(12) United States Patent
Ignatchenko

(10) Patent No.: US 12,238,003 B2
(45) Date of Patent: Feb. 25, 2025

(54) SYSTEMS, APPARATUSES AND METHODS FOR COOPERATING ROUTERS

(71) Applicant: Six Impossible Things Before Breakfast Limited, Dublin (IE)

(72) Inventor: Sergey Ignatchenko, Innsbruck (AT)

(73) Assignee: Six Impossible Things Before Breakfast Limited, Dublin (IE)

( * ) Notice: Subject to any disclaimer, the term of this patent is extended or adjusted under 35 U.S.C. 154(b) by 0 days.

(21) Appl. No.: 18/161,578

(22) Filed: Jan. 30, 2023

(65) Prior Publication Data

US 2023/0171191 A1 Jun. 1, 2023

Related U.S. Application Data

(60) Division of application No. 15/809,896, filed on Nov. 10, 2017, now Pat. No. 11,570,098, which is a
(Continued)

(51) Int. Cl.
*H04L 45/00* (2022.01)
*H04L 43/0852* (2022.01)
(Continued)

(52) U.S. Cl.
CPC .......... *H04L 45/74* (2013.01); *H04L 43/0852* (2013.01); *H04L 43/10* (2013.01);
(Continued)

(58) Field of Classification Search
CPC ..... H04L 45/74; H04L 43/0852; H04L 43/10; H04L 45/121; H04L 45/72; H04L 47/2416; H04L 47/32; H04L 69/16
See application file for complete search history.

(56) References Cited

U.S. PATENT DOCUMENTS

| 7,224,693 B1 | 5/2007 | Zhou et al. |
| 7,266,686 B1 | 9/2007 | Monteiro et al. |

(Continued)

FOREIGN PATENT DOCUMENTS

| EP | 2849397 A1 | 3/2015 |
| WO | WO 01/41380 A2 | 6/2001 |
| WO | WO 2009/005162 A2 | 1/2009 |

OTHER PUBLICATIONS

Boulanger et al., "Comparing interest management algorithms for massively multiplayer games," Netgames '06 Proceedings of $5^{th}$ ACM SIGCOMM Workshop on Network and System Support for Games, Article No. 6 (2006).
(Continued)

*Primary Examiner* — Lakeram Jangbahadur
(74) *Attorney, Agent, or Firm* — Arnold & Porter Kaye Scholer LLP

(57) ABSTRACT

Methods and systems are provided for cooperating routers in communication networks. The cooperating routers conduct a handshake to exchange information with respect to "cooperation types" which they are capable of performing and/or are configured to perform. In an exemplary "emergency connection" cooperation type, one cooperating router may use the ISP connection of another cooperating router to send and receive packets. In an exemplary "bandwidth sharing" cooperation type, one cooperating router may make excess bandwidth available for use by other cooperating routers. In an exemplary "latency optimization" cooperation type, one cooperating router may use another cooperating router to transmit duplicates of packets or to implement suppression techniques.

20 Claims, 43 Drawing Sheets

Related U.S. Application Data continuation-in-part of application No. 15/640,565, filed on Jul. 2, 2017, now Pat. No. 10,841,222.

(60) Provisional application No. 62/526,116, filed on Jun. 28, 2017, provisional application No. 62/421,193, filed on Nov. 11, 2016, provisional application No. 62/421,104, filed on Nov. 11, 2016, provisional application No. 62/376,073, filed on Aug. 17, 2016, provisional application No. 62/358,341, filed on Jul. 5, 2016.

(51) Int. Cl.
| | | |
|---|---|---|
| *H04L 43/10* | (2022.01) | |
| *H04L 45/121* | (2022.01) | |
| *H04L 45/74* | (2022.01) | |
| *H04L 47/2416* | (2022.01) | |
| *H04L 47/32* | (2022.01) | |
| *H04L 69/16* | (2022.01) | |

(52) U.S. Cl.
CPC ............ *H04L 45/121* (2013.01); *H04L 45/72* (2013.01); *H04L 47/2416* (2013.01); *H04L 47/32* (2013.01); *H04L 69/16* (2013.01)

(56) References Cited

U.S. PATENT DOCUMENTS

| | | | |
|---|---|---|---|
| 8,351,445 | B1 | 1/2013 | Kaniz et al. |
| 10,791,052 | B2 | 9/2020 | Ignatchenko |
| 10,841,222 | B2 | 11/2020 | Ignatchenko |
| 10,841,223 | B2 | 11/2020 | Ignatchenko |
| 10,841,224 | B2 | 11/2020 | Ignatchenko |
| 2001/0012294 | A1 | 8/2001 | Kadambi et al. |
| 2002/0063916 | A1* | 5/2002 | Chiu .................. H04L 49/557 398/5 |
| 2003/0081605 | A1 | 5/2003 | Egevang |
| 2003/0128746 | A1 | 7/2003 | Lener et al. |
| 2005/0122966 | A1 | 6/2005 | Bowes |
| 2006/0133364 | A1 | 6/2006 | Venkatsubra |
| 2007/0177594 | A1* | 8/2007 | Kompella ............ H04L 45/24 370/432 |
| 2008/0074996 | A1 | 3/2008 | Fourcand |
| 2008/0243990 | A1* | 10/2008 | Mallik ................. H04L 51/23 709/203 |
| 2009/0019505 | A1 | 1/2009 | Gopalakrishnan et al. |
| 2010/0061272 | A1 | 3/2010 | Veillette |
| 2010/0202378 | A1* | 8/2010 | Youn .................. H04W 72/56 370/329 |
| 2010/0226243 | A1 | 9/2010 | Lee et al. |
| 2010/0226247 | A1 | 9/2010 | Plamondon |
| 2011/0093540 | A1 | 4/2011 | Eisenberg et al. |
| 2013/0016724 | A1 | 1/2013 | Thaler |
| 2013/0201316 | A1 | 8/2013 | Binder et al. |
| 2013/0205040 | A1 | 8/2013 | Naor et al. |
| 2014/0047266 | A1 | 2/2014 | Borthakur et al. |
| 2014/0050150 | A1 | 2/2014 | Conte |
| 2014/0068357 | A1 | 3/2014 | Georges et al. |
| 2014/0086256 | A1 | 3/2014 | Raniere |
| 2014/0101331 | A1 | 4/2014 | Bartlett |
| 2014/0164640 | A1 | 6/2014 | Ye et al. |
| 2014/0314401 | A1* | 10/2014 | Fujimori .............. H04L 45/22 398/5 |
| 2014/0376427 | A1 | 12/2014 | Hui et al. |
| 2015/0085657 | A1* | 3/2015 | Hoehne ............... H04L 45/22 370/235 |
| 2015/0295752 | A1 | 10/2015 | Yamashita et al. |
| 2015/0373162 | A1 | 12/2015 | Mosko et al. |
| 2016/0112308 | A1 | 4/2016 | Ficara et al. |
| 2017/0346709 | A1* | 11/2017 | Menon ................. H04L 45/70 |
| 2018/0048567 | A1 | 2/2018 | Ignatchenko |
| 2018/0123958 | A1 | 5/2018 | Ignatchenko |
| 2018/0139131 | A1 | 5/2018 | Ignatchenko |
| 2018/0176133 | A1 | 6/2018 | Ignatchenko |
| 2018/0234341 | A1 | 8/2018 | Ignatchenko |
| 2021/0058325 | A1 | 2/2021 | Ignatchenko |
| 2021/0067446 | A1 | 3/2021 | Ignatchenko |
| 2021/0067447 | A1 | 3/2021 | Ignatchenko |
| 2021/0135989 | A1 | 5/2021 | Ignatchenko |
| 2021/0135990 | A1 | 5/2021 | Ignatchenko |

OTHER PUBLICATIONS

Ignatchenko, S., "An Algorithm for Online Data Compression," C/C++ Users Journal, vol. 6, No. 10, Oct. 1998.
International Search Report and Written Opinion issued Feb. 5, 2018 in International Patent Application No. PCT/IB2017/000972.
International Search Report and Written Opinion issued Feb. 8, 2018 in International Patent Application No. PCT/IB2017/057061.
Jin et al., "P-Code: A New RAID-6 Code With Optimal Properties," Proceedings of the 23$^{rd}$ International Conference on Supercomputing, pp. 360-369 (2009).
Plank et al., "Minimum density RAID-6 codes," ACM Transactions on Storage (TOS), vol. 6, Issue 4, Article No. 16, May 2011.
Plank, J.S., "The Raid-6 Liber8Tion Code," International Journal of High Performance Computing Applications, vol. 23, Issue 3, Aug. 2009.
Extended European Search Report issued Jan. 17, 2023 in European Appln. 22198038.6.

* cited by examiner

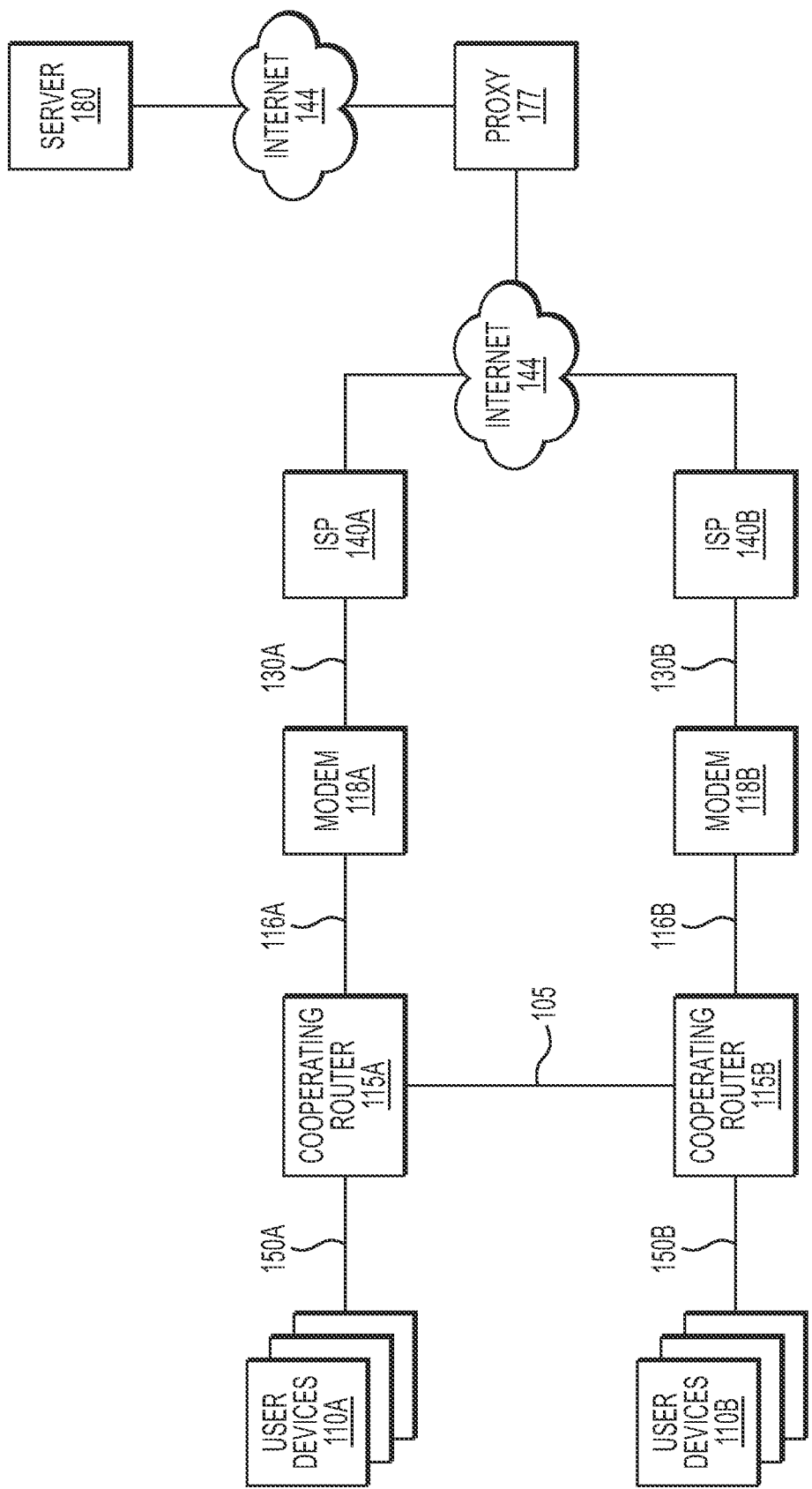

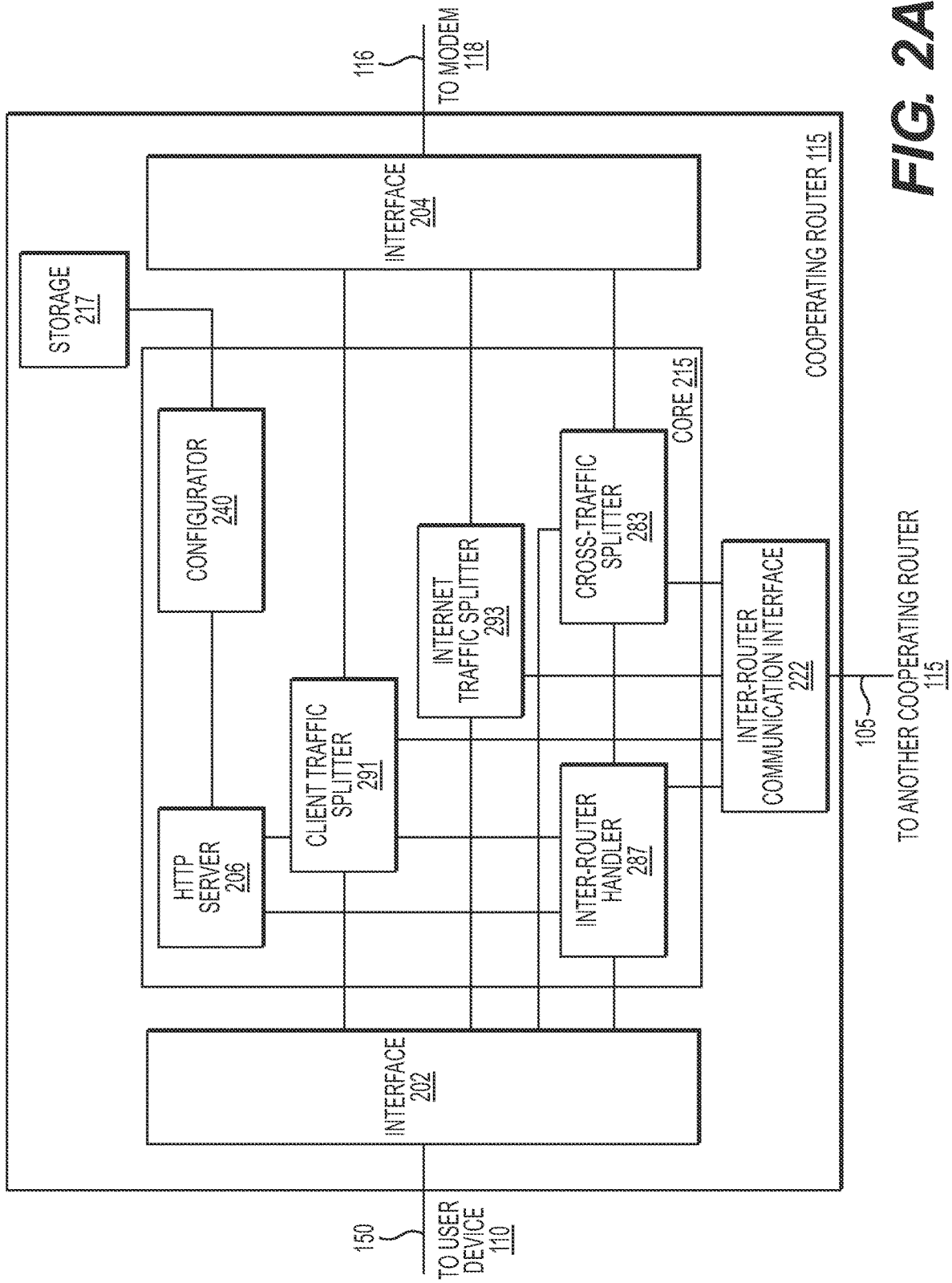

SYSTEMS, APPARATUSES AND METHODS FOR COOPERATING ROUTERS

RELATED APPLICATIONS

This application is a divisional application of U.S. application Ser. No. 15/809,896, filed Nov. 10, 2017, entitled "Systems, Apparatuses and Methods for Cooperating Routers" ("the '896 application). The '896 application claims priority to U.S. Provisional Application No. 62/421,104, filed Nov. 11, 2016, entitled "Cooperating Routers" ("the '104 Application"); U.S. Provisional Application No. 62/421,193, filed Nov. 11, 2016, entitled "Latency Oriented Router" ("the '193 Application"); and U.S. Provisional Application No. 62/526,116, filed Jun. 28, 2017, entitled "Latency-Oriented Router with Download and Video Acceleration" ("the '116 Application"); and is a continuation-in-part of U.S. application Ser. No. 15/640,565, filed Jul. 2, 2017, entitled "Systems, Apparatuses and Methods for Network Packet Management" ("the '565 Application"). The '565 application in turn claims priority to U.S. Provisional Application No. 62/358,341, filed Jul. 5, 2016, entitled "Latency Oriented Router" ("the '341 Application"); U.S. Provisional Application No. 62/376,073, filed Aug. 17, 2016, entitled "Latency Oriented Router" ("the '073 Application"); the '193 Application; and the '116 Application. The content of each of the '896, '104, '193, '116, '565, '341 and '073 applications is incorporated herein by reference in its entirety.

FIELD OF THE DISCLOSURE

The present disclosure relates generally to cooperating routers in communication networks.

BACKGROUND

Routers are ubiquitous in present day society. In many circumstances, the distance between two routers may be no more than several meters. This relatively close proximity has been known to cause technical problems, particularly wireless interference between different routers. However, such proximity presents new opportunities to improve user connectivity.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the relevant art to make and use the disclosure.

FIG. 1C is a schematic diagram illustrating an exemplary connection of cooperating routers, according to another embodiment of the present disclosure.

FIG. 2A is a block diagram illustrating an exemplary implementation of a cooperating router, according to an embodiment of the present disclosure.

The embodiments will be described in detail with reference to the accompanying drawings. In the drawings, generally, like reference numbers indicate the same or functionally similar elements.

DETAILED DESCRIPTION

Figure 1A:
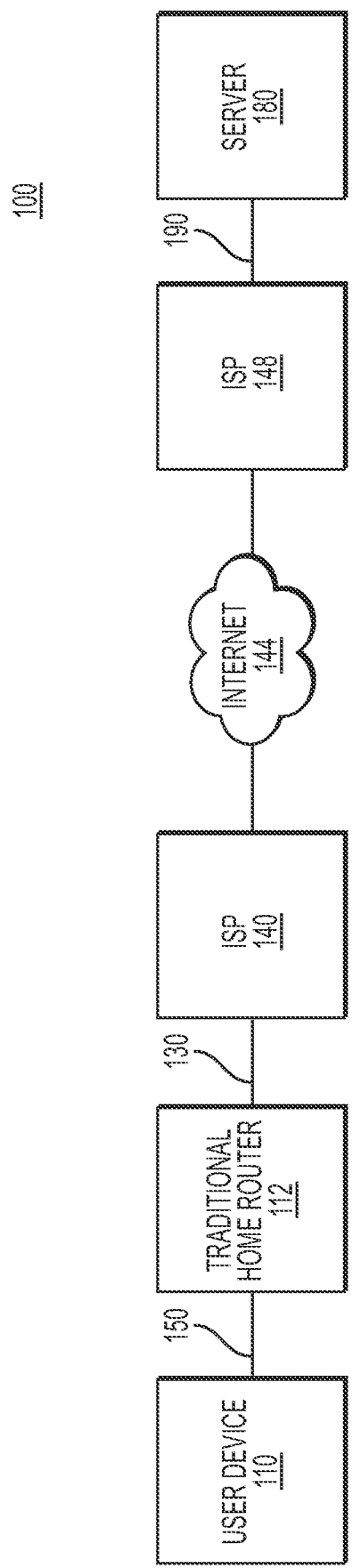
FIG. 1A is a schematic diagram illustrating an exemplary connection between user devices and a server through a traditional router.

Certain illustrative aspects of the systems, apparatuses and methods according to the present invention are described herein in connection with the following description and the accompanying figures. These aspects are indicative, however, of but a few of the various ways in which the principles of the invention may be employed and the present invention is intended to include all such aspects and their equivalents. Other advantages and novel features of the invention may become apparent from the following detailed description when considered in conjunction with the figures.

In the following detailed description, numerous specific details are set forth in order to provide a thorough understanding of the invention. In other instances, well known structures, interfaces and processes have not been shown in detail in order not to unnecessarily obscure the invention. However, it will be apparent to one of ordinary skill in the art that those specific details disclosed herein need not be used to practice the invention and do not represent a limitation on the scope of the invention, except as recited in the claims. It is intended that no part of this specification be construed to effect a disavowal of any part of the full scope of the invention. Although certain embodiments of the present disclosure are described, these embodiments likewise are not intended to limit the full scope of the invention.

The present disclosure comprises systems, methods, and apparatuses for cooperating routers. While the present invention is described and explained in the context of cooperating routers in communication with an internet service provider and end users, it is to be understood that it is not so limited and may be applicable to any systems, methods, and apparatuses directed to any packet processing communication networks.

As used herein, the term "port" refers to any kind of protocol-specific port, including, but not limited to, a Transmission Control Protocol (TCP) port or a User Datagram Protocol (UDP) port. As used herein, IP addresses, port numbers, session_ID or packet_ID numbers are exemplary and serve to facilitate the present disclosure and are not otherwise limiting in any manner.

As used herein, "adding fields" to a packet, or "wrapping", refers to a method that may be accomplished in a variety of ways, including, but not limited to: (a) wrapping, (b) adding field(s) to the beginning of a packet, and/or (c) adding field(s) to the end of a packet. The field that may be added to the beginning or end of a packet may have a fixed or variable size. If the field added is of a variable size, then the size of the field may be derived from the data within the field, for example, as in variable-length quantity (VLQ) coding. If VLQ coding is implemented or other variable-size fields are added to the end of a packet, such field(s) may be written in reverse byte order to facilitate determination of field size starting from the end of the packet.

As used herein, Ethernet is intended to encompass any present or future developed variants of Ethernet including, but not limited to, 10BASE-T, 100BASE-T, 1000BASE-T, 1000BASE-X, 10GBASE-T, or any other of 10BASE, 100BASE, 1000BASE, or 10GBASE connections and/or all versions of connections implemented according to the IEEE 802.3 standard. As used herein, Wi-Fi is intended to encompass any present or future developed variants of Wi-Fi including, but not limited to, all implementations compliant with the IEEE 802.11 standard.

It should be understood that, throughout this disclosure, stream-oriented connections and/or protocols, including, but not limited to, QUIC, UDP Torrent tracker and Stream Control Transmission Protocol may be used in a similar manner as a TCP connection and/or protocol. Additionally, all the protocols running on top of the aforementioned stream-oriented connections and/or protocols, including, but not limited to, HTTP, HTTPS and SPDY, may use features described within the context of the present disclosure by being implemented on top of the applicable stream-oriented connections and/or protocol.

FIG. 1A is a schematic diagram illustrating an exemplary connection between user devices and a server through a traditional router. The exemplary system shown in FIG. 1A includes user devices 110, traditional router 112, Internet service providers (ISPs) 140 and 148 and server 180. User devices 110, which may be any network connectable device, including, but not limited to, a desktop computer, laptop computer, phone or tablet, are connected using connection 150 to traditional router 112. Connection 150 may be, without limitation, a Wi-Fi connection, an Ethernet connection, a Bluetooth connection or any other existing or future developed communication systems and/or protocols with similar functionalities. Traditional router 112 may also provide services such as being a Dynamic Host Configuration Protocol (DHCP) server to user devices 110 and/or acting as a DHCP client with respect to its connection to ISP 140.

Traditional router 112 may connect to ISP 140 using connection 130. Connection 130 may be an Asymmetric Digital Subscriber Line (ADSL), Symmetric Digital Subscriber Line (SDSL), cable, 3G, 4G, long-term evolution (LTE), Ethernet or any other existing or future developed communication systems and/or protocols with similar functionalities. ISPs 140 and 148 may provide access to Internet 144.

Server 180 is connected to the ISP 148 using connection 190. Server 180 may be, without limitation, a game server, a financial trading server (such as, without limitation, a stock exchange and/or foreign exchange server), a media server or a Voice over Internet Protocol (VOIP) server. Connection 190 may be an Ethernet, Infiniband or any other existing or future developed communication systems and/or protocols with similar functionalities.

Communications between one of user devices 110 and server 180 may be performed by exchanging packets, including, but not limited to, IP packets and/or packets that correspond to Level 2, Level 3 or Level 4 of the Open Systems Interconnection (OSI) model.

Figure 1B:
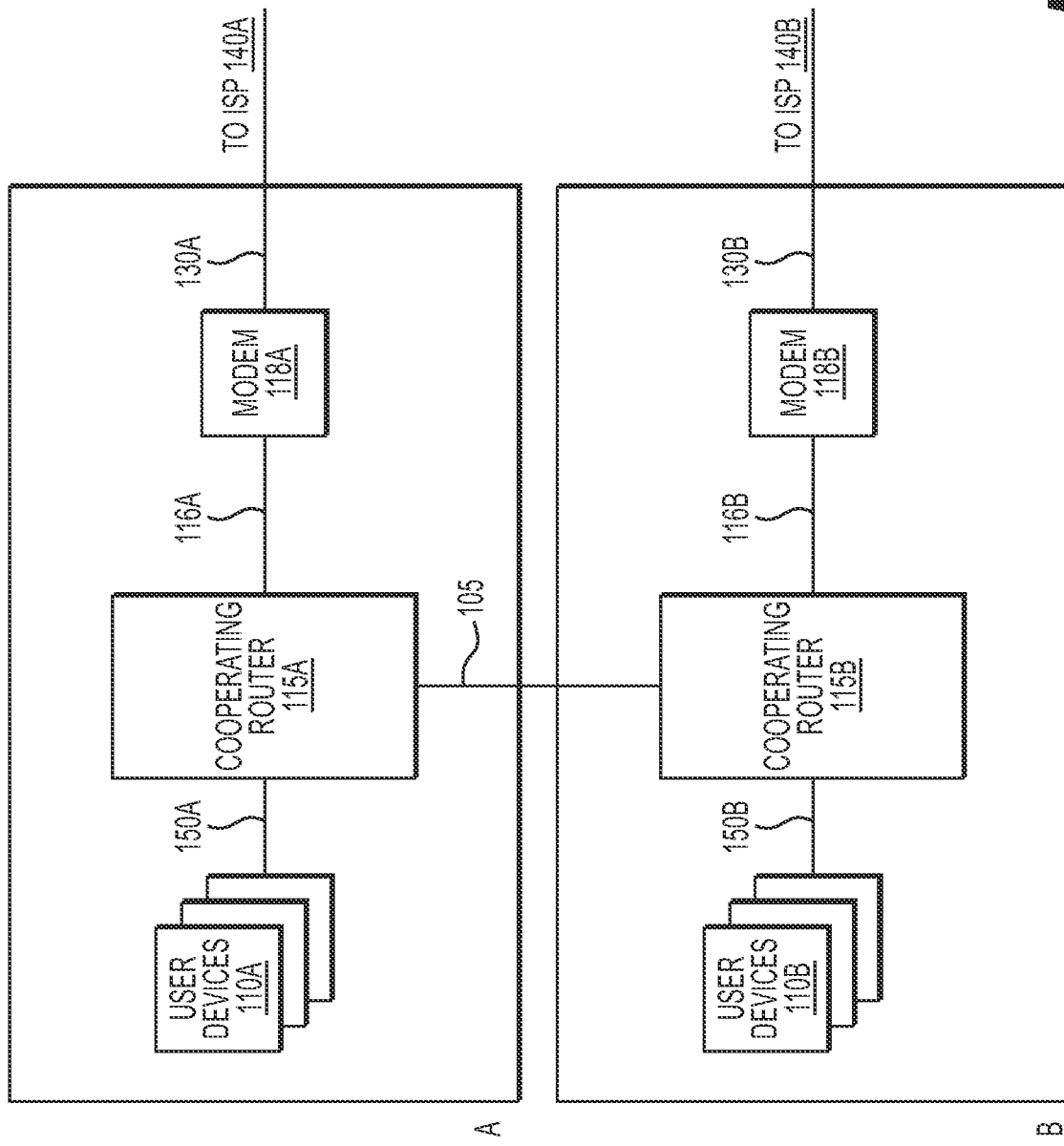
FIG. 1B is a schematic diagram illustrating an exemplary connection of cooperating routers, according to an embodiment of the present disclosure.

FIG. 1B is a schematic diagram illustrating an exemplary connection of cooperating routers 115, according to an embodiment of the present disclosure. FIG. 1B shows two cooperating routers 115A and 115B. Cooperating routers 115A and 115B may be located anywhere so long as they are capable of communicating with one another in the manner set forth in the present disclosure. As illustrative examples, cooperating routers 115A and 115B may be located in separate structures (e.g., two separate houses or apartments, two separate offices, a house and an office, etc.), in the same structure (e.g., in the same house or office), or in no structure (e.g., outdoors). Each of the cooperating routers 115 may connect to user devices 110, which may include, but are not limited to, smartphones, personal computers, laptops, servers or tablets. Cooperating routers 115 may be connected to their respective user devices 110 via connection 150, which may be implemented as, without limitation, Wi-Fi, Ethernet, Bluetooth or any other existing or future developed communication systems and/or protocols with similar functionalities.

Cooperating routers 115 may also connect to respective modems 118 using connections 116. Modems 118 may include, without limitation, ADSL modems, cable modems or LTE modems. Connections 116 between cooperating routers 115 and respective modems 118 may be implemented, without limitation, as Ethernet connections and/or Universal Serial Bus (USB) connections, or any other technology with similar functionality, known now or developed in the future. In some embodiments, one or more of modems 118 may be implemented as a part of respective cooperating router 115. Modems 118 may be connected to their respective ISP or to the same ISP, using connections 130, which connections may be implemented, without limitation, as ADSL, SDSL, cable, 3G, 4G, LTE, Ethernet or any other existing or future developed communication systems and/or protocols with similar functionalities.

In addition, cooperating routers 115A and 115B may connect to each other via connection 105. Connection 105 may include, without limitation, a Classic Bluetooth connection (including, but not limited to, enhanced data rate (EDR) Bluetooth), a Bluetooth Low Energy (BLE) connection, a Wi-Fi connection (using, without limitation, Wi-Fi infrastructure mode, i.e., a basic service set (BSS), or Wi-Fi ad hoc mode, i.e., an independent basic service set (IBSS)), an IEEE 802.14 connection, a sub-GHz ISM band connection (which may be implemented based on, without limitation, one of 315 MHz, 433 MHZ, 470 MHZ, 868 MHz, 915 MHz, 928 MHz or 960 MHz transceivers), an Ethernet connection or any other existing or future developed communication systems and/or protocols with similar functionalities. As discussed below, the additional connection 105 may provide for various improvements in user experience and network connectivity.

FIG. 1C is a schematic diagram illustrating an exemplary connection of cooperating routers 115, according to another embodiment of the present disclosure. In addition to elements shown on FIG. 1B (including cooperating routers 115, user devices 110 and modems 118), FIG. 1C includes ISPs 140A and 140B connected to Internet 144; Internet 144 connected to proxy 177; and Internet 144 connected to server 180. In some embodiments, Internet 144 to the left of the proxy 177 and Internet 144 to the right of the proxy 177 may be the same Internet 144.

FIG. 2A is a block diagram illustrating an exemplary implementation of cooperating router 115, according to an embodiment of the present disclosure. Core 215 may implement the router's routing logic, including traditional router logic and/or logic according to the present disclosure. Core 215 may be implemented, without limitation, as a central processing unit (CPU), microcontroller (MCU), microprocessor (MPU), an application-specific integrated circuit (ASIC), a field programmable gate array (FPGA) or any combination of the aforementioned, with an optional addition of random access memory (RAM).

Cooperating router 115 may include communication interfaces 202 and 204, storage 217, core 215 and inter-router communication interface 222. Interfaces 202 may be hardware and/or software interfaces to handle connections 150 from user device 100, and interface 204 may be hardware and/or software interfaces to handle connections 116 to modem 118 as illustrated in FIG. 1B and described above.

Interfaces 202 may be implemented, without limitation, as Ethernet, Wi-Fi, Classic Bluetooth, BLE or any other existing or future developed communication systems and/or protocols with similar functionalities. One or more interfaces 202 may provide connectivity via connections 150 to user devices 110. Interfaces 204 may be implemented, without limitation, as Ethernet, Wi-Fi, Classic Bluetooth, BLE or any other existing or future developed communication systems and/or protocols with similar functionalities. One or more interfaces 204 may provide connectivity via connections 130 to ISPs 140. Additionally, one or more interfaces 204 may connect to one or more modems 118.

Storage 217 may be implemented, without limitation, as persistent storage such as a solid-state disk (SSD), hard disk drive (HDD), electrically erasable programmable read-only memory (EEPROM), Flash, battery-backed RAM or any other existing or future developed storage with similar functionality.

In some embodiments, inter-router communication interface 222 may be used to communicate with another cooperating router 115. Inter-router communication interface 222 may be implemented as a Bluetooth module, such as, without limitation, a Classic Bluetooth module, BLE module (i.e., Bluetooth Smart) and/or dual-mode Bluetooth module (i.e., Bluetooth Smart Ready). A dual-mode Bluetooth module may support both Classic Bluetooth and BLE. The Bluetooth module may also support EDR. The Bluetooth module may include one or more of an antenna, radio frequency (RF) transceiver, processor or host interface.

In other embodiments, inter-router communication interface 222 may be implemented as a Wi-Fi module. The Wi-Fi module may include, without limitation, an antenna, RF transceiver, processor or host interface. In some such embodiments, the Wi-Fi module may be one of the Wi-Fi modules on the cooperating router 115. In some embodiments, the Wi-Fi module used to implement inter-router communication interface 222 may be configured to use less bandwidth than the available maximum.

In other embodiments, inter-router communication interface 222 may be implemented, without limitation, as an Ethernet module or an IEEE 802.14 module.

In some embodiments, and as explained in more detail below, core 215 may include configurator 240, which may store configuration information in persistent storage 217, which may reside outside of core 215. Upon powering up and/or restarting of cooperating router 115, the configuration information may be read from storage 217 into configurator 240 of core 215. Configurator 240 may be controlled by Hypertext Transfer Protocol (HTTP) server 206. Alternatively, configurator 240 may be controlled by other devices to generate the configuration information. The generated configuration information from configurator 240 may be used by some or all the other modules of core 215.

Core 215 may also include cross-traffic splitter 283, inter-router handler 287, client traffic splitter 291 and internet traffic splitter 293.

As used herein, "inter-router communication protocol" may be any protocol which consists of packets and/or messages which are exchanged between cooperating routers 115. Packets and/or messages within this protocol may include, without limitation, a cross_packet_type field, as well as other information.

Cross-traffic splitter 283 may receive via inter-router interface 222 packets and/or messages from another cooperating router 115 and may classify each packet and/or message into one of three categories on the basis of, for example, a cross_packet_type field within such packet and/or message. Packets and/or messages in the first category are control packets and/or messages intended for a cooperating router 115 directly. Such packets may be forwarded to inter-router handler 287. Packets and/or messages in the second category are those which another cooperating router 115 requests to forward to Internet 144, which packets and/or messages may also contain information about a target IP/port. An IP packet may be extracted from such packets and/or messages, and such extracted packet may be forwarded to an interface 204. In some embodiments, before forwarding, such packets and/or messages may be modified by "NAT-like translation" and/or "proxy translation 2", as described in more detail below. Such modification may involve the creation of and/or the detection of the "forwarded session" in a manner similar to the creation of the "latency-critical session", as described in more detail below. Packets and/or messages in the third category are those that, in the context of a "forwarded session", one cooperating router 115 has requested from another cooperating router 115 and need to be forwarded to a user device 110. Such packets and/or messages may contain an IP packet, which may be similar to an IP packet traveling between latency-oriented router 120 and latency-oriented proxy 121, as described in more detail below. Cross-traffic splitter 283 may extract such IP packet from the incoming packet and/or message and then may forward it to an interface 202. In some embodiments, before forwarding, cross-traffic splitter 283 may also modify the extracted IP packet using "reverse NAT-like translation" and/or "reverse proxy translation", as described in more detail below. Such modification(s) may be implemented in a manner similar to that described below with respect to latency-oriented router 120.

Client traffic splitter 291 may receive IP packets from interface 202 and may classify each such IP packet into one of two categories. First, such IP packets may be packets intended for inter-router handler 287. Such packets may be identified, for example, because they have the same target IP address as one of the IP addresses of interfaces 202 and/or a predefined protocol field and/or a port field (such as a TCP port field or UDP port field). Such packets may be forwarded to inter-router handler 287 and/or HTTP Server 206. The decision of where exactly to direct such packets may be determined, for example, based on a pre-defined set of target IP addresses and/or ports for inter-router handler 287 and/or a pre-defined set of target IP addresses and/or ports for HTTP Server 206.

Second, IP packets received by client traffic splitter 291 may be packets intended for the Internet. This category may include all packets not in the first category described above. Such second category of packets may be further classified into two subcategories. The first subcategory comprises packets which need to be forwarded to another cooperating router 115. Such packets may be "wrapped" into an appropriate packet and/or message intended for another cooperating router 115 and may be forwarded to inter-router interface 222. This "wrapped" packet and/or message may include an incoming packet. Prior to "wrapping", the relevant packet may be modified using "NAT-like translation" and/or "proxy translation" as described in more detail below. Such modification process may involve finding an existing "forwarded session" which matches the incoming packet or creating a new "forwarded session". This may be achieved in a manner similar to the finding and/or creation of a "latency-critical session" as described in more detail below. The second subcategory comprises packets which need to be forwarded to interface 204. Such packets may be forwarded to interface 204 without changes or with changes related to applying network address translation (NAT) (including, but not limited to, "NAT-like translation" as described in more detail below and/or NAT techniques, including, but not limited to, network address port translation (NAPT), as described in RFC2663, RFC3022, RFC4787 and/or RFC5382, the entirety of each of which is incorporated herein by reference).

The decision of whether an incoming packet needs to be forwarded to another cooperating router 115 may depend on the current state of "inter-router handler" 287. Examples of such states may include, without limitation: forwarding all packets to another cooperating router 115, which may apply in case of an "emergency connection" described in more detail below; forwarding only certain types of connections and/or only certain connections (such as a TCP connection or a UDP session); and/or for certain connections, such as latency-critical connections or connections in the context of "proxied bandwidth sharing" described in more detail below, making such decision for each packet individually. Client traffic splitter 291 may implement some or all of the logic of selecting connections and/or packets to be forwarded. Examples of such logic are described in more detail with respect to "bandwidth sharing" and/or "latency optimization" cooperation types.

Internet traffic splitter 293 may receive IP packets from interface 202 and may classify each of them into one of two categories. The first category comprises packets which need to be forwarded to another cooperating router 115. Such packets may be identified by matching them to an existing "forwarded sessions" originated by another cooperating router 115 in a manner similar to that for detecting existing "latency-critical sessions" described in more detail below. Such packets may be "wrapped" into an appropriate packet and/or message intended for another cooperating router 115 and may be forwarded to inter-router interface 222. Such "wrapped" packet and/or message may include the incoming packet and/or some other fields. Prior to "wrapping", the packet may be modified using "reverse NAT-like translation" and/or "reverse proxy translation" as described in more detail below. The second category comprises packets which need to be forwarded to interface 204. Such packets may be forwarded to interface 204 without changes or with changes related to applying NAT (including, but not limited to, "NAT-like translation" as described in more detail below and/or NAT techniques, including, but not limited to, NAPT, as described in RFC2663, RFC3022 RFC4787 and/or RFC5382).

In some embodiments, including, but not limited to those implementing "bandwidth sharing" cooperation types, cooperating router 115 may also include a "stream splitter" 254 (not shown) and/or "stream joiner" 256 (not shown), each of which is described below.

Figure 2B:
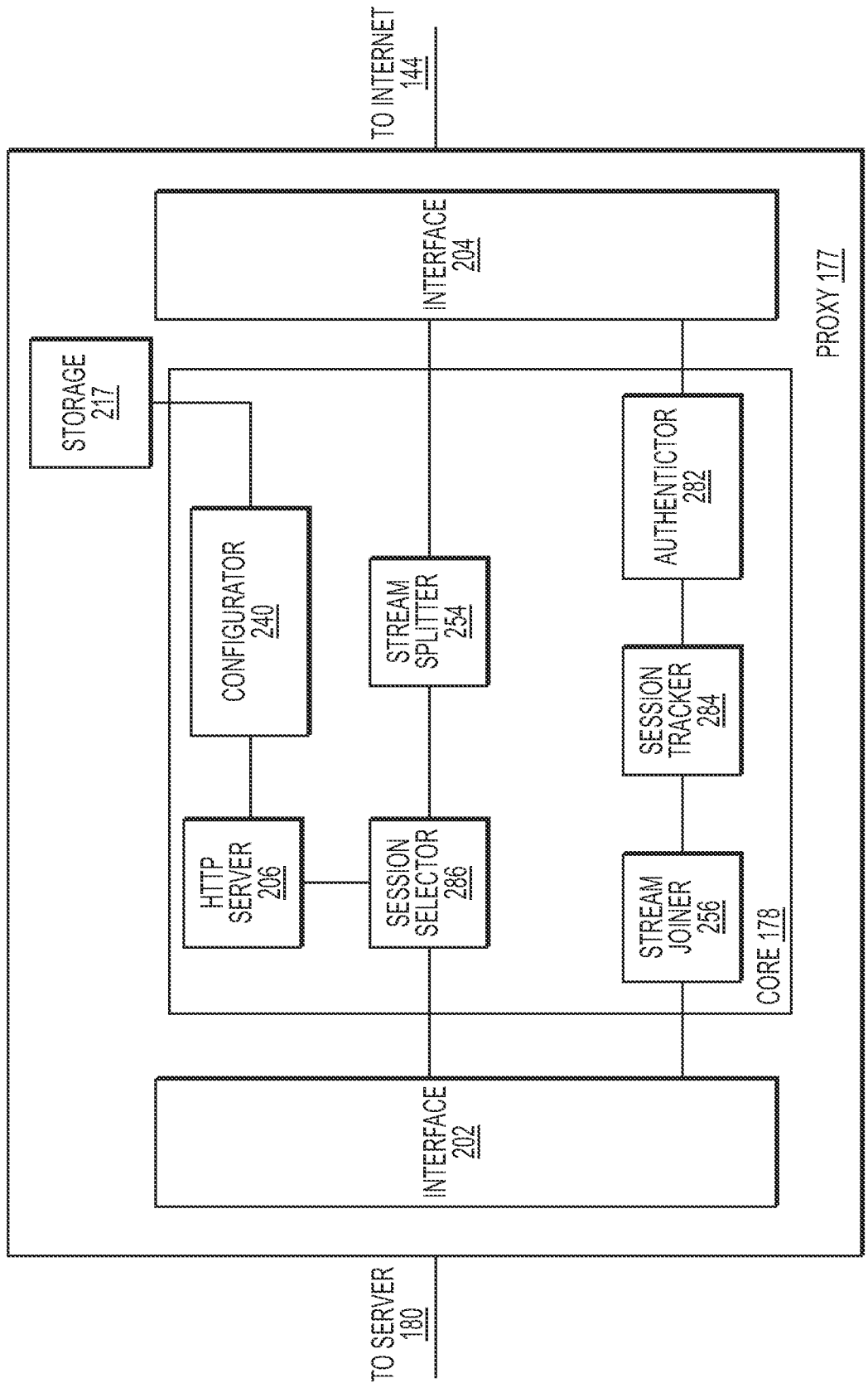
FIG. 2B is a block diagram illustrating an exemplary implementation of a proxy, according to an embodiment of the present disclosure.

FIG. 2B is a block diagram illustrating an exemplary implementation of proxy 177, according to an embodiment of the present disclosure. Proxy 177 may include interface 202, core 178, one or more interfaces 204 and, optionally, storage 217. In some embodiments, core 178 may further include configurator 240, session selector 286, stream splitter 254, authenticator 282, session tracker 284 and/or stream joiner 256. Optionally, core 178 may also include HTTP server 206. Interfaces 202 and/or 204 may be "virtual interfaces" built on top of "physical" interface(s) as described below. In other embodiments, "virtual interfaces" may be built on top of the same physical interface so that only one physical interface performs the functions of both interface(s) 202 and interface(s) 204.

In some embodiments, proxy 177 may also implement some or all of the functionalities and/or include some or all the components described below with respect to latency-oriented proxy 121, intermediate proxy 122 and/or simple proxy 124.

In some embodiments, session tracker 284 may be implemented as described below (for example, with respect to FIG. 5B). In other embodiments (for example, when TCP stream is used), the following implementation ("TCP-based session tracker") may be used. "TCP-based session tracker" may "listen" for a TCP stream and accept incoming TCP connections. Then "TCP-based session tracker" may read some portion of the TCP stream ("stream header"). Such "stream header" may contain a proxy_target_IP field, proxy_target_port field and/or session_ID field. Session tracker 284 may then check if there is already a session matching the session_ID field in the stream header. If so, session tracker 284 may associate such incoming TCP connection with the existing session as a "multiplexed" connection. If not, session tracker 284 may create a new session (with an associated session_ID), associate the TCP connection with this created session as a "multiplexed" connection and use the proxy_target_IP field and/or proxy_target_port field to establish an outgoing TCP connection intended for server 180, which TCP connection may be associated with the created session as a "demultiplexed" connection. In addition, "TCP-based session tracker" may forward the remaining portions of the TCP stream (i.e., the portions not constituting the "stream header") to stream joiner 256.

In some embodiments, stream joiner 256 may be implemented as follows. It may receive packets (for example, from session tracker 284, with packets originating from both interfaces 204) and forward such packets (for example, to interface 202). When forwarding packets, stream joiner 256 may modify them using, without limitation, "NAT-like translation" and/or "proxy translation 2", as described in more detail below.

In some embodiments, for example, when a TCP or other stream-oriented protocol is involved, stream joiner 256 may also perform reassembly of the TCP stream (or other type of stream) in the internal buffer. Reassembly of such stream may be implemented in a manner similar to the stream reassembly performed by a TCP stack (described in RFC793, the entirety of which is incorporated herein by reference). As a portion of the stream becomes available, stream joiner 256 may split it into valid TCP (or other) packets (described in RFC793), and then send such packets to interface 202. Modifications to such packets, as described above, may be applied.

In some embodiments, for example, when a TCP or other stream-oriented protocol is involved, stream joiner 256 may be implemented as a "TCP-based stream joiner". A "TCP-based stream joiner" may receive portions of a TCP stream (for example, from session tracker 284), along with information about "multiplexed" connections and/or sessions where such TCP stream portion was received. The "TCP-based stream joiner" may combine the stream portions to obtain messages from a TCP-based stream splitter, along with information about associated sessions. As described with respect to TCP-based stream splitter, each of these messages may contain data size, information about the position of data within the stream, and data itself. Such information may be used to place the data in the internal buffer, effectively reassembling the TCP stream.

In some embodiments, reassembly of the stream may be implemented in a manner similar to stream reassembly performed by a TCP stack (and described in RFC793). In such an embodiment, a "position_within_the_stream" field may be used similarly to the way a "sequence number" field is used in RFC793. When the next portion which should be sent to the reassembled stream becomes available, a "TCP-based stream joiner" may send such portion to the "demultiplexed" TCP connection associated with the session and remove such portion from the internal buffer. Packets sent to the "demultiplexed" TCP connection may be further modified using, without limitation, "NAT-like translation" or "reverse NAT-like translation", described in more detail below.

In some embodiments, session selector 286 may be implemented as described below, for example, with respect to FIG. 5B. In other embodiments that may use a TCP stream, session selector 286 may be implemented as a "TCP-based session selector". A "TCP-based session selector" may "listen" for incoming portions of a TCP stream of a "demultiplexed TCP connection", which may have been created by a "TCP-based session tracker", and may select a session associated with such outgoing TCP connection. Information about such session, along with the portion of the TCP stream, may be passed to stream splitter 254.

In some embodiments, stream splitter 254 may receive packets (for example, from session selector 286, with packets originating from interface 202), and may then send some percentage of such packets (for example, 50 percent) to one of interfaces 204, and some other percentage of them (for example, the remaining 50 percent) to another one of interfaces 204. It should be noted that the distribution of percentages of packets sent to each interface 204 as indicated above is merely illustrative and could be any distribution of percentages that adds up to 100 percent. When sending packets to interface 204, such packets may be modified using "reverse NAT-like translation" and/or "reverse proxy translation" as described in more detail below.

In some embodiments that involve TCP or other stream-oriented protocol, stream splitter 254 may also perform reassembly of the TCP stream in the internal buffer, as described above. As a portion of a TCP stream becomes available, stream splitter 254 may split the stream into valid TCP packets (for example, according to RFC793) and then send some percentage of such TCP packets to one of interfaces 204, and some other percentage of them to another one of interfaces 204. The distribution of percentages of packets sent to each of the interfaces 204 could be any distribution of percentages. When sending packets to interface 204, such packets may be modified using "reverse NAT-like translation" and/or "reverse proxy translation" as described in more detail below.

In some embodiments that involve TCP or other stream-oriented protocol, stream splitter 254 may be implemented as a "TCP-based stream splitter". A "TCP-based stream splitter" may receive portions of a TCP stream from a "TCP-based session selector" (along with information about the associated session), and may store such portions in an internal buffer. In some exemplary embodiments, such portions of the TCP stream may range from 100 bytes to 1 Mbytes. A "TCP-based stream splitter" may also send portions of data from such internal buffer, either directly or as messages over a TCP stream, to one or more "multiplexed connections" associated with the session. If messages are used to send the portions of stream, each such message may contain one or more of the following: data size, information about position of the data within the stream and data itself. In some embodiments, a "TCP-based stream splitter" may send some percentage of such portions of stream and/or messages to one of the "multiplexed connections", and some other percentage of such portions of stream and/or messages to another one of the "multiplexed connections". The distribution of percentages of data and/or messages to each "multiplexed connection" could be any distribution of percentages. In some embodiments, TCP packets sent via "multiplexed connections", may be sent via different interfaces on a per-packet basis. In some such embodiments, there may be only one "multiplexed connection" instead of multiple "multiplexed connections".

In some embodiments that use a "TCP-based stream splitter", the "TCP-based stream splitter" may detect TCP connections that become "stuck" (i.e., not responsive), and initiate re-establishing any such "stuck" TCP connections (for example, by terminating the existing TCP connection and creating a new one). Detection of a "stuck" TCP connection may be implemented using one or more of the following methods: (a) a TCP keep-alive (for example, as described in RFC1122, the entirety of which is incorporated herein by reference); (b) application-level keep-alives sent as a special type of the portions of data and/or messages described above; and/or (c) detection of a lack of incoming packets and/or lack of acknowledgments (ACKs) within incoming packets over the course of a certain time period (such as 10 to 300 seconds) while at least some TCP packets are being sent over the same TCP connection.

In some embodiments, when sending packets to different interfaces (or when sending portions of data to different "multiplexed connections"), such sent packets or portions of data may be randomized while roughly preserving the same overall percentages of packets (or portions of data) sent to each interface. In one exemplary embodiment, the probability of sending a packet (or a portion of stream) to each of the interfaces (or "multiplexed connections") may be proportional to the percentages assigned to such interfaces (or "multiplexed connections"). Such randomization may help to avoid certain classes of packet loss from becoming persistent and to prevent the connection from becoming "stuck".

In some embodiments, percentages of packets sent to different interfaces (or portions of stream sent to different "multiplexed connections"), may be communicated to proxy 177 by cooperating router 115. Such percentages may be sent by cooperating router 115 according to the relative bandwidth capacity of connections 130 described above with respect to FIG. 1C. In some embodiments, the number of packets (or portions of stream) forwarded, the size of packets (or portions of stream) forwarded and/or a weighted sum of these two parameters may be counted for the purposes of calculating percentages.

In some embodiments, percentages of packets sent to different interfaces may be calculated based on the frequency of recent "congestion events" for sessions being held over each of the interfaces. The more recently "congestion events" are observed for a particular interface, the lower the percentage that is assigned to the particular interface may be. In one example, percentages for interfaces may be calculated to be inversely proportional to the respective numbers of recent "congestion events". "Congestion events" may be found via one or more of the following mechanisms: (i) an IP Explicit Congestion Notification (ECN) (as described in RFC3168, the entirety of which is hereby incorporated by reference), wherein each ECN may be considered a "congestion event"; (ii) duplicate ACKs for TCP connections, wherein each duplicate ACK may be considered a "congestion event"; and/or (iii) any of the "potential issue detection" techniques described below. In some embodiments, "congestion events" may be considered "recent" based on some pre-designated time threshold (for example, between 1 and 60 seconds). Different types of "congestion events" may have different weights for the purposes of calculating percentages. For example, a "potential issue" of a lost packet over a latency-critical session may have several times (for example, 2 to 5 times) more impact on a percentage calculation than a duplicate TCP ACK.

It should be noted that approaches similar to those described above may be applied when the number of interfaces 204 is more than two. It also should be noted that, whenever a present description includes a TCP stream, other similar stream-oriented protocols, including, but not limited to, Sequence Packet Exchange (SPX), QUIC and/or SCTP may be implemented in a similar manner as a TCP stream.

Figure 3A:
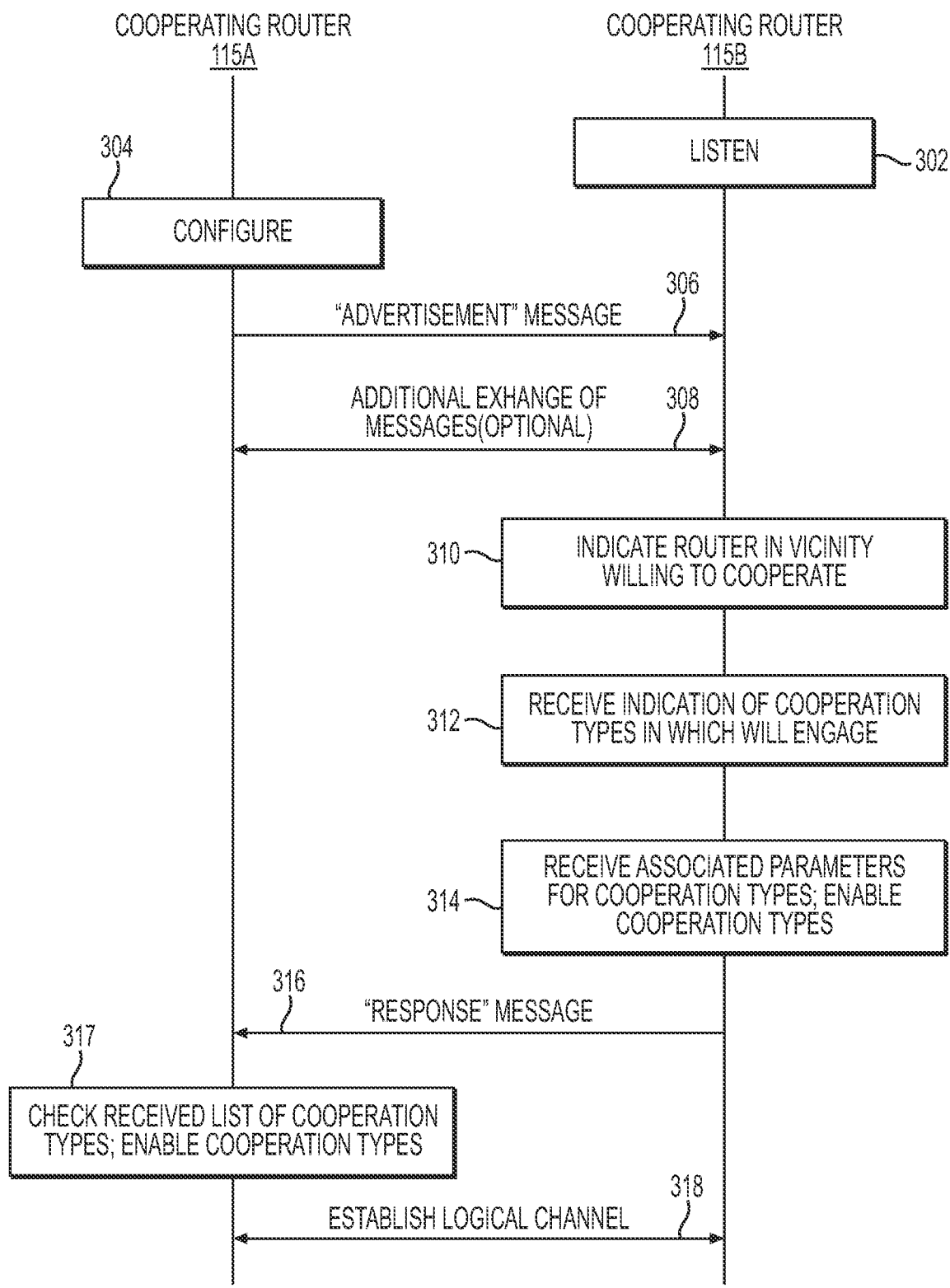
FIG. 3A illustrates a flow diagram of an exemplary "handshake" between cooperating routers, according to an embodiment of the present disclosure.

FIG. 3A illustrates an exemplary flow diagram of a "handshake" between cooperating routers 115, according to an embodiment of the present disclosure. At step 302, cooperating router 115B may be powered on and its inter-router communication interface 222 may "listen" (e.g., be ready to receive) for "advertisement" messages. Such "listening" may be implemented, by inter-router handler 287 instructing inter-router interface 222 to start "listening". In embodiments where connection 105 is implemented as a BLE connection, such "listening" by inter-router interface 222 may be implemented, without limitation, as a BLE Link Layer Scan. At a higher abstraction level, "listening" may be implemented as a Generic Access Profile (GAP) Observer and/or as a BLE Generic Attribute Profile (GATT) server "listening" for incoming requests. In embodiments where connection 105 is implemented as a Classic Bluetooth connection, such "listening" may be implemented, without limitation, as a Bluetooth Inquiry Scan and/or a Bluetooth Page Scan. At a higher abstraction level, "listening" may be implemented as a service delivery platform (SDP) server "listening" for inquiries from SDP clients. In embodiments where connection 105 is implemented as a Wi-Fi connection, such "listening" may be implemented, without limitation, as receiving Wi-Fi beacon frames. In embodiments where connection 105 is implemented as an Ethernet connection, "listening" may involve asking a user to connect devices with an Ethernet cable, and "listening" for Layer 2 (L2) Ethernet packets and/or frames. In embodiments using IP-enabled services such as Wi-Fi, Ethernet or personal area network (PAN) and/or Bluetooth Network Encapsulation Protocol (BNEP) over Bluetooth, such "listening" may be implemented by creating a logical network interface (such as, without limitation, a Linux network interface or Windows network interface), requesting IP addresses for such interface (for example, over DHCP), and "listening" on some ports (such as TCP and/or UDP ports) on such network interface and/or IP of such network interface.

At step 304, the cooperating router 115A may be configured to indicate that it is capable of and able to cooperate. The configuration may also specify or indicate which "cooperation types" the router is capable of performing and/or is configured to perform. As used herein, the term "cooperation types" refers to cooperation types and associated parameters thereof. Such configuration may be implemented using end-user interactions with HTTP Server 206 and/or inter-router handler 287. In some embodiments, such interactions may be implemented as interactions, including, but not limited to, HTTP requests and/or responses, with inter-router 287 via HTTP Server 206.

At step 306, the inter-router communication interface 222 of cooperating router 115A may send an "advertisement" message indicating it is ready and able to cooperate. This may happen, for example, as a result of inter-router handler 287 instructing inter-router communication interface 222 to do so. Such "advertisement" message may be received by the inter-router communication interface 222 of cooperating router 115B. In embodiments where connection 105 is implemented as a BLE connection, cooperating router 115A may implement step 306, without limitation, as a BLE Link Layer Advertisement. At a higher abstraction level, it may be implemented using BLE GAP Broadcast and/or GATT service discovery. In embodiments where connection 105 is implemented as a Classic Bluetooth connection, the cooperating router 115A may implement the "advertisement" message, without limitation, as a Bluetooth Inquiry. At a higher abstraction level, it may be implemented as an SDP client performing service discovery. In embodiments where connection 105 is implemented as a Wi-Fi connection, the cooperating router 115A may implement such "advertisement" messages, without limitation, as broadcasting Wi-Fi beacon frames. In embodiments where connection 105 is implemented as an Ethernet connection, cooperating router 115A may implement "advertisement" messages by sending specially formed L2 Ethernet packet(s) and/or frame(s), which are described in more detail below. In embodiments using IP-enabled services such as Wi-Fi, Ethernet and/or PAN/BNEP over Bluetooth, "advertisement" messages may be implemented by creating a network interface, launching a DHCP server on such network interface, waiting for the other side of communication to receive an IP address via such network interface and sending IP packet(s) to the received IP address over such network interface.

It should be noted that, although step 306 is shown only once in FIG. 3A, the cooperating router 115A may repeat step 306 periodically such that the "advertisement" message is sent at regular or irregular intervals.

In some embodiments, cooperating routers 115 may measure the actual bandwidth of connection 105. Such actual bandwidth measurement may be implemented by sending multiple packets over connection 105, aiming to saturate such connection. The observed bandwidth may then be interpreted as a metric of "actual bandwidth". Such "actual bandwidth" may be included as a part of "additional information", which may be exchanged between cooperating routers 115, as described in more detail below.

At optional step 308, cooperating routers 115A and 115B may engage in an additional exchange of control message(s) to communicate additional information, including, but not limited to, the "cooperation types" that the cooperating router 115 is capable of performing and/or is configured to perform; types and/or bandwidths of ISP connection available to one or both of the cooperating routers 115; and/or typical patterns of traffic averaged by respective cooperating routers 115 across a finite time interval, such as a day or week. In some embodiments, all or part of such additional information may be included in the "advertisement" message sent by the cooperating router 115A at step 306.

In embodiments using Classic Bluetooth for connection 105, some additional exchanges may be necessary, such as a sequence of exchanges leading to the establishment of an asynchronous connection-less (ACL) or synchronous connection-oriented (SCO) link, with a subsequent exchange of packets over such established ACL or SCO link. In embodiments using BLE for connection 105, the amount of information which may be included in "advertisement" messages may be limited, so subsequent communication using, without limitation, Scan Response and/or Scan Payload packets may be necessary if the information to be advertised exceeds the size limit.

In some embodiments, "advertisement" messages may include "co-op router magic number" information (with the concept being similar in nature to file magic numbers), which may indicate that the "advertisement" message is intended for cooperating routers 115 and may allow for distinction between "advertisement" messages intended for cooperating routers 115 and all other "advertisement" messages sent over the same protocol.

In some embodiments, a "co-op router magic number" may be transferred as a pre-defined part of the packet, at a certain offset from the beginning of the packet (or payload). For example, in embodiments where connection 105 is implemented using BLE, a "co-op router magic number" may be conveyed as a GAP manufacturer-specific data field, with several bytes (such as 4 bytes) as a pre-defined constant at a pre-defined offset (for example, zero offset). A "co-op router magic number" may also be represented as a pre-defined constant within a BLE link-layer Advertisement packet. As another example, a "co-op router magic number" may be part of a payload of an L2 Ethernet packet and/or frame or an IP packet described above.

In some embodiments, protocol-specific features may be utilized to implement "co-op router magic numbers". For example, in embodiments where connection 105 is implemented as a BLE connection, "co-op router magic number" may be a universally unique identifier (UUID) in GATT service definition. In embodiments where connection 105 is implemented as a Bluetooth Classic connection, a "co-op router magic number" may be implemented as an UUID of the SDP service. In embodiments where connection 105 is implemented using Wi-Fi, "co-op router magic number" information and/or additional information may be included in the service set identifier (SSID) field of the Wi-Fi beacon frame.

In embodiments in which L2 Ethernet packets and/or frames are used, specially formed L2 Ethernet packet(s) and/or frame(s) may be used as described above. Such specially formed L2 Ethernet packet(s) and/or frame(s) may use "co-op router magic numbers" as discussed above and/or may have special values of certain Ethernet fields to distinguish such packet from other Ethernet packets. The special values may include one or more of the following: a special pre-defined value for a media access control source address, a special pre-defined value for a media access control destination address and/or a special pre-defined value for an Ethernet type/length field. Similarly, "co-op router magic numbers" and/or special values of source/destination IPs and/or ports may be used for IP packets.

In some embodiments, in addition to (or instead of) a "co-op router magic number", a checksum may be used. In such cases, the validity of either the "co-op router magic number", the checksum or both may be used to determine whether an "advertisement" message is from another cooperating router 115.

In embodiments in which Wi-Fi is used, the SSID may have one or more of the following features: (a) a pattern to indicate that the "advertisement" message is intended for other cooperating routers, wherein such pattern may effectively act as a "co-op router magic number"; (b) designation of certain portions of the SSID to convey additional information; and (c) a checksum to cover all or part of the SSID. In one non-limiting example, the SSID may be formed as follows: "COOP-ROUTER XXXXXXXX YYYYYYYY", where XXXXXXXX is 8 base64-encoded symbols, representing 48 bits of additional information (which may include "cooperation types" etc.), and YYYYYYYY is 8 base64-based encoded symbols, representing a 48-bit checksum of the whole or one or more parts of SSID. In some embodiments, such checksum may use one of checksum algorithms such as CRC-64 or Fletcher-64. In other embodiments, such checksum may be a Message Authentication Code (MAC) algorithm using a pre-defined key including, but not limited to, one-key MAC (OMAC), keyed-hash MAC (HMAC), cipher block chaining MAC (CBC-MAC) or Parallelizable MAC (PMAC). In some embodiments, checksums may be truncated to fit into the available number of bits in a data packet. In some embodiments, instead of base64-encoding, octets (such as additional information octets and checksum octets) may be written to SSID in binary form.

In some embodiments, upon receiving a beacon frame and/or an "advertisement" message, cooperating router 115B may validate such "advertisement" message by verifying that the pattern described above is followed in the beacon's SSID, which may be implemented by regular expression match and/or by validating checksum. The same technique may be applied in a similar manner to other types of connections 105.

In some embodiments, an SSID similar to that described above may be used as follows: In step 302 cooperating router 115A may "listen" to Wi-Fi probe request frames; and in steps 306 to 308, cooperating router 115B may send Wi-Fi probe request frames (such as Null Probe Requests), and cooperating router 115A may respond to such probe request frames with an "advertisement", which may contain an SSID similar to the one described above.

At step 310, cooperating router 115B may indicate (for example, to a user of the cooperating router 115B and/or to a user device 110) that there is another router in the vicinity that is willing to cooperate. In addition, cooperating router 115B may indicate some or all of the additional information and/or additional parameters (such as signal strength), received from such other router. Such indication by cooperating router 115B may be implemented as any suitable form of communication or messaging, including, but not limited to, as visual display (not shown) within cooperating router 115B; waiting for user initiation of a browser connection to cooperating router 115B or through the user device 110 to provide such indication; waiting until an application running on user smartphone or tablet initiates a connection, including, but not limited to, a TCP connection, HTTP connection and/or other connection, to cooperating router 115B to provide such indication; and/or sending a notification to a user's smartphone or tablet using messaging services, including, but not limited to, Short Message Service, Google Cloud Messaging or other similar messaging service.

In some embodiments, cooperating router 115B may present a list (for example, to a user of the cooperating router 115B) indicating the "cooperation types" the cooperation router 115A is capable of and/or configured to implement and provide an opportunity to select from the list. This indication of the "cooperation types" may be implemented, for example, using means similar to those described above with respect to implementing indications.

At step 312, the cooperation router 115B may determine or receive the second indication of (such as, without limitation, a message or an input) the "cooperation types" in which it will engage with the cooperation router 115A. This second indication may be implemented, for example, by receiving a message (for example, without limitation, over TCP connection and/or HTTP connection), or using a user input device (such as a touchscreen). The second indication may also include additional information and/or additional parameters, which may be used as described in more detail below. In some embodiments, the "cooperation types" in which the cooperating router 115B may be permitted to engage in with cooperation router 115A may be a subset of the list of "cooperation types" presented by the cooperation router 115A.

At step 314, cooperating router 115B may receive information about associated parameters for particular "cooperation types." The cooperating router 115 may receive these parameters, for example, from a user of the router or a user device 110 via, without limitation, a TCP connection, HTTP connection or user input device. In some embodiments, the cooperating router may display or indicate the parameters associated with "cooperation types" to a user of the cooperating router 115B, and the user may set or modify the associated parameters. As an illustrative example, an "emergency connection" and/or a "bandwidth sharing" cooperation type may have an associated parameter "amount of bandwidth" that the cooperating router 115B is willing to provide and/or receive. In such example, the user may be shown a range of minimum and maximum bandwidth amounts and then be permitted to designate a bandwidth amount within such range. Such designated bandwidth amount may then become an associated parameter of the negotiated "emergency connection" or "bandwidth sharing" cooperation types. As another illustrative example, a "latency optimization" and/or a "bandwidth sharing" cooperation type may have associated parameters such as "maximum latency-optimization bandwidth" that the cooperating router 115B is willing to provide and/or receive, particular time periods during which certain types of sharing are allowed and/or specific protocols and/or applications (such as a game) which are supported for respective types of sharing. Note that the specific protocols may vary for different "cooperation types". Cooperating router 115B may enable corresponding "cooperation types" with their associated parameters, and may store this information in storage 217. For example, cooperating router 115B may add corresponding "cooperation types" and their associated parameters in the list of "enabled cooperation types". This list of "enabled cooperation types" may be used, for example, to determine whether a cooperation request coming from another cooperating router 115 is valid.

At step 316, the inter-router communication interface 222 of cooperating router 115B may send a "response" message indicating it is available to cooperate, which may be received by the inter-router communication interface 222 of cooperating router 115A. In some embodiments, such a "response" message may also include a list of "cooperation types" in which the cooperating router 115B is capable of and/or is configured to engage. In some embodiments, such a "response" message by cooperating router 115B may respond to an original "advertisement" message received at step 306. As indicated above, step 306 may be repeated, and the "advertisement" message may be sent at regular or irregular intervals. In the event cooperating router 115B is unable to respond in time, it can respond with a "response" message to one of the repeated "advertisement" message that is sent on a regular or irregular interval. If such a "response" message is in response to one of the repeated "advertisement" messages, cooperating router 115B may verify that such repeated "advertisement" message contains the same additional information or portions thereof and the same additional parameters or a subset thereof as the original "advertisement" message.

In embodiments where connection 105 is a BLE connection, step 316 may include exchanging BLE "connection establishment" and/or a "connection request" BLE Link Layer packet(s). In embodiments where connection 105 is a Classic Bluetooth connection, step 316 may include communication over an ACL and/or SCO link established in step 308.

At step 317, cooperating router 115A may check that the received list of "cooperation types" is the same as or a subset of the list of "cooperation types" it previously advertised. Cooperating router 115A may also check that the received associated parameters are within the advertised ranges. Additionally, cooperating router 115A may enable cooperation for the list of "cooperation types" received (which may be a subset of those "cooperation types" advertised) with their associated parameters, and/or may store this information in storage 217.

At step 318, a logical channel may be established between cooperating routers 115A and 115B. In embodiments where connection 105 has already been established (for example, as a BLE connection which may have been established in step 316, or a Bluetooth Classic ACL or SCO link established in step 308), the logical channel may be established over existing connection 105. If connection 105 has been terminated or cannot be re-used for any reason by the logical channel, a new or other connection 105 may be established within step 318 using techniques similar to those described above in relevant steps. In embodiments where connection 105 is implemented as a Wi-Fi connection, the logical channel may be established, without limitation, by performing Wi-Fi association, which may involve one or more of the following sub-processes: probe request, probe response, authentication, association request or association response. If connection 105 is implemented as an L2 Ethernet connection, connection 105 may be used as a logical channel (and in some embodiments, establishment of a logical channel in step 318 may be skipped). In such case, future exchanges over the logical channel may be implemented as sending/receiving specially formed L2 Ethernet packets. In some embodiments (such as embodiments using IP-enabled services, including, but not limited to, Wi-Fi, Ethernet and/or PAN/BNEP over Bluetooth), establishment of the logical channel may be implemented, without limitation, by creating (i.e., one side initiating and the other side accepting) a TCP connection. In other embodiments, UDP exchanges (for example, using UDP sockets) may be used for the same purpose.

In some embodiments, one or more cooperating routers 115 may detect that a logical channel established over connection 105 has been disconnected or otherwise impeded. In such a case, the logical channel may be re-established over connection 105. Such detection may be implemented, without limitation, by exchanging specially formatted keep-alive messages at predefined, regular or irregular periods.

In some embodiments, the logical channel established in step 318 may be encrypted to prevent devices which are not cooperating routers from connecting to cooperating routers 115. Such encryption may be implemented using any existing or future-developed encryption techniques, including, but not limited to, symmetric encryption, asymmetric encryption and/or AEAD (for example, using a monotonously increasing packet number as a nonce).

In some embodiments, cooperating routers 115A and 115B may derive an encryption key for the encryption from an "advertisement" message sent and received in step 306. For example, if a Wi-Fi connection is established, then a certain function, including, but not limited to, a hash function (such as SHA256, SHA512, SHA3 and/or any kind of MAC algorithm with a pre-defined key) of the whole SSID or one or more parts of the SSID may be used as a Wi-Fi shared key for Wired Equivalent Privacy, Wi-Fi Protected Access (WPA) or WPA2 protocols. In some embodiments, SSID may contain random bits as part of, without limitation, additional information or as separate symbols and/or octets to randomize those parts of the SSID which are used to derive such shared key. In other embodiments, a pre-shared key available on the cooperating routers 115 may be used for such purpose. Such encryption techniques may be used to prevent devices which are not cooperating routers from connecting to cooperating routers 115, but in some embodiments, such encryption techniques may not provide protection from attacks.

In some embodiments, the encryption key for the encryption may be derived from a cryptographic key exchange (such as any variation of Diffie-Helman key exchange). In some embodiments, such cryptographic key exchange method may not provide protection from man-in-the-middle (MITM) attacks. In some embodiments, to prevent MITM attacks, a key exchange may be aided by passwords exchanged between users of both cooperating routers 115 by some independent means and then entered by both users (for example, using, without limitation, a TCP connection, HTTP connection or user input device) to their respective routers, making the key exchange a password-authenticated key agreement using methods such as, without limitation, Encrypted Key Exchange, Password Authenticated Key agreement, Public/Private Key Encryption, Simple Password Exponential Key Exchange and/or ITU-T X.1035.

Figure 3B:
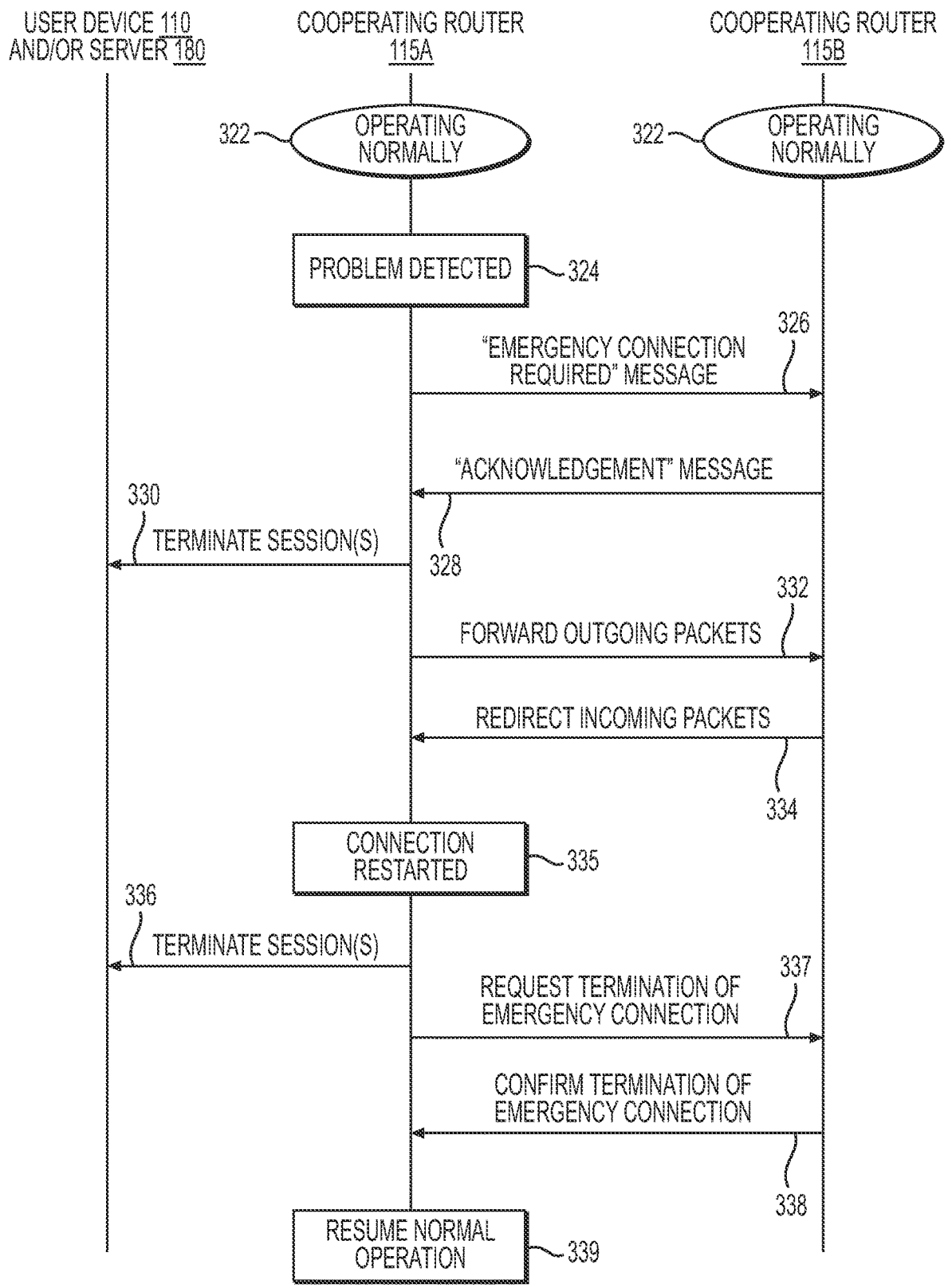
FIG. 3B illustrates a flow diagram of an exemplary "emergency connection" cooperation type, according to an embodiment of the present disclosure.
Figure 3C:
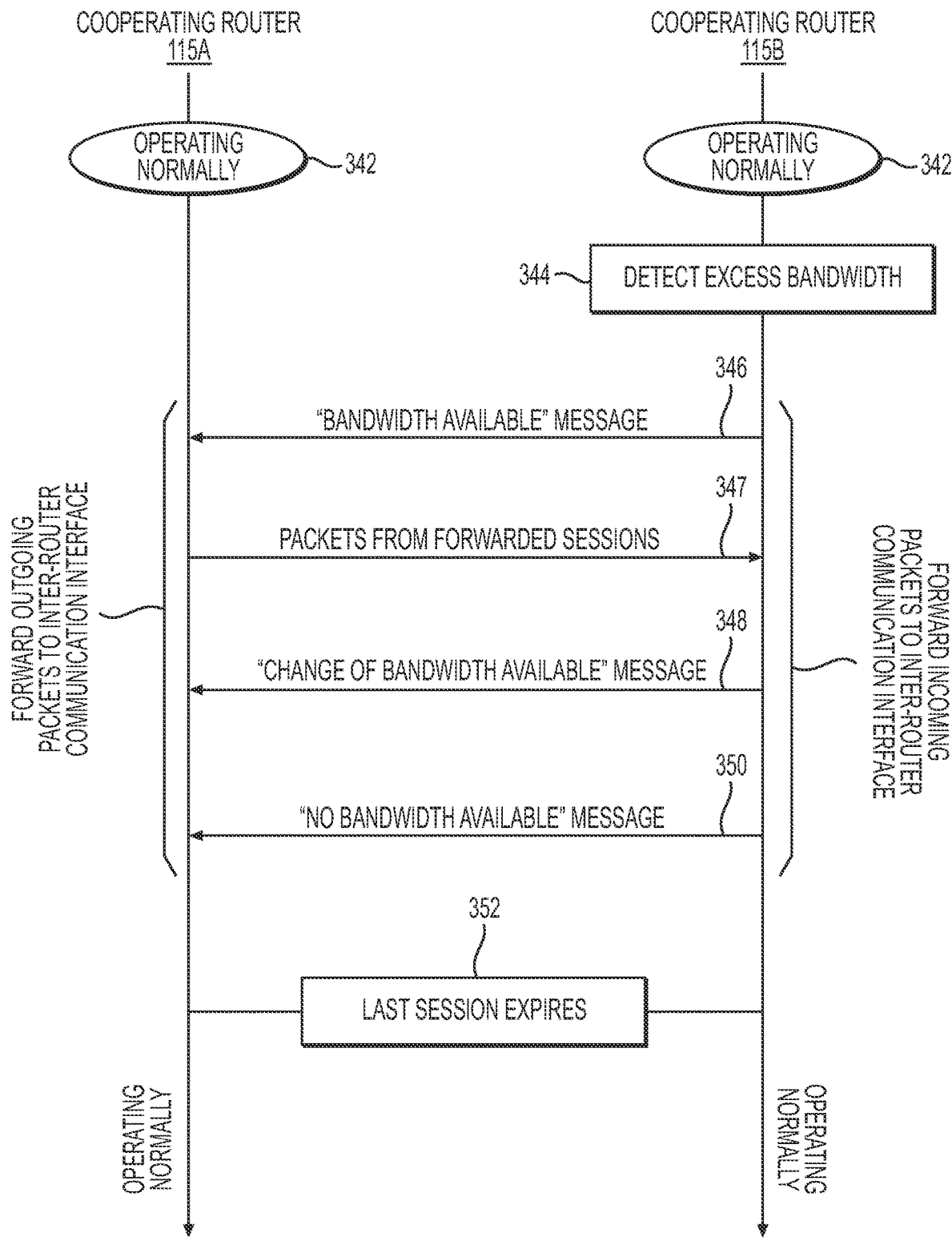
FIG. 3C illustrates a flow diagram of an exemplary "bandwidth sharing" cooperation type, according to an embodiment of the present disclosure.
Figure 3D:
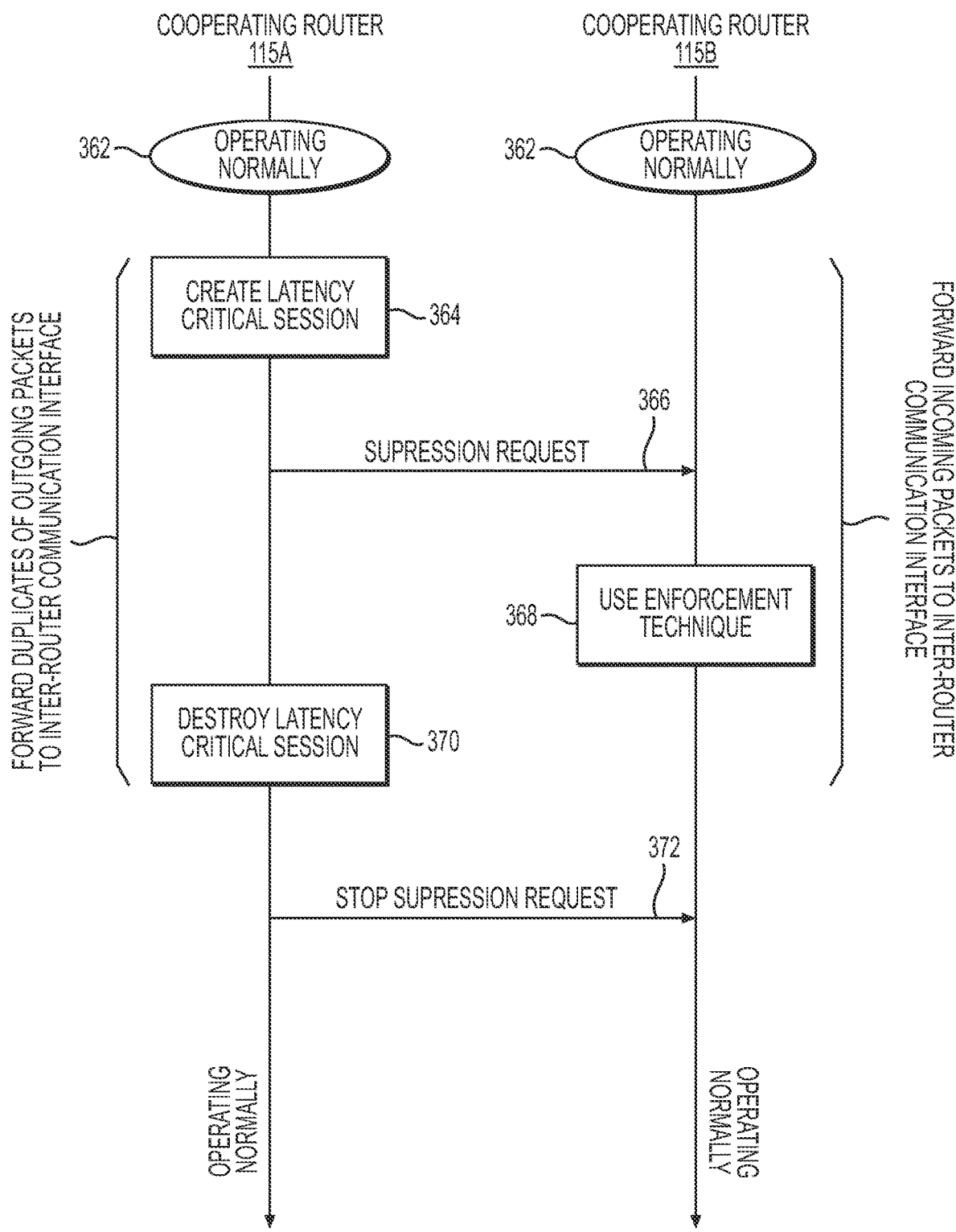
FIG. 3D illustrates a flow diagram of an exemplary "latency optimization" cooperation type, according to an embodiment of the present disclosure.

FIGS. 3B-3D are exemplary flow diagrams for different "cooperation types". Each such "cooperation type" may be enabled for a cooperating router 115 by a process described above in connection with FIG. 3A.

FIG. 3B illustrates a flow diagram of an exemplary "emergency connection" cooperation type, according to an embodiment of the present disclosure. In the embodiment of FIG. 3B, at step 322, both cooperating routers 115 may be operating normally, i.e., incoming packets at respective interfaces 202 may be forwarded to respective interfaces 204, and vice versa. One or both cooperating routers 115A and 115B may maintain their respective lists of currently active "sessions", including, but not limited to, TCP sessions, UDP sessions and/or latency-critical sessions (described in more detail below). Currently active TCP sessions and UDP sessions may be detected and maintained as described in connection with latency oriented routers 120 (as described in more detail below) and/or as described in RFC2663, RFC3022, RFC4787 and/or RFC5382. Latency-critical sessions may be detected and maintained as described in more detail below.

At step 324, cooperating router 115A may determine it has communication problems with its upstream ISP 140A. As an illustrative example, such determination may be implemented by cooperating router 115A receiving a notification from the modem 118A or, while there are active sessions and/or outgoing packets, by observing that packets from interface(s) 204 are no longer received for a predetermined or configurable amount of time. As another example, such determination may be implemented by sending packets, including, but not limited to, Internet Control Message Protocol (ICMP) pings or UDP ping-like packets to an Internet server (not shown) and receiving no replies to these packets.

At step 326, cooperating router 115A may send an "emergency connection" request message, which message may be received by cooperating router 115B. Cooperating router 115A may use the inter-router communication interface 222 to send the message through connection 105 and/or a logical channel established over connection 105. Step 326 may be combined with step 332, which is described in more detail below.

At step 328, cooperating router 115B may send an acknowledgement or agreement message to establish such "emergency connection", which message may be received by cooperating router 115A. Cooperating router 115B may use the inter-router communication interface 222 to send the message through connection 105 and/or a logical channel established over connection 105. Step 328 may be combined with step 334, which is described in more detail below.

At step 330, cooperating router 115A may send messages and/or packets indicating termination of some or all the current sessions with the user device 110 and/or the server 180 to the communicating parties. As an illustrative example, cooperating router 115A may send RST packets for the currently active TCP sessions to interface(s) 202 and/or 204. In some embodiments, such messages and/or packets indicating termination may be sent only for some of the sessions, or no sessions at all.

At step 332, cooperating router 115A may start forwarding packets from its interface(s) 202 to inter-router communication interface 222. Such forwarding may be implemented by client traffic splitter 291 of cooperating router 115A. Such packets, upon arriving at cooperating router 115B, may be provided to cross-traffic splitter 283. Cross-traffic splitter 283 of cooperating router 115B, upon receiving such packets, may process them and send them to the interface(s) 204 of cooperating router 115B.

In some embodiments, cross-traffic splitter 283 of cooperating router 115B may limit the bandwidth of such "emergency connection", which limit may be implemented by calculating the amount of data or number of packets sent during the immediately preceding time interval T, where T may be, without limitation, 0.1 second, 1 second or 10 seconds, and comparing such amount of data or number of packets to a predefined threshold of the same. If such threshold is exceeded, cross-traffic splitter 283 may start dropping packets that exceed the threshold. In some embodiments, such threshold may be read from configurator 240 of cooperating router 115B. In other embodiments, such threshold may be one of the parameters associated with the "emergency connection" type of cooperation and set during the process described in connection with FIG. 3A.

In some embodiments, cross-traffic splitter 283 of cooperating router 115B may modify source and/or target IP addresses and/or ports of the packets received over the inter-router communication interface 222. In some embodiments, the modifications of IP addresses and/or ports may be performed by cooperating router 115A before such packet is forwarded by cooperating router 115A to cooperating router 115B. As described with respect to FIG. 2A, cooperating router 115B may also keep "forwarded sessions", which may allow internet traffic splitter 293 to distinguish packets coming from the opposite direction and which belong to such "forwarded sessions".

At step 334, internet traffic splitter 293 of cooperating router 115B, upon receiving packets belonging to a "forwarded sessions", may forward the packets to inter-router communications interface 222. In some embodiments, cooperating router 115A may modify source and/or target IP addresses and/or ports of the packets received over the inter-router communication interface 222. Such modifications of IP addresses and/or ports may be performed by cooperating router 115B before the packet is forwarded by cooperating router 115B to cooperating router 115A. Thus, user devices 110A may still access the Internet via ISP 140B while ISP 140A is experiencing problems.

It is to be understood that although steps 332 and 334 are shown only once in FIG. 3B, they may be performed multiple time and/or continuously while an "emergency connection" cooperation type is active between cooperating routers 115A and 115B.

At step 335, cooperating router 115A may determine that its connection to ISP 140A is restored. Such determination may be implemented by cooperating router 115A receiving a notification from the appropriate modem 118 and/or by sending packets, such as pings, to a server on the Internet (not shown) and receiving commensurate replies.

At step 336, cooperating router 115A may send messages and/or packets indicating termination of some or all the current sessions with the user device 110 and/or the server 180 to the communicating parties. As an illustrative example, cooperating router 115A may send RST packets for the currently active TCP sessions to interface(s) 202 and/or 204. In some embodiments, such messages and/or packets indicating termination may be sent only for some of the sessions, or no sessions at all.

At step 337, cooperating router 115A may send a message that an "emergency connection" is no longer needed (e.g., a message requesting to terminate the "emergency connection"), which message may be received by cooperating router 115B. At step 338, cooperating router 115B may send a message confirming that the "emergency connection" is terminated. Cooperating routers 115A and 115B may use their respective inter-router communication interface 222 to send and receive such messages through connection 105 and/or a logical channel established over connection 105. In some embodiments, an exchange of packets between cooperating routers 115 may effectively serve as a termination request and confirmation for the "emergency connection".

At step 339, cooperating router 115A may start forwarding packets, received on its interface(s) 202 to its interface(s) 204, which may effectively resume normal operation with regards to such packets.

During packet forwarding, cross-traffic splitter 283 of cooperating router 115B may implement certain security measures to prevent a malicious cooperating router 115A from using the IP address of cooperating router 115B to perform malicious actions, such as an attack on a third-party server. Cross-traffic splitter 283 of cooperating router 115B may implement such security measures, for example, by forwarding packets only to a pre-defined list of proxies. In some embodiments, such list of proxies may be updated, for example, as a part of router software and/or firmware updates or from designated server(s). In other embodiments, such list may be retrieved from DNS. In such embodiments, cross-traffic splitter 283 of cooperating router 115B may forward packets coming over inter-router interface 222 to one of interfaces 204 with one or more of the following modifications: it may address the "forwarded packets" only to the aforementioned well-known list of proxies; it may add "real_IP" field to the "forwarded packet"; and/or it may "sign" the "forwarded packets" using either a MAC algorithm and/or an Authenticated Encryption with Associated Data (AEAD) algorithm using a secret key or a public key (wherein the respective keys may be stored within the cooperating router 115B). Alternatively, or additionally, client-traffic splitter 291 of cooperating router 115A may modify packets forwarded to inter-router interface 222 by "signing" them using either a MAC algorithm and/or an Authenticated Encryption with Associated Data (AEAD) algorithm using a secret key or a public key (wherein the respective keys may be stored within the cooperating router 115A). For example, the key(s) may be stored in storage 217. Such MAC algorithm may include, without limitation, CBC-MAC, HMAC, PMAC, OMAC and/or Poly1305. Such AEAD algorithm may include, without limitation, Encrypt-then-MAC, MAC-then-Encrypt, Encrypt-and-MAC, CCM mode, GCM mode, EAX mode, Chacha20-Poly1305 and/or other similar AEAD algorithms. In some embodiments, public cryptography (such as Rivest-Shamir-Adleman (RSA) or elliptic curve cryptography (ECC)) may be used to authenticate a packet, instead of, or along with, a MAC and/or AEAD algorithm.

These packet modifications may ensure that any packet which travels from cooperating router 115B to a proxy is effectively signed by cooperating router 115A, so such proxy may determine that the packet has actually originated from cooperating router 115A and is not forged by cooperating router 115B. Since cooperating router 115B is not forwarding traffic except to a proxy, where such packets are subsequently authenticated, cooperating router 115A may not be able to use the IP of cooperating router 115B maliciously.

In some embodiments, MAC algorithms, AEAD algorithms, and/or public-key signatures may use nonce(s) within packets to prevent replay attacks. A separate nonce field, incremented for each packet by a sender, may be added to each of the packets. In other embodiments, packet_ID or existing_packet_ID field may be used as such nonce(s), as described in more detail below. In one non-limiting example, AEAD may be used, and packet_ID may be passed in plain (i.e., without encryption), with the rest of the packet encrypted using a secret key and using packet_ID as an AEAD nonce. In another non-limiting example, MAC algorithm may be used to authenticate the whole packet, wherein packet_ID may be a part of such packet. On the receiving side of such communication, a nonce (including, but not limited to, packet_ID) may be used to ensure that each packet is delivered only once, which may effectively eliminate replay attacks. In some embodiments, methods using nonces to prevent replay attacks similar to those methods described in more detail below in connection with latency-oriented routers 120 and/or latency-oriented proxies 121 may be used.

FIG. 3C illustrates a flow diagram of an exemplary "bandwidth sharing" cooperation type, according to an embodiment of the present disclosure. In the embodiment of FIG. 3C, at step 342, both cooperating routers 115 may be operating normally. Incoming packets at respective interfaces 202 may be forwarded to respective interfaces 204, and vice versa. One or both cooperating routers 115A and 115B may maintain their respective lists of currently active "sessions", including, but not limited to, TCP sessions, UDP sessions and/or latency-critical sessions (described in more detail below). Currently active TCP sessions and UDP sessions may be detected and maintained as described in connection with latency oriented routers 120 (as described in more detail below) and/or as described in RFC2663, RFC3022, RFC4787 and/or RFC5382. Latency-critical sessions may be detected and maintained as described in more detail below.

At step 344, cooperating router 115B may detect or determine that its connection to ISP 130B has excess bandwidth. Such detection or determination may be implemented by comparing currently occupied bandwidth (which may be calculated as the "amount of traffic and/or packets sent and/or received over last T seconds", wherein T may be on the order of 1, 10 or 60 seconds) with the bandwidth of an ISP channel (which may be manually configured or measured as a peak bandwidth over the immediately preceding time interval TT, wherein TT may be on the order of one or more hours).

At step 346, cooperating router 115B may send a "bandwidth available" message, which message may be received by cooperating router 115A. In some embodiments, such "bandwidth available" message or notification may include a "shareable_bandwidth" field, which includes information about the amount of bandwidth that cooperating router 115B is willing to or capable of sharing. Cooperating router 115B may use the inter-router communication interface 222 to send the message through connection 105 and/or a logical channel established over connection 105.

Following receipt of the "bandwidth available" message from cooperating router 115B, at step 347, cooperating router 115A may detect when a new session is created and client traffic splitter 291 may redirect packets belonging to some or all new sessions to the inter-router communication interface 222. In turn, inter-router communication interface 222 may forward the packets to cooperating router 115B. Client traffic splitter 291 of cooperating router 115A may monitor the amount of traffic being sent to cooperating router 115B and try to limit such traffic by ceasing to redirect new sessions via inter-router communication interface 222 when the limit is reached.

Cooperating router 115A, when determining whether to redirect a session via inter-router communication interface 222, may try to use information such as, without limitation, whether this session is an HTTP/HTTPS session and whether the URL within this HTTP/HTTPS session indicates that it is a download. In some embodiments, non-download HTTP/HTTPS sessions may be smaller in size and may be better candidates for redirection. Whether a URL indicates that it is a download may be determined by matching the URL with regular expression patterns, including without limitation, "*download*" and "*file*".

At the same step 347, cooperating router 115A may start forwarding packets belonging to redirected sessions from its interface(s) 202 to inter-router communication interface 222; all other packets may be forwarded to one of interfaces 204. Such forwarding may be implemented by client traffic splitter 291 of cooperating router 115A. Such forwarded packets, upon arriving at cooperating router 115B, may be provided to cross-traffic splitter 283. Cross-traffic splitter 283 of cooperating router 115B, upon receiving such packets, may process them and send them to the interface(s) 204 of cooperating router 115B.

As described with respect to FIG. 2A, cooperating router 115B may also keep "forwarded sessions", which may allow internet traffic splitter 293 to distinguish packets coming from the opposite direction and which belong to such "forwarded sessions".

Cooperating router 115B may then start forwarding the packets belonging to such "forwarded sessions" from its interface(s) 204 to its inter-router communication interface 222.

Cooperating router 115A may allow some of the sessions (such as TCP, HTTP and/or HTTPS connections) from user devices 110A to run via connection 105 and/or a logical channel established over connection 105 and then via cooperating router 115B and ISP 140B, while at the same time, other sessions from user devices 110A may run via ISP 140A.

When forwarding to, redirecting to and/or receiving packets from inter-router communication interfaces 222, cooperating routers 115A and/or 115B may modify the source or target IP addresses and/or ports in a manner similar to that described with respect to steps 332 and 334 of FIG. 3B. In some embodiments, security measures described with respect to FIG. 2B (including, but not limited to, authentication using MAC algorithms, AEAD algorithms and/or public-key signatures) may also be used during forwarding.

It is to be understood that although steps 347 is shown only once in FIG. 3C, it may be performed multiple times and/or continuously while a "bandwidth sharing" cooperation type is active between cooperating routers 115A and 115B.

At step 348, cooperating router 115B may send a "change of bandwidth available" message, which message may be received by the cooperating router 115A. The "change of bandwidth available" message may have the same structure and/or organization as a "bandwidth available" message described above, or it may have a different structure and/or organization. Such notification may be generated by using methods similar to those described with respect to steps 344-346.

Following receipt of a "change of bandwidth available" message from cooperating router 115B, cooperating router 115A may designate a different limit for the purposes of determining whether to redirect packets associated with existing and/or new sessions. Upon receipt of a "change of bandwidth available" message, cooperating router 115A may forcefully terminate some or all of the sessions currently redirected to cooperating router 115B via inter-router communication interface 222. Such forced termination may include, without limitation, stopping routing packets which belong to the session to be forcefully terminated and/or sending special packets (such as TCP RST packets) depending on session type.

At step 350, cooperating router 115B may send a "no bandwidth available" message, which message may be received by cooperating router 115A. The "no bandwidth available" message may have the same structure and/or organization as either or both of a "bandwidth available" message or a "change of bandwidth available" message, as described above (in which case, the field "shareable_bandwidth" may be equal to zero), or it may have a different structure and/or organization. Such a message may be generated by using methods similar to those described with respect to steps 344-346.

Following receipt of a "no bandwidth available" message from cooperating router 115B, cooperating router 115A may cease routing existing and/or new sessions to cooperating router 115B via inter-router communication interface 222. In some embodiments, upon receipt of a "no bandwidth available" message, cooperating router 115A may forcefully terminate some or all of the sessions currently redirected to cooperating router 115B via inter-router communication interface 222. Such forced termination may be achieved in a manner similar to that described with respect to step 348.

At step 352, all the sessions which were routed from cooperating router 115A to cooperating router 115B through inter-router communication interface 222 may terminate naturally. As an illustrative example, TCP sessions may be terminated on completion of four-way TCP termination handshake. After such natural termination, cooperating routers 115A and 115B may work normally, i.e., as they worked at step 342.

In some embodiments, "bandwidth sharing" cooperation type may involve "proxied bandwidth sharing". With proxied bandwidth sharing, one or more of the following changes may be implemented during operation shown on FIG. 3C.

First, during normal operation, some or all of the traffic to or from cooperating router 115A may be directed via one or more proxies, including, but not limited to, proxy 177 (shown in FIG. 1C). Cooperating router 115A may maintain sessions, including, but not limited to, TCP sessions, UDP sessions and/or latency-critical sessions (as described in more detail below) for such proxied communications.

Second, when forwarding packets, decisions to redirect packets to inter-router communication interface 222 may be made on a per-packet basis. Unlike with respect to "bandwidth sharing" (as illustrated in FIG. 1C), all packets belonging to the same session need not be either forwarded to inter-router communication interface 222 or to interface(s) 204 for "proxied bandwidth sharing". For example, within the same "session" on cooperating router 115A, some packets may be forwarded to interface 204 (and then to ISP 140A), and some packets may be forwarded to inter-router communication interface 222 (and afterwards to cooperating router 115B, where such packets may be redirected to interface 204 and then proceed to ISP 140B). In some such embodiments, "forwarded sessions" on cooperating router 115B may be used in a manner similar to that described above with respect to FIG. 3B and/or FIG. 3C.

In other embodiments, "proxied bandwidth sharing" may be implemented by allowing for conversion of a session which needs to be forwarded to inter-router communication interface 222 to a session which will go directly to the interface 204, and vice versa. Such conversion may be implemented, for example, by exchanging messages and/or packets over inter-router communication interface 222.

In some embodiments, forwarding packets from interface(s) 202 to interface(s) 204 and/or inter-router communication interface 222 may be implemented using stream splitter 254. In some embodiments, forwarding packets from interface(s) 204 and/or inter-router communication interface 222 to interface(s) 202, may be implemented using stream joiner 256. If a stream splitter and/or stream joiner are used, processing of packets may require more than simple forwarding, and any method with regard to stream splitting and/or split joining described in more detail above may be used for "proxied bandwidth sharing".

Third, cooperating router 115A may monitor the amount of traffic moving toward cooperating router 115B and limit such traffic by stopping forwarding packets going toward inter-router communication interface 222 when a designated rate limit during a particular time interval is reached. Then when a new time interval starts, the forwarding of packets to inter-router communication interface 222 may resume. Unlike with non-proxied bandwidth sharing, this can be accomplished on a per-packet basis. Algorithms, including, but not limited to, token buckets and hierarchical token buckets (HTB), may be used to implement bandwidth limits.

Fourth, when forwarding to, redirecting to and/or receiving packets from inter-router communication interfaces 222, cooperating routers 115A and/or 115B may use security measures described with respect to FIG. 3B.

Fifth, if redirection is to occur on per-packet basis, no session will be formed, so step 352 may be omitted.

FIG. 3D illustrates a flow diagram of an exemplary "latency optimization" cooperation type, according to an embodiment of the present disclosure. Such "latency optimization" cooperation type may be used in configurations where cooperating router 115A implements certain features of a latency-oriented router 120 (as described in more detail below).

In the step 362 of embodiment of FIG. 3D, both cooperating routers 115 may be operating normally. Incoming packets at respective interfaces 202 may be forwarded to respective interfaces 204, and vice versa. In some embodiments, packets intended for server 180 may be sent toward server 180 (for example, with a destination IP address of server 180), and in other embodiments, packets intended for server 180 may be sent toward proxy 177 or latency-oriented proxy 121.

At step 364, cooperating router 115A may create a latency-critical session (as described in more detail below), after which cooperating router 115A may duplicate packets belonging to one or more latency-critical sessions and send at least one copy of a duplicated packet to its corresponding interface 204, and forward at least another copy of the same duplicated packet to inter-router communication interface 222. Duplication of packets may be implemented in a manner similar to that described in connection with latency oriented router 120 (as described in more detail below). The copy forwarded via inter-router communication interface 222 may then be processed by cooperating router 115B (for example, by its cross-traffic splitter 283) in a manner similar to that described with respect to FIG. 3B and/or FIG. 3C.

In some embodiments, cooperating router 115B may detect and maintain "forwarded sessions" from cooperating router 115A via inter-router interface 222. Such "forwarded sessions" may be used (for example, by its internet traffic splitter 293) to detect packets which need to be forwarded to inter-router communication interface 222, and to forward such packets as described with respect to internet traffic splitter 293. This may be implemented in a manner similar to that described with respect to FIG. 3B and/or FIG. 3C. Cooperating router 115A may further process such packets, which may involve deduplication (as described in more detail below) and/or forwarding the packets to interface 202.

When forwarding to, redirecting to and/or receiving packets from inter-router communication interface 222, one or both of cooperating routers 115 may modify the source and/or target IP addresses and/or ports in a manner similar to that described with respect to FIG. 3B and/or FIG. 3C.

In some embodiments, operation of cooperating router 115A when a "latency optimization" cooperation type is used may be similar to the operation of latency-oriented router 120, described in more detail below, using inter-router communication interface 222 instead of an interface 204 to send and/or receive duplicated packets (i.e., packet copies). In some embodiments, operation of cooperating router 115B when a "latency optimization" cooperation type is used may be similar to the operation of latency-oriented proxy 121 described below, using inter-router communication interface 222 instead of an interface 204 to send and/or receive duplicated packets (i.e., packet copies).

In some embodiments, when forwarding to, redirecting to and/or receiving packets from inter-router communication interfaces 222, one or both of cooperating routers 115 may use security measures similar to those described with respect to step 332 and 334 of FIG. 3B.

At step 366, cooperating router 115A may detect one of the potential issues, described in more detail below in connection with latency oriented routers 120. Accordingly, cooperating router 115A may send a "suppression request", which request may be received by cooperating router 115B. Cooperating router 115A may use the inter-router communication interface 222 to send the suppression request through connection 105 and/or a logical channel established over connection 105.

At step 368, upon receipt of such "suppression request", cooperating router 115B may use one or more of enforcement techniques, described in more detail below in connection with latency oriented routers 120.

At step 370, cooperating router 115A may destroy a latency-critical session, described in more detail below in connection with latency oriented routers 120, after which cooperating routers 115A and 115B may resume operating normally.

At step 372, cooperating router 115A may send a "stop suppression" request, which request may be received by cooperating router 115B. Cooperating router 115A may use the inter-router communication interface 222 to send the stop suppression request through connection 105 and/or a logical channel established over connection 105.

Following receipt of such "stop suppression" request, cooperating router 115B may stop using enforcement techniques, described in more detail below in connection with latency oriented routers 120.

In some embodiments, when cooperating routers 115 utilize a BLE and/or Classic Bluetooth connection, one or more methods of Bluetooth latency optimization techniques, including, but not limited to, "ACL Latency-critical channel" (described in more detail below in connection with latency oriented routers 120) may be used.

In some embodiments, the decision of cooperating router 115A as to whether to use duplication, suppression, or both may depend on the answer to the question, how common are the ISPs of cooperating routers 115A and 115B? Answering such question may be implemented in one or a combination of the following ways. In one exemplary embodiment, both cooperating routers 115 may trace their respective routes using methods similar to usual traceroute tools to the same public Internet IP address in order to exchange information via inter-router interface 222 about their respective routes, as well as to compare the common part of their respective routes. The length of the common part of their respective routes may be used as a metric to determine how much their respective ISPs share in common. If both routes differ only in their first one or two hops, and the rest of the routes are same, this may indicate that both routers are effectively using the same ISP. In another exemplary embodiment, cooperating routers 115 may gather statistics on the patterns of the packet loss and/or latency changes over time. Cooperating routers 115 may exchange such statistics (such as a message "per-second latency-critical packet loss over last 10 minutes") over inter-router interface 222. Statistics that demonstrate a correlation between latency increases and/or packet losses may indicate that both routers are effectively using the same ISP. In a yet another exemplary embodiment, cooperating routers 115 may exchange information on patterns of packet loss and/or latency changes and compare over inter-router interface 222 such patterns to patterns of the cooperating routers' respective bandwidth usages (such as a message "per-second latency-critical packet loss over last 10 minutes" and/or message "per-second bandwidth usage"). Pattern comparisons indicating a correlation between one cooperating router's significant bandwidth usage and an increase in the other cooperating router's packet loss and/or latency may indicate that both routers are effectively using the same ISP.

Metrics derived from the question "how common are the ISPs of cooperating routers 115A and 115B?" may be applied in a variety of different ways. In some embodiments, such metrics may be used to determine whether to use duplication. For example, if such metrics indicate that ISPs are relatively common, those metrics be used as a reason to avoid duplication. Such metrics may also be used to decide whether to use a "suppression request". If such metrics indicate that ISPs are relatively different, those metrics may be used as a reason to avoid inter-router suppression. Additionally, such metrics may be communicated to the user(s) of cooperating routers 115A and 115B. As an illustrative example, such metrics may be used as a part of additional information during "handshake" process. As another illustrative example, such metrics may be communicated to the user(s) after the "handshake" is already completed. Such information may be presented to the user(s) so that they may decide whether such cooperation is desirable for them.

It is to be understood that packet authentication may be implemented using MAC algorithms, AEAD algorithms, public-key signature or any other methods described for authentication in latency oriented routers 120 (described in more detail below). It is to be understood that any modification of IP addresses and/or ports may be implemented as "NAT-like translation", "reverse NAT-like translation", "proxy translation", proxy translation 2" and/or reverse proxy translation (each of which is described in more detail below). In such embodiments, proxy 177 may authenticate packets and/or modify IP addresses and/or ports.

Figure 4A:
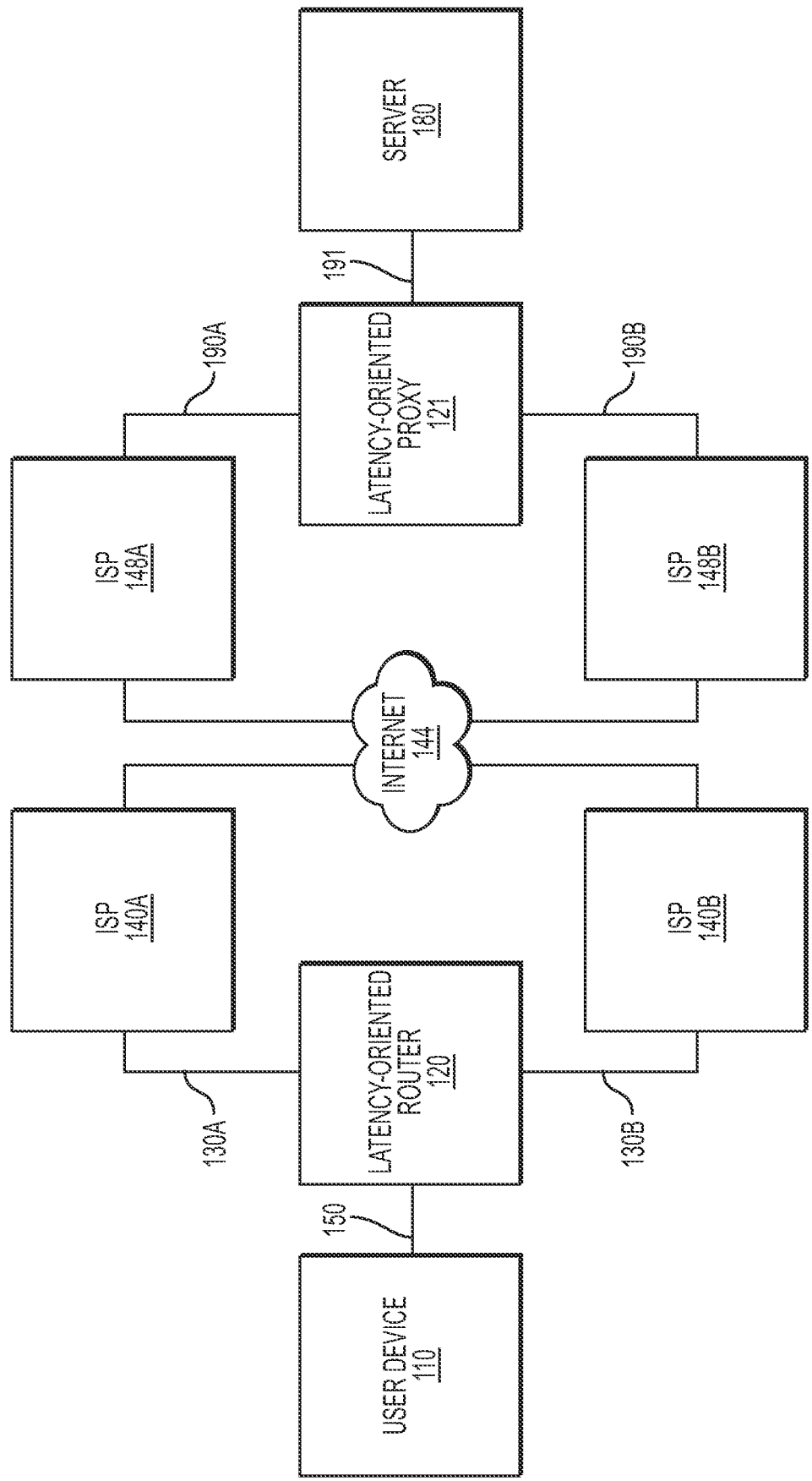
FIG. 4A is a schematic diagram illustrating an exemplary connection of a latency-oriented router, according to an embodiment of the present disclosure.

FIG. 4A is a schematic diagram illustrating an exemplary connection of a latency-oriented router 120, according to an embodiment of the present disclosure. FIG. 4A shows a system which may be used to improve latency characteristics compared to the system shown in FIG. 1A. The system shown in the example of FIG. 4A includes user devices 110, latency-oriented router 120, ISPs 140A, 140B, 148A and 148B, latency-oriented proxy 121 and server 180. There may be any number of ISPs 140 and any number of ISPs 148, though only ISPs 140A, 140B, 148A and 148B are shown in FIG. 4A. User devices 110 are connected to latency-oriented router 120, using connection 150. Latency-oriented router 120 may additionally provide services such as being a DHCP server to user devices 110 and/or act as a DHCP client with regards to one or more of its respective connections to ISPs 140 (only ISP 140A and 140B are shown in FIG. 4A).

In some embodiments, latency-oriented router 120 may use one or more connections 130 to connect to one or more ISPs 140 (in FIG. 4A only connections 130A and 130B and ISPs 140A and 140B are shown). Connections 130A and 130B may be implemented using any combination of the communications mechanisms listed for connection 130 as described with respect to FIG. 1A. Connections 130 may use the same communication mechanism, or they may use different communication mechanisms or any combination of communication mechanisms. In some embodiments, connections 130 may lead to different ISPs (as shown in FIG. 4A) or to any combination of ISPs. All connections 130 may also lead to the same ISP.

In some embodiments, ISPs 140A, 140B, 148A and 148B may provide access to the Internet 144. Latency-oriented proxy 121 may be connected to one or more ISPs 148 using connections 190 (in FIG. 4A only ISPs 148A and 148B and connections 190A and 190B are shown). Connections 190A and 190B may be implemented using any combination of the communications mechanisms listed for connection 190 as described with respect to FIG. 1A. Connections 190A and 190B may use the same communication mechanism, or they may use different communication mechanisms or any combination of communication mechanisms. Also, connections 190A and 190B may lead to different ISPs (as shown in FIG. 4A) or to any combination of ISPs. All connections 190 may also lead to the same ISP.

In some embodiments, server 180 may be connected to latency-oriented proxy 121 using connection 191. Connection 191 may be implemented in any way described above for connections 190, 190A and 190B. Alternatively, connection 191 may be implemented as an over-the-Internet connection, with server 180 being connected through its own ISP (not shown) and latency-oriented proxy 121 sending the traffic directed to server 180, via one or more ISPs 148, specifying a target IP address of the respective packets as the IP address (or one of IP addresses) of server 180. An example of an embodiment that uses Internet to implement connection 191 between latency-oriented proxy 121 and server 180, is shown in FIG. 4D.

Figure 4B:
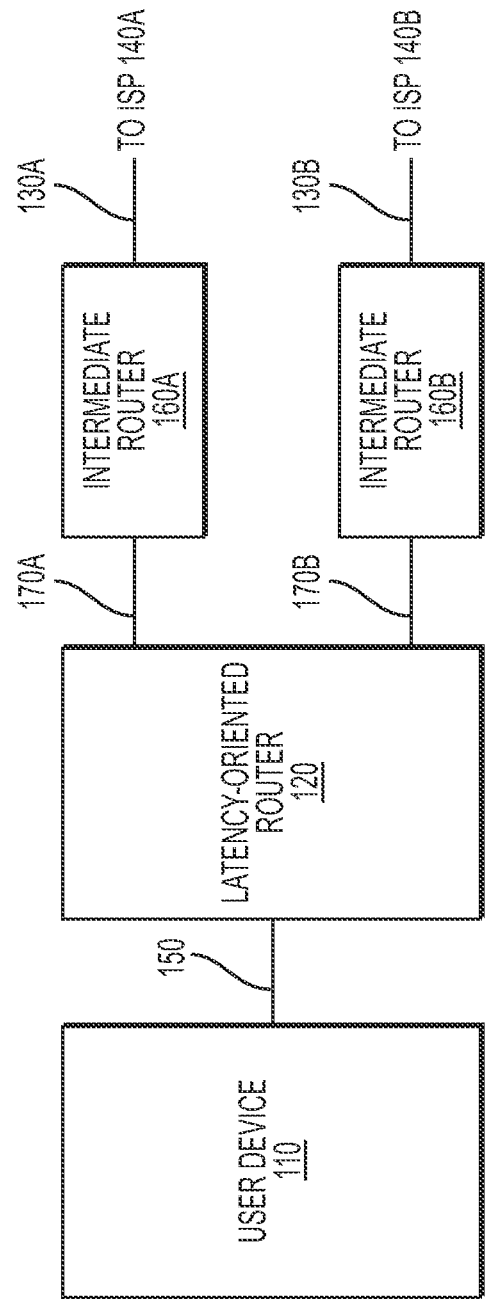
FIG. 4B is a schematic diagram illustrating an exemplary connection of a latency-oriented router, according to another embodiment of the present disclosure.

FIG. 4B is a schematic diagram illustrating an exemplary connection of a latency-oriented router 120, according to another embodiment of the present disclosure. An alternative way of connecting latency-oriented router 120 to ISP(s) 140A and/or 140B is shown. Latency-oriented router 120 may provide user devices 110 with similar services as illustrated in FIG. 4A. In some embodiments, latency-oriented router 120 may connect to one or more intermediate routers 160 (in FIG. 4B, only intermediate router 160A and intermediate router 160B are shown) instead of connecting directly to ISPs 140A and/or ISP 140B. Intermediate routers 160A or 160B may be routers (including, but not limited to, conventional routers used in the home or office), modems (such as, for example, 56 kBit/s modem, ADSL modem, cable modem, G.hn modem) or any other present or future developed device with similar functionality. In some embodiments, intermediate routers 160A and 160B may be of different types. In other embodiments, some or all of the intermediate routers 160 may be of the same type.

In a manner similar to that of the embodiment shown in FIG. 4A, latency-oriented router 120 may provide connection to user devices 110 over connection 150. Latency-oriented router 120 may connect to intermediate routers 160A and/or 160B over connection(s) 170 (in FIG. 4A only connections 170A and 170B are shown). Connections 170A and 170B may be implemented, without limitation, as an Ethernet connection or any other connection method listed with respect to connection 130 as described in FIG. 1A. In some embodiments, connections 170A and 170B may lead to different intermediate routers 160A and 160B (as shown in FIG. 4A) or to any combination of intermediate routers, including all connections 170A and 170B leading to the same intermediate router. In some embodiments, latency-oriented router 120 may connect to some of ISPs 140A and 140B directly (as shown in FIG. 4B) and to some of ISPs 140A and 140B via intermediate router(s) 160A and 160B (as shown in FIG. 4B).

Figure 4C:
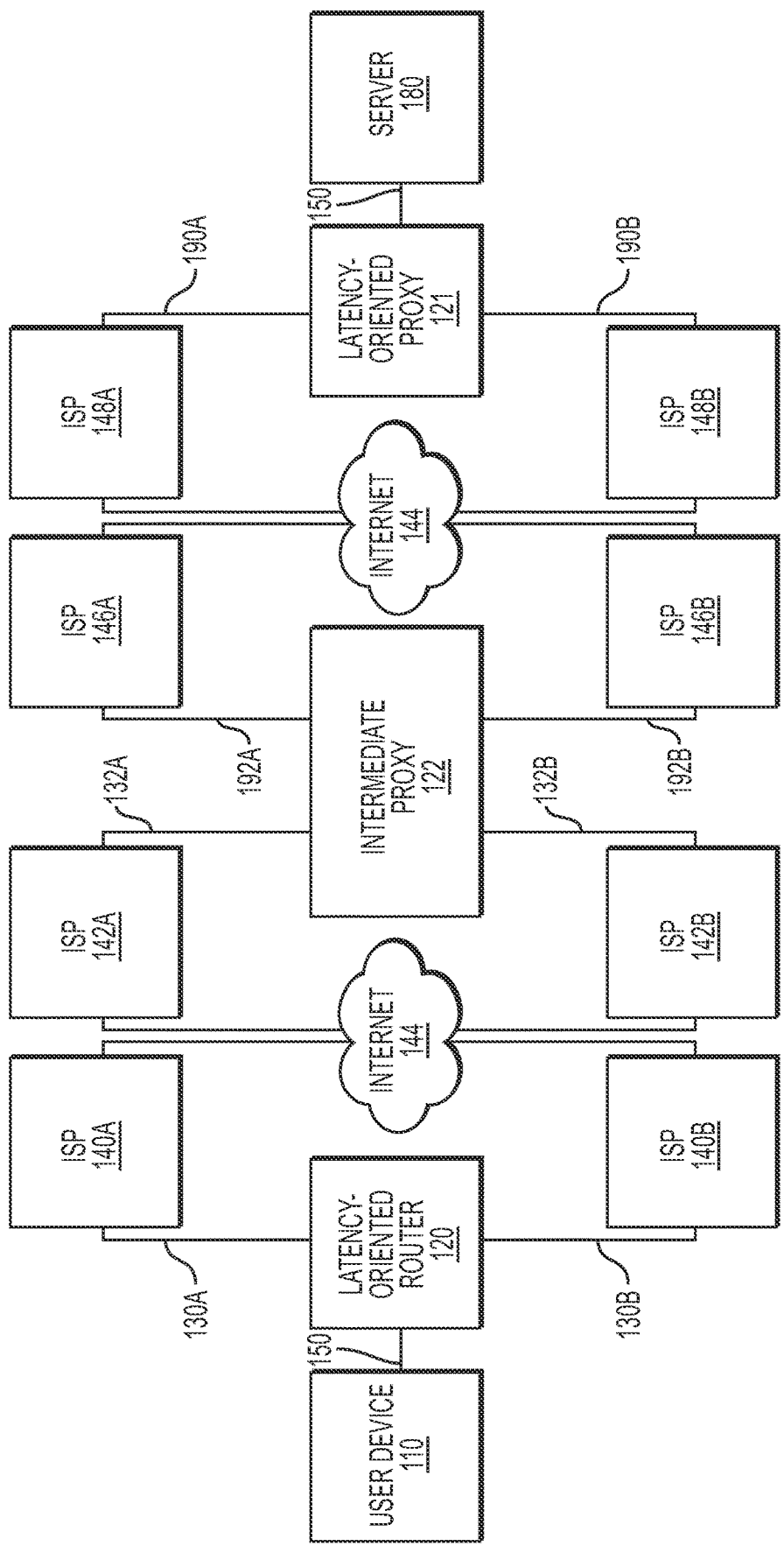
FIG. 4C is a schematic diagram illustrating an exemplary connection of a latency-oriented router, according to another embodiment of the present disclosure.
Figure 4D:
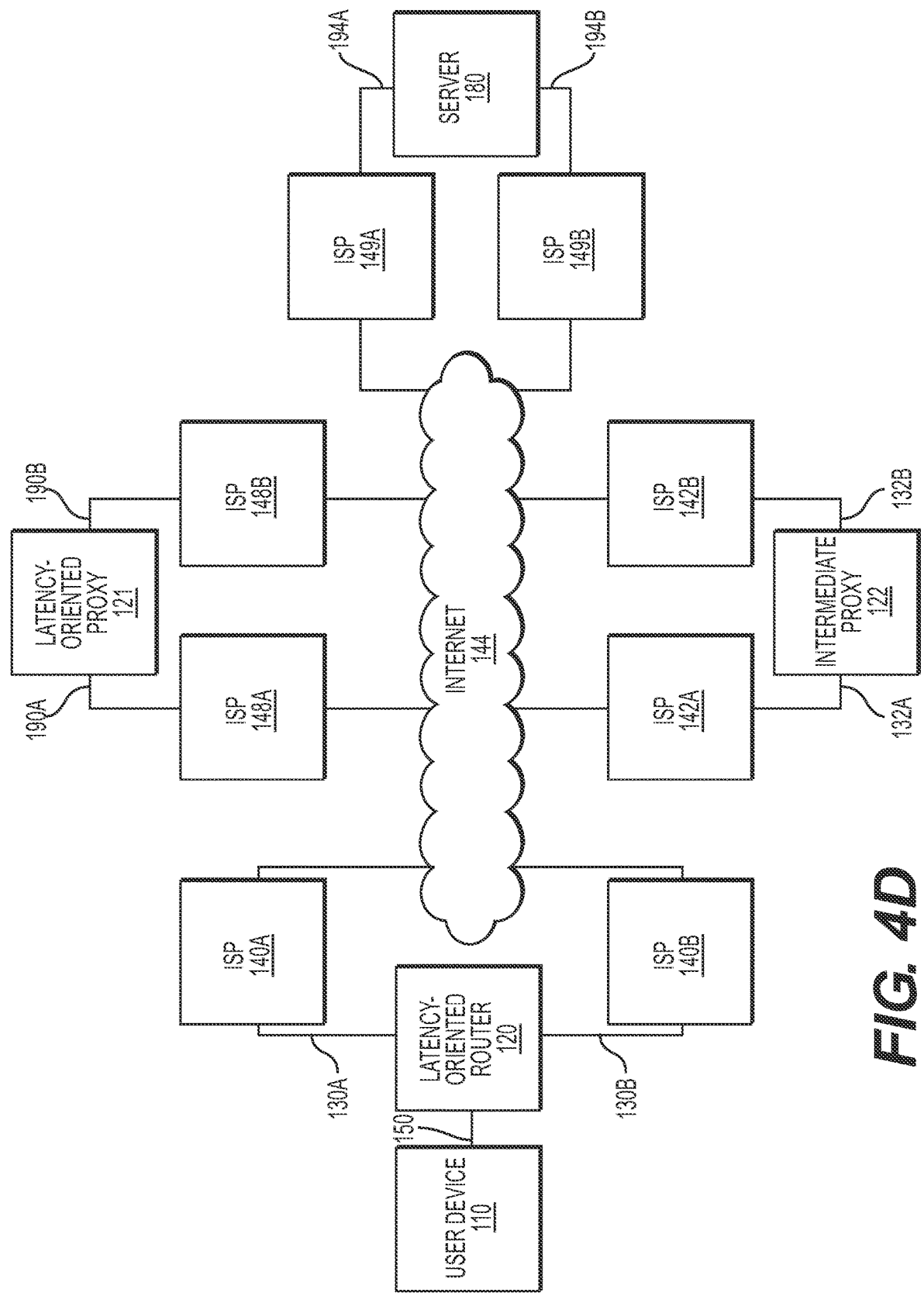
FIG. 4D is a schematic diagram illustrating an exemplary connection of an intermediate proxy, according to an embodiment of the present disclosure.

FIG. 4C is a schematic diagram illustrating an exemplary connection of latency-oriented router 120, according to another embodiment of the present disclosure. In addition to the components shown in FIG. 4A, the embodiment of FIG. 4C additionally includes intermediate proxy 122, one or more ISPs 142 and one or more ISPs 146 (in FIG. 4C only ISPs 142A, 142B, 146A and 146B are shown). As in the example illustrated in FIG. 4C, intermediate proxy 122 may be connected to ISPs 142 using connections 132 and to ISPs 146 using connections 192 (in FIG. 4C only connections 132A, 132B, 192A and 192B are shown). Connections 132 and/or 192 may be implemented, without limitation, in the same manner as connections 130 and/or 190. In some embodiments, Internet 144 shown on the left side of intermediate proxy 122, may be the same as the Internet 144 shown on the right side of intermediate proxy 122. In some embodiments, there may be more than one intermediate proxy 122 between latency-oriented router 120 and latency-oriented proxy 121 (although only one intermediate proxy 122 is shown in FIG. 4C).

FIG. 4D is a schematic diagram illustrating an exemplary connection of intermediate proxy 122, according to an embodiment of the present disclosure. As illustrated in the example of FIG. 4D, intermediate proxy 122 may use one or more ISPs 142 to connect both its left-side connections and right-side connections to the Internet 144 (only ISPs 142A and 142B are shown in FIG. 4D). In some embodiments, latency-oriented proxy 121 may connect to server 180 via Internet 144 through one or more ISPs 148 (only ISPs 148A and 148B are shown in FIG. 4D). Server 180 may be connected via one or more ISPs 149 (only ISP 149A and 149B are shown in FIG. 4D) using connections 194 (in FIG. 4E only connections 194A and 194B are shown). In some embodiments, connections 194 may be implemented similar to any of connections 130 and/or 190.

Figure 4E:
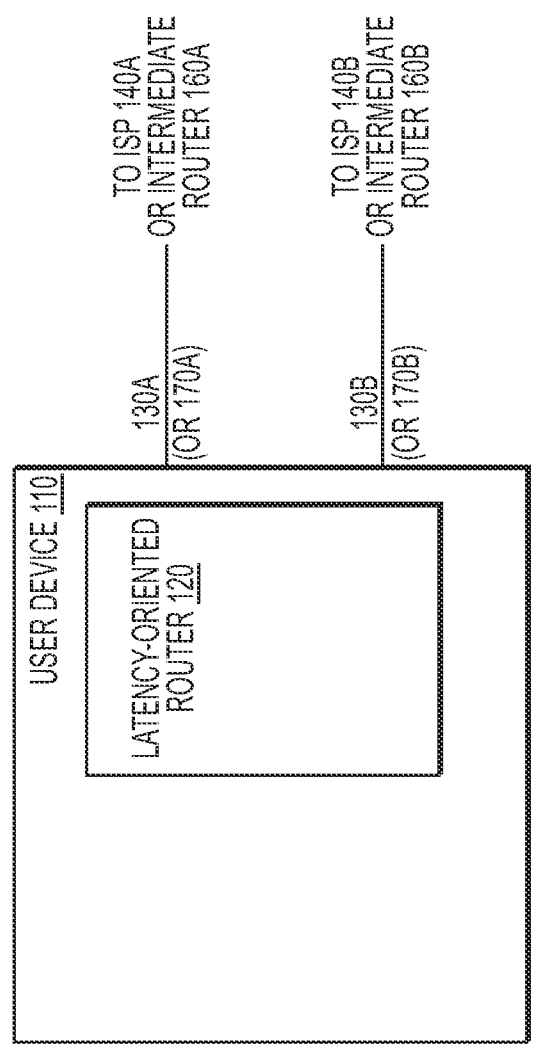
FIG. 4E is a schematic diagram illustrating an exemplary connection of a latency-oriented router, according to another embodiment of the present disclosure.

FIG. 4E is a schematic diagram illustrating an exemplary connection of latency-oriented router 120, according to another embodiment of the present disclosure. In such an embodiment, latency-oriented router 120 is implemented as a part of user device 110. User device 110 may have one or more connections 130 and/or 170 (only two connections are shown in FIG. 4E) and latency-oriented router 120, implemented as a part of user device 110, may use one or more of these connections. In some embodiments, a first connection 130A may be implemented, without limitation, as a Wi-Fi connection (leading, for example, to intermediate router 160A), and a second connection 130B may be implemented, without limitation, as an Ethernet connection (leading, for example, to intermediate router 160B).

Figure 4F:
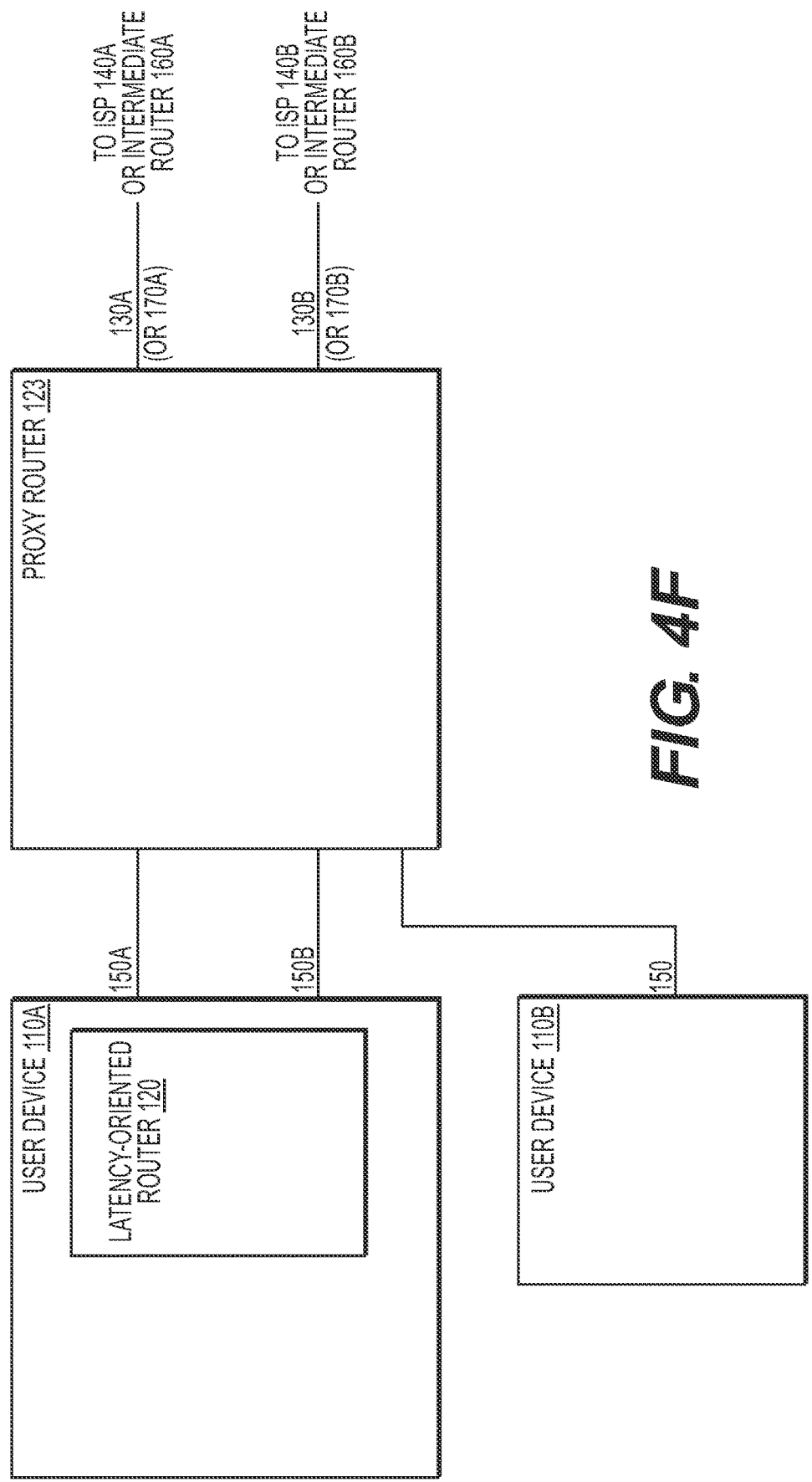
FIG. 4F is a schematic diagram illustrating an exemplary connection of a latency-oriented router, according to another embodiment of the present disclosure.

FIG. 4F is a schematic diagram illustrating an exemplary connection of latency-oriented router 120, according to another embodiment of the present disclosure. In the example illustrated in FIG. 4F, some of user devices 110 (only 110A is shown) may have a latency-oriented router 120 as a component or a part of user devices 110, and some other user devices (only 110B is shown) may not have a latency-oriented router as a component or a part of the user devices. In some embodiments, latency-oriented router 120 uses proxy router 123 to communicate with the Internet. In such an embodiment, user devices 110 (implementing latency-oriented router 120 as a component of user devices 110), may use one or more connections 150 (in FIG. 4F only connections 150A and 150B are shown), to communicate with proxy router 123. Proxy router 123 may use one or more connections 130 and/or 170 to communicate with ISP(s) 140 and/or intermediate router(s) 160.

In some embodiments, connections 150A and 150B may be implemented as Wi-Fi connections using different frequency bands of Wi-Fi (such as 2.4 GHz and 5 GHZ) or different channels within the same frequency band. In other embodiments, connection 150A may be implemented using wired Ethernet and connection 150B may be implemented using Wi-Fi, or vice versa. In yet other embodiments, connection 150A may be implemented using Wi-Fi and connection 150B may be implemented using Bluetooth (including, but not limited to, a Classic Bluetooth connection, BLE or EDR), or vice versa. Bluetooth connections may be implemented using, without limitation, a Bluetooth module(s) (not shown) on user device 110 and proxy router 123. In yet other embodiments, connection 150A may be implemented using Wi-Fi and connection 150B may be implemented using a sub-GHz radio connection, or vice versa. In some embodiments, one or more of connections 150 may include intermediate devices, including, but not limited to routers, switches and/or wireless access points (not shown).

In some embodiments, the implementation may facilitate dual (or triple or more) connections between user device 110 and proxy router 123 to ensure reliability and minimal latency over connections such as Wi-Fi. In some embodiments, the implementation may facilitate dual (or triple or more) connections between proxy router 123 and latency-oriented proxy 121 to ensure reliability and minimal latency over connections in the "last mile" and the Internet. In some embodiments, one or more additional proxy routers (not shown) may be used between user device 110A and proxy router 123. Such additional proxy router(s) may be implemented in a manner similar to that of proxy router 123.

In embodiments in which two devices (e.g., user device 110 and proxy router 123) use Bluetooth for time sensitive communication, one or more of the following techniques may be used to optimize Bluetooth latency. In this context, time sensitive communications may include communications occurring over one or more of connections 150. In embodiments in which the devices use Classic Bluetooth (with or without Enhanced Data Rate, the devices may establish the Bluetooth connection in advance of the actual communication to reduce latencies. The two devices may establish the Bluetooth connection as soon as they are in range whether a latency-critical session already exists or not (e.g., by going through the usual Classic Bluetooth connection procedures of Inquiry/Inquiry Scan/Page/Page Scan/Master Response/Slave Response (and exchanging the appropriate associated data packets) to establish an ACL communication link. This procedure is described in more detail in Jennifer Bray and Charles F Sturman, *Bluetooth* 1.1 *Connect Without Cables* (2nd ed. 2001), the entirety of which is incorporated herein by reference. For ease of reference, conveying latency-critical data over an ACL link may be referred to as an "ACL latency-critical channel".

In some embodiments, the Bluetooth channel may be kept free of other data traffic and ACL packets may be sent by the master at any time. Accordingly, the delay before the ACL packets may be sent by the master may be in the order of one Bluetooth time slot (approximately 625 μs). Further, to facilitate the Bluetooth slave sending latency-critical date over the same ACL link, the Bluetooth master may send an ACL POLL packet to the Bluetooth slave at regular intervals. These regular POLLs may enable the Bluetooth slave to respond while staying compliant with the Bluetooth protocol. Alternatively, instead of regular intervals, the Bluetooth master may send the POLLS to the Bluetooth slave whenever the master doesn't have other data/packets to send. The Bluetooth master may use single-slot ACL packet to send the POLLS. This technique may allow the delay for sending packets from the Bluetooth slave to the Bluetooth master to be reduced to approximately two Bluetooth time slots (approximately 1350 μs).

In some embodiments, similar results may be achieved using a different technique, particularly in embodiments in which manipulating POLL intervals is undesirable or impossible. In such embodiments, instead of sending POLL packets at smaller intervals, a higher-level request, such as sending a pre-defined application-level No Operation (NOP) message over an SPP's simulated serial cable, may be initiated at regular intervals, TNOP, by a Bluetooth master device. TNOP may range, for example, from 1 ms to 5 ms. The recipient of such NOP messages (normally an SPP reader on a Bluetooth slave device) may discard such NOP messages. Even as NOP messages are discarded, such NOP messages may cause a Bluetooth ACL packet to be sent from a Bluetooth master device to a Bluetooth slave device, thereby providing the Bluetooth slave device with an opportunity to reply with latency-critical data before a POLL would permit, and thereby improving latency in the direction of Bluetooth slave device to Bluetooth master device. In some embodiments, a Bluetooth master device, when sending NOP messages at regular intervals, may skip and/or delay NOP messages if the slave device has incoming traffic within the regular interval, TNOP.

According to another technique (which may be used separately from, or concurrently with, any of the Bluetooth-related techniques above), latency critical packets (such as IP packets) may be sent using 3- or 5-slot Bluetooth packets. In embodiments in which EDR is in use, such technique may allow transfer packets of up to approximately 1000 bytes in one single Bluetooth packet. In some embodiments, it may be sufficient to fit the whole IP packet into one single Bluetooth packet, reducing the latency.

In some embodiments in which latency-oriented router 120 is implemented as a part of a user device 110 (as illustrated in FIG. 4E and. FIG. 4F), such latency-oriented router 120 may be implemented as a standalone program that intercepts and/or injects incoming and outgoing packets of such user device 110. In this context, "intercepting" a packet may be understood to mean removing a packet from normal packet flow, with the option to inspect such removed packet; and "injecting" a packet may be understood to mean inserting a packet into normal packet flow, wherein such inserted packet has some or all the properties of packets within normal packet flow. In some embodiments, modifying a packet going through a normal packet flow may be considered an interception of an original packet with a subsequent injection of a modified packet. In some such embodiments, such standalone program may consist of several executables and may optionally include one or more kernel-mode drivers. As a non-limiting example, if user device 110 is running Windows as its operating system, the interception and/or injection of packets may be implemented as executables using the Windows Filtering Platform.

In some embodiments in which latency-oriented router 120 is implemented as a part of a user device 110, some parts of the latency-oriented router 120 may be implemented as a web browser plugin (sometimes also referred to in the art as a web browser extension) that intercepts and initiates HTTP requests, Websocket requests and/or any other requests which may be initiated by the web browser. This may be of particular interest in embodiments in which information belonging to application-level protocols, including but not limited to HTTP and/or Websockets, needs to be analyzed and/or modified while packets are processed, and one or more of the protocols used as a transport layer by the application-level protocol implement encryption (such as, without limitation, Transport Layer Security (TLS) encryption). In one non-limiting example, if video streaming is implemented on top of HTTPS (which, in turn, may be HTTP over TLS over Transmission Control Protocol (TCP)), certain information about the video stream (such as information about HTTP URLs and HTTP headers including, but not limited to, range fragments) may be TLS-encrypted and therefore not directly available at latency-oriented router 120. As a result, such information may not be available for use within some types of processing described within the present disclosure.

However, a web browser plugin operating at the HTTP level prior to encryption of the video stream information may still be able to access such information and may perform the necessary processing before the video stream is encrypted. In other embodiments, a web browser plugin or extension may be implemented in the manner described in more detail below (and referred to as "X-Plugin" 248), which may use additional communications with latency-oriented router 120 to direct traffic to different interfaces. In other embodiments, processing may be performed using both a web browser plugin and techniques described with respect to "X-Plugin" 248.

Figure 4G:
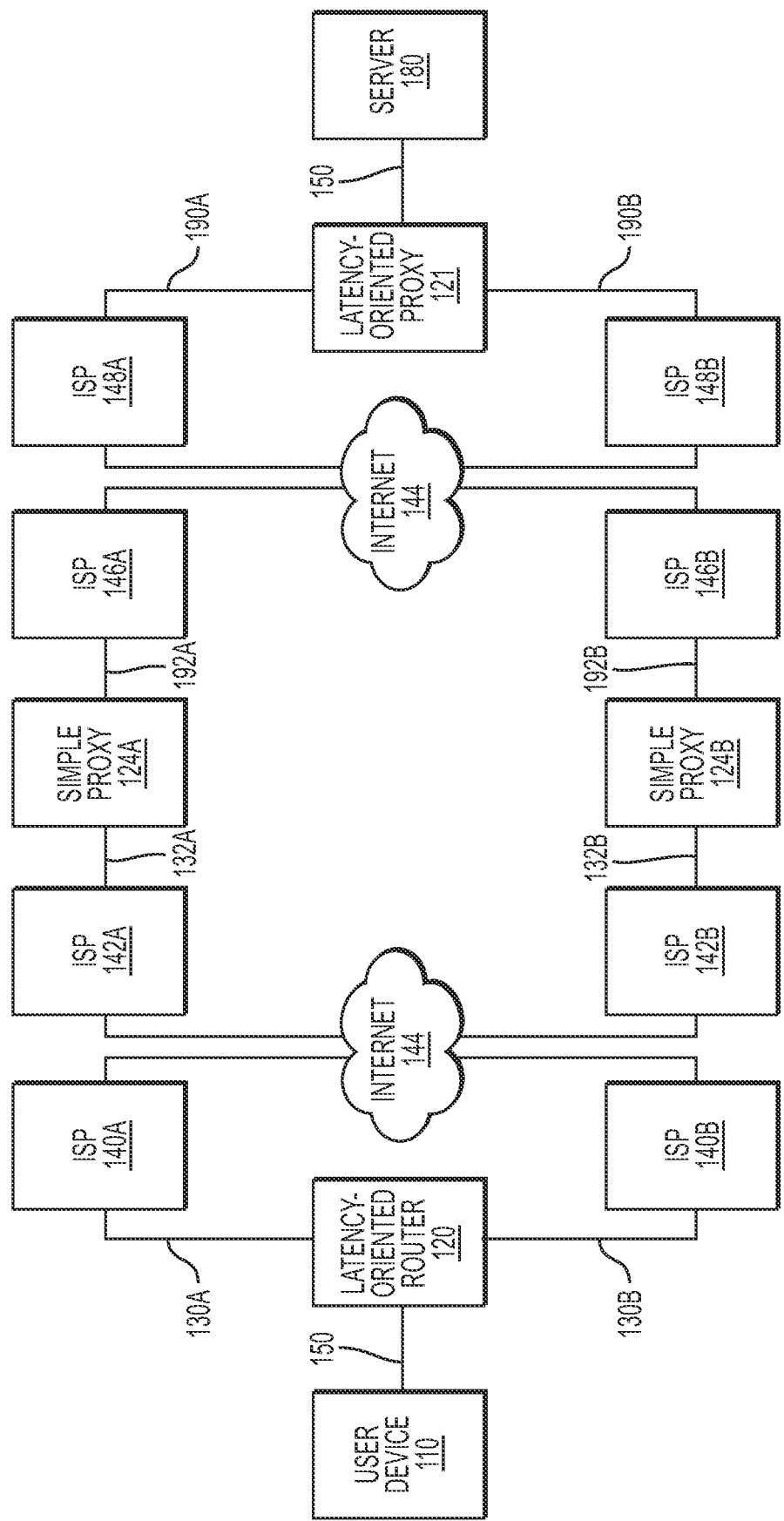
FIG. 4G is a schematic diagram illustrating an exemplary connection of a latency-oriented router, according to another embodiment of the present disclosure.

FIG. 4G is a schematic diagram illustrating an exemplary connection of latency-oriented router 120, according to another embodiment of the present disclosure. As the system of FIG. 4G may be substantially similar to FIG. 4C, only the differences between FIG. 4G and FIG. 4C will be described here. While the embodiment of FIG. 4C uses an intermediate proxy 122, in the embodiment of FIG. 4G the intermediate proxy 122 is replaced with one or more simple proxies 124 (only simple proxy 124A and 124B are shown in FIG. 4G). As illustrated in FIG. 4G, simple proxies 124 may be connected to one or more ISPs 142 using one or more connections 132 and to one or more ISPs 146 using connections 192 (only connections 132A, 132B, 192A and 192B are shown in FIG. 4G). In some embodiments, Internet 144 shown on the left side of simple proxy 124, may be the same as the Internet 144 shown on the right side of simple proxy 124. In some embodiments, one or more of simple proxies 124 may use one or more ISPs 142 to connect both its left-side connections and right-side connections to the Internet 144 (for example, in a manner similar to that described with respect to intermediate proxy 122 in FIG. 4D).

In some embodiments, there may be more than one simple proxy 124 on some of the paths between latency-oriented router 120 and latency-oriented proxy 121 (although only one simple proxy 124 is shown for each such path in FIG. 4G). In some embodiments, one or more intermediate proxies 122 and one or more simple proxies 124 may be used within the same embodiment.

Figure 4H:
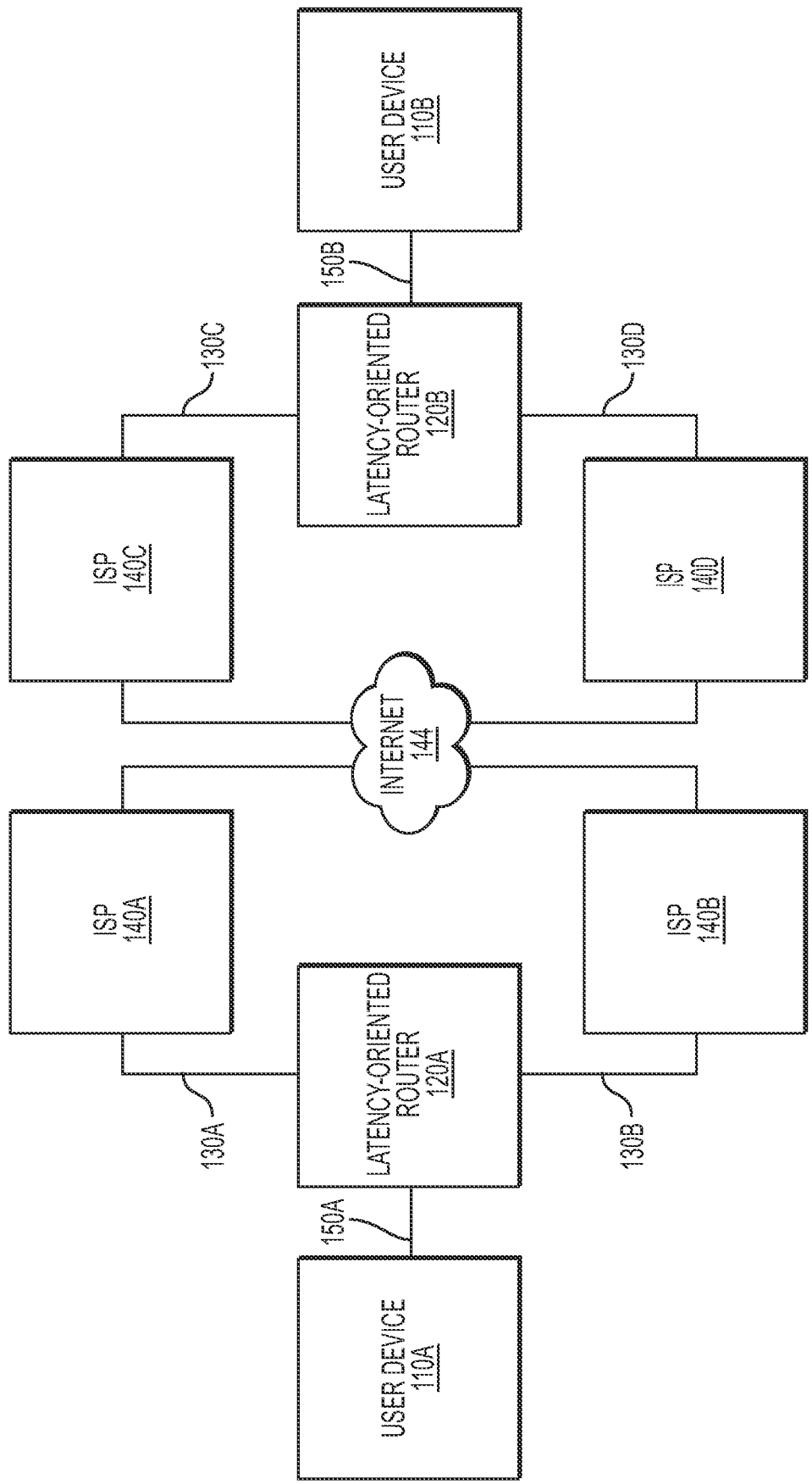
FIG. 4H is a schematic diagram illustrating an exemplary connection of latency-oriented routers, according to another embodiment of the present disclosure.

FIG. 4H is a schematic diagram illustrating an exemplary connection of latency-oriented routers 120, according to an embodiment of the present disclosure. In the embodiment of FIG. 4H, two user devices 110 may communicate with each other via latency-oriented routers 120 (only devices 110A and 110B and latency-oriented routers 120A and 120B are shown in FIG. 4H). In this example, latency-oriented routers 120A and B may be connected to the Internet 144 using ISPs 140 (only ISPs 140A, 140B, 140C and 140D are shown in FIG. 4H). A person skilled in the relevant art would appreciate that the number of ISPs connected to each of the latency-oriented routers may be any number greater or equal to one. Latency-oriented routers 120 may be connected to ISPs 140 using connections 130 (only connections 130A, 130B, 130C and 130D are shown in FIG. 4H). In some embodiments, the schema illustrated in FIG. 4H may be utilized for latency-critical point-to-point communications, such as VOIP communications.

In some embodiments utilized for point-to-point communications, such as those shown in FIG. 4H, one or more intermediate proxies 122 (not shown in FIG. 4H) and/or one or more simple proxies 124 (not shown in FIG. 4H), may be used in a manner similar to that described with respect to FIG. 4C, FIG. 4D and/or FIG. 4G.

In some embodiments, for example as shown in FIG. 4H, one or more external servers (not shown) may be used to facilitate the exchange of addresses (such as IP addresses) between devices 110A and 110B and/or between latency-oriented routers 120A and 120B. In one embodiment, a Domain Name System (DNS) server, including, but not limited to, a Dynamic DNS (DDNS) server, may be used for this purpose. In another embodiment, a protocol such as the Session Initiation Protocol (SIP) or a protocol with similar functionality may be used to exchange IP addresses between devices 110A and 110B and/or latency-oriented routers 120A and 120B.

Figure 4I:
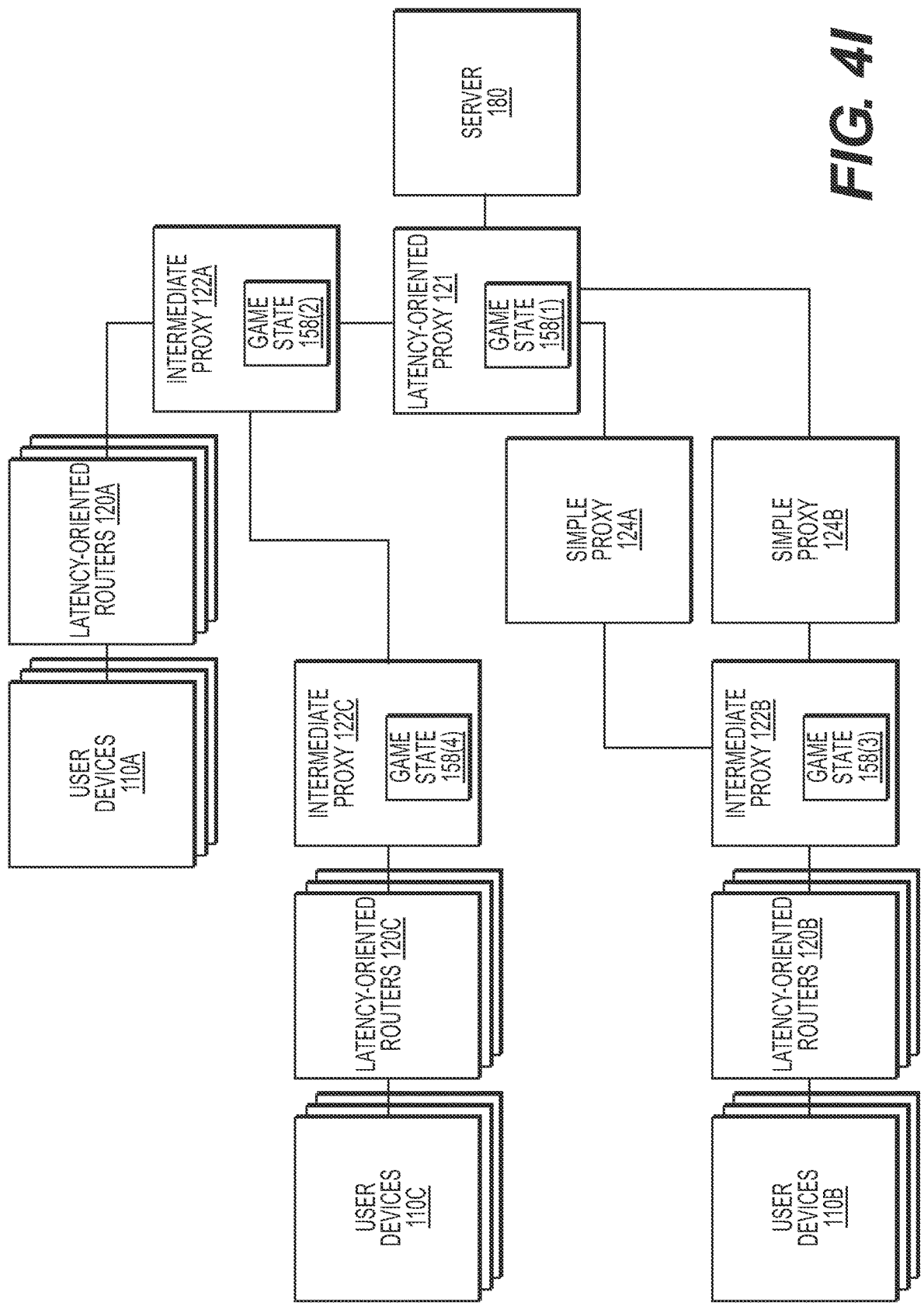
FIG. 4I is a schematic diagram illustrating an exemplary connection of latency-oriented routers implementing a "game state", according to an embodiment of the present disclosure.

FIG. 4I is a schematic diagram illustrating an exemplary connection of latency-oriented routers 120 implementing a "game state", according to an embodiment of the present disclosure. In the embodiment of FIG. 4I, one or more user devices 110A, B and C are connected to latency oriented routers 120A, B and C, respectively, which are in turn connected to intermediate proxies 122A, B and C, respectively. FIG. 4I illustrates exemplary configurations in which user devices, latency-oriented routers, intermediates proxies, latency-oriented proxies and/or servers may be connected. In one non-limiting arrangement, an intermediate proxy (e.g., intermediate proxy 122A), may connect to the latency oriented proxy 121. In another non-limiting arrangement, an intermediate proxy (e.g., intermediate proxy 122B) may connect to one or more simple proxies (e.g., simple proxies 124A and 124B), which may in turn be connected to the latency oriented proxy 121. In yet another non-limiting arrangement, an intermediate proxy (e.g., intermediate proxy 122C), may connect to another intermediate proxy (e.g., intermediate proxy 122A), which may in turn be connected to the latency oriented proxy 121. In some embodiments, there may be more than two intermediate proxies 122 between latency-oriented router 120 and latency-oriented proxy 121 (only one and two such intermediate proxies are shown in FIG. 4I). Latency oriented proxy 121 may subsequently connect to server 180. In some embodiments, there may be more than one latency-oriented proxy 121 (only one is shown in FIG. 4I).

In some embodiments, a game related application (for example, running on server 180) may use a "game state", which is then replicated (and/or synchronized) to the game clients, where the replica and/or synchronized copy of the "game state" may be rendered. In a traditional configuration (not shown), server 180 running such a game-related application, may send update packets directly to all the game clients (for example, running on user devices 110). In such traditional configuration, these update packets may create significant load on the server 180 and/or associated ISPs. In addition, the traditional configuration may not be optimal due to issues associated with the total amount of traffic and Distributed Denial of Service (DDoS) protection, etc. In contrast, the configurations illustrated in FIG. 4I may provide significant improvements over the traditional configuration, in reducing the traffic manifold and making DDOS attacks significantly more complicated.

In the example shown in FIG. 4I, instead of the server 180 sending "game state" updates directly to all the user devices, it instead sends the "game state" updates to one or more latency-oriented proxies 121 (only one latency-oriented proxy is shown in FIG. 4I). Each latency-oriented proxy 121 may keep its own copy of the "game state" and may be able to provide synchronization to one or more intermediate proxies (only intermediate proxies 122A, B and C are shown in FIG. 4I), each of which may maintain their own copy of the "game state". Intermediate proxy 122A and latency-oriented routers 120A may provide "game state" data and/or updates to user devices 110A; intermediate proxy 122B and latency-oriented routers 120B may provide "game state" data and/or updates to user devices 110B; and intermediate proxy 122A may provide "game state" data and/or updates to intermediate proxy 122C, which, in turn, may provide "game state" data and/or updates to user devices 110C (which are sitting behind the latency-oriented routers 120C). The "game state" data and/or updates received by the user devices 110 through the configurations shown in FIG. 4I may be equivalent to the "game state" data and/or updates that the user devices 110 would have otherwise received directly from the server 180 in a traditional configuration. As a result, in some of the examples illustrated in FIG. 4I, the system may be indistinguishable from traditional configuration from the point of view of user devices 110A-110C (and/or game clients running on them), while providing significant traffic savings.

In some embodiments, the same proxies may participate in different "data trees" similar to the one shown in FIG. 4I. In particular, more than one server 180 (only one is shown in FIG. 4I) may distribute their respective "game states" over the system in FIG. 4I (and/or a similar one) and also one server 180 may distribute more than one "game state".

It should be further noted that connections in FIG. 4I are merely exemplary, and any combination of any number of latency-oriented proxies 121, intermediate proxies 122, simple proxies 124, latency-oriented routers 120 and proxy routers 123 may be used to deliver "game state" (with appropriate updates) to user devices 110.

Figure 4J:
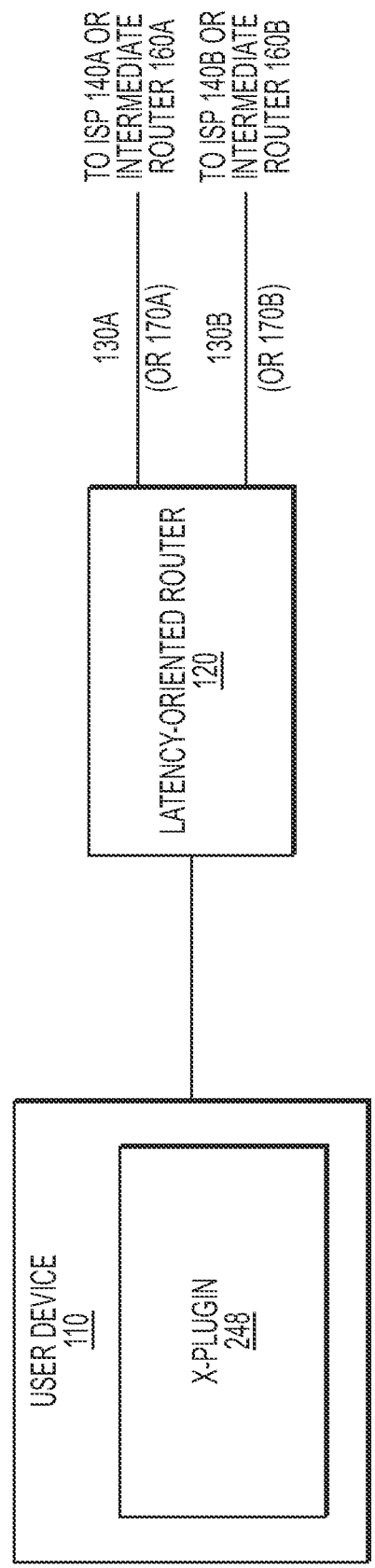
FIG. 4J is a schematic diagram illustrating connection of latency-oriented routers implementing "X-Plugin," according to an embodiment of the present disclosure.

FIG. 4J is a schematic diagram illustrating connection of latency-oriented routers implementing "X-Plugin" 248, according to an embodiment of the present disclosure. In some embodiments, "X-Plugin" 248 may run on user device 110, as illustrated in FIG. 4J. "X-Plugin" 248 is described in more detail below.

Figure 5A:
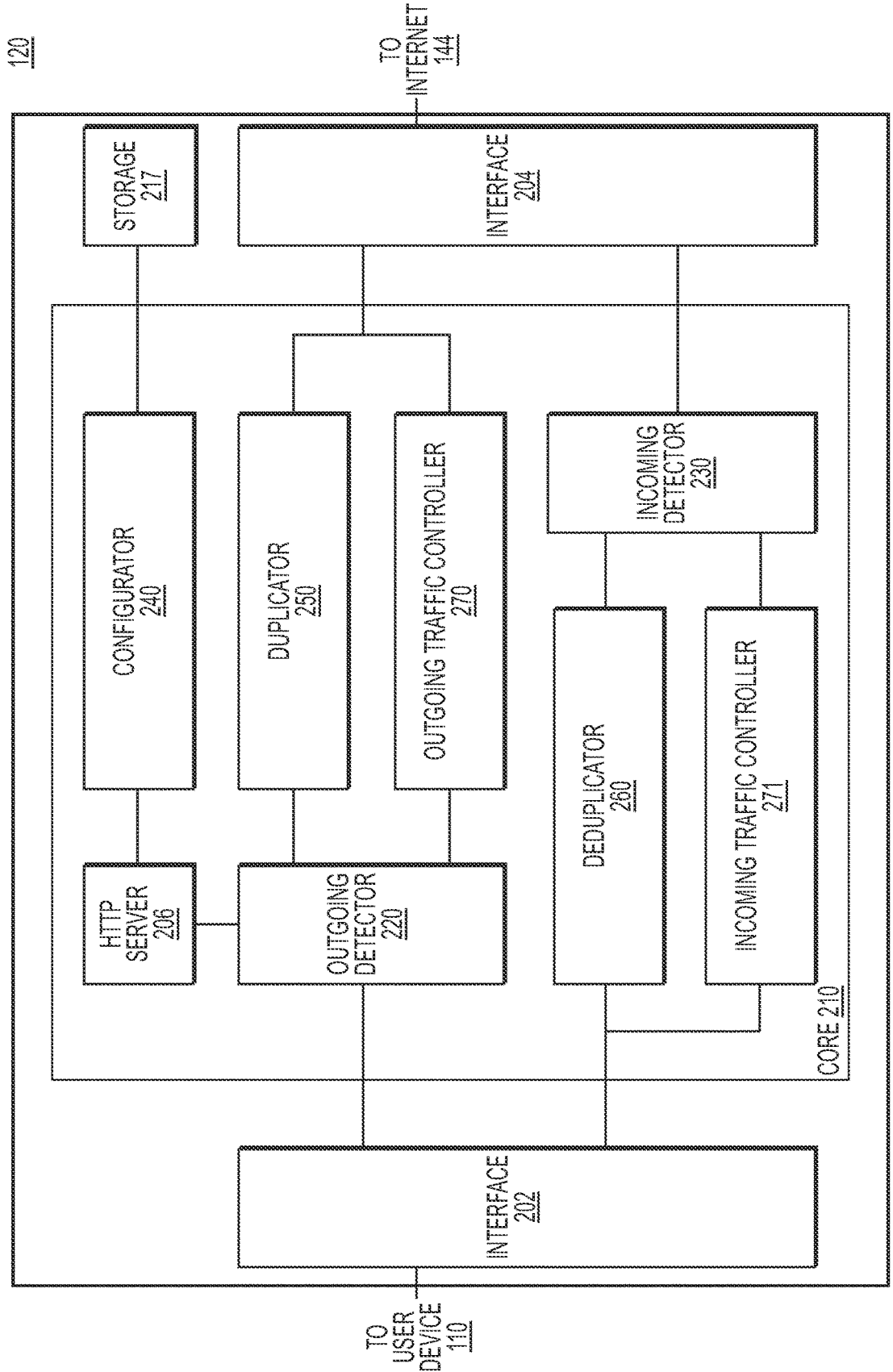
FIG. 5A is a block diagram illustrating an exemplary implementation of a latency-oriented router, according to an embodiment of the present disclosure.

FIG. 5A is a block diagram illustrating an exemplary implementation of latency-oriented router 120, according to an embodiment of the present disclosure. As illustrated in the example of FIG. 5A, latency-oriented router 120 may include interface 202, core 210, interface 204 and optionally storage 217. According to an embodiment, core 210 may further include outgoing detector 220, configurator 240, duplicator 250, traffic controller 270, incoming detector 230, deduplicator 260 and incoming traffic controller 271. Optionally, core 210 may also include HTTP server 206, one or more DHCP servers (not shown) acting as a DHCP server for appropriate interface 202 and one or more DHCP clients (not shown) acting as a DHCP client for appropriate interface 204.

In some embodiments, the latency-oriented router may also include one or more optional Bluetooth modules (not shown). Each of these module(s) may be, without limitation, a Classic Bluetooth module, a BLE module (which is also known in the art as a Bluetooth Smart module) or a Bluetooth dual-mode module that supports both Classic Bluetooth and BLE (which is also known in the art as a Bluetooth Smart Ready module). Classic Bluetooth and/or dual-mode modules may optionally support EDR and/or Bluetooth High Speed (HS).

Interfaces 202 and 204 may be interfaces to communicate with any device external to latency-oriented router 120. Interfaces 202 and 204 may be designed to communicate with an external system such as a personal computer, a cell phone, a personal digital assistance or a server. In some embodiments, interfaces 202 and/or 204 may be implemented as one or more of the following: Ethernet, Wi-Fi, USB, Bluetooth, ADSL, cable Internet, LTE, 3G or any other existing or future developed communication systems and/or protocols with similar functionalities. In an example, interface 202 may handle connections 150 from user devices 110 and interface 204 may handle connections 130 to ISPs 140 as illustrated in FIG. 4A.

In some embodiments, an external application (not shown) may be used to configure and/or control latency-oriented router 120. In some embodiments, such external application may run on a desktop PC, a smartphone and/or a tablet and may use a connection to HTTP server 206 to control latency-oriented router 120. In some embodiments, such external application may use a Wi-Fi connection (for example, using interface 202) or a Bluetooth connection (for example, using a Bluetooth module) to establish its connection to HTTP server 206.

In one embodiment, there may be multiple interfaces 202 and/or multiple interfaces 204. In some embodiments, some or all of the interfaces 202 and/or 204 may be "virtual interfaces".

In some embodiments, storage 217 may be implemented as a persistent storage such as SSD, HDD, Flash, EEPROM, battery-backed RAM or any other existing or future developed storage with similar functionality.

According to an embodiment, core 210 may be implemented as a CPU, MCU or MPU, and the modules shown in FIG. 5A within core 210 may be implemented as software programs, routines or modules. Alternatively, core 210 may be implemented as FPGA or ASIC, and the modules within core 210 may be implemented as circuits. Still alternatively, a hybrid implementation in which some components of core 210 are implemented on a CPU, MCU or MPU, while other components of core 210 are implemented as FPGA(s) or ASIC(s), is also within the scope of the current disclosure.

In some embodiments, there may be one or more of additional queues (not shown) placed between different components of the latency-oriented router 120. By way of example and not limitation, there may be a queue between (a) interface 202 and outgoing detector 220, (b) outgoing detector 220 and duplicator 250, (c) outgoing detector 220 and outgoing traffic controller 270 and/or (d) core 210 and interface(s) 204. These queues may be implemented as hardware queues (for example, similar to those hardware queues used in existing routers), software queues (including, but not limited to boost::sync_queue, boost::sync_bounded_queue, and so on) and/or a combination of both.

In some embodiments, one or more of these queues may be a prioritized queue and/or may allow for a prioritized data and/or packet extraction. For example, a queue placed between core 210 and interface 204 (obtaining packets from both duplicator 250 and outgoing traffic controller 270) may be prioritized, thereby allowing for extraction of latency-critical packets with higher priority than "other traffic" packets. In other embodiments, a queue between interface 202 and outgoing detector 220 may allow for prioritized packet extraction under certain conditions (such as high CPU load, high interface load, etc.), allowing outgoing detector 220 to run all or some of its detection procedures over the packet in the queue and take only packets which belong to latency-critical traffic (for example, leaving packets belonging to "other traffic" until high load conditions cease). In some embodiments, one or more of these queues may use one or more methods usually referred to as Active Queue Management (AQM) techniques (including, but not limited to, Random Early Detection (RED), Controlled Delay (CoDel), Class-based Queue Scheduling (CBQ), HTB, Hierarchical Fair Service Curve (HFSC), etc.).

In some embodiments, latency-critical packets detected, for example, by outgoing detector 220 and/or incoming detector 230, may be assigned a "traffic class" (referred to as "LC"); "other traffic" may be assigned "traffic class" (referred to as "OT"). Traffic class OT may be different from traffic class LC. In some of such embodiments, this assigned "traffic class" may be used as a "traffic class" of the packet for the purposes of Active Queue Management algorithms such as CBQ, HTB, HFSC and/or any other algorithms with similar functionalities, known now or developed in the future. In some of such embodiments, "traffic class" LC may be designated as "real time" for the purposes of the algorithms mentioned above. In some embodiments, some or all of the queues of latency-oriented router 120 may be implemented as two independent queues, one for latency-critical traffic and another for "other traffic". In some embodiments, each of these queues may use one or more of AQM algorithms.

In one embodiment, core 210 may include a configurator 240, which stores configuration information in persistent storage 217, which may reside outside of core 210. Upon restarting of latency-oriented router 120, the configuration information may be read from storage 217 into configurator 240 of core 210. In one embodiment, configurator 240 may be controlled by an HTTP server 206. In another embodiments, configurator 240 may be controlled by a Bluetooth module. In yet another embodiments, configurator 240 may be controlled by other devices to generate the configuration information. The generated configuration information from configurator 240 may be used by some or all the other modules of core 210.

In some embodiments, latency-oriented router 120 may implement the UPnP protocol and/or the Internet Gateway Device (IGD) protocol. In some embodiments, these protocols may be implemented as a part of (and/or communicating with) configurator 240, which may in turn facilitate dynamic port forwarding.

In some embodiments, latency-oriented router 120 may implement the IEEE 802.11e standard, Wi-Fi Multimedia (WMM) and/or Wireless Multimedia Extensions (WME).

In some embodiments, latency-oriented router 120 may include an authenticator 282 (not shown) between interface 204 and incoming detector 230. The authenticator 282 may be used to facilitate authentication for the router-to-router communication as shown in FIG. 4H.

In one embodiment, latency-oriented router 120 may be implemented as a separate computer running appropriate software. Latency-oriented router 120 may be implemented as an application running on a device with an operating system such as a personal computer, server, desktop computer, laptop computer, tablet, smartphone or a single-board computer (such as Raspberry Pi or BeagleBone). In such implementation, latency-oriented router 120 may use one or more application programming interfaces (APIs) (for example, latency-oriented router 120 may use Berkeley sockets API, including, but not limited to, SOCK_RAW or SOCK_DGRAM sockets) to receive and send data. These APIs may be provided by the operating system and/or by third-party applications and/or drivers.

In some embodiments, latency-oriented router 120 may be implemented as a standalone device specially constructed for its purpose serving as a latency-oriented router. Latency-oriented router 120 may include a MCU or CPU and other components supporting the functionalities of the MCU or CPU.

In some embodiments, latency-oriented router 120 may be implemented as one or more software module(s) running on one of user devices 110. Latency-oriented router 120 may use "network filter drivers" or equivalent (such as netfilter module for Linux or Network Kernel Extension for Mac OS) or any other technique used to implement VPN, to intercept traffic and process it before sending it out. An example of an embodiment which uses such an implementation of the latency-oriented router 120, is shown in FIG. 4E.

In one embodiment, packets from interface 202 may arrive at core 210, where they may be directed to outgoing detector 220 for further processing. Outgoing detector 220 may detect whether the received packet belongs to latency-critical traffic, such as traffic originated from VOIP, streaming media or game applications. Alternatively, outgoing detector 220 may detect that the packet belongs to other, non-latency-critical traffic such as HTTP(S) download or torrent traffic.

In some embodiments, outgoing detector 220 may detect latency-critical packets by analyzing one or more of the packet fields. Outgoing detector 220 may analyze the "protocol" field within an IP packet and/or a "port number" field for a respective protocol to determine the type of traffic. For example, an IP packet with protocol=UDP and UDP port in the range from 5000 to 5500, may indicate League of Legends game traffic and outgoing detector 220 may detect such traffic as latency-critical. In other embodiments, such information (e.g., the "protocol" and "port number" fields) may need to be combined with other information to identify the traffic reliably.

In some embodiments, outgoing detector 220 and/or incoming detector 230 may implement an analysis of foreign IP addresses. For example, with respect to outgoing traffic, the outgoing detector may use the target IP address as the "foreign" IP address, and with respect to incoming traffic, the incoming detector 230 may use the source IP address as the "foreign" IP address. In one non-limiting example, if a "foreign" IP address is associated with an Autonomous System (AS) belonging to Riot Games, such "foreign" IP address may indicate League of Legends traffic. In this example, the check "whether IP belongs to AS", which is typically used by servers of certain games may be implemented, for example, by storing a table of AS entries "of interest" within the latency-oriented router 120 itself (this information may be derived from netmask-to-ASN and/or ASN-to-owner tables (wherein ASN means Autonomous System Numbers) which may be obtained, for example, by making an "MRT dump" (or by using any other export mechanism) from certain "border" routers), or by storing netmask-to-ASN and ASN-to-owner tables themselves, or by performing an external request (for example, to an external server, including, but not limited to, a special server which is set up for such purpose and/or a WhoIs server). In some embodiments, the table of AS entries "of interest" may be implemented as a list, with each entry describing an "app type", and containing one or more of IP ranges "of interest". In one embodiment, the "app type" entry in the list may further contain one or more entries identifying ports "of interest", and/or other information which may allow further classification of the traffic. In some embodiments, IP ranges "of interest" may be derived from netmask-to-ASN and/or ASN-to-owner tables.

In another non-limiting example, latency-oriented router 120 may use "reverse DNS lookup" (wherein DNS means Domain Name System) on "foreign" IP address and pass such information to detector 220, which may then check for typical patterns within the string returned by "reverse DNS lookup". In some embodiments, outgoing detector 220 may perform a regular expression match to check if the string returned by reverse-DNS-lookup matches a regular expression pattern (e.g., *riotgames*). In some embodiments, such pattern match may be made case-insensitive. In other embodiments, the string returned by reverse-DNS-lookup may be parsed to extract the domain name out of it, and the domain name may be subsequently compared to a predefined one (e.g., "riotgames.com"). In some embodiments, such comparison may be performed in a case-insensitive manner.

In some embodiments, outgoing detector 220 may analyze the Differential Services Field within the IP header (such as an IPv4 header or an IPv6 header) and, in particular, the differentiated services code point (DSCP) portion of the field (as defined in RFC2474, the entirety of which is incorporated herein by reference). In some embodiments, any packet in which the value of the DSCP field is not equal to "DF" (also known as "CS0" with a binary value of 000000) or "CS1" (binary value 001000), as defined in RFC4594 and/or RFC5865, the entirety of both of which is incorporated herein by reference, may be determined to belong to latency-critical traffic. In other embodiments, any packet in which the value of the DSCP field is equal to "CS3" (binary value 011000), "CS4" (binary value 100000), "CS5" (binary value 101000) and/or "EF" (binary value 101110) may be determined to belong to latency-critical traffic.

In some embodiments, outgoing detector 220 may use WMM, WME and/or 802.11e "access category" to determine whether the packet belongs to "latency-critical traffic". In some embodiments, if the packet belongs to an AC_VO or AC_VI "access category", it may be recognized as a "latency-critical packet".

In some embodiments, outgoing detector 220 may analyze packets which are identified by certain fields within the packet, such as by (source_IP, source_port, target_IP, target_port) tuple, and may decide whether the packet belongs to "latency-critical traffic" based on such analysis. Outgoing detector 220 may look for packets with the same (source_IP, source_port, target_IP, target_port) tuple, and if such packets are small for the respective interface (for example, less than a maximum transmission unit (MTU) and/or less than a predefined threshold) and/or have small typical time-intervals between them (for example, less than 100 or 200 ms), then such packets may be considered as latency-critical. In some embodiments, the criteria may be adjusted to analyze low average traffic (such as less than 100 or 200 Kbit/s), combined with small typical time intervals between the packets. For ease of reference, such technique may be referred to as "ad-hoc latency-critical detection". In some embodiments, "ad-hoc latency-critical detection" latency-critical sessions may be dropped when a pre-defined time threshold is reached (for example, "several seconds") without communications over the session.

In some of embodiments with "ad-hoc latency-critical detection", "ad-hoc latency-critical detection" may lead to the existing communication session changing its status from "other traffic" to "latency-critical traffic" while the session is already in progress. In such scenarios, it may be undesirable to use all the latency-improving features for packets that belong to such sessions. In particular, proxy-related features may be undesirable for such sessions. In some embodiments, other latency-improving features (for example, DSCP modification, "time slots" and "suppression" of "other traffic") may be still applicable to such sessions.

In some embodiments, latency-oriented router may store information about such "ad-hoc latency-critical detection" sessions, such as (target_IP, target_port) or (ASN-of-target_IP, target_port), and use such information to determine whether the session is latency-critical for new sessions (i.e., created after such information is stored). Information may be stored in RAM or in non-volatile storage such as storage 217. In some embodiments, such information-based determination may allow identification of the session as latency-critical from the very beginning of the session (and without using ad-hoc detection mechanisms) which, in turn, may allow use of all the latency-improving features for such sessions (including proxy-related features).

In some embodiments, information about "ad-hoc latency-critical detection" sessions may be communicated to latency-oriented proxy 121 (or to any other proxy or an external server). In some embodiments, such information may be communicated after permission from the user to share such information is obtained (for example, via Configurator 240). In some embodiments, such information may be used by developers to improve latency-oriented router 120. In one example, statistics on such ad-hoc latency-critical sessions may be used to determine the latency-critical applications used by client devices 110 (and/or the popularity of such applications), which may lead to implementing support for another application type. In another example, information on such ad-hoc latency-critical sessions may allow detection of region-specific or ISP-specific behavior of certain latency-critical applications.

In some embodiments, the methods described above may be combined. For example, if an incoming packet has protocol=UDP and the UDP port is in the range from 5000 to 5500, or the incoming packet has a "foreign" IP address that belongs to an AS that originated from Riot Games, or a string is returned by reverse-DNS-lookup that matches (case-insensitively) regular expression pattern "*riot-games*", then the outgoing detector 220 may decide that the packet belongs to a League of Legends client time-critical traffic.

In other embodiments, outgoing detector 220 may perform an analysis of packet format. Information from such analysis may be used alone, or together with some or all of other methods described above. If the packet has protocol=UDP and a port which may indicate two different applications A and B, then the outgoing detector 220 may check whether the packet format complies with packet format of application A and/or with packet format of application B and use such information to make relevant determinations.

In some embodiments, in addition to information that "this packet belongs to latency-critical traffic", outgoing detector 220 may additionally provide information about the "app type" to which the packet belongs. In one non-limiting example, if some of the exemplary checks above succeeded for a packet, outgoing detector 220 may report that "app type" is "'League of Legends' client traffic". In another non-limiting example, "app type" may be "Skype VOIP traffic". In some embodiments, "app type" may contain additional information associated with such type of traffic, such as "expected packet rate" or "list of preferred proxies".

In some embodiments, outgoing detector 220 may additionally implement detection and/or creation/destruction of the "latency-critical sessions" for latency-critical traffic. In some embodiments, such "latency-critical sessions" may also be used to facilitate detection and/or modification of the incoming traffic (as described for incoming detector 230 and deduplicator 260).

In one example, "latency-critical session" may start (and/or be created) when a UDP packet arrives, after which outgoing detector 220 may store information about source_IP, source_port, target_IP and/or target_port from the packet and associate the future packets with the session when the future packets arrive with these attributes. In some embodiments, a session may end (and/or be destroyed) after a certain amount of time has passed without further receiving any packets belonging to the session (with typical timeout values between 0.1 s and 60 s). Alternatively, timeout may be configurable and/or may depend on the "app type" of the latency-critical traffic. In some embodiments, only packets coming in one direction may count to keep the session alive (i.e., to prevent session end and/or destruction). For example, only packets from interface 202, or only packets from interface 204 (e.g., as reported by incoming detector 230) may count to keep the session alive. In other embodiments, packets coming in both directions (both from interface 202 and interface 204) may count to keep the session alive.

Still alternatively, if latency-critical traffic is going over TCP, the TCP connection may be used as a session using mechanism(s) similar to that described above for UDP or with additional analysis of TCP-specific packet fields, such as SYN/FIN flags to determine the start and the end of the session more reliably.

In some embodiments, "latency-critical sessions" may be detected/created using any of the existing techniques for starting/ending NAT sessions (such as techniques described in RFC2663, RFC3022, RFC4787 and/or RFC5382). In some embodiments, "latency-critical sessions" may be created using "port forwarding" and/or "static NAT" or "static mapping". Information necessary to create these sessions may be taken from configurator 240.

In some embodiments, outgoing detector 220 may, when passing a latency-critical packet to duplicator 250, additionally provide information about the latency-critical session associated with such packet. In some embodiments, outgoing detector 220 may provide additional information associated with the latency-critical session, which may include "detected packet rate" (such as, measured over the last NN seconds, wherein NN is a specific, predetermined or configurable period of time). In another example, the latency-critical session may include information about the session proxy. In some embodiments, such session proxy information may be calculated by other components of the latency-critical router 210, such as duplicator 250.

In some embodiments, the information about the "app type" may be maintained and/or reported on per-latency-critical-session basis instead of, or in addition to, reporting on per-packet basis as described above.

In some embodiments, outgoing detector 220 may additionally provide information on whether currently there is latency-critical traffic (for example, to outgoing traffic controller 270). Such detection may be implemented based on a parameter such as last-time-when-latency-critical-packet-has-been-observed (either in one direction or in any direction). The incoming latency-critical traffic may be reported by incoming detector 230. If it is determined that the last time that a latency-critical-packet was observed was more than D seconds ago, outgoing detector 220 may report that there is no current latency-critical traffic. The typical values for D may be between 0.1 s and 60 s. In some embodiments, values of D may be different for different "app types" and/or configurable via configurator 240.

Alternatively, detection of the current latency-critical traffic may be based on detection of the "latency-critical sessions" as described above. In one embodiment, outgoing detector 220 may report that there is current latency-critical traffic if there is at least one "latency-critical session" in progress. In some embodiments, detection of "latency-critical sessions" and/or "current latency-critical traffic" may be implemented within other parts of the system, such as within duplicator 250 and/or within incoming detector 230. Combinations of the detection methods described above are also within the scope of the present disclosure.

In some embodiments, some or all of the functionality related to detection, creation, maintenance and destruction of latency-critical sessions, may be implemented as a "session keeper" component (not shown). Such component may be a part of the outgoing detector 220, or may be implemented as a separate component (for example, within core 210). In some embodiments, the same or similar "session keeper" component may be re-used to implement some or all of the other session-related components such as incoming detector 230, session tracker 284 and/or session selector 286.

In one embodiment, latency-critical traffic may be directed to duplicator 250, where duplicator 250 may duplicate the packet and send it to several interfaces 204. In some embodiments, zero or more copies may be sent to each interface 204. In one non-limiting example, duplicating may include sending one or more copies of the packet to each interface 204. Alternatively, duplicator 250 may duplicate the packet into one or more copies and transmit them to the same interface 204 according to configuration information obtained from configurator 240. In other embodiments, duplicator 250 may send two or more copies into each interface 204.

In some embodiments, packet duplication may be generalized to "Redundant Arrays of Inexpensive Connections" (RAIC), with the concept being similar in nature to Redundant Arrays of Inexpensive Disks (RAID). For example, simple duplication as described above (and corresponding deduplication as described with respect to deduplicator 260 and/or 262), may be seen as a simple mirror (RAIC-1, with the concept being similar to that of RAID-1). In some embodiments, RAIC-5 (with the concept being similar to that of RAID-5) may be used. For example, if there are three interfaces and/or connections between sides of the communication (such as latency-oriented router 120 and latency-oriented proxy 121; two latency-oriented routers 120; or any other combination of routers and proxies), then the packet may be split into two parts (A and B) of the same size. If the size of the packet is not divisible by two, padding may be used to make the size of the packet equivalent prior to splitting. Then duplicator 250 may send several "split-copies": split-copy #1 containing A to interface #1, split-copy #2 containing B to interface #2, and split-copy #3 containing A^B to interface #3 (where '^' denotes 'xor', i.e., "exclusive or"). Deduplicator 260 and/or 262 may then be able to restore the whole packet as soon as any two of these three split-copies have been received. More specifically, if split-copy #1 is missing, then A can be restored as splitcopy_3^splitcopy_2; if split-copy #2 is missing, then B can be restored as splitcopy_3^splitcopy_1; and if split-copy #3 is missing, both A and B are already available so the packet can be reassembled from splitcopy_1 and splitcopy_2. In some embodiments, three interfaces and/or connections may be further generalized to four or more interfaces and/or connections. For example, on a sending side, four interfaces may be supported as splitting the packet into three parts (A, B, and C), and sending four split-copies: splitcopy_1=A, splitcopy_2=B, splitcopy_3=C, and splitcopy_4=A^B^C. On the receiving side if, for example, splitcopy_1 is lost, then A can be restored as splitcopy_4^splitcopy_3^splitcopy_2.

In some embodiments, RAIC-6 may be used with one of the algorithms that are normally used for RAID-6 (for example, using syndrome calculation and restore algorithm). RAID-6 and its associated algorithms are known to those of ordinary skill in the art and are described in more detail in publications such as (the entirety of each of which is incorporated herein by reference): James S. Plank, "The RAID-6 Liber8tion Code," *International Journal of High Performance Computing Applications* (Jun. 2, 2009); Chao Jin, et al., "P-Code: A New RAID-6 Code With Optimal Properties," *Proceedings of the 23$^{rd}$ International Conference on Supercomputing*, at 360-369 (2009); James S. Plank, et al., "Minimum Density RAID-6 Codes," *ACM Transactions on Storage*, Vol. 6, Issue 4, Article No. 16 (May 2011). Using RAIC-6 may allow restoring the packet as soon as all-but-two of the split-copies of the packet are received.

In some embodiments, RAIC (including, but not limited to, RAIC-1, RAIC-5 and RAIC-6) may be used when only one interface is used. In such case, duplication packets over the same interface, as described above with respect to duplicator 250 and which may include delaying some of the copies, may be seen as an implementation of RAIC-1. In some embodiments, as described above with respect to sending copies and duplicator 250, one packet may be split into three split_copies, which split_copies may be sent over the same interface in a manner similar to RAIC-5. Upon receipt of any two of split_copies, the receiving side of communication (for example, deduplicator 260) may restore the original packet in a manner described above. RAIC-6 may be used over a single interface in a similar manner. In some embodiments, N split_copies may be sent over M different interfaces, where M and N are integers. In one non-limiting example, two of the split_copies may be sent to interface #1, and two of the split_copies may be sent to interface #2.

In some embodiments, RAIC may be used together with X-Fragmentation. For example, a packet may be split by X-Fragmentation into N segments of roughly the same size, which segments may be then encoded into M split_copies, where M may be equal to N+1 for RAIC-5, and M may be equal to N+2 for RAIC-6. Such split_copies may then be then sent as described with respect to X-Fragmentation. In one non-limiting example, if an original packet has a payload size of 500 bytes, it may be split into five copies each having a payload size of 100 bytes. Six split_copies (100 bytes each) may be produced out of the five original split_copies, where the sixth copy is an 'xor' of the other five in order to make RAIC-5. Then all six split_copies may be sent over the same interface or over different interfaces. Delivery of any five of the six split_copies may be sufficient to reconstruct the original packet. A similar approach may be used for RAIC-6, in which N+2 split_copies are produced, and reconstruction of the original packet may be possible upon delivery of any N of the N+2 split_copies.

In some embodiments, a variation of RAIC, referred to herein as Redundant Arrays of Inexpensive Connections Time-based (RAICT), may be used. RAICT may apply techniques similar to that of RAIC, but to distinct packets in the packet sequence instead of just one packet. In one non-limiting example, each packet from a packet sequence may be sent twice: once as-is, and once 'xor'ed with a previous packet. One of the packets may need to be padded to achieve the same length as the other packet. Thus, if packet A needs to be sent, it is sent as two split_copies: the first split_copy may be equal to "A^packet_before_A", and the second split_copy may be equal to A. If A is the very first packet in the packet sequence, packet_before_A may be considered a well-known constant, such as zero. When next packet B needs to be sent, split_copies "B^A" and "B" may be sent; when next packet C needs to be sent, split_copies "C^B" and "C" may be sent; and so on. On the receiving side of communication, even if both split_copies from any of the packets are missing, the packet may still be reconstructable from subsequent packets. In some embodiments, the method above may be generalized to more than two split_copies sent for each of the packets. For example, when four split_copies are used per packet, packet D may be sent as four split_copies: "D^A", "D^B", "D^C" and "D", which may allow for recovery from bursts of packet losses.

In some embodiments, RAIC split-copies may be further duplicated. In some embodiments, packet duplication may be performed together with one or more proxying techniques (such as the proxying techniques described below). In some other embodiments, packet duplication may be performed without proxying techniques. In some of the packet duplicating embodiments without proxying techniques it may lead to more than one copy of the packet arriving to the server 180, and server 180 may ignore some or all such duplicates.

In some embodiments, when sending one or more of the packet copies to one or more of interfaces 204, duplicator 250 may modify the respective copy by adding authentication data, which may be one or more of client_ID, auth_token, MAC and/or signature fields (for example, as one of (client_ID, auth_token), (client_ID, MAC) or (client_ID, signature) tuples). Exemplary handling of these tuples is described with respect to authenticator 282 shown in FIG. 5B. According to some embodiments, the MAC field, if present, may contain a MAC for the packet (and/or a part of the packet, including, but not limited to, packet body) either from MAC algorithms (such as OMAC, HMAC or Poly1305) or from AEAD algorithms (such as Encrypt-then-MAC, MAC-then-Encrypt, Encrypt-and-MAC, Environmental Audio Extensions (EAX), Counter with CBC MAC (CCM), Offset Codebook (OCB), Chacha20-Poly1305 or various forms of Galois/Counter Mode (GCM) including, but not limited to, AES-GCM), using a secret key. Such a secret key may be pre-shared with both the latency-oriented router and the latency-oriented proxy and may be issued on per-user, per-latency-oriented-router and/or on per-latency-oriented-proxy basis).

In some embodiments, MAC algorithms and/or AEAD algorithms may use nonce(s) within packets to prevent replay attacks. In some embodiments, a separate nonce field, incremented for each packet by the sender, may be used. In some other embodiments, a packet_ID field (for example, an added field as described with respect to duplicator 250 or existing_packet_ID) may be used as such nonce(s). In one non-limiting example, AEAD may be used, and packet_ID may be passed in plain (without being encrypted), with the rest of the packet encrypted using a secret key and using packet_ID as an AEAD nonce. In another non-limiting example, a MAC algorithm may be used, and packet_ID may be a part of the packet, with the whole packet being authenticated by a MAC algorithm. In some embodiments, on receiving side of the communication, the nonce (including, but not limited to, packet_ID) may be used to ensure that each packet is delivered only once (which may effectively eliminate replay attacks). In some embodiments, methods similar to that described with respect to deduplication (including, but not limited to, last_packet_ID and/or bit mask(s) and/or list(s) of received packet_IDs) may be used to ensure that each packet is delivered not more than once.

In other embodiments, the signature field, if present, may be an asymmetric algorithm (such as RSA or ECC) signature for the packet using a private key PR. Such private key may be stored within the latency-oriented router 120. The public key corresponding to the private key PR may be shared with the latency-oriented proxy 121. In some embodiments, adding additional fields to the respective copy may be implemented by "wrapping" the original packet (or original packet body) inside of new packet (or new packet body), with additional fields within the "new" packet (or packet body). In some embodiments, the client_ID field may be skipped for the rest of the latency-critical session as soon as an acknowledgement that the client_ID has been received for such session, arrives from the other side of the connection.

In some embodiments, even if authentication data is not provided, duplicator 250 may still encrypt the packet body (and/or a part of packet body) using a secret key and/or a private key. In some embodiments, calculation of authentication data and/or encryption may be performed after all the other packet modifications (or packet body modifications) are completed.

In some embodiments, when sending one or more of the packet copies to one or more of interfaces 204, duplicator 250 may modify the respective copy(ies) of the packet to provide NAT-like behavior. For ease of reference, such a modification may be referred to as "NAT-like translation". In one example, the source IP of the copy may be changed to match the IP address associated with the interface 204 where the copy is to be sent. In some embodiments, the source port (such as UDP port or TCP port) may be modified (for example, to use a port number that is currently unused for the modified-source-IP address), so that traffic returning back to the modified (source-IP, source-port) pair can be easily distinguished from all the other traffic. In some further embodiments, information (which, for ease of reference, may be referred to as "NAT-like translation data") may be associated with the corresponding "latency-critical session", to facilitate "reverse NAT-like translation" as described with regards to deduplicator 260. In some embodiments, such "NAT-like translation data" may be implemented as (source_IP, source_port) pair, which is associated with the latency-critical session.

In some other embodiments, the IP packet may be modified using one or more of the techniques described in RFC2663, RFC3022, RFC4787 and/or RFC5382. These techniques may include, but are not limited to, NAPT.

In some embodiments, "NAT-like translation" may include adding a "VPORT" field, value of which may represent a "virtual port" which is assigned to such session_ID using any still-unused-VPORT and/or techniques for port selection used in NAPT. In some embodiments, such "VPORT" may be a purely virtual port, without processing of any packets coming directly to such port. In particular, VPORT may be of interest in embodiments such as those shown in FIG. 4H.

In some embodiments, when sending one or more of the packet copies to one or more of interfaces 204, each of the copy (ies) may be modified to ensure that it reaches the latency-oriented proxy 121. For ease of reference, such a modification may be referred to as "proxy translation". In one embodiment, the target IP of each copy may be changed to one of the IPs of the latency-oriented proxy 121. Additionally, the target port (such as the UDP port or the TCP port) may be modified to use a port number reserved for latency-critical traffic by the latency-oriented proxy 121. In other embodiments, in addition to modifying the target IP address, a session_ID field (representing a "latency-critical session") may be added to each copy by "wrapping" the original packet (or original packet body) inside of new packet (or new packet body) and adding a session_ID field within "new" packet (or packet body). In some embodiments, when duplicator 250 is a component of the latency-oriented router 120, this will facilitate using the same port on the latency-oriented proxy, for packets received for multiple sessions from the same latency-oriented router. In other embodiments, the logic above may be used in the latency-oriented proxy using the duplicator 252. In other words, the latency-oriented proxy 121 and its duplicator 252 may use the session_ID field to facilitate using the same port of the latency-oriented router for communicating with multiple sessions from the same latency-oriented proxy.

In some embodiments, "proxy translation" may include modifying the packet to include a proxy_target_IP field and/or a proxy_target_port field. Such field may be added by "wrapping" the original packet (or original packet body) inside of a new packet (or new packet body), with an additional proxy_target_IP field and/or proxy_target_port field included within the "new" packet (or packet body). In some further embodiments, the proxy_target_IP field and/or the proxy_target_port field may be skipped for the rest of the latency-critical session as soon as an acknowledgement arrives from the other side of the connection that the proxy_target_IP and/or proxy_target_port field has been received for such session. Such an acknowledgement may be sent as a separate packet or as a field within existing packets.

In some embodiments, the target IP addresses and/or ports for "proxy translation" may be different for different interfaces 204. In other embodiments, some or all of the interfaces 204 may be "virtual interfaces". In such an embodiment, while all (or some) of the virtual interfaces may have the same underlying physical interface 204, each virtual interface may have its own target-IP and/or target-port fields and may replace the target IP addresses and/or ports of the packets sent through the "virtual interface", with its own target-IP and/or target-port fields. Such "virtual interfaces" may be particularly useful in embodiments in which the "virtual interfaces" are used as a part of duplicator 252 which may form a part of latency-oriented proxy 121, where latency-oriented proxy 121 has only one interface 204. Such "virtual interfaces" are also particularly useful for any embodiment in which the same physical interface is used to implement interface(s) 202 and 204.

In some embodiments, whether and/or how "proxy translation" is performed may depend on the target_IP field of the packet, the "app type" information and/or information about the "latency-critical session associated with current packet". In one non-limiting example, if the "app type" has an associated list of preferred proxies, then "proxy translation" may pick one of these preferred proxies from the list. In another non-limiting example, if there is more than one preferred proxy in the list of preferred proxies, the proxy to be used for translation may be selected as follows: (a) if there is a "session proxy" associated with the latency-critical session for the current packet, then the proxy associated with that session may be used; (b) if there is no such proxy, then a proxy from the list may be selected and set as the "session proxy" for the latency-critical session based on the round-trip times of the most recent pings (or other similar packet exchanges). In another non-limiting example, selecting a proxy from the list may include an information exchange with each proxy from the list of preferred proxies. Such an information exchange may include requesting a current roundtrip trip time (current_RTT) from the proxy to the target server, receiving the current_RTT from the proxy to the target server (and also optionally receiving the time spent on the proxy before replying) and calculating the current_latency_via_this_proxy as equal to the time from sending the request to receiving the reply+(current_RTT from the proxy to the target server–the time spent on the proxy before replying). In some embodiments, these exchanges may be performed in advance with the results saved or cached for later use. Once the current_latency_via_this_proxy is determined for each of the preferred proxies, in one embodiment, the proxy with the lowest current_latency_via_this_proxy may be selected.

"Proxy translation" may be performed instead of, or in addition to, the "NAT-like translation" described above. In some embodiments, "proxy translation data" may be stored by duplicator 250. Duplicator 250 may store multiple records, with each record containing (source_IP, source_port, target_IP, target_port). Alternatively, or additionally, the duplicator 250 may store (session_ID, target_IP, target_port). It is to be noted that any superset of these fields may also be stored. It is further to be understood that session_ID refers to the ID of the latency-critical session, and such session_ID may be used by other components of the system, such as deduplicator 260.

In some embodiments, when sending one or more copies of the packet to one or more of interfaces 204, traditional IP fragmentation, including, but not limited to fragmentation based on MTU of the interface may be performed. In some embodiments, when sending one or more copies of the packet to one or more of the physical (i.e., non-virtual) interfaces 204, additional information may be added to the header (according to the logic of the respective underlying layer), and the packet may then be transferred/transmitted over respective physical media. These may include adding Ethernet media access control address headers and transferring over Ethernet PHY or Wi-Fi PHY, adding Point to Point Protocol over ATM (PPPoA) headers and transferring over ATM, and so on.

In some embodiments, when sending one or more copies of the packet to one or more of interfaces 204, the duplicator 250 may modify all or some of the copies of the packets by modifying the Differential Services (DiffServ) Field within the IP header (such as IPv4 header or IPv6 header) and, in particular, the DSCP portion of the field as defined in RFC2474. In some embodiments, the DSCP field may be modified to indicate that DSCP is equal to "CS3" (binary value 011000), "CS4" (binary value 100000), "CS5" (binary value 101000) or "EF" (binary value 101110) (as defined in RFC4594 and/or RFC5865). For ease of reference, such values may be referred to as "high-priority DSCP values".

In some embodiments, when sending one or more copies of the packet to one or more of interfaces 204, the duplicator 250 may use Enhanced Distributed Channel Access (EDCA) and/or HCF Controlled Channel Access (HCCA), using access class of AC_VO or AC_VI for the latency-critical packets. This may be of specific interest in configurations such as those shown in FIG. 4E and/or FIG. 4F.

In some embodiments, the number of DSCP modifications may be rate-limited. This may be useful to avoid excessive number of DSCP packets leading to DSCP being ignored as a result of "edge conditioning". If a rate limit on DSCP modifications is implemented, it may be a limit on bandwidth taken by DSCP packets compared to channel bandwidth (for example, DSCP packets may be limited to a number from 5 percent to 20 percent of channel bandwidth) and/or a limit on a bandwidth taken by DSCP packets (for example, taken from configurator 240) and/or a limit on number of DSCP packets per second or any other limit of similar nature. In some embodiments, these limits may be enforced for the whole latency-oriented router 120 (for example, by avoiding DSCP modifications and/or forcing DSCP to values such as DF (binary 000000) or CS1 (binary 001000)—which for ease of reference may be referred to as "low-priority DSCP values". In some embodiments, such limits may be enforced on a per-interface basis. In some embodiments, such limits may be enforced in a way such that packets belonging to some latency-critical sessions have DSCP modified to high-priority DSCP values, and packets belonging to some other latency-critical sessions have DSCP unmodified or modified to low-priority DSCP values.

In some embodiments, when sending one or more copies of the packet to one or more of interfaces 204, the duplicator 250 may compress the packet (and/or a part of the packet, including, but not limited to, packet body). Any compression algorithm may be used, including, but not limited to, LZ77, Huffman coding, deflate, bzip2, LZHL (as described in Sergey Ignatchenko, "An Algorithm for Online Data Compression," C/C++ *Users Journal*, Volume 16, Number 10 (October 1998), which is incorporated by reference herein in its entirety) and any combination of these or any other compression algorithms, known now or developed in the future.

In some embodiments, the compression used for the packets belonging to certain latency-critical session may depend on the "app type" associated with such latency-critical session. In some embodiments, such app-specific compression may use knowledge about the structure of the app-specific packet. In one non-limiting example, such an app-specific compression may use information that at a certain offset within certain type of app-specific packet (or at any other position which may be obtained by parsing the packet), there is a field which may have certain specific meaning (for example, an enum field, such as "NPC state" field, which for the purposes of this example may take only five different values). To compress such a field in such a non-limiting example in a lossless manner, the app-specific compression may represent the field with 3 bits. In another non-limiting example, statistics on the values of such field encountered while the game is played (and/or value frequency tables obtained from such statistics) may be used to generate a Huffman encoding for such field. Then such Huffman encoding may be used to encode such field with different number of bits depending on the specific value (in one non-limiting example, the most frequent value out of the 5 possible ones may be encoded with 1 bit '0', and remaining 4 values may be encoded with 3 bits taking values '100' to '111'). In some other embodiments, arithmetic encoding may be used instead of Huffman encoding. It should be noted that such techniques are not limited to enum fields and may be applied to any type of field.

In some embodiments, some of the fields may be compressed and some may be left uncompressed (and may be transferred verbatim). In some embodiments, some of the fields may be split into two parts—compressed and uncompressed. In one example, a few high bits of a certain field (for example, representing a coordinate) may be seen as a sub-field which may be compressed using Huffman encoding, while the rest of the bits may be transferred verbatim.

In some embodiments, app-specific compression may use lossy compression techniques. In one non-limiting example, if the packet is known to contain an 8-byte (64-bit) double field or 4-byte (32-bit) float field which contains a value of an angle (which angle may be known to be used only for rendering purposes by receiving side of communication), app-specific compression may transfer it as a fixed-point value of only a few bits long (for example, 8 to 10 bits).

In some embodiments, app-specific compression may involve an "incremental compression", whereby the compression may refer to or rely on previously sent packets. This reference to previously sent packets may facilitate "incremental" compression techniques such as or similar to LZ77 and/or compression techniques using "delta compression". In some embodiments, such "incremental" compression techniques may use a reference to a packet with packet_ID=X. For example, LZ77 may refer to an "offset Z within packet X", and "delta compression" may use packet X as a reference packet. In one example, compressed packet Y based on packet X may say that "nothing has changed since packet X" for a certain field or several fields. In another example, compressed packet Y may say that "this field has changed by increment DELTA since packet X". If packet-based communication (such as UDP packets) is used between the parties, then the protocol between the communicating parties may also include a field "packet_ID_ACK", which may be filled by the other side of communication to a value of the last packet received. Upon receiving such packet_ID_ACK, compression technique may use the value of such packet_ID_ACK as an indication that the other side already has such packet_ID_ACK and may use such packet_ID_ACK as a reference packet X for compression purposes. If a reliable stream communication (such as TCP or TLS-over-TCP, where "TLS" refers to Transport Layer Security) communication is used between the parties, then an offset within the stream (for example, from the very beginning, or from current position) may be used to refer to older values, instead of packet X. In such cases, it may be assumed that by the time when the next portion of the stream is received, all the previous data within the stream has also been received (and may be used for reference in "incremental" compression techniques).

In some embodiments, when sending one or more copies of the packet to one or more of interfaces 204, the duplicator 250 may modify all or some of the copies of the packets by adding one of IP "source route" options to IP header (known as loose source and record route (LSRR) and strict source and record route (SSRR), as defined in RFC791, the entirety of which is incorporated herein by reference) and/or modifying the destination IP field (for ease of reference, such process may be referred to as "source route modification"). In some embodiments, LSRR/SSRR header may be added with "route data" containing destination IP field of the packet, and then destination IP field may be modified to contain a "target" IP address (which may be one of IP addresses of latency-oriented proxy 121). In some embodiments, the modification described above (effectively adding destination IP address to LSRR/SSRR header and replacing destination IP address with a "target" IP address), may be repeated more than once to add "preferred route" to the packet. In some embodiments, "preferred route" may be received from latency-oriented proxy 121 (or from some other server on the Internet), in response to a special "preferred route request" from the latency-oriented router 120. In other embodiments, "preferred route" may be associated with "app type". In some embodiments, "source route packet modification" may be made before, after or instead of "proxy translation" described above. For IPv6 packets, IPv6 "routing header" (for example, "Type 0" routing header as defined in RFC2460, the entirety of which is incorporated herein by reference) may be used to implement "source route modification" in a similar manner.

In some embodiments, when sending one or more copies of the packet to one or more of interfaces 204, duplicator 250 may modify each copy of the duplicated packets, adding its own field packet_ID to some or each of the copies it sends to interface 204. This field may be added by "wrapping" the original packet (or original packet body) inside of new packet (or new packet body), with an additional packet_ID field within "new" packet (or packet body). The packet_ID may be an integer that is incremented for each packet going to the same latency-oriented proxy, for each packet going to the same (target_IP, target_port) and/or for each packet belonging to the same "latency-critical session" as identified by outgoing detector 220. Such packet modification may be performed either instead of, or in addition to, other modifications to IP addresses and/or to ports described above.

In other embodiments, for some types of well-known traffic types, it may be unnecessary for the duplicator 250 to add its own identifier to copies of the packet, if each incoming packet may already contain an existing packet_ID with similar properties, and it is possible to retrieve such existing_packet_ID from the packet. Quite often, UDP packets of game traffic already have an integer field of well-known size located at a pre-defined offset from the packet start, which is normally incremented by the game client. Alternatively, such an incremented-by-game-client field may be obtained via alternative techniques for parsing of a known format including, but not limited to, descrambling, decompression, variable-length field parsing and fixed-length field parsing. If an identifier representative of an existing_packet_ID is already present, then for the traffic from the client, the duplicator 250 may skip adding the identifier, and deduplicator 260 on the other side of communication may use the existing identifier from the packet instead.

In some embodiments, before duplication, the packet may be split into several packets (which, for ease of reference, may be referred to as "X-Fragmentation"). In such embodiments, each of the X-Fragments may have its own packet_ID, plus information necessary to reassemble the packet on the receiving side (such as the number of current fragments in the packet and the total number of fragments in the packet). In such cases, X-Fragmentation is different from and may have a significant advantage over usual IP-level fragmentation because X-Fragments are duplicated and the packet can be reassembled if ANY of the copies of the X-Fragment reaches the destination. X-Fragmentation has a significant advantage in probability of packet reassembly on the receiving side. In one example, if the probability of fragment loss is 10 percent and two fragments are sent by two interfaces each, traditional IP-level fragmentation/defragmentation will successfully defragment the packet ONLY if both fragment are received through interface A or both fragments are received through interface B. The probability that such defragmentation will be successful, and given the assumptions discussed herein, is $1-(1-0.9^2)^2$ (or approximately 96 percent). With X-Fragmentation, on the other hand, the packet can be successfully reassembled even if the first fragment came through interface A and the second fragment came through interface B (and vice versa). With X-Fragmentation, the probability that defragmentation will be successful, and given the assumptions discussed herein, is $(1-(1-0.9)^2)^2$ (or approximately 98 percent).

In some embodiments, X-Fragmentation may be performed by duplicator 250 because the original packet is too large compared to the MTU of one of the interfaces. Unlike traditional IP fragmentation, with X-Fragmentation, X-Fragments may be created for all the interfaces (even for those where MTU is not exceeded), and the X-Fragments for all the interfaces may be the same. This may facilitate X-Fragment reassembly advantages as described above.

In some embodiments, X-Fragmentation (and/or creating usual IP-level fragments as described in RFC791) may be performed by duplicator 250 to avoid sending packets larger than a certain threshold, even if such threshold is lower than usual MTU limitations. This may improve the chances that the packets pass and/or improve latencies on the way through the Internet (based on an observation that certain routers on the Internet have routing policies to favor small packets). As described above, such "size-based forced fragmentation" may start fragmenting packets even when usual MTU-based fragmentation is not required yet. In other words, "size-based forced fragmentation" may be triggered earlier than MTU-based fragmentation. In some embodiments, the threshold for "size-based forced fragmentation" may be taken as a constant (with examples for typical threshold constant values being 200, 100 and 50 bytes), or may be obtained via configurator 240. In some other embodiments, the threshold may depend on "app type".

In some embodiments, "size-based force fragmentation" may be used together with proxying techniques. In some other embodiments, it may be used without any proxying. The latter may be achieved by using usual IP-level fragments as mentioned above.

In some embodiments, duplicator 250 may decide to disallow large packets instead of fragmenting them. In one example, if the "app type" belongs to an app that is known to implement Path MTU Discovery (PMTUD), and the IP packet has the "Don't Fragment" flag set, and the size of the current packet is larger than a certain threshold (which may be the same as, or may be different from, the threshold used for "size-based forced fragmentation"), duplicator 250 may decide to drop the packet and issue an ICMP Destination Unreachable/Datagram too big packet (which may be a standard notification used for PMTUD purposes, as described in RFC1191, RFC1981 and/or RFC4821, the entirety of each of which is incorporated herein by reference). In some embodiments, whether an application with UDP packets is known to implement PMTUD may be decided on the basis of a flag associated with the particular "app type", and all TCP connections may be interpreted as implementing PMTUD. In other embodiments, whether an application is known to implement PMTUD may be based on the flag associated with the "app type" of a particular packet, regardless of the protocol.

In some embodiments, duplicator 250 may delay some of the copies, in particular some of the copies sent over the same interface. In some embodiments, delays may be calculated depending on the "app type" of the latency-critical traffic ("app type" may be reported by outgoing detector 220 and may contain parameters such as "expected packet rate") and/or configuration information from configurator 240. Alternatively, some of the copies may be delayed depending on the "app type" in combination with other factors.

In some further embodiments, the packet copies may be spread evenly over a time period tau. Time period tau may be calculated in a variety of ways, including (by way of non-limiting example) as "expected packet rate" from the "app type", some function of "expected packet rate" and/or some function of the "detected packet rate" and the "expected packet rate". When these multiple copies are sent over the same interface, especially with delays, the chances that at least one copy is delivered may be improved.

In one non-limiting example, in the event the outgoing detector 220 detects and reports that the packet belongs to a game traffic that is known to send 50 packets per second (i.e., normally each packet comes every 20 ms), then the outgoing detector 220 may report "app type" with an "expected packet rate" of 20 ms. In this example, duplicator 250 may use configuration information from configurator 240 to send three copies of each incoming packet to interface 204 and further two copies to interface 204A (not shown). In this non-limiting example, based on the "expected packet rate" of 20 ms, the first copy to interface 204 may be sent immediately; a second copy to the same interface 204 may be delayed by 20/3 ms (or approximately 6.6 ms); and a third copy to the same interface may be delayed by 2*20/3 ms (or approximately 13.3 ms). Two copies of the incoming packet to interface 204A (not shown), may be sent as follows: first copy being sent immediately; and a second copy being delayed by 20/2 ms (or approximately 10 ms). A person skilled in the art would appreciate that the delayed time periods in this example are selected for illustration purpose and are not intended to limit the scope of the disclosure.

In some embodiments, sending some of the copies and/or delays may be relative to the currently processed packet (as described in examples above). In some other embodiments, when "app type" for a latency-critical session includes "expected packet rate", a synchronization technique such as Phase-Locked Loop and/or Delay-Locked Loop may be maintained for a "latency-critical session" and the output of such synchronization technique(s) may be used for synchronization purposes, sending some of the copies and/or delays relatively to the oscillations (which will correspond to "expected packet times") as reported by the synchronization technique such as Phase-Locked Loop and/or Delay-Locked Loop. In employing such a technique, jitter in the outgoing copies being sent may be reduced. Such a Phase-Locked Loop and/or Delay-Locked Loop techniques may be implemented either in hardware or in software or in a combination of both. In some embodiments, "detected packet rate" may be used instead of or in addition to "expected packet rate".

In some embodiments, information on "when the next latency-critical packet is expected" (referred to as "$T_{next}$") may be provided to other components (such as outgoing traffic controller 270). $T_{next}$ may be obtained by using the delay calculated from "expected packet rate" or "detected packet rate" and the last packet received, or based on synchronization techniques such as Phase-Locked Loop or Delay-Locked Loop. In some embodiments, $T_{next}$ may be a minimum of some or all the "next latency-critical expected" estimates for several different latency-critical sessions.

In some embodiments, duplicator 250 may additionally implement some or all of the functionality which is described with respect to duplicator 252. In particular, duplicator 250 may implement "reverse NAT-like translation" and/or "reverse proxy translation". Such implementation may be used for the router-to-router communication as shown in FIG. 4H.

In one embodiment, upon the detection by outgoing detector 220 that the incoming packet belongs to "other traffic", outgoing detector 220 may direct the packet to outgoing traffic controller 270. In some embodiments, outgoing traffic controller 270 may modify packets to perform "NAT-like translation" and/or one or more of traditional NAT translation techniques as described in RFC2663, RFC3022, RFC4787 and/or RFC5382. "NAT-like translation" may be implemented in one or more of the ways described for "NAT-like translation" with respect to duplicator 250.

In some embodiments, outgoing traffic controller 270 may implement one or more of the techniques to reduce the impact of the other traffic on latency-critical traffic under certain conditions. For the purposes of this disclosure, these techniques are collectively named as "suppression" of "other traffic".

It should be noted that "suppression" techniques as described within the present disclosure may be different from "prioritization" techniques which are used in various Active Queue Management techniques (including, but not limited to, RED, CoDel, HTB, CBQ and HFSC). In particular, "prioritization" techniques address determining which packet to push into an interface and, as such, may not allow or address dropping packets if/when the respective target interface is available for transfer. The "suppression" techniques discussed herein, on the other hand, may allow dropping of packets even if the target interface is not in use when the decision to suppress the packet is made. In an another exemplary difference between "suppression" and "prioritization" techniques, "prioritization" techniques may not take into account traffic which goes in the other direction (i.e., packets moving from interface 202 to interface 204 may not be affected by traffic going from interface 204 to interface 202), while "suppression" techniques may take such traffic into account.

According to some embodiments, "suppression" techniques may include "potential issue detection" techniques and "enforcement" techniques. When one or more of "potential issue detection" techniques reports that there may be a reason to "suppress" "other traffic", one or more of the "enforcement" techniques may be invoked.

In some embodiments, "potential issue detection" techniques may include detecting limits on amount of "other traffic" and/or "all the traffic combined". These limits may be set as maximum number of packets per second or as maximum number of bits transferred per second (note that instead of "per second", any other time interval may be used). In some embodiments, these limits may be taken from configuration information received from configurator 240. Alternatively, these limits may be calculated based on information associated with the interfaces. If one of the interfaces 204 is a relatively slow ADSL, it may be undesirable to use more than certain percentage of its traffic, such as 50 percent, while the latency-critical session is in progress. In this example, a threshold such as "50 percent" may be pre-defined for the ADSL or taken from configuration information received from configurator 240. Still alternatively, the limits may be obtained both from configuration information received from configurator 240 and calculated based on interface information and a function (such as a minimal value) calculated based on the these two set of values.

In some embodiments, "potential issue detection technique" may use limits on a per-connection basis. In one example, a limit of "maximum 1 Mbit/s for any TCP connection, for any QUIC session and for any BitTorrent UDP Tracker session" may be used, wherein QUIC refers to Quick UDP Internet Connections (note that any other maximum rate may also be selected, and also the limit may be different for TCP, QUIC and BitTorrent).

In some embodiments "potential issue detection" techniques may include detecting whether there is currently a latency-critical traffic (as reported by outgoing detector 220). In such embodiments, if there is no current latency-critical traffic, all the other "potential issue detection" techniques may be disabled, with no "enforcement" actions taken to suppress other traffic. In some embodiments, information about the nature of "app type" of the latency-critical session currently in progress (as reported by outgoing detector 220) may be used to choose "enforcement action" (or some parameters of "enforcement action") and/or to affect other "potential issue detection techniques". In some embodiments, if the VOIP session is in progress, traffic limits for other potential issue detection techniques may be set higher, and "enforcement" action may be limited to dropping not more than 20 percent of the packets of the "other traffic". If, however, a first-person-shooter game is in progress, traffic limits for other potential issue detection techniques may be set lower and "enforcement" action may be allowed to drop all the packets necessary to achieve required traffic restrictions. Such configuration information may be stored, for example, in storage 217 and controlled by configurator 240. Alternatively, such configuration information may be a part of the logic implemented by core 210.

In some embodiments, the following method may be used as one of "potential issue detection" techniques. Latency-oriented router 120 may request one or more external servers—which may or may not be directly involved in any of the communications going over interface 202—to send packets to latency-oriented router 120 in order to send packets once or at certain intervals. In some embodiments, "ping" ICMP packets may be used for such purpose. In other embodiments, UDP packets with the purpose similar to "ping" may be used. Such packets, upon arrival to interface 204 of the latency-oriented router 120, may be used to calculate information about the packet loss from these servers (for example, servers may number the packets as it is common for 'ping' requests), as one of the indicators of congestion over the incoming channel. In some further embodiments, special servers may be set up for such purpose. In some embodiments, round-trip times of such ping and/or ping-like packets may be used as an additional "potential issue detection" technique.

In some embodiments, "measured round-trip time" between latency-oriented router 120 and any of the proxies (such as latency-oriented proxy 121, intermediate proxy 122 or simple proxy 124), may be used for one or more "potential issue detection" techniques. For ease of reference, one side of the communication may be referred to as side A and another side of the communication may be referred to as side B. In such embodiments, ICMP pings (or UDP ping-like packets, which may be replied back by side B of the communication) may be used to calculate round-trip time. In some other embodiments, existing packet exchanges may be used to calculate round-trip time (which, for ease of reference, may be referred to as "round-trip piggy-backing"). In one example, some or all of the packets sent by side B of the communication may include two additional fields: (a) reference_packet_ID and (b) ΔT_since_reference_packet_ID. The field ΔT_since_reference_packet_ID may have a value representing the amount of time that has passed from when the reference_packet_ID was received by side B to when the current packet was sent by side B to side A, as measured by side A to the communication. The measured round-trip time may be determined as $T_{recv}$-$T_{sent}$-ΔT_since_reference_packet_ID, wherein $T_{sent}$ is the time when the original packet X (with a packet_ID=X) was sent by side A of the communication, $T_{recv}$ is the time when the packet Y (with packet_ID=Y, reference_packet_ID=X and ΔT_since_reference_packet_ID) is received by side A, ΔT_since_reference_packet_ID is obtained from packet Y, and X & Y are generic designators for any packet identifier. Both $T_{sent}$ and $T_{recv}$ may be measured by side A of the communication. Then statistics on such measured round-trip time may be obtained (including, but not limited to, averages over certain period of time, deviations, changes of the measured round-trip time, averages and deviations, and so on).

In some embodiments, measuring "jitter" may be used as one of "potential issue detection" techniques. If latency-oriented router 120 has identified a certain latency-critical session as having interval between the packets at T milliseconds (such interval may be derived from "expected packet rate" associated with "app type" and/or from "detected packet rate"), then it may measure the difference ΔT between expected packet time arrival (which may be calculated as previous-packet-time-of-arrival, plus T or based on Phased Locked Loop/Delay Locked Loop) and then to gather some statistics of ΔT over "measurement interval", which "measurement interval" may be last N packets (or over last TT seconds). In some embodiments, such statistics may be the sum of absolute values of ΔT over the "measurement interval" or the sum of squares of ΔT over the "measurement interval". In some embodiments, instead of calculating ΔT, differences between times of packet arrivals (referred to as "$T_{gap}$") may be measured and variation of $T_{gap}$ over the "measurement interval" may be used as the statistics. Such statistics (which, for ease of reference, may be referred to "measured jitter") may be used as one of the "potential issue detection" techniques. In some embodiments, if "measured jitter" goes above certain threshold, it may be used as a trigger for some of the "enforcement techniques".

In some embodiments, for certain "app types", the packet may contain information which is used to calculate latency to be shown on the game client. In one example, (a) packet A from the user device 110 to server 180, may contain ID of the packet; and (b) packet B from the server 180 to user device 110, may contain ID of the last packet received by the server before packet B was sent. In such cases, latency-oriented router 120 may calculate latency over the path from latency-oriented router 120 to server 180 and back, and such latency may be named as "almost-end-to-end-latency". Such almost-end-to-end latency may be used for one or more of "potential issue detection" techniques.

In some embodiments, a user-device-agent (not shown) running on the user device 110 may extract end-to-end latency for the application, as measured and/or shown by the application client running on the user device 110. Such extraction may be implemented by reading certain location(s) in application client memory and/or by intercepting certain system and/or library calls (for example, by making a "wrapping" dynamic link library (DLL) or .so library to "wrap" a system call which draws a value on the screen) and/or by reading the value from the screen and performing Optical Character Recognition (OCR). Such end-to-end latency may be communicated by the user-device-agent to latency-oriented router 120. Such communication may be implemented by sending special packets and/or by adding information to existing packets and/or by using existing communication devices and protocols, including, but not limited to, TCP, HTTP, etc. In some embodiments, such a communicated end-to-end latency may be used by latency-oriented router 120 for one or more of "potential issue detection" techniques.

In other embodiments, the latency-oriented router 120 may issue packets (for example, pings) itself and may use statistics on ping replies (including, but not limited to, packet loss and round-trip time) to the pings as an indicator of congestion over incoming channel. In such case, round-trip time may be calculated as the time between the moment when latency-oriented router 120 has sent a "ping"-like packet, and when it receives a reply to it.

In some embodiments, the other side of communication may monitor the quality of one or more of the incoming channels using, without limitation, one of "potential issue detection" techniques and send a "connection quality" packet to latency-oriented router 120 or attach such "connection quality" packet as a separate field to any other packet directed to the latency-oriented router 120. Such "connection quality" packet may be sent at regular intervals and/or on significant changes in connection quality observed by the other side of communication. Such "connection quality" packet and/or field may then be analyzed by latency-oriented router 120 and considered as one of the "potential issue detection" techniques. In some embodiments, latency-oriented proxy 121 may issue other packets and/or fields, including, but not limited to "forward connection quality" or "overload", which may be analyzed by latency-oriented router 120 and considered as one of "potential issue detection" techniques.

In some embodiments in which a TCP protocol is used, detection of a "potential issue" may be implemented by the detection of the receipt of duplicate TCP ACKs (which, for usual TCP implementations, may indicate a packet loss). In some embodiments, an ACK may be considered a duplicate if the value of the ACK field in the TCP header of the packet is the same as it was for a previous packet. No other parts of the packet may need to be matched for an ACK to be considered a duplicate. In some embodiments, the detection of the receipt of more than one duplicate ACK (for example, two or three duplicate ACKs) may be required to be considered a "potential issue". In some embodiments, there may be more than one "potential issue" linked to the receipt of duplicate ACKs. For example, the receipt of one duplicate ACK may correspond to a first "potential issue", and the receipt of two duplicate ACKs may correspond to a second "potential issue". In such case, the second potential issue may carry greater "weight" when determining appropriate enforcement techniques.

In some embodiments, latency-oriented router 120 may add a special "tag" field to some or all of the packets. At the other side of the communication, such "tag" may be used to report "connection quality". In some of these embodiments, the latency-oriented router 120 may send a special "tag stats request" packet (or a field) requesting statistics for a specified "tag", and the other side of the communication may reply to such request with a "tag stats reply" packet and/or field. Such "tag stats reply" packet or field may include statistics about packet loss and/or "relative latencies" for the packets with such "tag" coming over current latency-critical session.

In some embodiments, these "tag" fields may be used to allow the latency-oriented router 120 to perform experiments, calculate the resulting packet loss and/or latencies and make decisions based on the results of such calculation. In one embodiment, latency-oriented router 120 may try different sizes of X-Fragments, tagging different sizes with different tags and requesting statistics for different "tags" from the other side of the communication. In one embodiment, based on such per-tag statistics, the latency-oriented router 120 may be able to select a size of X-Fragments which is optimal at the moment. In one example, the latency-oriented router 120 may choose the size which causes the least packet loss. Alternatively, the latency-oriented router 120 may choose the size which causes the smallest latency. Still alternatively, latency-oriented router 120 may choose the size that minimizes a result of a weight function using packet loss, latencies and/or overhead due to fragmenting as the weight function parameters. Still alternatively, any combinations of these techniques are also possible. In one embodiment, latency-oriented router 120 may try different numbers of copies sent over each interface (or any other choice which may affect the connectivity, including, but not limited to, trying different values for $T_{reserve}$) in a similar manner, including, but not limited to, by trying different values, "tagging" them with different "tags", requesting statistics and making a choice based on the statistics received.

In some embodiments, additional "potential issue detection" techniques may be implemented by other components by deduplicator 260.

In some embodiments, experiments to determine optimal latency optimization options may be performed by the latency-oriented router 120 without using "tags". In one example, latency-oriented router 120 may experiment with rate limits on DSCP modifications, such as, without limitation, DSCP modifications described with respect to duplicator 250. In such embodiments, latency-oriented router 120 may try to gather statistics on different DSCP rates (observed with or without DSCP limits being enforced) during extended periods of time (such as minutes or hours) and on quality of traffic (such as measured round-trip times and/or packet loss) observed with these DSCP rates. Then, these statistics may be used to enforce DSCP rate limits to ensure optimal quality of traffic. In one non-limiting example, if statistics indicate that DSCP rates over 1 Mbit/s tend to cause sharp drop in deliverability and/or latency of the DSCP-labeled packets, latency-oriented router 120 may decide to start imposing a DSCP rate limit of 1 Mbit/s (or a somewhat smaller number, such as 500 kBit/s).

In some embodiments, the "potential issue detection" techniques listed above may be combined using rule-based logic. Potential issue detection technique C may be defined as "true" if potential issue detection technique A reports value >=X and potential issue detection technique B reports value "true". In another example, "potential issue detection" techniques may be combined by weighting their respective outputs with some pre-defined or configured-and-stored-in-storage weights which may be stored in storage 217.

In some embodiments, any or all of the "potential issue detection" techniques described above, maybe used separately for different interfaces 130 and/or over any combination of interfaces 130. Such information, in turn, may be used to take "enforcement" actions over specific interfaces 130 and/or over combinations of interfaces 130.

In some embodiments, when one or more of "potential issue detection" techniques indicate that their respective conditions are met, an "enforcement" action may be taken. The "enforcement" action may be taken by outgoing traffic detector 270 or incoming traffic detector 271. In some embodiments, when a "potential issue detection" technique detects a certain condition (such as "traffic limit is exceeded"), the outgoing traffic controller 270 may start using an "enforcement" action. The "enforcement" action may include dropping some of the packets that belong to "other traffic".

In some embodiments, dropping packets may lead to the sending side of "other traffic" connection (such as sending side of TCP connection) reducing the rate of sending, which potentially reduces congestion on the routers and connections along the way (in particular, reducing congestion over the "last mile", which in turn may improve user experience with regards to "latency-critical traffic").

In some embodiments, the percentage of packets that are dropped may be predetermined. In other embodiments, the percentage of packets that are dropped may be increased gradually while the corresponding "potential issue" continues to be detected.

In some embodiments, the packets that would cause a certain limit to be exceeded may be dropped. For ease of reference, such technique may be referred to as "limit-based enforcement action". The limit may be the same as, or different from, the limit(s) used for "potential issue detection" techniques.

In some embodiments, the packet may include a maximum_percentage_of_the_packets_to_be_dropped field, which represent the maximum percentage of packets that may be dropped when implementing the "limit-based enforcement action". In other words, when available, the maximum_percentage_of_the_packets_to_be_dropped field would cause the limit-based enforcement action to drop only those packets that exceed a certain limit and do not exceed the value of the maximum_percentage_of_the_packets_to_be_dropped field. Such field may have any appropriate value, such as, without limitation, 5 percent, 10 percent or 20 percent. The value of the maximum_percentage_of_the_packets_to_be_dropped field be provided by configurator 240. In some embodiments, the maximum_percentage_of_the_packets_to_be_dropped value may be calculated and/or taken into account on a per connection basis (such as per TCP connection, per QUIC connection and/or per BitTorrent UDP Tracker connection). In other embodiments, the maximum_percentage_of_the_packets_to_be_dropped value may be calculated and/or taken into account on a per interface basis, per latency oriented router basis and/or on a per user-device basis.

In some embodiments, an "enforcement action" may include delaying of some or all of the packets belonging to "other traffic". This in turn may lead to the sending side of "other traffic" connection (such as sending side of TCP connection) reducing the rate of sending, which potentially reduces congestion on the routers and connections along the way (in particular, reducing congestion over the "last mile", which in turn may improve user experience with regards to "latency-critical traffic"). In some embodiments, the amount of time that packets are delayed may be may predetermined. In other embodiments, the amount of time that packets are delayed may be increased gradually while the corresponding "potential issue" continues to be detected.

In some embodiments, all the packets belonging to "other traffic" may be dropped by outgoing traffic detector 270 and/or incoming traffic detector 271 when one or more of "potential issue detection" techniques indicate that their respective conditions are met. In some further embodiments, outgoing traffic detector 270 and/or incoming traffic detector 271 may issue a "terminate session" packet back to sender in response to some or all of the incoming packets. For a TCP connection, the "terminate session" packet may be a TCP RST packet.

In other embodiments, the outgoing traffic controller 270 may use a different "enforcement" action, such as attaching ECNs to the packets it sends. This may be done according to RFC3168 by setting a CE indication within the packet. In some embodiments, the outgoing traffic controller 270 as described in the present disclosure may differ from classical AQM techniques (such as RED, CoDel, HTB, CBQ, HFSC, etc.) in that the latency-oriented router according to the present disclosure may trigger packet drop or ECN not only because one of the queues of the router is full (which may rarely be the case for incoming traffic), but also because of other considerations, such as the presence (and/or low perceived quality) of the latency-critical traffic. In some embodiments, when "potential issue detection" technique ceases to indicate the condition, outgoing traffic controller 270 may stop using respective "enforcement" action.

In some embodiments, there is one or more outgoing queue(s) between outgoing traffic controller 270, which may mean that the packet, after being processed by outgoing traffic controller 270, may be delayed for a certain time before reaching the interface 204. In such embodiments, transfer of the packet itself over the interface 204 may also be non-instantaneous. For example, transferring a 1500-byte packet over 1 Mbit/s connection may take 12 milliseconds, and 12 milliseconds may qualify as a significant delay for latency-critical applications. In some embodiments, to account for both these potential delays, the outgoing traffic controller 270 may implement an "enforcement" technique which, for ease of reference, may be referred to as "allocating time slots".

In some embodiments, the "allocating time slots" technique may use information about when the next latency-critical packet is expected (which may be provided by outgoing detector 220 and/or duplicator 250). When information is available that the next latency-critical packet is expected around time $T_{next}$, outgoing traffic connector 270 may stop sending "other traffic" packets to an interface 204 at time $T_{cutoff}=T_{next}-T_{reserve}$, where $T_{reserve}$ may be some predefined time for the interface 204. Such stop sending of the "other traffic" packets mechanism may be implemented as stopping processing of all the "other traffic" packets by outgoing traffic controller 270, as dropping the packets intended for the interface 204, or as postponing packets intended for the interface 204 by putting them in a separate queue until the latency-critical packet comes through. In some embodiments, $T_{reserve}$ may depend on the size of the packet (for example, requiring more reserve for larger packets). In such cases, $T_{reserve}$ may be determined as the function $T_{reserve}$ (packet_size_in_bits)=C+packet_size_in_bits*interface_bitrate, where C is a constant time, packet_size_in_bits is the size of the packet in bits (which may be calculated as size of the packet in octets multiplied by 8), and interface_bitrate is the interface bandwidth (measured in bits/second).

In some embodiments, "stop sending" may include forced fragmentation (for example, traditional IP-level fragmentation, as described in RFC791 and/or X-Fragmentation). The packet may be fragmented when the whole packet cannot be transmitted in $T_{reserve}$ (packet_size_in_bits), but some meaningful part of the packet may be. The rest of such force-fragmented packet may be transmitted as an additional IP fragment (and/or X-Fragment) after the sending of the packets is resumed. In some embodiments, if a packet that is about to be fragmented has a "Don't Fragment" flag and is above a certain threshold in size (e.g., 576 bytes), the "allocating time slots" enforcement technique may decide to drop the packet and issue an ICMP "Destination Unreachable/Datagram too big" packet back to packet originator. If the packet has a "Don't Fragment" flag set but there is no size threshold set, then "allocating time slots" enforcement technique may decide to postpone the packet until packet sending is resumed.

In some embodiments, sending of the packets may be resumed after the expected latency-critical packet is processed, when the estimate of the $T_{next}$ changes and/or after a predefined timeout. Timeout t may be related to "detected packet rate" Rd and/or "expected packet rate" Re, as t=1/Rd*alpha or t=1/Re*alpha, with alpha taking values from 0 to 1. In some embodiments, $T_{reserve}$ may be chosen taking into account typical or maximum delays in queues and/or typical or maximum delays with regards to sending packets over certain interface 204. In some embodiments, $T_{reserve}$ may have different values for different interfaces 204.

In some embodiments, "enforcement" actions may be applied on a per-connection basis (such as per-TCP-connection, per-QUIC-connection or per-BitTorrent UDP Tracker connection). If the outgoing traffic controller 270 detects that most of the outgoing traffic goes over a few TCP connections (these traffic intensive connections may, for ease of reference, be referred to as "traffic hogs"), then outgoing traffic controller 270 may drop only some or all packets from these "traffic hog" connections and leave other connections from the "other traffic" category free of "enforcement" actions for longer. In other embodiments, outgoing traffic controller 270 may refrain from dropping too many packets in a row from the same connection and try to spread packet drops more evenly across various "other traffic". In some embodiments, "enforcement actions" may be applied in a manner similar to what is described above, on per-traffic-type basis (for example, separating all the traffic into groups such as "HTTP traffic", "QUIC traffic", "BitTorrent traffic", "Whatsapp traffic", and so on).

In some embodiments, outgoing traffic controller 270 may use different "potential issue detection" techniques to cause different "enforcement" actions. In one example, there may be two different "potential issue detection" techniques using different sets of rules. In some embodiments, a potential issue detection technique with lower set of limits may be associated with an "enforcement" action of dropping packets and another potential issue detection technique with a higher set of limits, may be associated with a different "enforcement" action, which issues ECNs. In some embodiments, the outgoing traffic controller 270 may differentiate the severity of traffic-suppressing "enforcement" actions depending on the detected issues in latency-critical traffic. In one example, latency-oriented router 120 may have two "potential issue detection" techniques with different sets of thresholds, with one "potential issue detection" technique associated with an "enforcement" action resulting in up to 20 percent packet drop in "other traffic" when the end-to-end latency grows over a first threshold and the other "potential issue detection" technique associated with an "enforcement" action causing an immediate stop to all the "other traffic" when the end-to-end latency grows over a second threshold.

In some embodiments, after the outgoing traffic controller 270 is done with processing the "other traffic" packet, it may send the (potentially modified) packet to one of interfaces 204. In some embodiments, outgoing traffic controller 270 may select the interface 204 to which to send the "other traffic" packet based on one or more criteria, including, but not limited to: (a) where traffic within the same "other traffic" session was sent (such as "TCP connection); (b) load statistics on interfaces 204 (in some embodiments it may be "recent" statistics, such as statistics over last NN seconds); and/or (c) any "potential issues" detected for any interfaces 204.

In some embodiments, when sending one or more copies of the packet to one or more of interfaces 204, the outgoing traffic controller 270 may modify all or some of the copies of the packets by modifying the Differential Services Field within the IP header (such as Ipv4 header or Ipv6 header) and, in particular, the DSCP portion of the field as defined in RFC2474. In some embodiments, the DSCP field may be modified to indicate that DSCP is equal to "DF" (also known as "CS0" with a binary value of 000000) or "CS1" (binary value 001000), as defined in RFC4594 and/or RFC5865. Such DSCP modification may be applied as an "enforcement" action, or in another example, it may be applied regardless of any "enforcement" actions to all the packets belonging to "other traffic".

In some embodiments, when sending one or more copies of the packet to one or more of interfaces 204, the outgoing traffic controller 270 may use EDCA and/or HCCA, using access class of AC_BK or AC_BE for the packets belonging to "other traffic". This technique may be of particular interest in embodiments such as those shown in FIG. 4E and/or FIG. 4F.

According to some embodiments, some packets may be received at interface 204, pass through incoming detector 230, deduplicator 260 or incoming traffic controller 271 and arrive at interface 202. In some embodiments, a packet from interface 204 may come to incoming detector 230, which detects whether the packet belongs to "latency-critical traffic" or to "other traffic". Such detection may be done using methods similar to the methods described for outgoing detector 220. In some embodiments, incoming detector 230 may perform traditional IP-level defragmentation.

In some embodiments, incoming detector 230 may use information about current "latency-critical sessions", to detect whether the packet belongs to "latency-critical traffic" or to "other traffic". In one example, the information about current "latency-critical sessions" may be maintained by outgoing detector 220. In another example, such information may be used to facilitate detection of incoming latency-critical traffic. In one embodiment, if there is an incoming packet with (source_IP, source_port), and there is a matching latency-critical session indicating that the communication peer has exactly the same (source_IP, source_port) parameters (which may be indicated by latency-critical session having sessions' target_IP=packet's source_IP and session's target_port=packet's source_port), the packet may be classified as latency-critical and/or belonging to that session without any additional analysis. In some embodiments, such information about the matching latency-critical session may be combined with other analysis methods described herein.

In some embodiments, information about latency-critical sessions from outgoing detector 220 may be combined with IP translation information from duplicator 250 to identify the latency-critical session to which the packet belongs. If within outgoing detector 220 there is a latency-critical session Z having (target_IP, target_port)=(X0,Y0), and duplicator 250 reports that (target_IP, target_port) of (X0, Y0) is modified to (X1, Y1) as a part of proxy translation described above, then incoming detector 230 may associate incoming packets having (source_IP, source_port)=(X1,Y1) with latency-critical session Z. Such logic may rely on the latency-oriented proxy 121 using the same value for (target_IP, target_port) for the packets it sends as the value for the (source_IP, source_port) in the packets it receives. Such technique is a part of the TCP standard and is a common practice for UDP as well. In another example, if the packet has session_ID field added by duplicator 250 of latency-oriented proxy 121, then such field may be used to match the incoming packet with the latency-critical session and/or to detect the packet as latency-critical traffic. In some embodiments, before passing such a packet to deduplicator 260, certain checks may be performed to ensure that the data in the packet (such as source_IP/source_port) does match the session-which-corresponds-to-session_ID. In some embodiments, these checks (which, for ease of reference, may be referred to as "packet-session validity checks") may be performed in the manner similar to the session detection techniques described above, but may be significantly faster because only one session (the one identified by session_ID) may need to be analyzed.

In some embodiments, all the traffic coming over a certain port may be considered as latency-critical traffic. In such embodiments, if all the traffic from all the proxies goes over such port and only over such port, and there is no non-proxied traffic, all the traffic coming over the certain port may be considered as the latency-critical traffic.

In some embodiments, incoming detector 230 may provide information about incoming latency-critical packets to other parts of the system, such as to outgoing detector 220. Such information may be used to facilitate detection of the latency-critical sessions and/or presence of latency-critical traffic as described above. Incoming detector 230 may direct latency-critical packets to deduplicator 260 and/or direct "other traffic" packets to incoming traffic controller 271.

In one embodiment, deduplicator 260 may implement one or more of the following functions: (a) packet deduplication; (b) X-Defragmentation; (c) one or more "potential issue detection" techniques; and/or (d) packet modification, including address/port translation and/or removal of certain fields added by the other side of the communication.

In some embodiments, deduplicator 260 may decompress the packet (and/or a part of the packet, including, but not limited to, packet body) using a decompression algorithm that is a counterpart to the compression algorithm used to compress the packet (as described with respect to duplicator 250).

In some embodiments, deduplicator 260 may deduplicate incoming packets by using the packet_ID identifier, which may be either added by duplicator 250 on the other side of communication or may already be present in packets as an existing_packet_ID field described with respect to duplicator 250. In some embodiments, deduplicator 260 may store (for example, in internal RAM) a last_packet_ID of the packets received via a particular "latency-critical session" (which may be reported by incoming detector 230). When a packet, associated with a particular latency-critical session Z arrives to deduplicator 260 and has a packet_ID that is greater than last_packet_ID-for-the-session-Z, deduplicator 260 may let it through and modify the last_packet_ID parameter for the session Z. When a packet associated with session Z arrives and has a packet_ID that is smaller or equal to last_packet_ID for session Z, deduplicator 260 may drop such packet.

In some embodiments, deduplicator 260 may also store information about additional packets that have numbers below last_packet_ID but that have not been received yet. Such embodiments may allow for out-of-order packet delivery while still ensuring that duplicates may be filtered out. Such information may be stored as a bit mask of a relatively small size (such as a few bytes) alongside the last_packet_ID parameter described above. In one non-limiting example, deduplicator 260 may, in addition to last_packet_ID, store a bit mask with a meaning of "which packets earlier than last_packet_ID have not been received yet". If last_packet_ID=12345, and the bitmask has bits 00111000, it may mean that while last_packet_ID is 12345, there are still packets with numbers 12342, 12341 and 12340 (corresponding to '1's in the bit mask) that have not been received yet. In such embodiments, if a packet with a "not-received yet" packet_ID arrives, deduplicator 260 may let it through and reset the appropriate bit within the bit mask. If a "very old" packet arrives (with a packet_ID which cannot be represented by the bit mask), the packet may be dropped. In some embodiments, instead of (or in addition to) a bit mask, a list of packet IDs that have not yet been received (implemented as a list, array, etc.) may be used. In some embodiments, "very old" packet IDs may be removed from the list, where "very old" packet IDs is defined as those packet IDs that are less than last_packet_ID—a_threshold, (where a_threshold may have a value in the range from 1 to 100). In other embodiments, if new packet ID doesn't fit into the list/array because of size limitations, the oldest packet ID may be removed from the list/array.

In some embodiments, deduplication may be implemented by storing recently arrived packets, comparing such packets to other packets and removing duplicates. In such embodiments, a packet_ID field may be unnecessary, and deduplicator 260 may store packets for some time after receiving them. Any newly arrived packet (or such packet's payload) may be compared with the stored packets to determine whether such new packet (or its payload) is the same as any of the packets previously stored by deduplicator 260. If a newly arrived packet is a match with any of the stored packets, such arriving packet may be discarded as a duplicate. If there is no such match, deduplicator 260 may let the newly arrived packet through and/or may store it. In some embodiments, instead of storing whole packets, checksums and/or hashes (including, but not limited to, any CRC checksum, any Fletcher checksum and/or any crypto hash such as SHA-256, SHA-3 or BLAKE) of a whole packet or any part thereof may be stored. In such case, upon the arrival of a new packet, the packet's checksum and/or hash may be calculated, and then compared with the checksums and/or hashes of the stored packets to determine whether such new packet is the same as any of the packets previously stored by deduplicator 260. In some embodiments, stored and/or compared checksums and/or hashes may be accompanied by packet size.

In some embodiments, deduplicator 260 may perform X-Defragmentation. X-Defragmentation may be a process of defragmenting packets fragmented by X-Fragmentation on the sending side. In some embodiments, X-Defragmentation may be performed as follows. When an X-Fragmented packet arrives, deduplicator 260 may check if there is enough information to produce the whole defragmented packet (i.e., that all the fragments of the defragmented packet have already arrived). In some embodiments, "whether there is enough information" may be derived from (fragment_number, total_number_of_fragments) fields which may be contained in each of the X-Fragments. If there is not enough information, fragments (other than duplicates) may be saved (for example, in internal RAM) for future use. Alternatively, if there is enough information, deduplicator 260 may produce a defragmented packet and send it to the interface 204, which may also remove all the stored fragments forming such packet to save space. In some embodiments, deduplicator 260 may remove fragments from the packets which are "too old" to have any chance to arrive and to be reassembled. For example, "too old" may be interpreted as "having any fragment which is older than all the bits in the current bit mask".

In some embodiments, deduplicator 260 may implement some of the "potential issue detection" techniques as described above to facilitate "enforcement" actions by traffic controllers 270 and/or 271. In some embodiments, "potential issue detection" techniques may include measuring and/or estimating current quality of the latency-critical traffic. If a sequentially-increasing packet_ID is added to packets by duplicator 250 or is contained within packets and may be obtained out of them, such "potential issue detection" techniques may use such sequentially-increasing packet_ID within deduplicator 260 to calculate a number of packets lost in transit between latency-oriented proxy 121 and latency-oriented router 120. In some embodiments, deduplicator 260 may use a significant increase in number of lost packets (which may be formalized as "rate of growth of the (potentially averaged over certain time) packet loss rate") as a "potential issue detection" technique.

In some embodiments, if the packet rate of a specific game is well-known (and provided as "expected packet rate" associated with the "app type" which may be detected by incoming detector 230), the packet loss rate may be calculated by comparing the rate of received packets with the expected packet rate.

In some embodiments, some of the "potential issue detection" techniques" by deduplicator 260 may be implemented as follows. In such embodiments, packets may be modified by the sender (such as duplicator 250) to add the sender's timestamp. In such embodiments, on the receiving side, these timestamps may be used, to calculate "perceived one-way latency" $d_r$, which is the difference between the sender's timestamp within the packet and receiver's current time at the moment of receiving the packet. Due to potential desynchronization between sender's and receiver's clocks, "perceived one-way latency" $d_r$ may not necessarily be an indication of real-world delay. However, changes in $d_r$ may still reflect changes in real-world delays. Statistics developed based on observation of $d_r$ may be used to establish a "usual delay" for each interface 204 by averaging $d_r$ over significant time, such as 1-100 seconds. In some embodiments, if $d_r$ suddenly starts to exceed such "usual delay", it may indicate congestion over the corresponding interface 204. In some embodiments, some or all of the "potential issue detection" techniques which use "perceived one-way latency", may be used within latency-oriented router 120.

In some embodiments, techniques based on measured round-trip times may be combined with techniques based on "perceived one-way latency". In one example, latency-oriented router 120 may calculate "measured round-trip time" for communication with latency-oriented proxy 121 and may also calculate "perceived one-way latency" for the packets from the same latency-oriented proxy 121. In such embodiments, if latency-oriented router 120 observes an increase in the "measured round-trip time", and there is a similar increase in "perceived one-way latency", it may indicate congestion in the incoming channel of the latency-oriented router 120. In some embodiments, in response to such scenarios, latency-oriented router 120 may take "enforcement actions" which aim to reduce traffic over incoming channel (such as "suppression" techniques related to dropping packets and/or issuing ECNs for incoming TCP connections). In other embodiments, if latency-oriented router 120 observes an increase in the "measured round-trip time", without significant increase in "perceived one-way latency" of the packets from latency-oriented proxy 121, it may indicate congestion over the outgoing channel of the latency-oriented router 120. In some embodiments, in response to such scenarios, latency-oriented router 120 may take "enforcement actions" which aim to reduce traffic over outgoing channel (such as "suppression" techniques related to dropping packets and/or issuing ECNs for outgoing TCP connections).

In another alternative implementation of the "potential issue detection" techniques, information about current end-to-end latency may be present within the packets as they're sent from server 180 (such packets are common in games to enable reporting of current latency within the game client). In such cases and/or for such "app types", end-to-end latency may be parsed from the packets and may be used as one of the "potential issue detection" techniques (for example, after exceeding certain pre-defined or pre-configured threshold).

In some embodiments, deduplicator 260 may use some of the "potential issue detection" techniques to form a "connection quality" packet and send it to the other side of communication (such as device containing duplicator 250) If one of the "potential issue detection" techniques starts to detect that packet loss rate exceeds a predefined or predetermined threshold (which may be system-wide or may depend on "app type"), then the "connection quality" packet may be sent to the other side of communication to notify it about the problems. In some embodiments, the "connection quality" packet may be sent even if there is no incoming packet (for example, on a timeout).

In some embodiments, deduplicator 260 may also recognize "tag" fields within the packets and may gather statistics (such as packet loss and/or "relative latencies") on a per-tag basis. In other embodiments, deduplicator 260 may additionally reply to "tag stats request" requests, sending back a "request tag reply", based on the per-tag statistics. "Relative latencies" may be implemented as averages of "perceived one-way latency" di value discussed above, for a specific tag. Subsequently, the other side of the communication may compare these "relative latencies" for two different tags and use it for latency comparison purposes.

In some embodiments, deduplicator 260 may modify incoming packets to modify the target address and/or port, which may be referred to as "reverse NAT-like translation". Such "reverse NAT-like translation" may serve as a counterpart to "NAT-like translation", and the deduplicator 260 may need to perform "reverse" translation of (target_IP, target_port) so that the packet may reach the user device 110. This may be done by replacing packet's (target_IP, target_port) with (source_IP, source_port) from "NAT-like translation data" associated with current latency-critical session (as described with regards to duplicator 250) or by using any of the NAT techniques described in RFC2663, RFC3022, RFC4787 and/or RFC5382.

In some embodiments, deduplicator 260 may modify incoming packets to modify the source address and/or port which, for ease of reference, may be referred to as "reverse proxy translation". Reverse proxy translation may be performed by finding a record within "proxy translation data" (described with respect to duplicator 250) that matches certain information from the incoming packet (such as source_IP/port fields from the packet and/or session_ID of the associated latency-critical session). In some embodiments, when performing such matching, the source_IP/port from the packet may need to be matched to the target_IP/port within "proxy translation data". After matching is performed, the target_IP/port fields may be extracted from the matching record within the "proxy translation data" and written to the source_IP/port fields of the packet.

In some embodiments, "reverse proxy translation" may be performed instead of, or in addition to, "reverse NAT-like translation" described above.

In some embodiments, deduplicator 260 may modify the packet to remove certain fields added by the other side of communication (usually by duplicator 250 residing on the other side of the communication). These fields to be removed may include packet_ID and/or session_ID (in the case for deduplicator 262, the proxy_target field may also be removed).

In some embodiments, the "reverse NAT-like translation" on the incoming traffic may be performed by the incoming traffic controller 271.

In some embodiments, deduplicator 260 and/or incoming detector 230 may provide information about the time when the next latency-critical packet is expected ($T_{next}$). Such functionality may be implemented using techniques similar to those described for implementing $T_{next}$ with respect to duplicator 250 and/or outgoing detector 220.

In some embodiments, deduplicator 260 may additionally implement some or all of the functionality which is described with respect to deduplicator 262. In particular, it may implement "NAT-like translation" and/or "reverse proxy translation". Such implementation may be used for the router-to-router communication as shown in FIG. 4I.

In some embodiments, incoming traffic controller 271 may implement the "suppression" of "other traffic" techniques as described with respect to outgoing traffic controller 270, which may include either "potential issue detection" techniques or "enforcement" techniques or both.

In some embodiments, the same "potential issue detection" techniques may cause different "enforcement" actions within outgoing traffic controller 270 and incoming traffic controller 271. In one non-limiting example, an increased packet loss over incoming channel (as detected by deduplicator 260) may be taken into account only by incoming traffic controller 271, and increased packet loss over the outgoing channel (as detected by the other side of the communication and reported back to deduplicator 260) may lead to more severe "enforcement" action by outgoing traffic controller 270, and to a less severe "enforcement" action by incoming traffic controller 271.

In some embodiments, for the purposes of implementing "allocating time slots" enforcement technique, the incoming traffic controller 271 may use information about the time when the next latency-critical packet is expected ($T_{next}$) provided by the incoming detector 230 and/or deduplicator 260.

In some embodiments, latency-oriented router 120 may use some or all of the "potential issue detection" techniques to make a decision that either a latency-oriented proxy currently in use and/or the Internet route from latency-oriented router to the proxy and/or the Internet route from the proxy to the server, is experiencing problems and/or delays. If the packet loss from or to the latency-oriented proxy (the latter may be reported as a "connection quality" packet or as a "tag stats reply") grows higher than a certain threshold, or the connection from the proxy to the server becomes problematic (which may be reported as a "forward connection quality" packet), or if the proxy becomes overloaded (which may be reported, for example, as "overload" packet), latency-oriented router 120 may decide to switch to a different proxy, or to connect directly to server 180 without any proxying. If server 180 does not support changing IP on the fly without making a reconnect to a different server such as matchmaking server, the game/VoIP app may need to be disconnected first with a new connection reestablished. This may be implemented by asking the player to reconnect manually or by sending an RST packet to the TCP connection that the game app may have to send to the matchmaking server or by sending a message to a special application installed and running on user device 110 that may simulate the disconnect of the physical interface with a subsequent reconnect.

In some embodiments, the latency-oriented router 120 may try to know in advance a "reserve" proxy to use. This may be done even when there are no reported "potential issues" with the current proxy, aiming to reduce switch time when such a "potential issue" is reported. In such embodiments, the latency-oriented router 120 may use one of the techniques for picking a proxy as described with respect to duplicator 250 on an ongoing basis to determine such a "reserve" proxy. If a decision to switch from the current proxy is made, such a "reserve" proxy may be used as a target for the proxy switch.

Figure 5B:
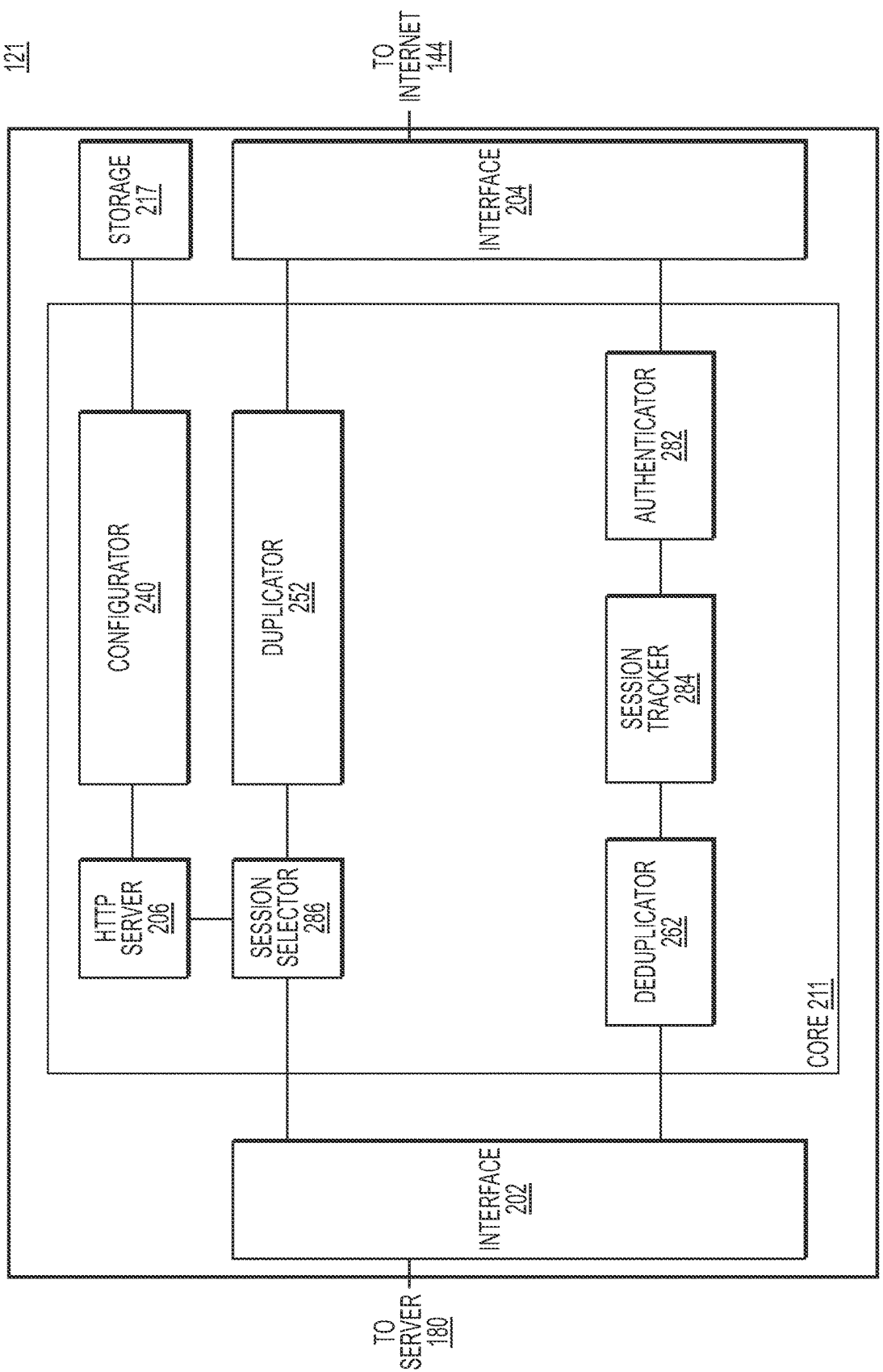
FIG. 5B is a block diagram illustrating an exemplary implementation of a latency-oriented proxy, according to an embodiment of the present disclosure

FIG. 5B is a block diagram illustrating an exemplary implementation of latency-oriented proxy 121, according to an embodiment of the present disclosure. As illustrated in FIG. 5B, the latency-oriented proxy 121 may include interface 202, core 211, interface 204 and optionally storage 217. According to an embodiment, core 211 may further include configurator 240, session selector 286, duplicator 252, authenticator 282, session tracker 284 and deduplicator 262. Optionally, core 211 may also include HTTP server 206.

In some embodiments, the same techniques as described for latency-oriented router 120 (including, but not limited to, implementing as a standalone device and/or a separate computer running appropriate software), may be used to implement latency-oriented proxy 121. Alternatively, latency-oriented proxy 121 may be implemented as one or more software modules running on the server 180. In such case, interface 204 of latency-oriented proxy 121 may be implemented as one of Inter-Process Communications (IPC) and/or network communication methods including, but not limited to, sockets (including both TCP/UDP socket and Unix sockets), shared memory, message queues, pipes (both anonymous and named ones), memory-mapped files or any other existing or future developed communication systems and/or protocols with similar functionalities.

In some embodiments, incoming packets originating from the Internet 144 may come via one or more of the interfaces 204. They may optionally be authenticated in authenticator 282 and then sent to the session tracker 284.

In one embodiment, authenticator 282 may perform authentication of the packets from the interface 204. Authenticator 282 may perform "null authentication", considering all the packets valid. In other embodiments, incoming packets may include (client_ID, auth_token) tuple, and authenticator 282 may contain a database of valid (client_ID, auth_token) tuples, validating incoming packets against such database. In one example, the database may be stored in-memory as a hash table. In other embodiments, incoming packets may be authenticated with a MAC algorithm (or encrypted-and-signed-with AEAD) and include (client_ID, MAC) tuple, and authenticator 282 may contain a database of (client_ID, secret_client_key) tuples, validating the MAC of incoming packets using the key from such database. In one example, the database may be stored in-memory as a hash table. In other embodiments, incoming packets may be signed with a private key PR and include (client_ID, signature) tuple, and authenticator 282 may contain a database of (client_ID, public_key_corresponding_to_PR) tuples, validating the signature under incoming packets using the key from such database. Likewise, the database may be stored in-memory as a hash table.

In some embodiments, authenticator 282 may perform decryption of the packet (and/or a part of the packet, including, but not limited to, the packet body), using the secret key and/or the public key of the sender. In some embodiments, a decryption algorithm which is a counterpart to the encryption algorithm which was used to encrypt the packet (as described with respect to duplicator 250), may be used for decryption.

In some embodiments, when session_ID is used, the sender may skip sending the client_ID once it receives an acknowledgement that the other side of the communication has the client ID for the current session_ID. This may be implemented in a manner similar to the manner in which the proxy_target_IP and proxy_target_port may be skipped after acknowledgement. In some embodiments, the same acknowledgement may be used for all of the proxy_target_IP, proxy_target_port and client_ID fields. Even if client_ID is skipped, MAC and signature fields may still be transmitted. In such embodiments, after receiving the packet with the client_ID, authenticator 282 may store the client_ID as an associated data for the latency-critical session in which the packet belongs and start acknowledging the receipt of such field for the session (for example, as a special field added to all or some of the packets sent to the other side of communication). Such acknowledgement may be stopped upon receipt of the first packet from such session without a client_ID field.

Session tracker 284 may perform some (or all) of the functions performed by outgoing detector 220. In particular, Session tracker 284 may provide detection and/or creation/destruction and/or reporting of "latency-critical sessions" to which the packet belongs.

In some embodiments, detection of the "latency-critical session" to which the packet belongs in session tracker 284 may be implemented either in one of the ways described for such detection with respect to outgoing detector 220 or using session_ID (if it is available in the packet). In the latter case, in some embodiments, before passing such a packet to deduplicator 262, certain checks may be performed to ensure that the data in the packet (such as source_IP/source_port) matches the session-which-corresponds-to-session_ID. These checks may be performed in a manner similar to the "packet-session validity checks" described with respect to incoming detector 230.

In some embodiments, after processing by session tracker 284, packets may be sent to deduplicator 262. Deduplicator 262 may be implemented in a manner similar to deduplicator 260 discussed with respect to latency-oriented router 120 with some differences. As one difference, instead of "reverse NAT-like translation", deduplicator 262 may implement "NAT-like translation" as described with respect to duplicator 250. This may include storing "NAT-like translation data", which may be associated with the corresponding "latency-critical session", to facilitate "reverse NAT-like translation" within duplicator 252. In some embodiments when there are two different interfaces used on the other side of the communication, "NAT-like translation data" for deduplicator 262 may include more than one (source_IP, source_port) pair associated with the latency-critical session. In some embodiments, these (source_IP, source_port) pair(s) may be used to create "virtual interface(s)" which may be associated with the latency-critical session.

In some embodiments, instead of or in addition to "NAT-like translation", deduplicator 262 may perform "NAT-like translation 2". To perform "NAT-like translation 2", deduplicator 262 may take the "VPORT" field from the packet and use its value to populate the "Source Port" field of the packet. In addition, as a part of "NAT-like translation 2", deduplicator 262 may remove the "VPORT" field from the packet. Such technique may be of interest for use in environments such as those depicted in FIG. 4I.

As another difference between deduplicator 262 and deduplicator 260, instead of "reverse proxy translation", deduplicator 262 may implement "proxy translation 2". In some embodiments, "proxy translation 2" may be implemented as (1) parsing a packet to extract the proxy_target_IP and/or the proxy_target_port field and the body of the original packet (e.g., the one that was wrapped by duplicator 250); (2) replacing the target IP address of the original packet with the value of the proxy_target_IP field and/or replacing the target_port of the packet with the value of the proxy_target_port field; (3) optionally, storing the proxy_target_IP as an associated data for the latency-critical session to which the packet belongs and/or start acknowledging the receipt of these fields for the session. Such acknowledgement may be stopped when the first packet from such session that does not include the proxy_target_IP/proxy_target_port fields.

In some embodiments, deduplicator 262 may recognize "preferred route requests" and may reply to such requests. In some embodiments, the reply may be based on a predefined table of "preferred routes" for some of the ASN. In such embodiments, deduplicator 262 may first find the ASN (for example, based on the "source IP" field of the packet, via lookup in a netmask-to-ASN table) and then look up the ASN-to-preferred-routes table to find a "preferred route" to be returned as a reply to the "preferred route request".

Packets from the server 180 may reach one of interfaces 202 and may be passed to session selector 286. In some embodiment, session selector 286 may perform some (or all) of the functions performed by incoming detector 230. In particular, session selector 286 may identify the latency-critical session to which the packet belongs. Session selector 286 may perform such identification in a manner similar to that described with respect to incoming detector 230.

In some embodiments, after processing by session selector 286, the packets may be sent to duplicator 252. Duplicator 252 may be implemented in a manner similar to duplicator 250 discussed with respect to latency-oriented router 120, with some differences. As one difference, instead of "NAT-like translation", duplicator 252 may implement "reverse NAT-like translation" as described with respect to deduplicator 260. Such "reverse NAT-like translation" may use "NAT-like translation data" (which may contain one or more (source_IP, source_port) pair(s)) associated with the corresponding "latency-critical session", which were created as described with regards to deduplicator 262. In some embodiments, duplicator 252 may use "virtual interfaces" which were created as described with regards to deduplicator 262, to send copies of the packets. As another difference of duplicator 252 from duplicator 250, instead of "proxy translation", duplicator 252 may implement "reverse proxy translation", as described with respect to deduplicator 260.

Latency-oriented proxy 121 may perform one or more of "potential issue detection" techniques as described with respect to latency-oriented proxy 120. In addition, it may optionally implement one or more of the following "potential issue detection" techniques. In some embodiments, latency-oriented proxy 121 may monitor packet loss and/or latency with some or all of the target servers 180. If packet loss and/or latency is exceeded, latency-oriented proxy 121 may send a special "forward connection quality" packet (and/or add a special "forward connection quality" field to an existing packet) to some or all of the user devices with which the specific server 180 currently has latency-critical sessions. In other embodiments, latency-oriented proxy 121 may monitor use of resources (such as CPU load) and/or internal processing latencies (such as "time from the moment when the packet was received until the copy was sent") and, if a pre-defined or pre-configured threshold is exceeded, send a special "overload" packet (and/or add a special "overload" field to an existing packet) to some or all of the user devices with which the specific server 180 currently has latency-critical sessions.

In some embodiments, latency-oriented proxy 121 may implement rate limits (such as packets-per-second or bytes-per-second) on a per-client or a per-session basis. In some embodiments, latency-oriented proxy 121 may limit outgoing connections to a well-known list of IP addresses. These limitations may be used to reduce potential for misuses and/or attacks on the latency-oriented proxy itself and/or servers 180 and/or Internet infrastructure.

In some embodiments, latency-oriented proxy 121 may implement a "proxy-to-server" protocol to communicate with server 180. In such embodiments, packets sent over such "proxy-to-server" protocol may include a field (which, for ease of reference, may be named as "real_IP") to indicate the "real" source IP address (for example, the IP address of latency-oriented router 120 that was received by latency-oriented proxy 121 in the source IP address field). In some embodiments, latency-oriented proxy 121 may add a real_IP field (for example, using "wrapping" of the whole packet or of the packet body) to each of the packets sent to server 180. In some embodiments, server 180 may take note of such field (which indicates the real IP address of the user device without the proxy) and use it as if it is a source IP of the packet for purposes such as identification and/or fraud/cheating prevention. In other embodiments, server 180 may remove such field before further processing of the packet. In other embodiments, server 180 may modify packets from proxies by moving the data in the real_IP field into the packet's source_IP field and removing the real_IP field completely before further processing. In some embodiments, the processing mechanism on the side of server 180 may allow for seamless processing of both proxied and non-proxied packets.

In some embodiments, connections from intermediate proxies 122 to latency-oriented proxy 121 and/or to other intermediate proxies 122, and/or from simple proxies 124 to latency-oriented proxy 121 and/or to other simple proxies 124 may also use the "proxy-to-server" protocol. In some embodiments, intermediate proxy 122, simple proxy 124 and/or latency-oriented proxy 121 may copy the data in the real_IP field in the incoming packet into the real_IP field of the outgoing packet. In some embodiments (instead of, or in addition to, real_IP field), intermediate proxy 122, simple proxy 124, latency-oriented proxy 121 and/or server 180 may use "proxy-to-server" protocol with a "source_IP_list" field, consisting of IP addresses. In some embodiments, all or some of the listed proxies may add a source_IP field of the incoming packet to the list when proxying. Server 180 may use such information for different purposes, including, but not limited to authentication, identification, fraud/cheating prevention and/or detection of compromised proxies.

In some embodiments, the receiving side of the proxy-to-server protocol (e.g., the server 180 or the latency-oriented proxy 121), may authenticate the packets before using the real_IP field (and/or "source_IP_list" field) from the packet. In some embodiments, such authentication may be performed by comparing the source IP field of the packet to a list of proxies with "trusted" IP addresses. In other embodiments, the sending side of the proxy-to-server protocol may provide an "authentication tag" with the packets (for example, as an additional field within the packet), and the receiving side of the proxy-to-server protocol may use it for authentication purposes. In some embodiments, such "authentication tag" may be a password, PIN or similar string. In other embodiments, such "authentication tag" may be a crypto tag, such as a MAC tag (e.g., HMAC, OMAC or Poly1305) or AEAD tag (e.g., Encrypt-then-MAC, MAC-then-Encrypt, Encrypt-and-MAC, EAX, CCM, OCB, Chacha20-Poly1305 or various forms of GCM including, but not limited to, AES-GCM) or a signature with a private key. If crypto tags are used, pre-shared key and/or public/private key pairs may be present within the devices.

In some embodiments, each proxy may add its own "authentication tag" to the packet. Server 180 may validate each of the "authentication tags" separately (for example, by using secret and/or public keys that correspond to the IP addresses within the "source_IP_list" field).

In some embodiments, even if an "authentication tag" is not provided, the sides of the proxy-to-server communication may still use encryption and/or decryption of the data sent/received (and/or of the portions of such data). Secret keys and/or public/private key pairs (the same as mentioned above or separate from those mentioned above) may be used for such purpose.

In some embodiments, any of the sides implementing proxy-to-server protocol (this may include any latency-oriented proxies 121, intermediate proxies 122, simple proxies 124 and/or server 180) may combine several incoming packets (including packets belonging to different latency-critical sessions) into one single packet using sub-packet sizes and/or sub-packet boundaries to allow restoring the packets on receiving side (which for ease of reference may be referred to as "packet consolidation"). In some embodiments, the receiving side of the proxy-to-server protocol may separate such consolidated packets (for example, using sub-packet sizes or sub-packet boundaries) into sub-packets before further transmitting them. Such "packet consolidation" may help to reduce the traffic (in particular, due to savings on header sizes of consolidated packets). In some embodiments, on the sending side the packets may be combined until one of two conditions is met: (a) total size of the consolidated packet exceeds some pre-defined size (for example, such pre-defined size may be 1500 bytes, 9000 bytes, the MTU of the outgoing interface on the sending side or the "Path MTU" discovered using one of PMTUD methods, including, but not limited to, those described in RFC1191, RFC1981 or RFC4821), or (b) a predetermined amount of time has elapsed since the first packet for current consolidated packet was received (which, for ease of reference, may be referred to as "timeout"). Examples of such timeouts include 10 mks, 100 mks, 1 ms, 10 ms and 100 ms. In some embodiments, the timeout may depend on the "app types" involved. In some embodiments, each sub-packet added to the consolidated packet may cause its own timeout limit, and the minimum of these timeout limits may be used for the purposes of ending "packet consolidation".

In some embodiments, the proxy-to-server protocol may work over TCP, and such proxy-to-server protocol over TCP may be used to transfer any kind of data between the two sides of the communication (including, but not limited to, data from UDP and/or ICMP packets). UDP packets and/or ICMP packets may be wrapped into (packet_size, packet_data) tuples, with the tuples sent over the TCP.

In some of the embodiments where the proxy-to-server protocol is used, the sending and receiving sides may implement X-multicast packets, and X-multicast may be different from traditional IP multicast. In some embodiments, X-multicast may not rely on routing of multicast IP packets (which usually does not work over the public Internet). If server 180 needs to send the same update packet to several clients (which is a common occurrence at least for some game servers), it may send a special packet indicating (a) the need for X-multicast, (b) list of the computers to receive the packet (such list may specify IPs or session_IDs or anything else to that effect), and (c) the body to be sent to all these addresses. In some embodiments, X-multicast may be combined with "packet consolidation" and/or "proxy-to-server over TCP" techniques.

In some embodiments where the proxy-to-server protocol is used, one or more of the latency-oriented proxies 121, intermediate proxies 122, simple proxies 124 may implement a "game state". In such embodiments, one of the proxies may maintain the "game state". Such "game state" may be updated by special packets sent over the proxy-to-server protocol (from server 180 or from an "upstream" proxy). In turn, other proxies ("downstream proxies") and/or latency-critical routers 120 may request and obtain the current "game state" (or a part of it) and/or may "subscribe" to the updates to the "game state". In some embodiments, on receiving an update to the "game state" from an "upstream" server or proxy, each proxy may calculate and send zero or more updates to the "game states" of its subscribers (proxies) and/or to zero or more updates to connected user devices.

In some embodiments, "game state" on the server(s) 180 may be implemented as follows. The server itself may maintain a "game state". When the server receives request for a "game state" from a "downstream" requestor, the server may: (a) send a copy of its own "game state" to the "downstream" requestor, and (b) add the downstream requestor to a list of downstream subscribers. In such embodiments, updates to the "game state", may be sent to downstream subscribers in the list of downstream subscribers.

In some embodiments, "game state" on the proxies may be implemented as follows. The proxy itself may "subscribe" to the "upstream" source (which may be another proxy or server 180) and may obtain a copy of the "game state" (for example, acting as a "downstream" requester as described above). When a "downstream" request for a "game state" comes in to the proxy, the proxy may: (a) send a copy of its own "game state" to the "downstream" requestor, and (b) add the downstream requestor to a list of downstream subscribers. In such embodiments, updates from the "upstream" source to the proxy may (i) be used to update the "game state" of the proxy, and (ii) be sent to downstream subscribers in the list of downstream subscribers.

In some embodiments, when implementing "game state", game server(s) and/or proxies may filter the "game state" and/or updates. In some embodiments, such filtering may be implemented to reduce potential for cheating (such as "wall-hacks" or "maphacks"), and in some embodiments, it may be implemented to reduce "downstream" traffic. In some embodiments, such filtering may be implemented using "interest management" techniques as described in Jean-Sebastien Boulanger, et al., "Comparing Interest Management Algorithms for Massively Multiplayer Games," *Netgames '06 Proceedings of 5<sup>th</sup> ACM SIGCOMM Workshop on Network and System Support for Games*, Article No. 6 (2006), the entirety of which is incorporated herein by reference. In some other embodiments, filtering may be performed on the basis of which information is allowed to be accessible to which of subscribers.

In the embodiments which use a "subscription" mechanism, compression methods (both traditional and game-specific) such as those described above, may be used to compress the data. Game-specific compression methods may include game-specific incremental techniques such as dead reckoning, interest management and/or delta compression. In some embodiments, separate and potentially different methods of compression may be used to compress "upstream" updates received by the proxy and to compress "downstream" updates issued by the proxy and/or server 180.

In some embodiments, one or more latency-oriented proxies 121, intermediate proxies 122 and/or simple proxies 124 may maintain more than one "game state". In some embodiments, "game states" may be created and/or destroyed by either commands from "upstream" (via the proxy-to-server protocol) and/or by "subscription requests" from "downstream". In the latter case, on receiving such a "subscription request", the proxy may go to the "upstream" server or proxy to request appropriate "game state" and/or to "subscribe" to updates to the "game state". In some embodiments, if all the "subscribers" on the specific proxy are unsubscribed from a certain "game state" (or if "upstream"

indicates that the "game state" is no longer available), such "game state" may be removed (and/or the proxy may "unsubscribe" from it).

In some embodiments, the same proxy may have more than one "upstream" source, each "upstream" source corresponding to a different "game state". In some embodiments, the "game state" may also be implemented on some of the latency-oriented routers 120. In some of these embodiments, a protocol functionally similar to the proxy-to-server protocol may be used for communications between the latency-oriented router 120 and the "nearest" proxy.

In some of the embodiments in which the proxy-to-server protocol is used, the sending and receiving sides may implement compression. Any compression algorithm may be used including, but not limited to, LZ77, Huffman coding, deflate, bzip2, LZHL and any combination of these or any other compression algorithms currently known or developed in the future. In some embodiments, compression techniques may be combined with "packet consolidation", "proxy-to-server over TCP" techniques and/or X-multicast techniques. In particular, in some embodiments "X-multicast" packets may use the identifier of "subscription" instead of (or in addition to) the list of the computers to receive the packet.

Figure 5C:
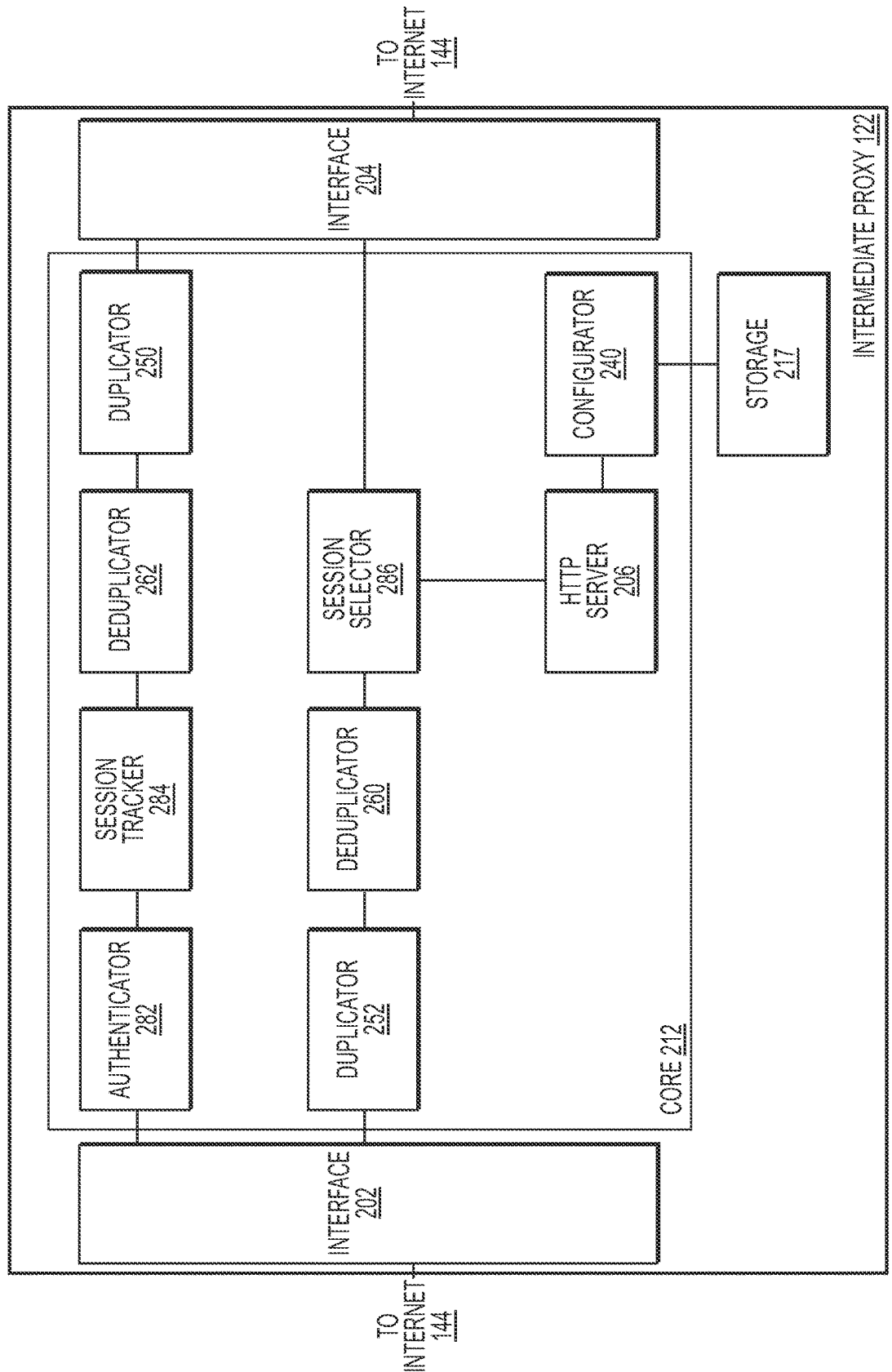
FIG. 5C is a block diagram illustrating an exemplary implementation of an intermediate proxy, according to an embodiment of the present disclosure.

FIG. 5C is a block diagram illustrating an exemplary implementation of intermediate proxy 122, according to an embodiment of the present disclosure. In the embodiment shown in FIG. 5C, intermediate proxy 122 may include core 212, interfaces 202 and 204 and storage 217. Core 212 may further include authenticator 282, session tracker 284, deduplicator 262, duplicator 250, session selector 286, deduplicator 260, duplicator 252 and (optionally) HTTP server 206 and/or configurator 240.

In some embodiments, the same techniques as described for latency-oriented proxy 121 (including, but not limited to, implementing as a standalone device and/or a separate computer running appropriate software) may be used to implement intermediate proxy 122. In one embodiment, packets from the "left side" (which may correspond to connections 132 in FIG. 4C), may be received by one of interfaces 202 (only one interface is shown) and then be processed by authenticator 282, session tracker 284, deduplicator 262 and duplicator 250, reaching one of interfaces 204 on the "right side" (which may correspond to one of connections 192 in FIG. 4C). In other embodiments, packets from the "right side", may be received by one of the interfaces 204 (only one interface is shown) and then processed by session selector 286, deduplicator 260 and duplicator 252, reaching one of interfaces 202 on the "left side". As it was described with respect to FIG. 5A and/or FIG. 5B, in some embodiments, some or all of the interfaces 202 and/or 204 may be "virtual interfaces". In some embodiments, all the interfaces 202 and 204 may be "virtual interfaces" built on top of a single "physical interface".

In some embodiments, intermediate proxy 122 may use data from some of the fields from incoming packets (such as packet_ID, real_IP, VPORT) to populate respective field(s) in outgoing packets.

In one embodiments (not shown), the intermediate proxy 122 may be implemented as a combination of a latency-oriented router 120 and a latency-oriented proxy 121, with an interface 204 of the latency-oriented router 120 directly connected to an interface 202 of latency-oriented proxy 121.

Figure 5D:
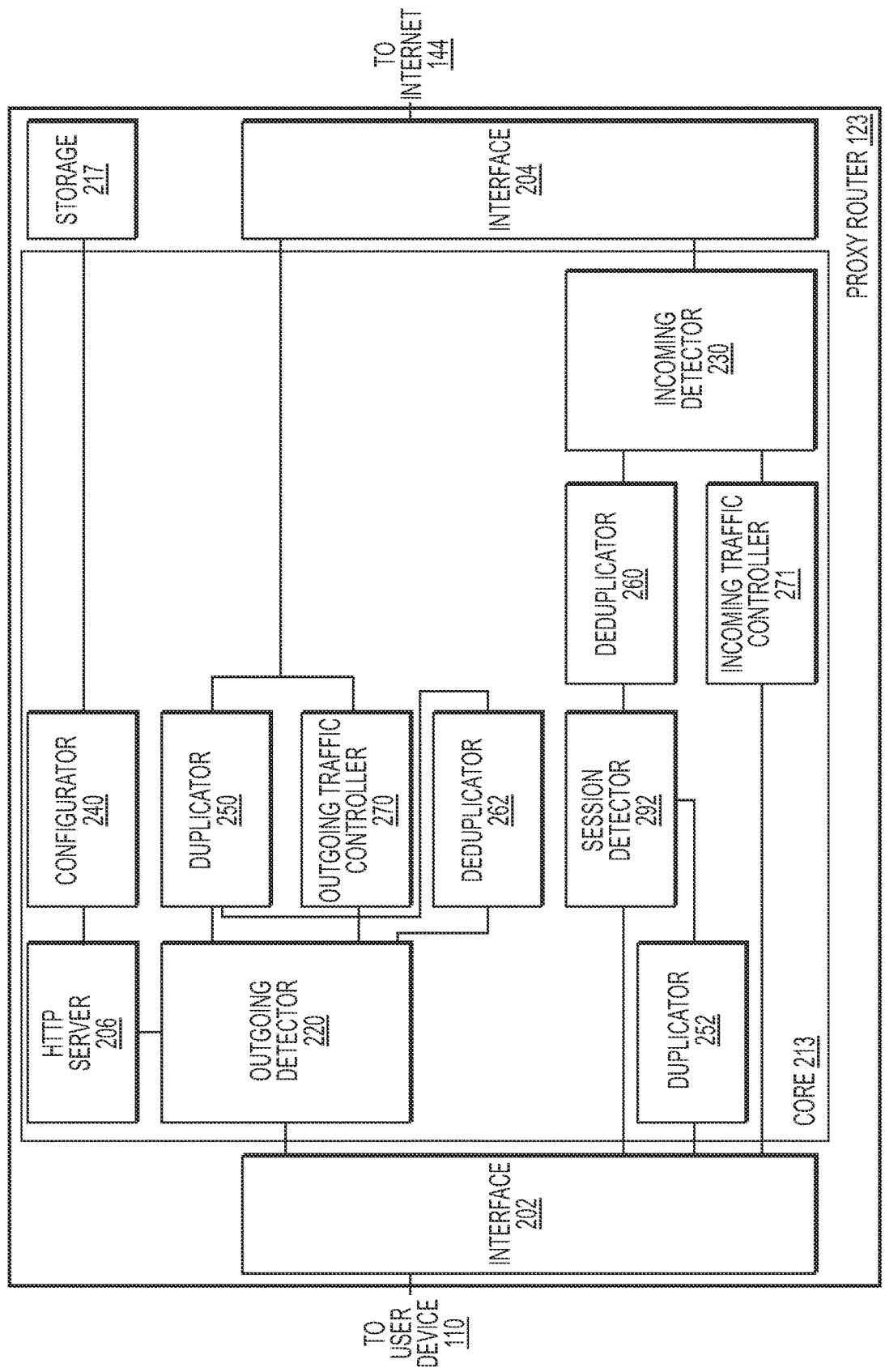
FIG. 5D is a block diagram illustrating an exemplary implementation of a proxy router, according to an embodiment of the present disclosure.

FIG. 5D is a block diagram illustrating an exemplary implementation of proxy router 123, according to an embodiment of the present disclosure. In some embodiments, proxy router 123 may have many of the same components of the latency-oriented router 120 operating in the same or similar manner as they operate in the latency-oriented router 120. As such, these components are not discussed again here and the reader is referred to the discussion of FIG. 5A. In some embodiments, the same techniques as described for latency-oriented proxy 120 (including, but not limited to, implementing as a standalone device and/or a separate computer running appropriate software), may be used to implement proxy router 123.

In some embodiments of the proxy router 123, the outgoing detector 220 may additionally detect that a packet is from latency-oriented router 120 (which may happen in configurations such as shown in FIG. 4F). Such additional detection may be performed by comparing a packet destination IP address with the IP address(es) of interface(s) 202 of proxy router 123, and/or comparing the destination port to a port number designated for such communication. In some embodiments, if the packet is determined to come from the latency-oriented router 120, it may be directed to deduplicator 262 and then to duplicator 250. In addition, latency-critical sessions associated with such packets, may have associated information to indicate such packets are from a latency-oriented router 120. In some embodiments, in a somewhat similar manner, the packets from interface(s) 204, after going through deduplicator 260, may be directed to session detector 292. In some embodiments, session detector 292 may detect whether the packet belongs to the session which has associated information to indicate that it is from a latency-oriented router 120. Session detector 292 may forward such packets to duplicator 252 and all other packets to interface 202. If the packet is determined to belong to the session from a latency-oriented router 120, duplicator 252 may send one or more copies of the packet over one or more interfaces 202.

In some embodiments, packets from latency-oriented router 120 to proxy router 123 may include additional information, such as which interface of proxy router 123 a packet is intended for. Proxy router 123 may use such information when deciding where to direct such packets. This technique may be used in conjunction with techniques similar to those techniques described with respect to "X-Plugin" 248 used to detect latency-oriented routers 120 and/or proxy routers 123 and/or to retrieve information about latency-oriented routers 120.

Figure 5E:
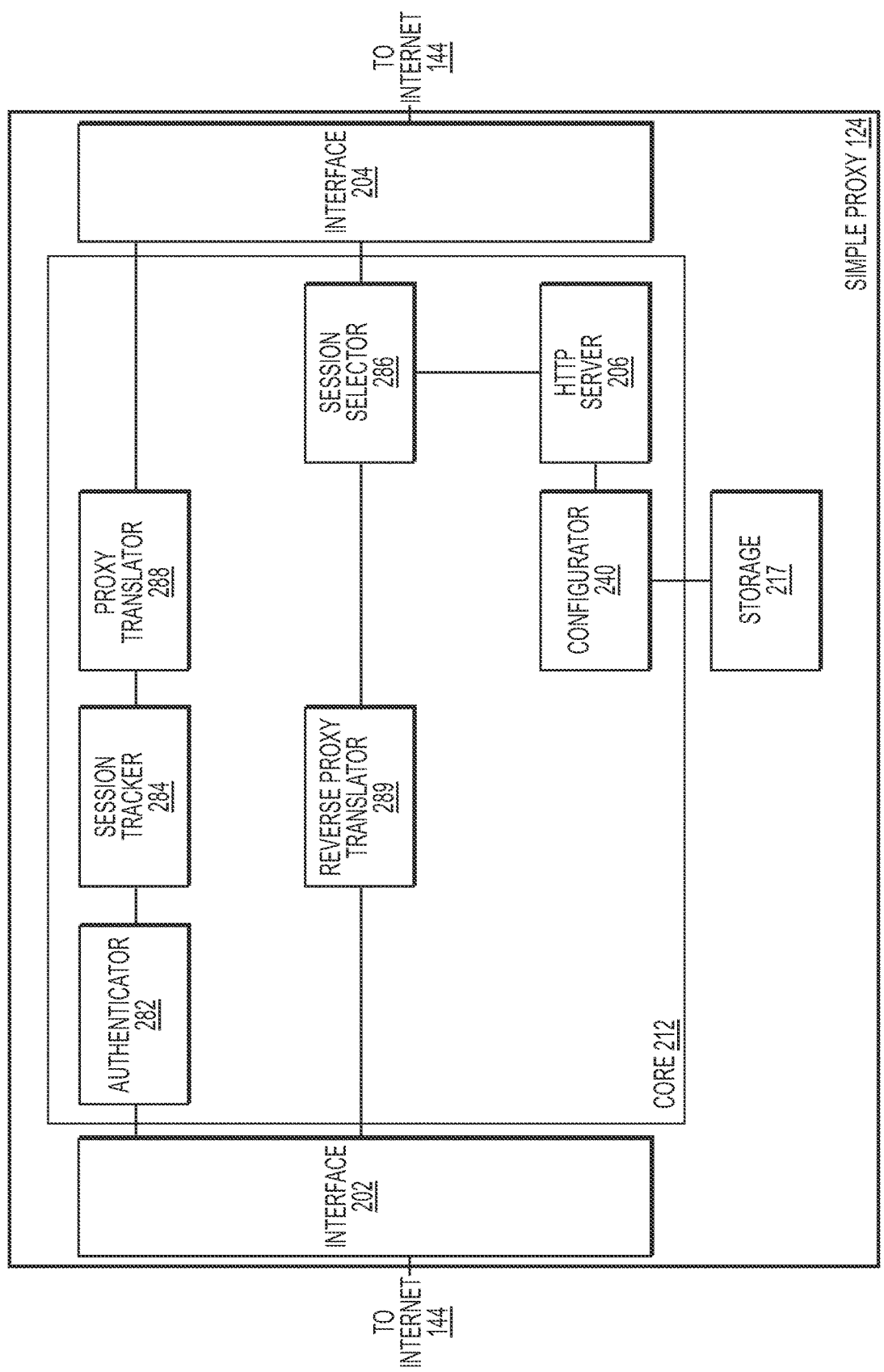
FIG. 5E is a block diagram illustrating an exemplary implementation of a simple proxy, according to an embodiment of the present disclosure.

FIG. 5E is a block diagram illustrating an exemplary implementation of simple proxy 124, according to an embodiment of the present disclosure. In some embodiments, the same techniques as described for latency-oriented proxy 120 (including, but not limited to, implementing as a standalone device and/or a separate computer running appropriate software), may be used to implement simple proxy 124.

In some embodiments, a packet received at one of interfaces 202 may be authenticated by authenticator 282, then processed by session tracker 284, and finally processed by proxy translator 288. Proxy translator 288 may perform "proxy translation 2" followed by "proxy translation". After the packet is processed by proxy translator 288, it may be sent to one of interfaces 204. A packet received at one of interfaces 204, may be processed by session selector 286 and then by proxy reverse translator 289. Proxy reverse translator 289 may perform a "reverse proxy translation". After the packet is processed by reverse proxy translator 289, it may be sent to one of interfaces 202.

In some embodiments, as it was described with respect to FIG. 5A and/or FIG. 5B, some or all of the interfaces 202 and/or 204 of the simple proxy 124 may be "virtual interfaces". In some embodiments, all the interfaces 202 and 204 may be "virtual interfaces" built on top of a single "physical interface".

In some embodiments, all the devices illustrated by FIG. 5A-FIG. 5E, may include a module, component and/or device to store "game states" (not shown). Such module, component and/or device may be a separate hardware module (for example, additional RAM) or may be just a part of RAM also used for the other purposes and may be accessed by deduplicator 260 to maintain "game state" (and provide updates to subscribers) as described with respect to the proxy-to-server protocol.

In some embodiments, all the devices illustrated by FIG. 5A-FIG. 5E, may include a remote updating facility (not shown). In addition to performing bug fixes and/or adding features, in the context of these devices, remote updates may facilitate reacting to changes resulting from handling of data/packets related to different and/or new application types. The remote updating facility may receive information that a new version of a software (or part of a software such as a shared-library or DLL that performs incoming detection for a specific application) or some new data is available and as a result perform an update. Examples of data which may be updated include, but are not limited to a netmask-to-ASN table, an ASN-to-owner table, a list of ports in use by a specific application type, the whole or parts of a new/updated application type (including, but not limited to, information about ports, formats, ASN numbers and/or netmasks application to the application). In some embodiments, such information may be obtained via polling an external update server (not shown) at pre-defined or configurable intervals (examples if such intervals may range from once per minute to once per day). In other embodiments, such information may be "pushed" the device by the update server as a packet from the update server to all the devices which "subscribed" to such service. After the information about the update being available, is received, the update itself may be received from the same (or different) update server. The update may be received using any of existing protocols, including, but not limited to, HTTP, HTTPS, File Transfer Protocol, TCP and any other existing or future developed technology with similar functionality.

In some embodiments, packets related to updates may be treated the same way as "other traffic", which may facilitate uninterrupted game play while the update is being downloaded. In some embodiments, the update may be signed and the signature may be validated before the update is applied (such validation may include checking the whole certificate chain up to the root certificate). After the signature is validated, the downloaded update may be applied to change the relevant software and/or data. In some embodiments, the update may be compressed and the device may perform decompression before applying the update. Compression/decompression in this context may be implemented using any of the existing compression algorithms including, but not limited to, deflate, zip, bzip2 and/or differential update techniques such as vsdiff, bsdiff, xdelta and Courgette.

In some embodiments, in addition to (or instead of) detecting latency-critical traffic, other categories of traffic may be detected by, for example, outgoing detector 220. Such other categories of traffic may include, without limitation, "interactive non-latency-critical" traffic, "video streaming traffic" and/or "download non-latency-critical traffic". In some embodiments, techniques similar to those used to detect latency-critical traffic (as described herein) may be used to detect "interactive non-latency-critical" traffic, "video streaming traffic" and/or "download non-latency-critical traffic". In one non-limiting example, all TCP connections going over ports 80 and/or 443 with dropbox.com are detected and categorized as "download traffic"; all FTP connections regardless of IP addresses are similarly detected and categorized as "download traffic"; all TCP connections with facebook.com (with or without regards to ports used) are detected and categorized as "interactive traffic"; and/or all TCP connections with youtube.com are detected and categorized as "video streaming traffic".

In some embodiments, any TCP connection may be considered "interactive non-latency-critical" traffic until a certain pre-defined amount of traffic is transferred over the connection, wherein transferring traffic includes receiving and/or sending. When such pre-defined amount of traffic is transferred, the relevant TCP connection may be re-classified as "download non-latency-critical traffic" or "video streaming traffic". In some embodiments, re-classification as "download traffic" may be based on other parameters, such as the relevant connection's elapsed time. In some embodiments, connections may be classified based on traffic patterns. In one non-limiting example, connections with steady traffic may be classified as "download non-latency-critical traffic" or "video streaming traffic" depending on the amount of bandwidth consumed, wherein connections consuming less than some pre-defined amount, such as 2 Mbit/s, are classified as "video streaming traffic" and other connections are classified as "download non-latency-critical traffic". In contrast, connections with sharp changes in traffic or falling below a different pre-defined bandwidth amount, such as 100 kBit/s, are classified as "interactive non-latency-critical traffic".

In some embodiments, information related to an application-level protocol (i.e., a protocol sitting on top of a TCP connection and/or SSL/TLS connection) may be used to classify traffic. For example, if a protocol running on top of a TCP connection is HTTP and the HTTP session indicates transfer of the same resource (indicated by the same URL), such HTTP session may be classified as "download non-latency-critical traffic". As another example, if the protocol running on top of a TCP connection is HTTP Live Streaming (HLS), HTTP Dynamic Streaming (HDS), Microsoft Smooth Streaming or Dynamic Streaming over HTTP (DASH), such TCP/HTTP session may be classified as "video streaming traffic".

In some embodiments, the analysis and/or modification of information that belongs to an application-level protocol may include re-assembling some portion of the TCP stream. In one non-limiting example, such TCP re-assembly may be necessary to read and/or modify HTTP headers, which in turn may be necessary for using an application-level protocol to classify traffic as described above. In some embodiments, outgoing detector 220 may perform TCP re-assembly. For example, for the receiving side of TCP communication, TCP re-assembly may be performed using techniques described in RFC793. Note that TCP re-assembly does not necessarily imply terminating TCP connections as described with respect to TCP terminator 241.

In some embodiments, the detection and classification methods described above may be combined. For example, traffic may be classified as "download non-latency-critical traffic" and "interactive non-latency-critical traffic" based on rules for well-known hosts; remaining connections may be classified based on application-level protocol; and those connections not classified by other means may be classified based on traffic patterns, elapsed time and/or traffic through the connection.

In some embodiments, "interactive non-latency-critical traffic" and/or "video streaming traffic" may be used in the same manner as latency-critical traffic is used for the purposes of "potential issue detection" techniques and/or prioritization techniques (for example, DSCP-based techniques as described herein). In some embodiments, different "enforcement techniques" may be used for "interactive non-latency-critical traffic" and "download non-latency-critical traffic". This may allow for different processing of "interactive non-latency-critical traffic" and "video streaming traffic", which may facilitate stronger suppression of the "download non-latency-critical traffic" and/or prioritization of "interactive non-latency-critical traffic", and which may provide for an improved web browsing experience for an end-user.

In some embodiments, latency-oriented router 120 may allow an end-user to control the relative priorities of two or more of the following types of traffic: latency-critical traffic, "interactive non-latency-critical traffic", "video streaming traffic" and/or "download non-latency-critical traffic". In some embodiments, latency-oriented router 120 may implement functionality to retrieve a list of current download connections and/or to specify which of the connections should be given priority, and apply such priority settings to prioritize traffic. This may be implemented, for example, using HTTP server 206, wherein HTTP server 206 may be controlled by an external application, to communicate connection lists and priority settings to configurator 240, and using one or more "enforcement techniques" to implement prioritization based on the settings in configurator 240. In some embodiments, additional "enforcement techniques" and/or more stringent settings for the same "enforcement techniques" (for example, lower limits for "limit-based enforcement action" as described in more detail below) may be used to reduce the priority of a connection.

In some embodiments, latency-oriented router 120 may implement the following latency optimization for some types of TCP traffic, including but not limited to video streaming traffic. If a particular data rate and/or packet rate for the TCP traffic is expected (which is common in video streaming), and TCP traffic from an interface 204 is unexpectedly delayed, then latency-oriented router 120 may issue a TCP packet containing a "duplicate ACK" to the appropriate interface 204. Such "duplicate ACK" may be obtained by storing the most recent ACK sent to such interface 204 for each TCP session. It should be noted that, in some embodiments, storing the entire TCP packet may not be required, and that storing the immediately previous value of the ACK field may be sufficient. Latency-oriented router 120 may send a packet with a duplicate of such ACK as soon as the unexpected delay arises. In some embodiments, such duplicate ACK may help initiate a "fast retransmit" procedure on the sender's side, thus facilitating a faster recovery from the unexpected delay than otherwise possible.

Figure 5F:
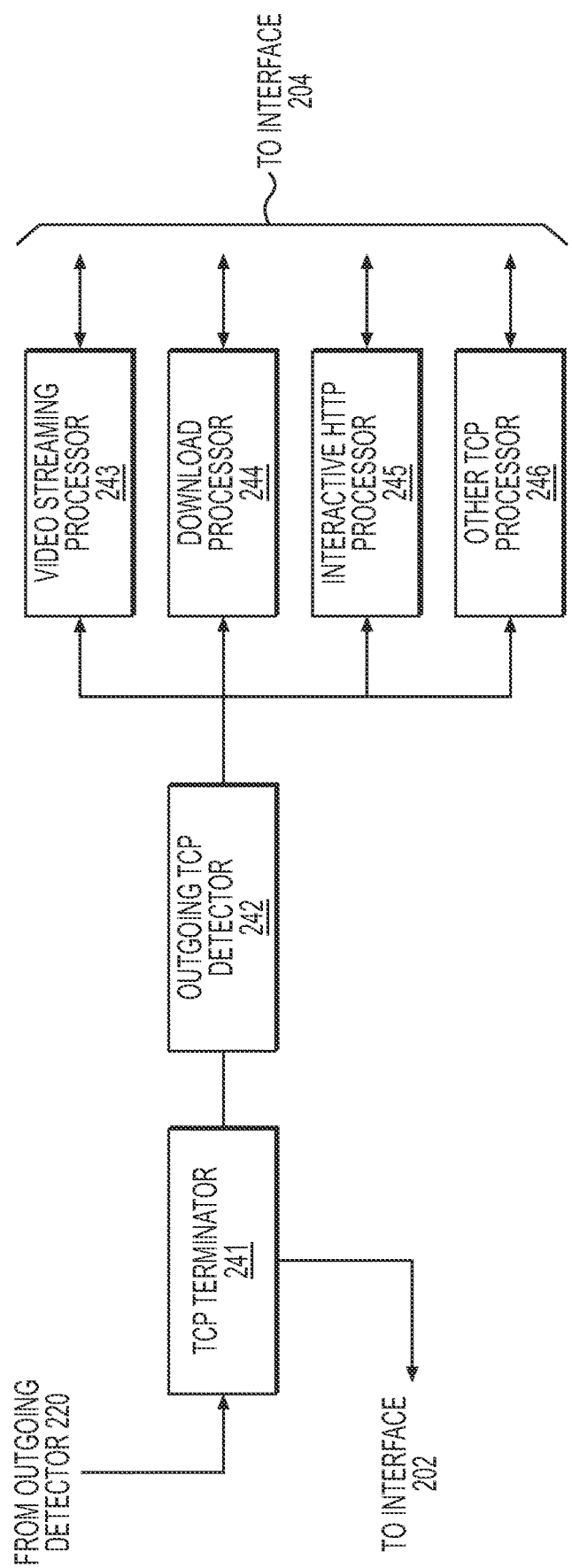
FIG. 5F is a block diagram illustrating an exemplary implementation of a TCP-handling subsystem.

FIG. 5F is a block diagram illustrating an exemplary implementation of a TCP-handling subsystem, which may optionally be incorporated into latency-oriented router 120 (for example, as illustrated in FIG. 5A) and/or proxy router 123 (for example, as illustrated in FIG. 5D), according to an embodiment of the present disclosure. In such embodiments, outgoing detector 220 may direct some or all TCP packets to TCP terminator 241. TCP terminator 241 may act as an end-point for the TCP connection by, for example, implementing a standard TCP stack and may effectively terminate any TCP connection from interface 202. To implement termination, TCP terminator 241 may send packets back to interface 202.

As a result of such termination, TCP terminator 241 may obtain portions of TCP stream and/or target IP addresses of terminated connections. Such TCP stream portions and/or target IP addresses may be passed to outgoing TCP detector 242. Outgoing TCP detector 242 may detect whether a TCP connection is an "interactive" connection, "download" connection or "video" connection and send such TCP stream portions and/or target IP addresses to interactive HTTP processor 245, download processor 244 or video streaming processor 243, respectively. Other traffic may be sent to other TCP processor 246. Detection of connection type by outgoing TCP detector 242 may be implemented using application-level protocol-based analysis as described above and/or any other methods described herein.

In some embodiments, a TCP-handling subsystem that is functionally similar to the one illustrated in FIG. 5F may be implemented without TCP terminator 241. In such embodiments, TCP stream fragments may be re-assembled by such TCP-handling subsystem to allow for application-level protocol analysis and/or modification without terminating the TCP connection itself (in particular, no packets to be sent from latency-oriented router 120 to interface 202 may be generated). In such embodiments, after TCP stream fragments are processed by processors 243-246, such TCP stream fragments may be sent to target interfaces as TCP packets. In such embodiments, additional TCP connections may be created and/or terminated by processors 243-246.

Each of other TCP processor 246, interactive HTTP processor 245, download processor 244 and video streaming processor 243 may initiate its own TCP connection(s) with interface 204 using, for example, target IP addresses received from outgoing TCP detector 242. In some embodiments, there may be no one-to-one correspondence between incoming TCP connections (terminated by TCP terminator 241) and outgoing TCP connections (initiated by other TCP processor 246, interactive HTTP processor 245, download processor 244 or video streaming processor 243). For example, for an incoming TCP connection there may be more than one outgoing TCP connection. In other embodiments, there may be such one-to-one correspondence, wherein instead of terminating incoming TCP connection at TCP terminator 241 and establishing a new TCP connection in one of processors 243-246, packets belonging to incoming TCP connection may be forwarded, with or without other modifications described herein.

All processors 243-246 may implement one or more "potential issue detection" techniques" and/or "enforcement techniques". Any such processor 243-246 may ensure that packets it sends toward interface 204 (for example, as part of a TCP connection it initiates) have specific DSCP values, such as those DSCP values discussed with respect to duplicator 250.

In some embodiments, other TCP processor 246 may establish one outgoing TCP connection for each incoming TCP connection. In some embodiments, other TCP processor 246 may balance outgoing TCP connections across different interfaces 204.

In some embodiments, processors 243-245 may implement the detection of "hanging" TCP connections and the automated re-reissue of idempotent request(s), such as HTTP GET/OPTIONS/HEAD request. Such idempotent request(s) may be automatically re-issued without dropping the original request. In such cases, if a reply to the original request arrives before a reply to the second request, the reply to the first request may be returned to the incoming TCP connection, and/or the second outgoing request may be aborted. In some embodiments, detection of "hanging" TCP connections may be accomplished using timeouts. It should be noted that different processors may use different timeouts for the detection of "hanging" TCP connections. As a non-limiting example, download processor 244 may use a timeout of 5 minutes; video streaming processor 243 may use a timeout of 15 seconds for initial request and 5 seconds for subsequent requests; and interactive HTTP processor 245 may use a timeout of 20 seconds. In some embodiments, when a request is re-issued, such re-issued request may be over a different interface 204 from the interface 204 used for the original request.

In some embodiments, in addition to implementing any of the techniques described above, interactive HTTP processor 245 may split incoming HTTP requests from a single incoming TCP connection into the same HTTP requests over multiple outgoing TCP connections. In some embodiments, HTTP requests may be modified, for example, by splitting a single HTTP range request into two or more HTTP range requests, and as described in more detail below. In some embodiments, interactive HTTP processor 245 may perform protocol conversion between any of the protocols capable of carrying HTTP requests, including but not limited to HTTP/1, QUIC, SPDY and/or HTTP/2. Thus, interactive HTTP processor 245 may establish HTTP/1, QUIC, SPDY or HTTP/2 outgoing connections, even if the type of incoming connection is different. In some embodiments, interactive HTTP processor 245 may balance outgoing TCP connections and/or HTTP requests across different interfaces 204. Implementation of any techniques described above may improve interactivity of end-user web browsing.

In some embodiments, in addition to implementing one or more of the techniques described above, download processor 244 may implement one or more of the techniques described with respect to interactive HTTP processor 245. In addition, download processor 244 may split one HTTP range request into two or more HTTP range requests. Such split HTTP range requests may be transmitted over different TCP connections. In some embodiments, in addition to (or instead of) HTTP requests, similar techniques may be applied to BitTorrent file pieces. Implementation of any techniques described above may accelerate end-user downloads.

In some embodiments, in addition to implementing one or more of the techniques described above, video streaming processor 243 may implement one or more of the techniques described with respect to download processor 244. Video streaming processor 243 may use different (for example, significantly smaller) timeouts than download processor 244. In some embodiments, video streaming processor 243 may recognize that video streaming is in progress and issue outgoing HTTP requests even if such requests were not yet requested over the incoming TCP connection. Replies to such HTTP requests may be stored within latency-oriented router 120 and may be served from storage, thus obviating the need to request the information from the server if such replies are requested over incoming TCP connection. In some embodiments, video streaming processor 243 may issue each HTTP request over more than one interface 204 in a manner similar to that of duplicator 250. Some such duplicate HTTP requests may also be delayed in a manner similar to that of duplicator 250. Implementation of any of the techniques described above may accelerate and/or smooth end-user video streaming.

In some embodiments in which a TCP connection is encrypted (for example, using SSL or TLS, which are routinely used for HTTPS requests), performing application-level protocol analysis and/or notification may be impossible. To facilitate handling of encrypted application-level connections, several different techniques may be used, as described in more detail below.

In some embodiments, to facilitate handling encrypted application-level connections, TCP terminator 241 may terminate not only TCP connection(s), but also SSL/TLS connection(s). In such embodiments, outgoing connections established by processors 243-246 may be SSL/TLS connections. Such connection terminations may allow for decryption of the stream and analysis and/or modification of the application-level protocol as if they were not encrypted. However, providing a valid SSL/TLS certificate when terminating an incoming SSL/TLS connection presents significant complications. To resolve such complications, latency-oriented router 120 may include its own private key and may generate a certificate for an incoming SSL/TLS connection, wherein the Common Name field corresponds to the domain being requested. Such certificate may be signed by latency-oriented router 120's private key. Use of such technique may require installing the certificate of the latency-oriented router 120 into web browsers using this feature. This technique may present security risks, so, in some embodiments, its use may be disabled by default. Enabling use of such technique may require action by the end-user, such as, without limitation, modifying settings in configurator 240 via HTTP server 206.

Figure 5G:
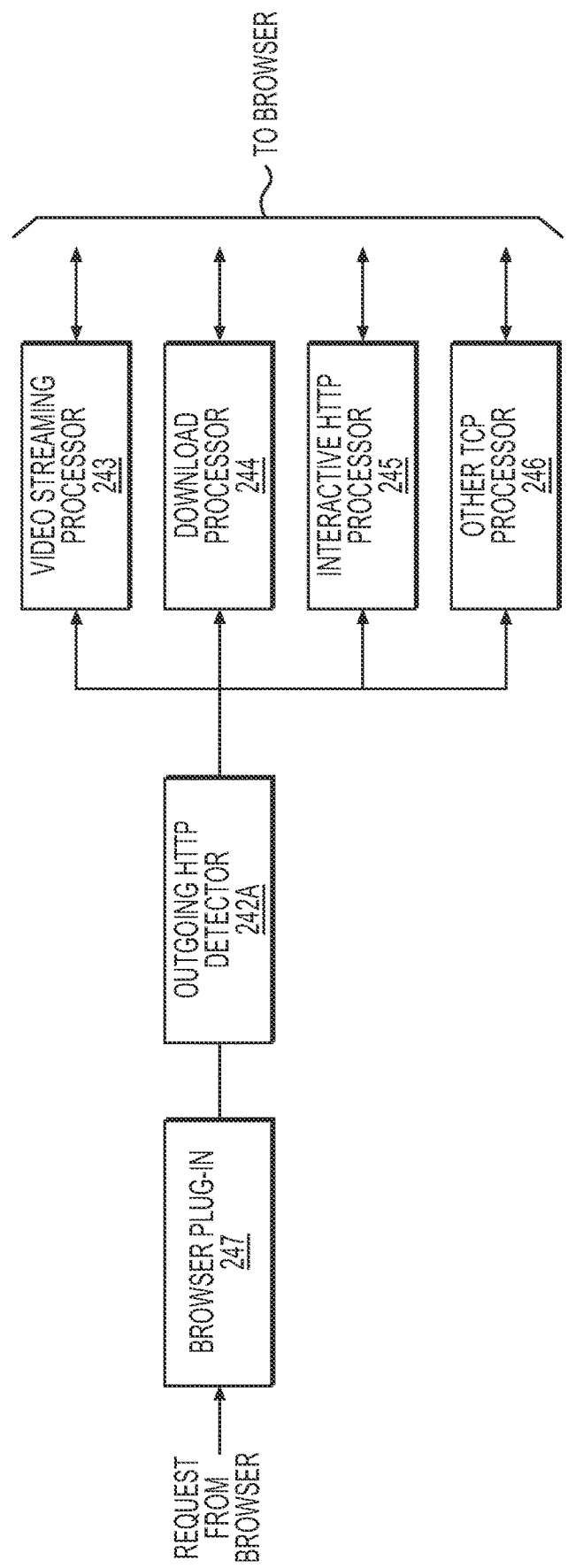
FIG. 5G is a block diagram illustrating an exemplary implementation of a TCP-handling subsystem.

FIG. 5G is a block diagram illustrating another exemplary implementation of a TCP-handling subsystem, according to an embodiment of the present disclosure. In some embodiments, the incorporation of outgoing HTTP detector 242A as illustrated in FIG. 5G may be used as a part of latency-oriented router 120 running on user device 110 in order to facilitate handling encrypted application-level connections. Implementation of outgoing HTTP detector 242A as illustrated in FIG. 5G may be used, for example, in configurations illustrated in FIG. 4E. Browser plugin 247 may intercept HTTP requests and/or other requests, including but not limited to Websocket data, from web browsers running on user device 110. Browser plugin 247 may feed such intercepted requests to outgoing HTTP detector 242A. Outgoing HTTP detector 242A may work in a manner similar to outgoing TCP detector 242, but may use intercepted HTTP requests rather than TCP stream fragments as its inputs. Such intercepted requests may then be processed by processors 243-246 and then may be fed back to the web browser, which may, in turn, encrypt the intercepted requests and/or send them over TCP.

Some embodiments, such as the embodiment illustrated in FIG. 5G, may be used to implement "X-Plugin" 248, which may then be used in configurations such as the embodiment illustrated in FIG. 4J. In some embodiments, "X-Plugin" 248 may intercept HTTP requests as such requests are initiated by a web browser and forward such requests to latency-oriented router 120 (or proxy router 123). In some embodiments, "X-Plugin" 248 may be implemented using a web browser plugin.

In some embodiments, "X-Plugin" 248 may be unable to send requests over different outgoing interfaces directly and may use one or more additional protocols to indicate to latency-oriented router 120 which of the requests should be sent over each interface 204 of the latency-oriented router 120. Latency-oriented router 120 may use such indications to forward the requests to its different interfaces 204. One example of such additional protocol may comprise a separate HTTP request (for example, directed to latency-oriented router 120 itself), wherein such HTTP request includes fields "target_IP" and "interface_number" and indicates that the next TCP request to "target_IP" should be forwarded to the interface 204 identified by "interface_number". Another example of such additional protocol includes the addition of information about a target interface 204 and a target IP address to the beginning of a TCP stream, which TCP stream may be addressed to latency-oriented router 120 itself (i.e., may have target address of latency-oriented router 120). The remainder of such TCP stream may contain an encrypted SSL/TLS session.

In some embodiments, latency-oriented router 120 may allow "X-Plugin" 248 (or any other device, including but not limited to another latency-oriented router 120 and/or a proxy router 123) to detect that its Internet connection is served by latency-oriented router 120. This may be implemented, for example, using any UPnP protocol, Rendezvous protocol or any protocol conceptually similar to NAT-PMP or PCP (or an extension to existing NAT-PMP or PCP protocol).

In some embodiments, to allow for detection of whether an Internet connection is served by latency-oriented router 120 and/or proxy router 123, latency-oriented router 120 may intercept outgoing packets and analyze such packets to determine whether they follow one or more pre-defined patterns (for example, using a pre-defined TCP and/or UDP port as a target port, and a pre-defined IP address as a target IP address). In one non-limiting example, latency-oriented router 120 (or proxy router 123) may intercept outgoing packets going to pre-defined IP address(es) over pre-defined TCP and/or UDP port(s). In such embodiments, "X-Plugin" 248 may issue an outgoing request that conforms to a pre-defined pattern and that is intended, for example, for an Internet host. Such request, when proceeding through an upstream latency-oriented router 120 (or proxy router 123), may be intercepted and replied to by the latency-oriented router 120 (or proxy router 123) closest to the user device 110 which has issued such request. Such reply may serve as an indication to the requestor that there is a latency-oriented router 120 (or proxy router 123) between the requestor and the Internet. In some embodiments, another latency-oriented router 120 or proxy router 123 may serve as a requestor instead of "X-Plugin" 248.

In some embodiments, more than one request conforming to a pre-defined pattern may be sent by a requestor to identify its upstream latency-oriented routers 120 and/or proxy routers 123, if any. In some such embodiments, the requestor may send such requests over different upstream interfaces.

In some embodiments, packets and/or connections matching pre-defined patterns may be used in lieu of packets and/or connections addressed to latency-oriented router 120 (or proxy router 123). This may be of particular interest in embodiments in which there are multiple latency-oriented routers 120 and/or proxy routers 123 for the same requestor (such as user device 110 or another latency-oriented router 120 or proxy router 123) and the route for each packet is selected or determined by the requestor individually. In such embodiments, transmitting packets to "upstream" routers by using the IP address of the "upstream" router may result in undesirable packet traffic patterns, but transmitting packets to "upstream" routers via pattern matching to pre-defined patterns as described above may allow each packet to reach the appropriate latency-oriented router 120 and/or proxy router 123 for further processing.

In some embodiments, latency-oriented router 120 and/or proxy router 123 may use one or more detection methods described herein to detect whether there is an "upstream" proxy router 123. In some embodiments, latency-oriented router 120 and proxy router 123 may communicate using a protocol similar to the "additional protocol" described above with respect to communications between "X-Plugin" 248 and latency-oriented router 120.

In some embodiments, latency-oriented router 120 may allow "X-Plugin" 248 (or any other client application and/or other router) to retrieve information, such as a list of its interfaces and their properties, the presence of "upstream" latency-oriented routers and/or proxy routers, and so on. Such "X-Plugin" 248 functions may be implemented as any request-response protocol, including but not limited to request-responses over UDP, TCP or HTTP(s).

With respect to the discussion of FIGS. 6A-6G that follows, it is noted that all values noted for IP addresses, port numbers, session_IDs, packet_IDs and/or any other fields are merely exemplary and solely for the purpose of facilitating a clear explanation of the present disclosure. It is further noted that although in FIGS. 6A-6G port numbers are different on different devices (and the same for different interfaces on the same device), this is merely exemplary and is not intended to narrow the scope of the present disclosure. Any two port numbers may be the same or different without departing from the scope of present disclosure. For purposes of discussion with respect to FIGS. 6A-6G, the notation "A.B.C.D:E" may be used, where "A.B.C.D" is an IPv4 or IPv6 IP address and E is the port number. It is also noted that it is not required that different "sides" of the same device (such as latency-oriented proxy 121 and/or intermediate proxy 122) have the same IP address. These addresses may be different without departing from the scope of present disclosure. Further, "port", as indicated in FIGS. 6A-6G and as discussed below, could be either a UDP port or a TCP port.

Figure 6A:
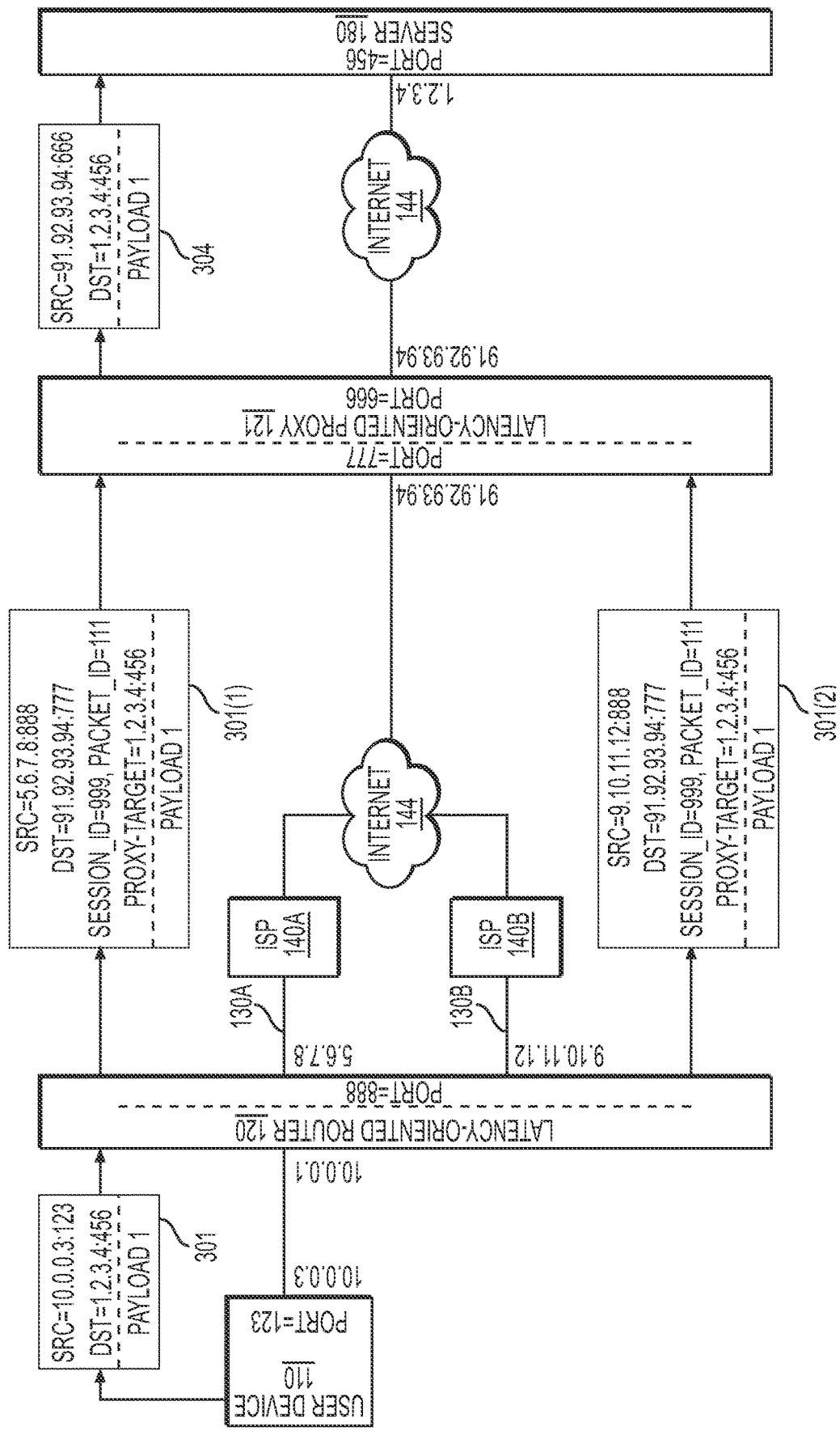
FIG. 6A illustrates transmission of latency-critical packets with possible modifications to the IP packets, according to an embodiment of the present disclosure.

FIG. 6A illustrates exemplary modifications to IP packets, according to an embodiment of the present disclosure. In such embodiments, all the packets exchanged may be latency-critical UDP packets (and the ports mentioned may be UDP ports). Alternatively, the packets exchanged may be TCP packets (and the ports mentioned may be TCP ports).

In the example of FIG. 6A, a user device 110 has an IP address 10.0.0.3 and sends a request with "payload1" to server 180 (which has an IP address of 1.2.3.4), port 456 (while "listening" on port 123 where it expects to receive replies). To send such a request, user device 110 may send exemplary packet 301 with source IP:port=10.0.0.3:123, destination IP:port=1.2.3.4:456, and packet body consisting of payload1. Packet 301 may travel over the network and arrive at latency-oriented router 120 (which may have a home-network-facing IP address of 10.0.0.1). At this point, latency-oriented router 120 may get the packet by "listening" on a SOCK_RAW Berkeley socket and pass it to the core 210 of the latency-oriented router 120. Within core 210, upon receiving the packet, duplicator 250 may create two copies of the original packet and send each copy to one of two external interfaces 140, with one of these interfaces in such exemplary embodiment having IP address 5.6.7.8 and another interface having IP address of 9.10.11.12. Latency-oriented router 120 may use port 888 to receive replies.

Figure 6B:
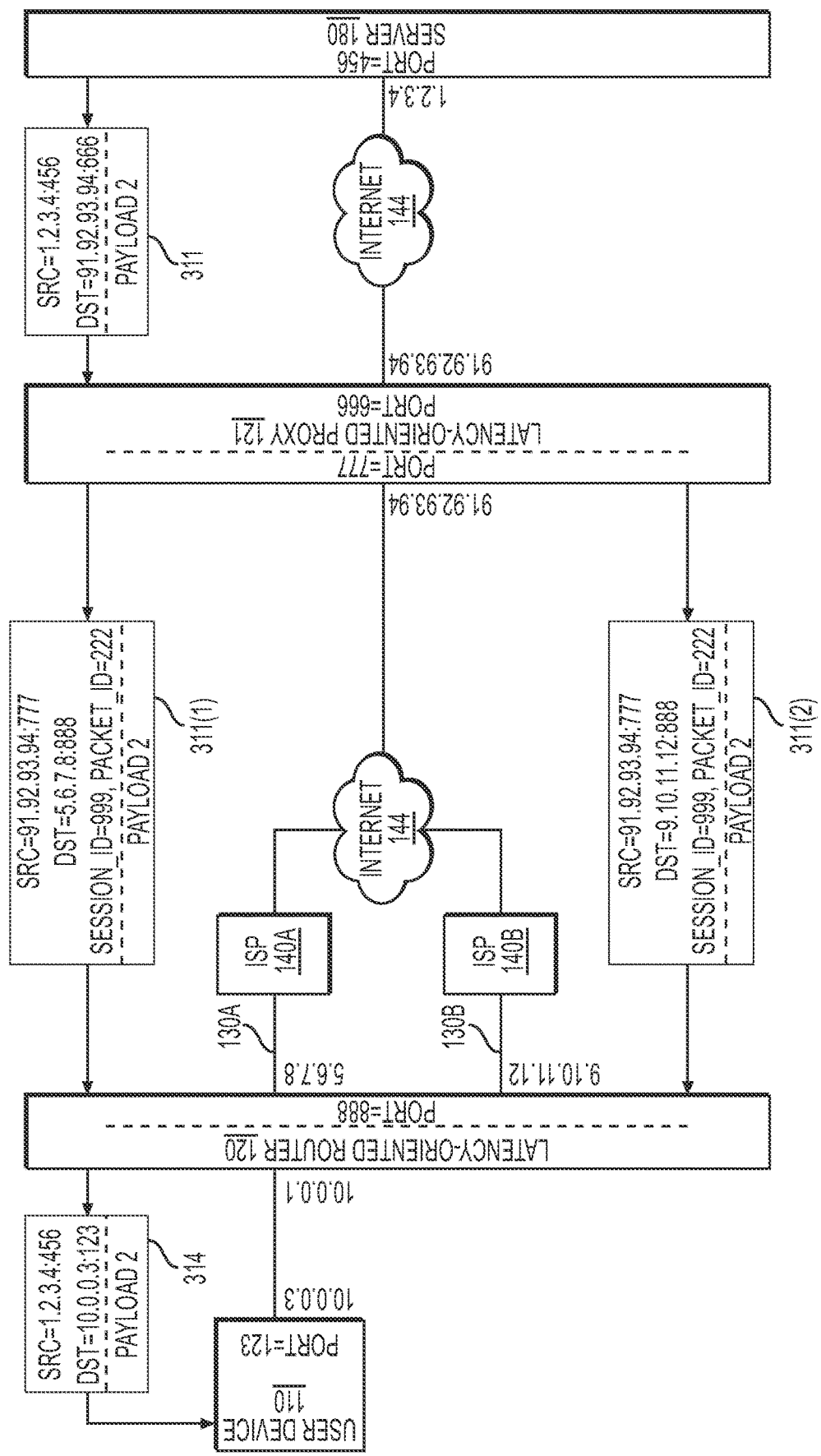
FIG. 6B illustrates transmission of latency-critical reply packets with possible modifications to the IP packets, according to an embodiment of the present disclosure.

In some embodiments, duplicator 250 may create a latency-critical session with associated information to facilitate processing of the reply packets, as discussed with respect to FIG. 6B.

The first copy 301(1) may be sent to ISP 140A over interface 130A and may have source IP:port=5.6.7.8:888 and destination IP:port=91.92.93.94:777 (where 91.92.93.94 is an IP address of latency-oriented proxy 121, and 777 is a port where latency-oriented proxy 121 "listens" for the traffic from latency-oriented routers). The body of first copy 301(1) may include payload1, as well as some optional fields, such as: session_ID (to identify the session to which the packet belongs to the latency-oriented proxy), packet_ID (to facilitate deduplication) and proxy_target (so that the latency-oriented proxy knows where to send the packet). The second copy 301(2) may be sent to ISP 140B over interface 130B and may have source IP:port=9.10.11.12:888. Destination IP:port and body of the second copy 301(2) may be the same as that of the copy 301(1) (this may include the body having the same optional fields as the first copy 301(1)).

Copies 301(1) and 301(2) travel over the Internet (via ISP 140A and ISP 140B respectively) and reach latency-oriented proxy 121. Latency-oriented proxy 121 may receive the packet (for example, by "listening" on a SOCK_RAW or SOCK_DGRAM Berkeley socket) and may pass it to the core 211 of latency-oriented proxy 121.

In some embodiments, within core 211, when the first (by time of arrival) of the copies 301(1) or 301(2) reaches deduplicator 262, a packet 304 may be emitted (and the second copy by time of arrival may be dropped). In some embodiments, deduplicator 262 may create a latency-critical session and/or "virtual interfaces" to facilitate processing of the reply packets, as discussed with respect to FIG. 6B. In some embodiments, as illustrated in FIGS. 6A and 6B, Internet 144 shown to the right of latency-oriented router 121, may be the same as Internet 144 shown to the left of the latency-oriented router 121. In some embodiments, the physical interface (such as Ethernet) on the right side of latency-oriented router 121 may be the same physical interface as the interface on the left side of latency-oriented router 121.

Packet 304 may have source IP:port=91.92.93.94:666 (with 666 being a port where latency-oriented router 121 expects to receive replies from server 180. Such port may be different for each session between latency-oriented router 121 and server 180) and destination IP:port=1.2.3.4.:456. The body of the packet 304 may be payload1. As observed, packet 304 may be identical to packet 301, except for the source IP:port. Packet 304 may arrive to server 180, where packet 304 may be processed in a usual manner.

FIG. 6B illustrates an exemplary transmission of a reply packet, according to an embodiment of the present disclosure. Reply packet 311 may be transmitted in a system similar to that illustrated in FIG. 6A. In some embodiments, reply packet 311 is sent by server 180, with source IP:port=1.2.3.4:456, destination IP:port=91.92.93.94:666 and the body being payload2. On arrival to latency-oriented proxy 121, packet 311 may be sent to duplicator 252, which creates two copies of the packets: 311(1) and 311(2). In one example, these copies may be further sent by the duplicator 252 to different "virtual interfaces" (which may include changing the target IP address of the packet, as described with respect to duplicator 250). These "virtual interfaces" may be associated with the latency-critical session, and both the latency-critical session and the "virtual interfaces" may have been created when packets 301(1) and 301(2) were sent from user device 110 to server 180, as shown in FIG. 6A. In this manner, as "virtual interfaces" may modify target IP and/or target-port, the copies may have different destination IP addresses.

In some embodiments, when sent by the latency-oriented proxy 121, the first copy 311(1) may have source IP:port=91.92.93.94:777 and destination IP:port=5.6.7.8:888 and the packet body may contain session_ID, packet_ID and payload2. The second copy 311(2) may have destination IP:port=9.10.11.12:777 and may have a source IP:port and a body that is the same as the first copy 311(1). When the first-by-time-of-arrival of the copies 311(1) or 311(2) reaches the latency-oriented router 120, a packet 314 may be emitted (and the second copy by time of arrival may be dropped). Packet 314 may have source IP:port=1.2.3.4:456 and destination IP:port=10.0.0.3:123. Note that the destination IP:port of packet 314 may be obtained from a latency-critical session (and/or associated information), which may have been created when the packets 301(1) or 301(2) were travelling from the user device 110 to the server 180, as shown in FIG. 6A. The body of packet 314 may be payload2. As observed, packet 314 may be identical to packet 311, except for the destination IP:port.

In some embodiments, given that packets 301 and 304 are identical except for the source IP address: port, and packets 311 and 314 are identical except for the destination IP:port, neither user device 110 nor server 180 needs to have any knowledge of the changes to the packets made en route. Thus, changes may be needed to the normal operation of user device 110 or server 180 for them to be compatible with the latency-oriented router and latency-oriented proxy. From the perspective of user device 110 and server 180, the system is indistinguishable from NAT and more specifically, from NAPT, despite the observation that NAT/NAPT is implemented in a distributed manner.

Figure 6C:
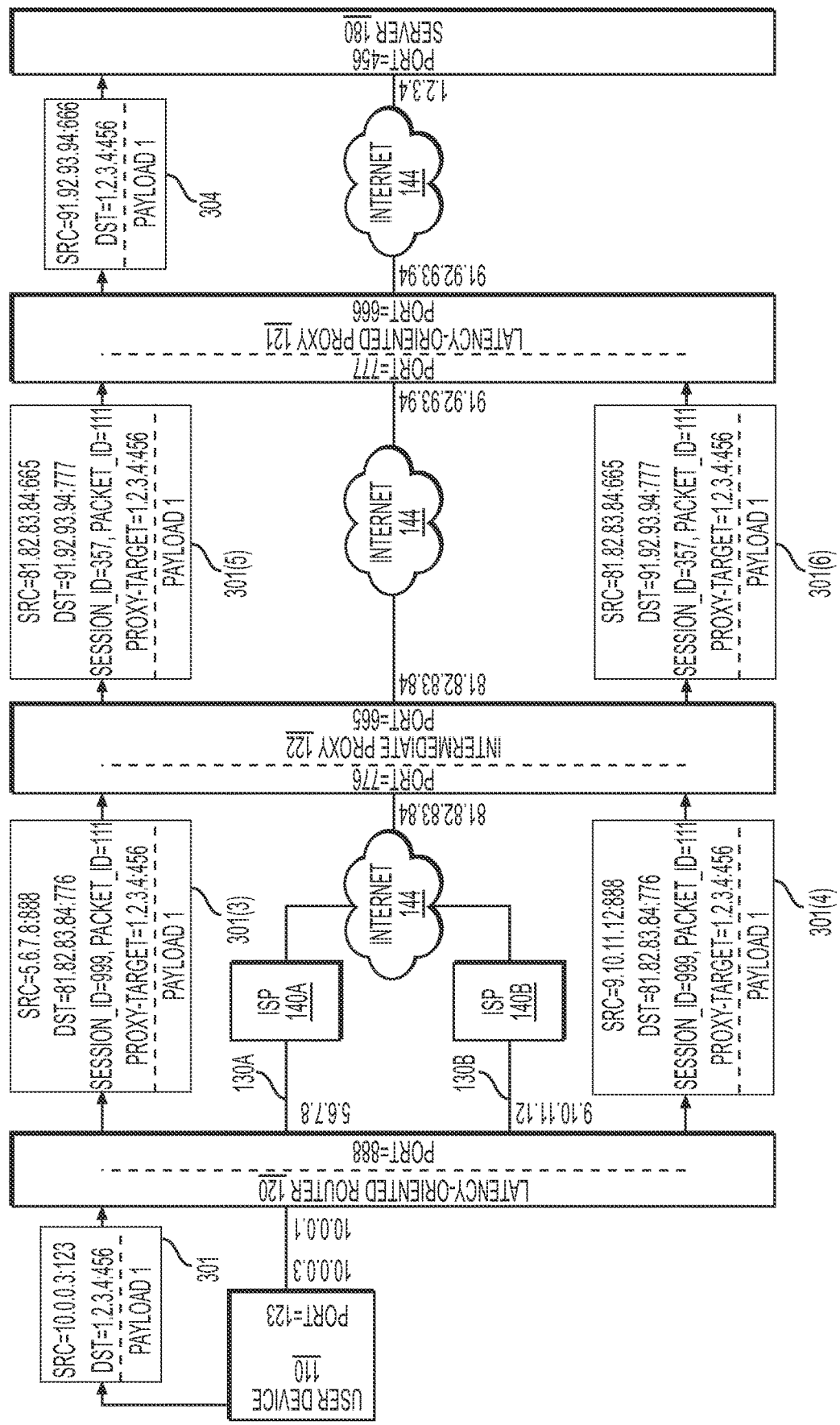
FIG. 6C illustrates transmission of latency-critical reply packets with possible modifications to the IP packets in presence of an intermediate proxy, according to an embodiment of the present disclosure.

FIG. 6C illustrates exemplary modifications to latency-critical IP packets shown in FIG. 6A when intermediate proxy 122 is in the transmission path, according to an embodiment of the present disclosure. Packet modifications shown in FIG. 6C may be performed in embodiments as shown in FIG. 4D. Similar to FIG. 6A and FIG. 6B, all the three Internets 144 in FIG. 6C may be the same.

As substantial parts of the processing of packets in FIG. 6C are similar to that shown in and described with respect to FIG. 6A, only differences from the processing shown in FIG. 6A are described herein. In some embodiments shown in FIG. 6C, latency-oriented router 120, in response to receiving packet 301, may send two copies, 301(3) and 301(4), of the packet to the intermediate proxy 122. The destination IP of both copies 301(3) and 301(4) may be set as an IP address of intermediate proxy 122 (for example, 81.82.83.84 in FIG. 6C), and the destination port of both copies may be set as a port on which the intermediate proxy is ready to receive the packets (for example, port 776 in FIG. 6C). Intermediate proxy 122 may process the first of the packets 301(3) or 301(4) that it receives (by time of arrival) in the deduplicator 262 and then pass the processed packet to the duplicator 250. Duplicator 250 of intermediate proxy 122 may send one or more copies of the packet it receives from deduplicator 262 (shown as 301(5) and 301(6) in FIG. 6C) to latency-oriented proxy 121. The source IP address of both copies 301(5) and 301(6) may be set as an IP address of intermediate proxy 122 (1.82.83.84 in FIG. 6C), and the source IP port of both packets may be set as a port on which intermediate proxy 122 is ready to receive packets (665 in FIG. 6C). The destination IP address and destination port of both copies 301(5) and 301(6) may be set as an IP address of latency-oriented proxy 121 and a port on which the latency-oriented proxy is ready to receive packets (91.92.93.94 and 777, respectively in FIG. 6C). In some embodiments, intermediate proxy 122 may assign a new value for the session_ID field (357 in FIG. 6C), but may retain the same value for the packet_ID field for copies 301(5) and 301(6) (as compared to these values in copies 301(3) and 301(4)). In some embodiments, intermediate proxy 122 may keep the same values for the session_ID and packet_ID fields for copies 301(5) and 301(6) (as compared to these values in copies 301(3) and 301(4)). When received by the latency-oriented proxy 121, copies 301(5) and 301(6) may be processed by the latency-oriented proxy in a manner that is the same or similar as that described with respect to packets 301(1) and 301(2) as shown in FIG. 6A.

It is to be understood that although that the preceding discussion was in reference to two copies, the latency-oriented router 120 and/or intermediate proxy 122 may generate any number of copies of the packets. Additionally, the number of copies of the packets that are transmitted by the latency-oriented router 120 may differ from the number of copies generated by the intermediate proxy 122.

Figure 6D:
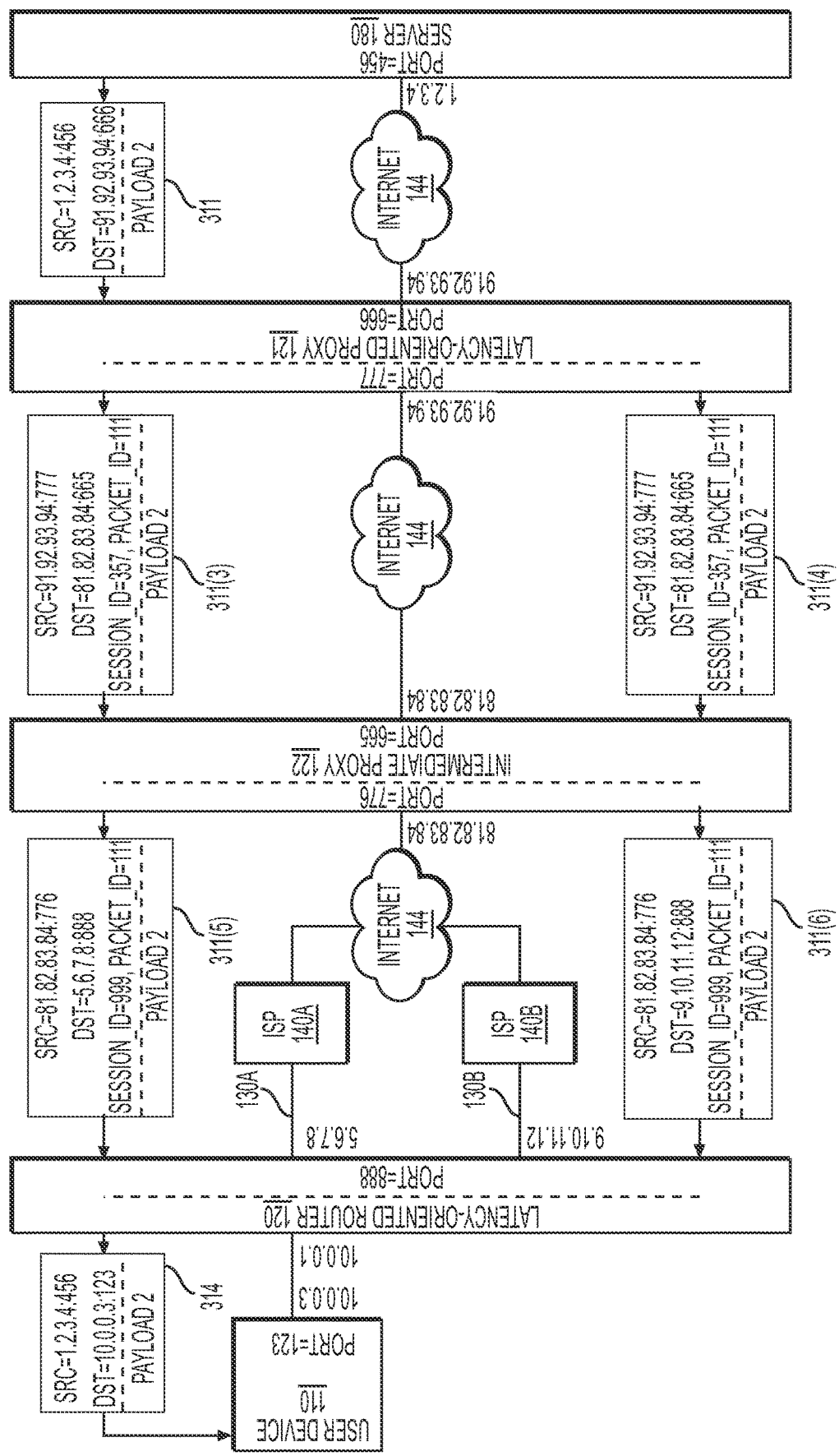
FIG. 6D illustrates transmission of latency-critical reply packets with possible modifications to the IP packets in presence of a proxy router, according to an embodiment of the present disclosure.

FIG. 6D illustrates exemplary modifications to latency-critical reply packets shown in FIG. 6B when intermediate proxy 122 is in the transmission path, according to an embodiment of the present disclosure. Packet modifications shown in FIG. 6D may be performed in embodiments as shown in in FIG. 4D. Similar to FIG. 6C, all the three Internets 144 in FIG. 6D may be the same.

As substantial parts of the processing of packets in FIG. 6D are similar to that shown in and described with respect to FIG. 6B, only differences from the processing shown in FIG. 6B are described herein. In some embodiments, as illustrated in FIG. 6D, latency-oriented proxy 121, in response to receiving packet 311, may send two copies, 311(3) and 311(4), of the packet to intermediate proxy 122. The destination IP of both copies 311(3) and 311(4) may be set as an IP address of intermediate proxy 122 (for example, 81.82.83.84 in FIG. 6D), and the destination port of both packets may be set as a port on which the intermediate proxy is ready to receive the packet (for example, 665 in FIG. 6D). Intermediate proxy 122 may process the first of the packets 311(3) or 311(4) that it receives (by time of arrival) in deduplicator 260 and then pass the processed packet to duplicator 252. Duplicator 252 of intermediate proxy 122 may send one or more copies of the packet it receives from the deduplicator 260 (copies shown as 311(5) and 311(6) in FIG. 6D) to latency oriented router 120. The source IP address of both copies 311(5) and 311(6) may be set as an IP address of intermediate proxy 122 (81.82.83.84 in FIG. 6D), and the source IP port of both packets may be set as a port on which intermediate proxy 122 is ready to receive packets (776 in FIG. 6D). The destination IP address of the packets 311(5) and 311(6) may be set as an IP address of the latency-oriented router 120 (5.6.7.8 and 9.10.11.12, respectively in FIG. 6D), and the destination port of the packets 311(5) and 311(6) may be set as a port on which latency-oriented router 120 is ready to receive packets (888 in FIG. 6D). In some embodiments, intermediate proxy 122 may assign a new value for the session_ID field (999 in FIG. 6D), but may retain the same value for the packet_ID field for copies 311(5) and 311(6) (as compared to these values in copies 311(3) and 311(4)). In some embodiments, intermediate proxy 122 may keep the same values for the session_ID and packet_ID fields for copies 311(5) and 311(6) (as compared to these values in copies 311(3) and 311(4)). When received by latency-oriented router 120, copies 311(5) and 311(6) may be processed by latency-oriented router 120 in a manner that is the same or similar as that described with respect to packets 311(1) and 311(2) as shown in FIG. 6B.

It is to be understood that although that the preceding discussion was in reference to two copies, the latency-oriented proxy 121 and/or intermediate proxy 122 may generate any number of copies of the packets. Additionally, the number of copies of the packets that are transmitted by the latency-oriented proxy 121 may differ from the number of copies generated by the intermediate proxy 122.

Figure 6E:
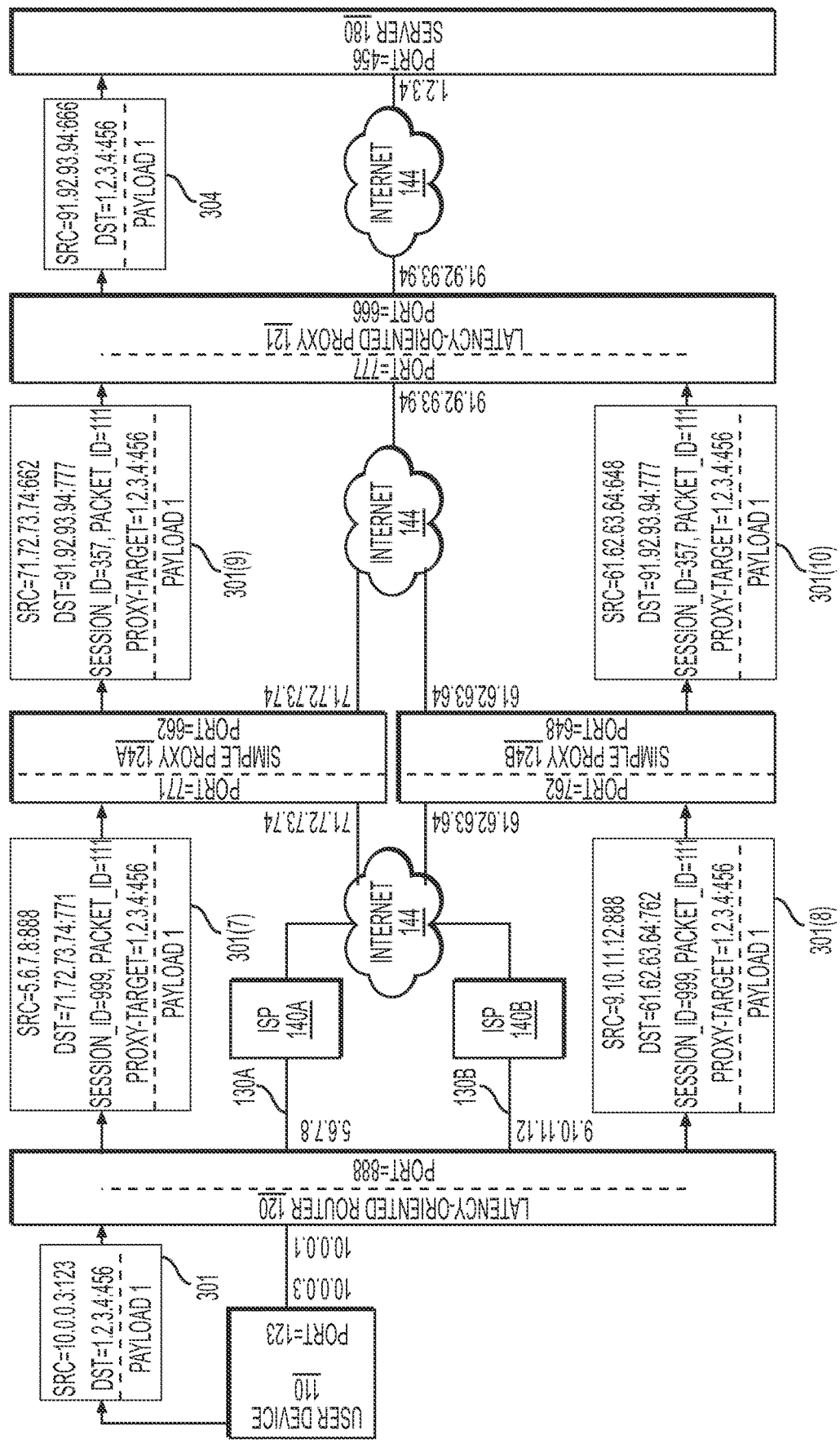
FIG. 6E illustrates transmission of latency-critical reply packets with possible modifications to the IP packets in presence of a simple proxy, according to an embodiment of the present disclosure.

FIG. 6E illustrates exemplary modifications to latency-critical IP packets shown in FIG. 6A when one or more simple proxies 124 are in the transmission path, according to an embodiment of the present disclosure. Packet modifications shown in FIG. 6E may be performed in embodiments shown in FIG. 4G. Similar to FIG. 6C, all the three Internets 144 in FIG. 6E may be the same.

As substantial parts of the processing of packets in FIG. 6E are similar to that shown in and described with respect to FIG. 6A, only differences from the processing shown in FIG. 6A are described herein. In some embodiments, as illustrated in FIG. 6E, latency-oriented router 120, in response to receiving packet 301, may send two copies of the packet, 301(7) and 301(8), to simple proxies 124A and 124B, respectively. The destination IP of the packet 301(7) may be set as an IP address of simple proxy 124A (for example, 71.72.73.74 in FIG. 6E), and the destination port of the packet 301(7) may be set as a port on which the simple proxy 124A is ready to receive packets (for example, port 771 in FIG. 6E). The destination IP of the copy 301(8) may be set as an IP address of simply proxy 124B (for example, 61.62.63.64 in FIG. 6E), and the destination port of the copy 301(8) may be set as a port on which the simple proxy 124B is ready to receive packets (for example, port 762 in FIG. 6E). Each simple proxy 124 may process the respective packet that it receives by sending it to proxy translator 288. The proxy translator of each simple proxy 124 may process its respective packet and then send it to a respective interface 204. The respective interface 204 of each simple proxy 124A and 124B transmits packets 301(9) and 301(10), respectively, to latency-oriented proxy 121. The source IP address of copy 301(9) of the packet may be set as an IP address of the simple proxy 124A (71.72.73.74 in FIG. 6E), and the source IP port of the packet may be set as a port on which simple proxy 124A is ready to receive packets (port 662 in FIG. 6E). The source IP address of copy 301(10) of the packet may be set as an IP address of the simple proxy 124B (61.62.63.64 in FIG. 6E), and the source IP port of the packet may be set as a port on which simple proxy 124B is ready to receive packets (port 648 in FIG. 6E). The destination IP address and destination port of both packets 301(9) and 301(10) may be set as an IP address of latency-oriented proxy 121 and a port on which the latency-oriented proxy is ready to receive packets (91.92.93.94 and 777 respectively in FIG. 6E). In some embodiments, the simple proxies 124 may assign a new value for the session_ID field, but may retain the same value for the packet_ID field for copies 301(9) and 301(10) (as compared to these values in copies 301(7) and 301(8)). In some embodiments, the simple proxies 124 may keep the same values for the session_ID and packet_ID fields for copies 301(9) and 301(10) (as compared to these values in copies 301(7) and 301(8)). When received by latency-oriented proxy 121, copies 301(9) and 301(10) may be processed by the latency-oriented proxy in a manner that is the same or similar as that described with respect to packets 301(1) and 301(2) as shown in FIG. 6A.

Figure 6F:
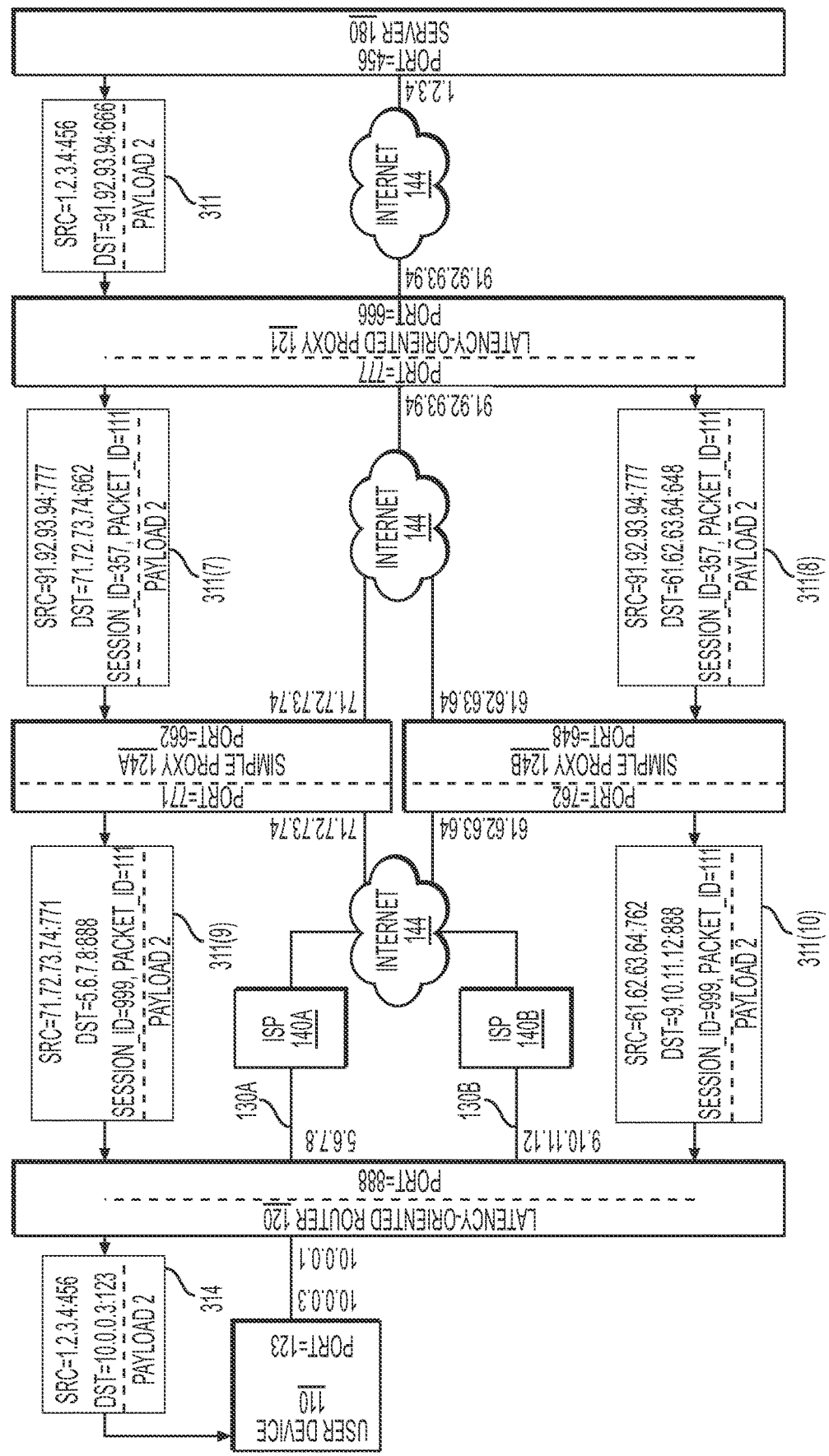
FIG. 6F illustrates transmission of latency-critical reply packets with possible modifications to the IP packets in presence of a simple proxy, according to another embodiment of the present disclosure.

FIG. 6F illustrates exemplary modifications to latency-critical reply packets shown in FIG. 6B when one or more simple proxies 124 are in the transmission path, according to another embodiment of the present disclosure. Packet modifications shown in FIG. 6F may be performed in embodiments as shown in FIG. 4G. Similar to FIG. 6C, all three Internets 144 in FIG. 6F may be the same.

As substantial parts of the processing of packets in FIG. 6F are similar to that shown in and described with respect to FIG. 6B, only difference from the processing shown in FIG. 6B are described herein. In some embodiments, as illustrated in n FIG. 6F, latency-oriented proxy 121, in response to receiving packet 311, may send two copies of the packets, 311(7) and 311(8) to the simple proxies 124A and 124B, respectively. The destination IP of the copy 311(7) may be set as an IP address of the simple proxy 124A (for example, 71.72.73.74 in FIG. 6F), and the destination port of the packet 311(7) may be set as a port on which simple proxy 124A is ready to receive packets (for example, port 662 in FIG. 6F). The destination IP of the copy 311(8) may be set as an IP address of simple proxy 124B (for example, 61.62.63.64 in FIG. 6F), and the destination port of the packet 311(8) may be set as a port on which simple proxy 124B is ready to receive packets (for example, port 648 in FIG. 6F). Each simple proxy 124 may process the respective packet that it receives by sending it to proxy reverse translator 289. The proxy reverse translator of each simple proxy 124 may process its respective packet and then send it to a respective interface 202. The respective interface 202 of each simple proxy 124A and 124B transmits packets 311(9) and 311(10), respectively, to latency-oriented router 120. The source IP address of copy 311(9) of the packet may be set as an IP address of simple proxy 124A (71.72.73.74 in FIG. 6F), and the source IP port of the packet may be set as a port on which simple proxy 124A is ready to receive packets (port 771 in FIG. 6F). The source IP address of copy 311(10) of the packet may be set as an IP address of simple proxy 124B (61.62.63.64 in FIG. 6E), and the source IP port of the packet may be set as a port on which simple proxy 124B is ready to receive packets (port 762 in FIG. 6F). The destination IP address and destination port of packet 311(9) may be set as an IP address of latency-oriented router 120 and a port on which the latency-oriented router is ready to receive packets (5.6.7.8 and 888, respectively in FIG. 6F). The destination IP address and destination port of packet 311(10) may be set as another IP address of latency-oriented router 120 and a port on which the latency-oriented router is ready to receive packets (9.10.11.12 and 888, respectively in FIG. 6F). In some embodiments, simple proxies 124 may assign a new value for the session_ID field, but may retain the same value for the packet_ID field for copies 311(9) and 311(10) (as compared to these values in copies 311(7) and 311(8)). In some embodiments, simple proxies 124 may keep the same values for the session_ID and packet_ID fields for copies 311(9) and 311(10) (as compared to these values in copies 311(7) and 311(8)). When received by latency-oriented router 121, copies 311(9) and 311(10) may be processed by latency-oriented router 121 in a manner that is the same or similar as that described with respect to packets 311(1) and 311(2) as shown in FIG. 6A.

Figure 6G:
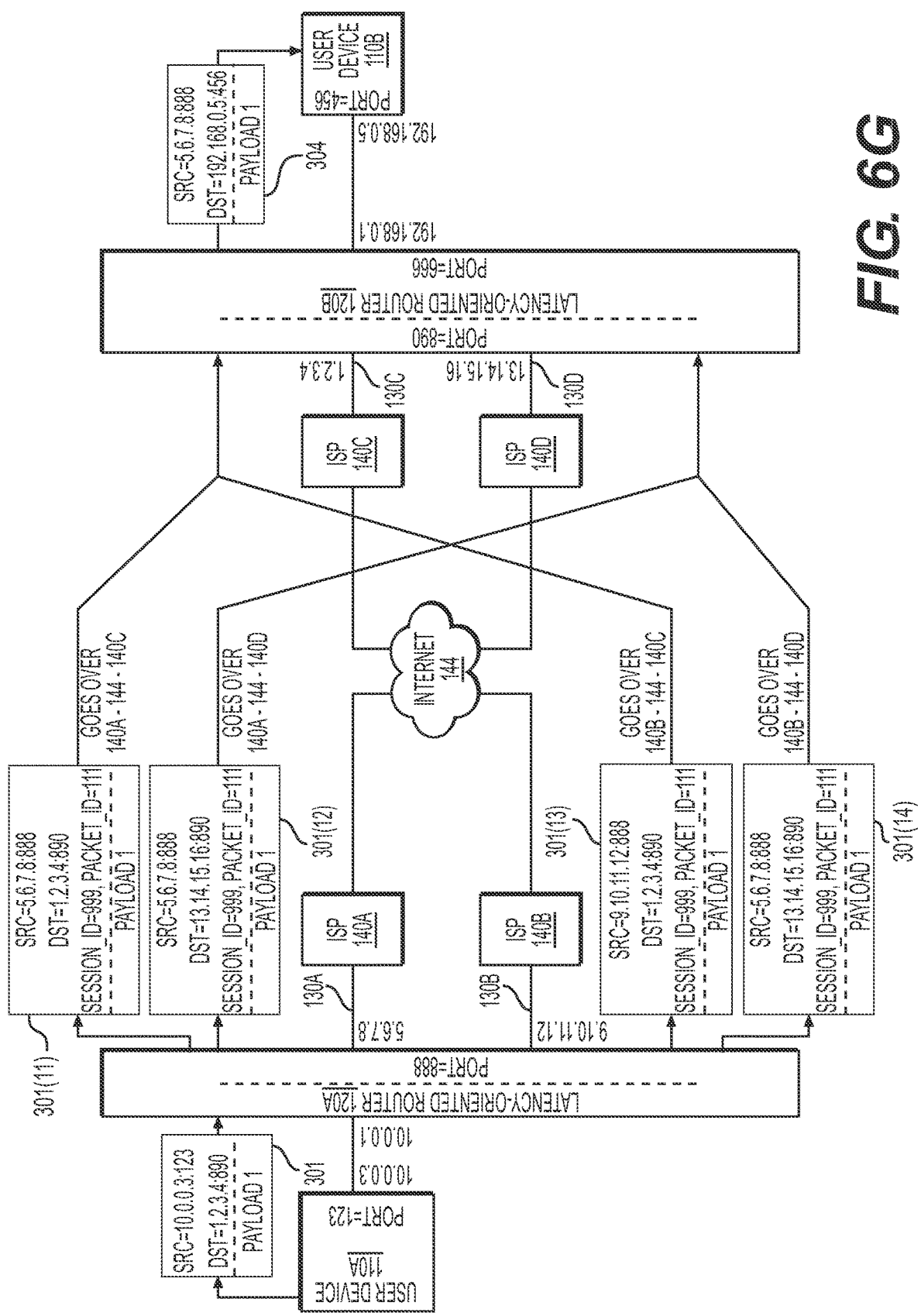
FIG. 6G illustrates transmission of latency-critical reply packets with possible modifications to the IP packets, according to an embodiment of the present disclosure.

FIG. 6G illustrates an exemplary transmission of latency-critical packets with possible modifications to IP packets, according to an embodiment of the present disclosure. Such modification may be performed in embodiments as shown in FIG. 4H.

In the example of FIG. 6G, a user device 110A sends a request with a "payload1" to a user device 110A. User devices 110A and 110B each are "behind" latency-oriented routers 120A and 120B, respectively. It is to be understood that the IP addresses, port numbers, session_ID and packet_ID numbers are exemplary and serve to facilitate the present disclosure and are not otherwise limiting in any manner. User device 110A may send exemplary packet 301 to the user device 110B. Packet 301 may have source IP:port=10.0.0.3:123 and destination port 1.2.3.4:890 and a pocket body consisting of payload1. Packet 301 is transmitted over the network and arrives at latency-oriented router 120A. The latency-oriented router 120A receives the packet over an interface and passes it to core 210. In the present exemplary embodiment, duplicator 250 may create four copies of the original packet 301 (301(11) through 301(14)). Each of the four copies is transmitted to an ISP 140 through one of two interfaces in latency-oriented router 120A. The two interfaces of the latency-oriented router are assumed to have IP addresses 5.6.7.8 and 9.10.11.12. In the embodiment of FIG. 6G, the latency oriented router 120A may use port 888 to receive replies.

In the current exemplary embodiment, the first copy 301(11) of the packet is sent to ISP 140A over the connection 130A and may have a source IP:port=5.6.7.8:888 and a destination IP:port=1.2.3.4:890, corresponding to an IP address of the latency-oriented router 120B and a port on which the latency-oriented router 120B is ready to receive packets from other latency-oriented routers. The second copy 301(11) of the packet may be sent to the same ISP 140A over the same connection 130A, but may have destination IP:port=13.14.15.16:890, corresponding to a second IP address of the latency-oriented router 120B. In some embodiments, the first or second copy may be delayed as described above with respect to duplicator 250.

The third copy 301(13) of the packet may be sent to ISP 140B over the connection 130B and may have a source IP:port=9.10.11.12:888 and a destination IP:port=1.2.3.4:890. The fourth copy 301(14) of the packet may be sent to the same ISP 140B over the same connection 130B, but may have destination IP:port=13.14.15.16:890. The third or fourth copy may be delayed as described above with respect to duplicator 250.

The body of the packets 301(11) through 301(14) each contain payload1. Some or all of the copies 301(11) through 301(14) may optionally further include a session_ID field, a packet_ID field and/or VPORT fields.

Sending two different copies of the same packet (e.g., 301(11) and 301(12), or 301(13) and 301(14)) over the same connection (e.g., 130A or 130B, respectively) may be implemented by using "virtual interfaces". As described above, such "virtual interfaces" may have an associated target_IP address and/or target_port and may change the values of the target_IP address and/or target_port fields of the packet to the values associated with the "virtual interface".

In the exemplary embodiment of FIG. 6G, the transmission path of the packet 301(11) may be via ISP 140A and the Internet and ISP 140C; the transmission path of the packet 301(12) may be via ISP 140A and the Internet and ISP 140D; the transmission path of packet 301(13) may be via ISP 140B and the Internet and ISP 140C; and the transmission path of packet 301(14) may be via ISP 140B and the Internet and ISP 140D. Accordingly, in the embodiment of FIG. 6G, four different copies of the packet 301 may travel over four different paths to reach the same destination. This ensures that at least one of the copies reaches the destination if any of the four paths is operational. Additionally, if there may be probabilistic packet drops along some of the paths (as might occur when AQM routers are present along the transmission path), the chances that at least one of the packets will be delivered is increased.

On the receiving end, one or more of the packets 301(11) through 301(14) may be received by latency-oriented router 120B. Latency-oriented router 120B may "listen" for packets on a SOCK-RAW or SOCK_DGRAM Berkley socket and pass the received packet to its core 210. Within core 210, the first of the received copies 301(11)-301(14) (by time of arrival) may be passed to the deduplicator 260, and eventually, latency-oriented router 120B may transmit a packet 304 containing payload1 to the user device 120B. The second, third and fourth copies of the packet (by time of arrival) may be dropped.

Packet 304 may have source IP:port=5.6.7.8:888 (i.e., the source IP and port number of the latency-oriented router 120A). The port number may be obtained from the VPORT field. Alternatively, the latency oriented router 120B may assign another source port number to the packet 304 using any NAPT technique for selecting the port number or using any port number so long as the port number makes the pair (5.6.7.8: port) unique among all the sessions to which the latency oriented router 120B is a party. The values for the target_IP:port of the packet 304 (e.g., 192.168.0.5:456 in FIG. 6G) may be derived from a record in a "static assignment" table. The "static assignment" table may be obtained from configurator 240. Such "static assignment" table may include a rule that all packets directed to 1.2.3.4:890 are redirected to 192.168.0.5:456.

In an alternative embodiment, the target IP:port of the packet 304 may be determined by trying to match the source IP address and/or port (or VPORT) value in the incoming packet to the target IP address and/or port value in an existing "outgoing" latency-critical session. If such a match is found, then the target_IP:port of the packet 304 may be set to the same value as the source IP:port of the existing "outgoing" session. This technique may facilitate "hole punching" techniques ", which are commonly used for NAT traversal. In some embodiments, protocols such as "classical STUN" or STUN (as described in RFC3489, RFC5389 and/or RFC5766, the entirety of each of which is incorporated herein by reference) may be used in addition to "hole punching" techniques to establish the session between the user devices 110A and 110B.

It should be noted that packet flow in the opposite direction (i.e., packets sent from the user device 110B to the user device 110A) may also use the same technique of sending up to four packets over up to four different paths formed by the two interfaces of the latency-critical router 120B and the two interfaces of the latency-critical router 120A.

It is further to be understood that the embodiment with respect to FIG. 6G may be generalized as an N×M packet transmission schema, wherein one communication device has N interfaces and the other communication device has M interfaces (where N and M are integers equal or greater than one, and where N and M need not be the same integer). In such a schema, up to N×M different paths may be formed between the interfaces. Devices may send copies of packets over some or all of the paths of such matrix by selecting the interfaces over which to send a copy of the packet and destination address of the copy.

It is also within the scope of the present disclosure to include one or more proxies (such as latency-critical proxy 121, intermediate proxy 122 and/or simple proxy 124) between the latency-oriented routers 120A and 120B. In such an embodiment, the latency routers 120 may optionally use the public IP address of the proxy(ies) to establish a communication link, instead of (or in addition to) relying on "hole punching" techniques. It is also within the scope of the present disclosure for one or more of the proxy (ies) to implement a Traversal Using Relays around NAT (TURN) server as described in RFC5766.

It is to be understood that the technique of transmitting multiple copies of a packet over multiple ISPs is not limited to embodiments in which a latency-oriented router communicates with another latency-oriented router (as discussed with respect to FIG. 6G) but may be used with any of the embodiments discussed herein including, but not limited to, embodiments in which a latency-oriented router communicates with a latency-oriented proxy.

Figure 7A:
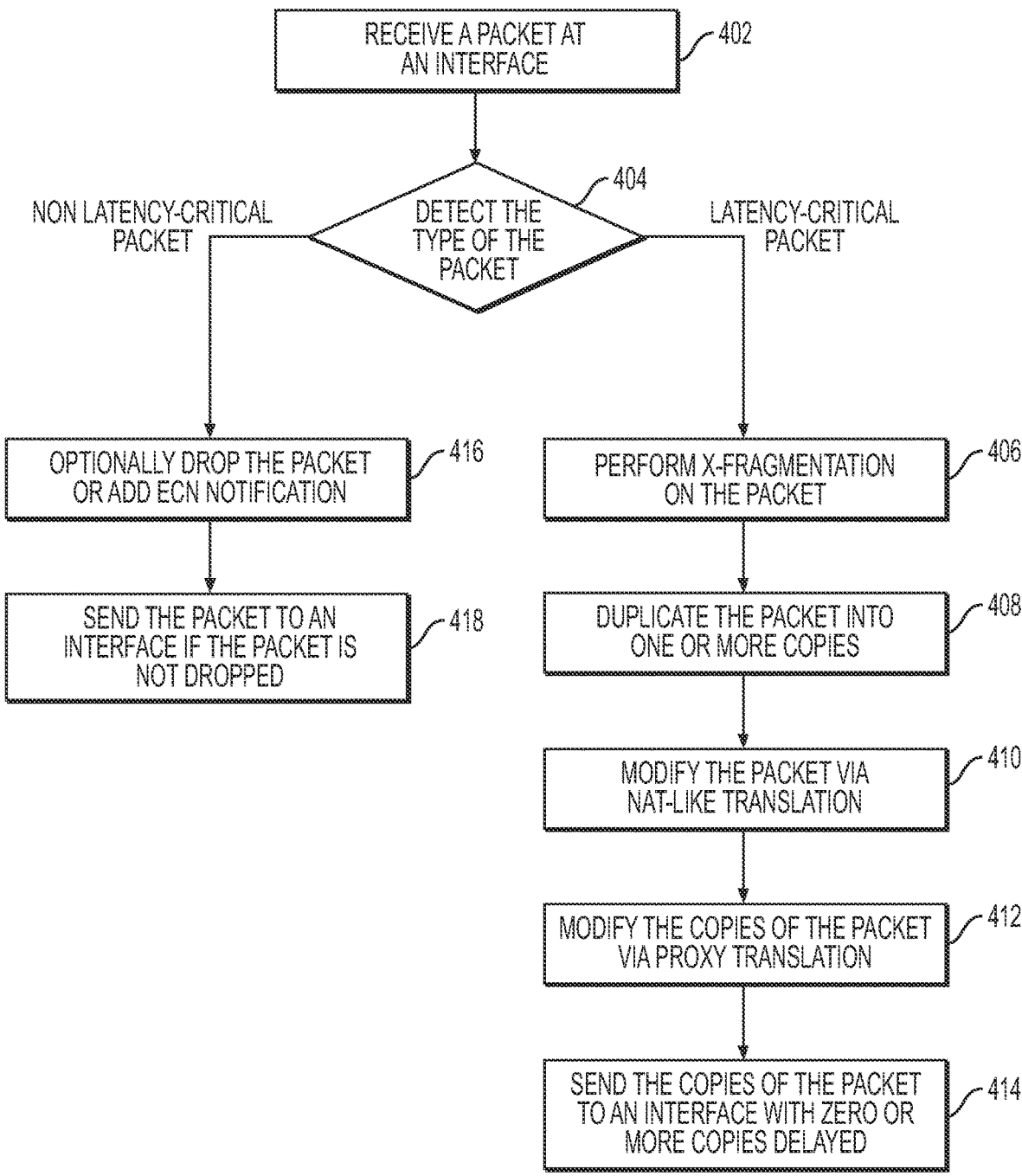
FIG. 7A is a flow diagram illustrating an exemplary operation method of a latency-oriented router, according to an embodiment of the present disclosure.

FIG. 7A is a flow diagram illustrating an exemplary operation method of latency-oriented router 120, according to an embodiment of the present disclosure. For ease of explanation, method 400 will be described with respect to latency-oriented router 120 of FIG. 5A, as described above and for a situation in which a packet is received on interface(s) 202. However, method 400 is not intended to be limited thereto.

At stage 402, a packet may be received from user device 110 at one of interfaces 202. At stage 404, the type of the incoming packet may be determined. Outgoing detector 220 may determine if the packet belongs to latency-critical traffic or other traffic. If the packet belongs to latency-critical traffic, the method may proceed to stage 406. If it belongs to "other traffic", the method may proceed to stage 416.

At stage 406, "X-Fragmentation" may be performed on the packet. At stage 408, the packet may be duplicated to generate one or more copies. Duplicator 250 may create one or more copies of the packet, intended for one or more interfaces 204. In some embodiments, there may be N copies intended for M different interfaces, where N and M are any integer greater than zero (and some of the interfaces may get more than one copy).

At stage 410, the copies may be modified by performing "NAT-like translation" on them. At stage 412, the copies may be modified by performing "proxy translation" on them. At stage 414, some or all of the duplicated copies of the packets may be optionally delayed (including spreading them over certain time interval), and each copy may then be sent to one of interfaces 204.

Upon a determination at stage 404 that the incoming packet belongs to "other traffic", at stage 416 it may be determined whether to drop the packet, to modify it to include ECN notification or to leave the packet without modifications. Outgoing traffic controller 270 may make such a determination based on results of "potential issues detection" techniques. As a result, the packet may be dropped, ECN modification may be added, or the packet may be kept intact. If the packet is not dropped, at stage 418 the packet may be sent to one of interfaces 204.

Figure 7B:
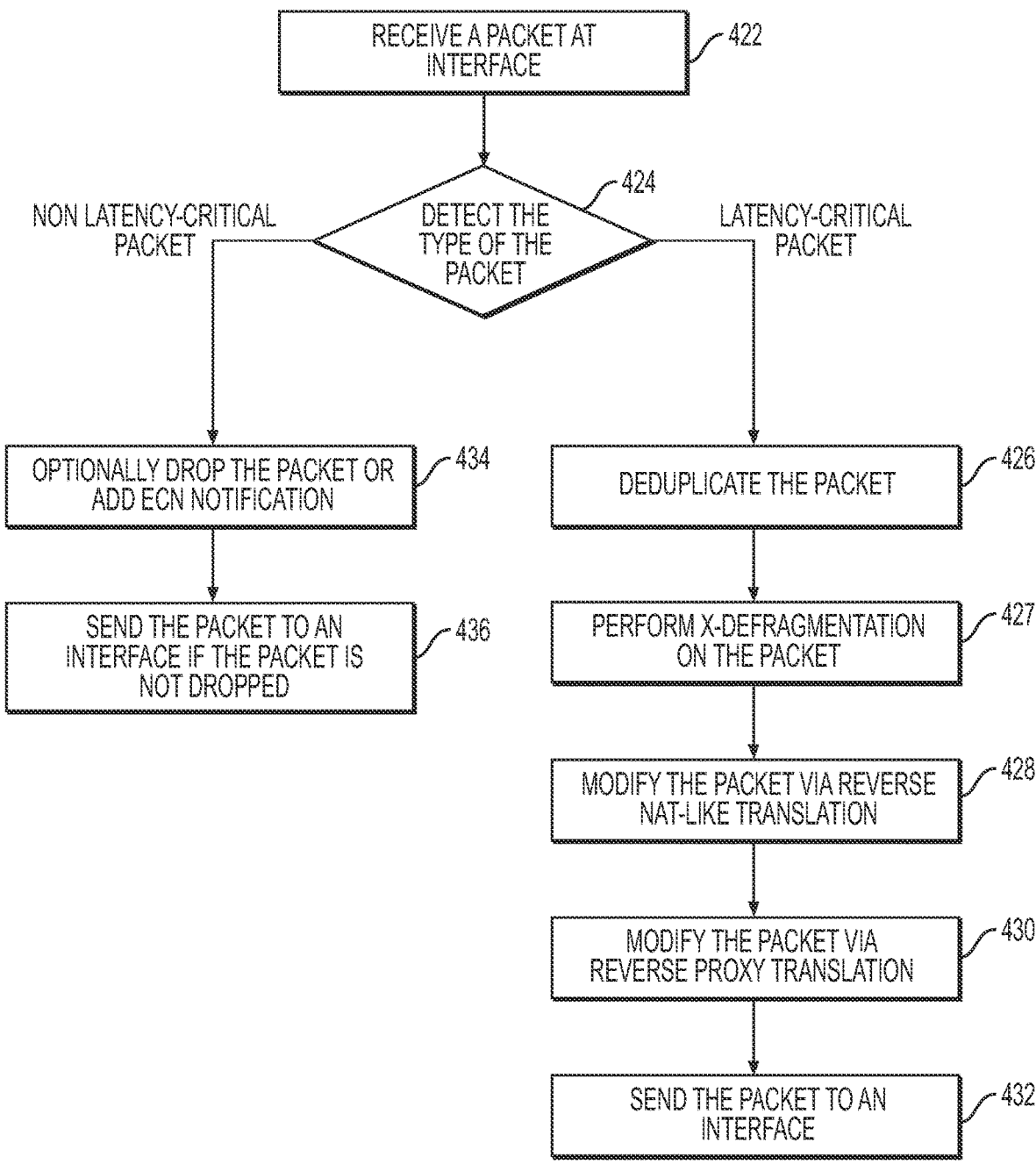
FIG. 7B is a flow diagram illustrating an exemplary operation method of a latency-oriented router, according to another embodiment of the present disclosure.

FIG. 7B is a flow diagram illustrating an exemplary operation method of latency-oriented router 120, according to another embodiment of the present disclosure. For ease of explanation, method 420 will be described with respect to latency-oriented router 120 of FIG. 5A, as described above and for a situation in which a packet is received on interface(s) 204. However, method 420 is not intended to be limited thereto.

At stage 422, a packet may be received from server 180 at one of the interfaces 204. At stage 424, incoming detector 230 may determine whether the packet belongs to "latency-critical traffic" or to "other traffic". If the packet belongs to latency-critical traffic, the method may proceed to stage 426. If it belongs to "other traffic", the method may proceed to stage 434.

At stage 426, the packet may be deduplicated (e.g., dropping extra copies as applicable). Such deduplication may be performed by the deduplicator 260 using the packet_ID in a manner similar as described above. At stage 427, X-Defragmentation may be performed on the packet. At stage 428, the packet may be modified by performing "reverse NAT-like translation". At stage 430, the packet may be modified by performing "reverse proxy translation". At stage 432, the packet may be sent to one of interfaces 202.

Upon a determination at stage 424 that the incoming packet belongs to "other traffic", at stage 434 it may be determined whether to drop the packet, to modify it to include ECN notification or to leave the packet without modifications. Incoming traffic controller 271 may make such a determination based on results of "potential issues detection" techniques. As a result, the packet may be dropped or ECN modification may be added, or the packet may be kept intact. If the packet is not dropped, at stage 436, the packet may be sent to one of interfaces 202.

Figure 7C:
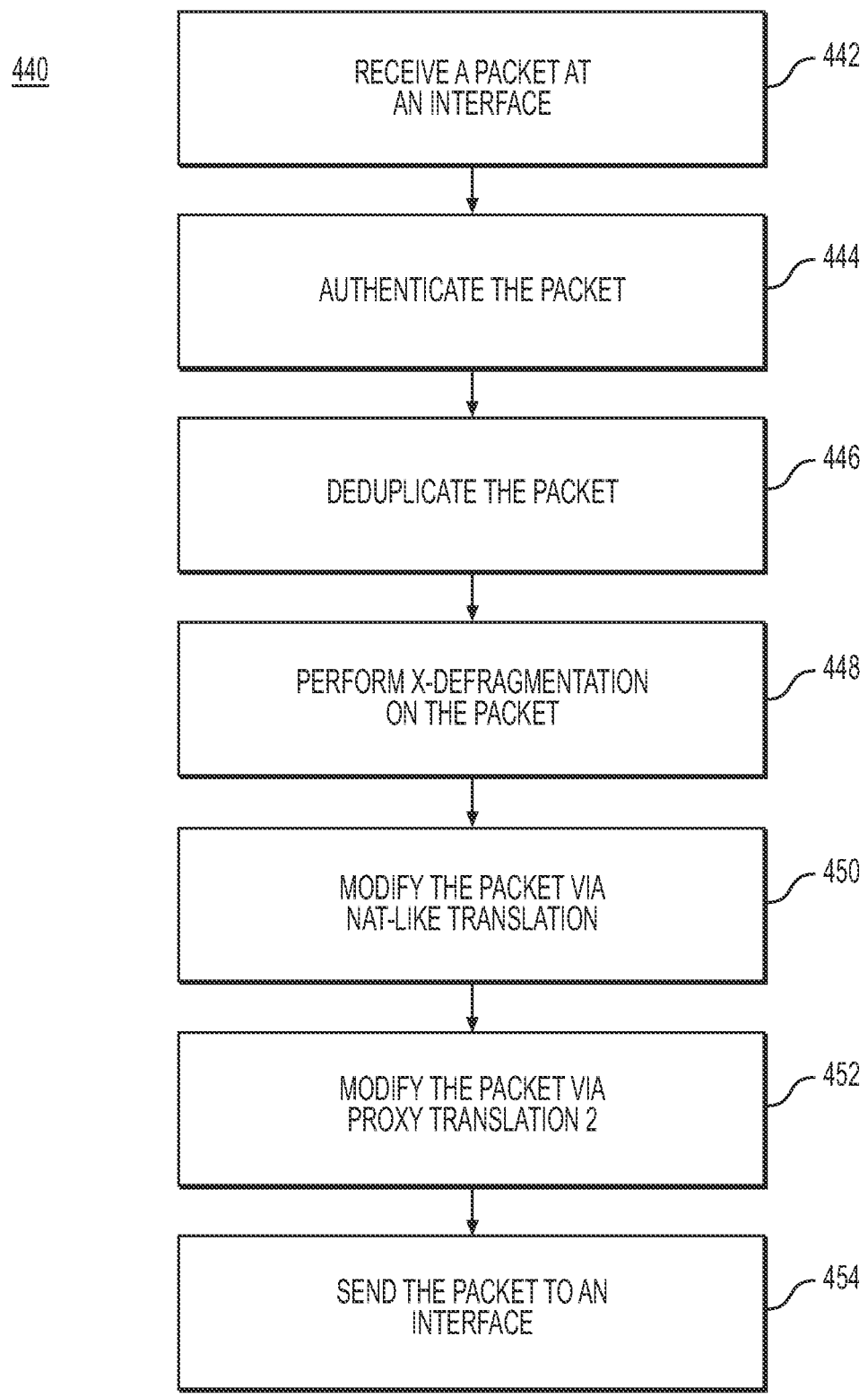
FIG. 7C is a flow diagram illustrating an exemplary operation method of a latency-oriented proxy, according to an embodiment of the present disclosure.

FIG. 7C is a flow diagram illustrating an exemplary operation method of latency-oriented proxy 121, according to an embodiment of the present disclosure. For ease of explanation, method 440 will be described with respect to latency-oriented proxy 121 of FIG. 5B, as described above and for a situation in which a packet is received on interface(s) 204. However, method 440 is not intended to be limited thereto.

At stage 442, a packet may be received at one of the interfaces 204. At stage 444, the packet may be authenticated. The authentication maybe performed by authenticator 282. At stage 446, the packet may be deduplicated (e.g., dropping extra copies as applicable). Such deduplication may be performed by the deduplicator 262 using the packet_ID in a manner similar as described above. At stage 448, X-Defragmentation may be performed on the packet. At stage 450, the packet may be modified by performing "NAT-like translation". At stage 452, the packet may be modified by performing "proxy translation 2". At stage 454, the packet may be sent to one of interfaces 202.

Figure 7D:
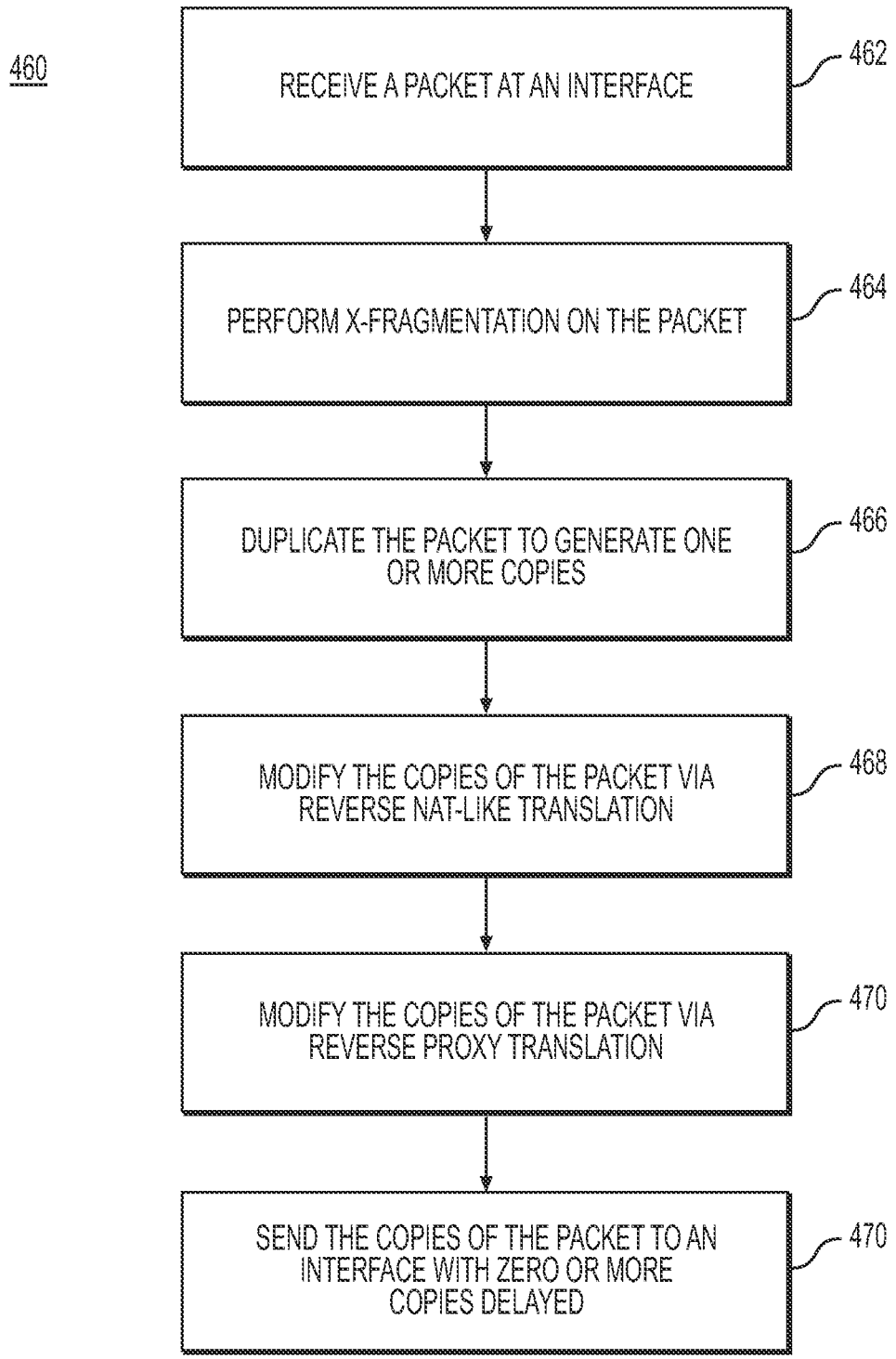
FIG. 7D is a flow diagram illustrating an exemplary operation method of a latency-oriented proxy, according to another embodiment of the present disclosure.

FIG. 7D is a flow diagram illustrating an exemplary operation method of latency-oriented proxy 121, according to another embodiment of the present disclosure. For ease of explanation, method 460 will be described with respect to latency-oriented proxy 121 of FIG. 5B, as described above and for a situation in which a packet is received on interface(s) 202. However, method 460 is not intended to be limited thereto.

At stage 462, a packet may be received at one of the interfaces 202. At stage 464, "X-Fragmentation" may be performed on the packet. At stage 466, the packet may be duplicated to generate one or more copies. Such duplication may be performed by the duplicator 252 intended for one or more interfaces 204. In some embodiments, there may be N copies intended for M different interfaces and some of the interfaces may get more than one copy. At stage 468, the one or more copies of the packet may be modified by performing "reverse NAT-like translation". At stage 470, one or more copies of the packet may be modified by performing "reverse proxy translation". At stage 472, some or all of the duplicated copies may be optionally delayed (e.g., spreading them over certain time interval), and each copy may be then sent to one of interface(s) 204.

Figure 7E:
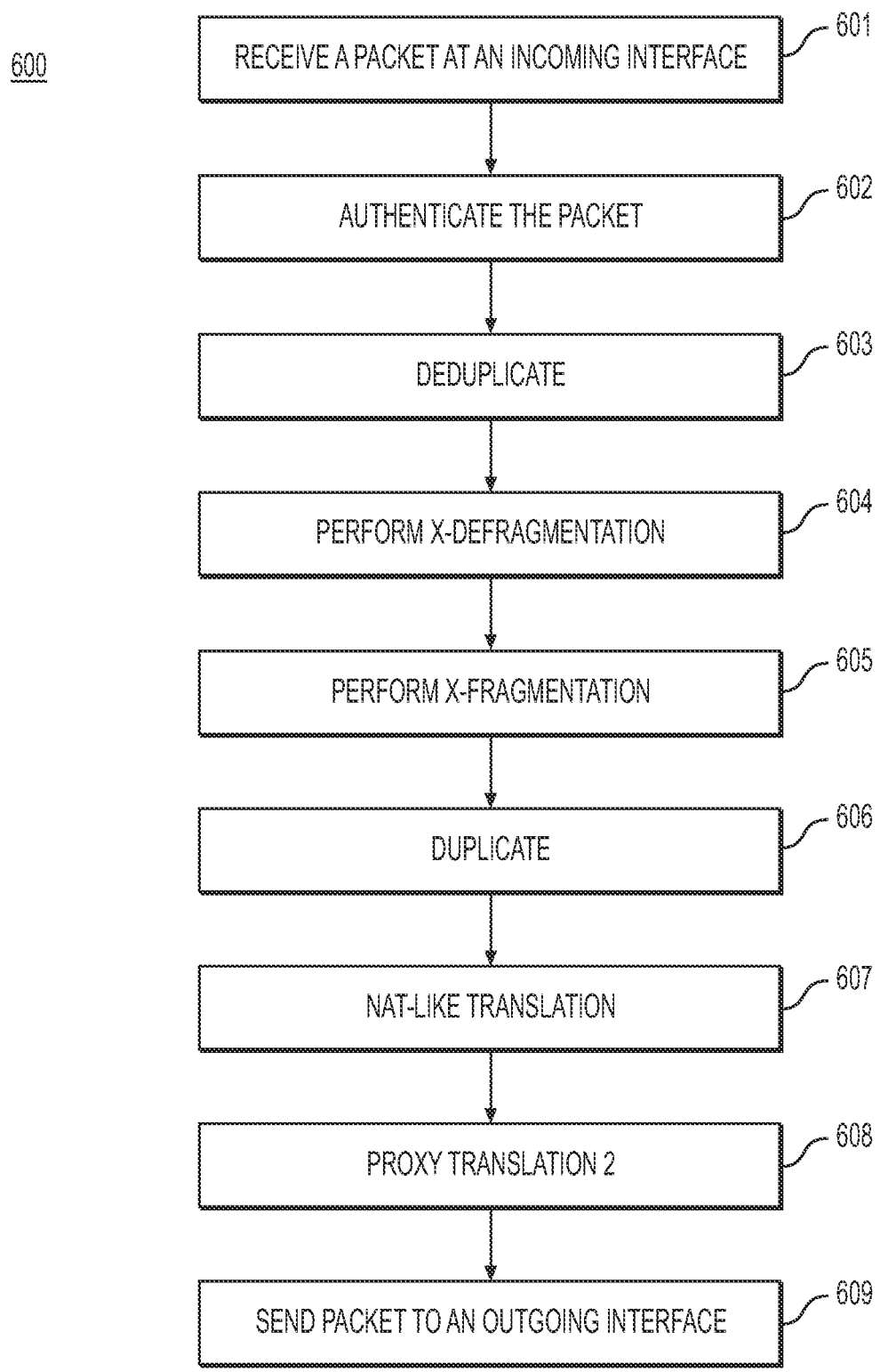
FIG. 7E is a flow diagram illustrating an exemplary operation method of an intermediate proxy, according to an embodiment of the present disclosure.

FIG. 7E is a flow diagram illustrating an exemplary operation method of intermediate proxy 122, according to an embodiment of the present disclosure. For ease of explanation, method 600 will be described with respect to intermediate proxy 122 of FIG. 5C, as described above and for a situation in which a packet is received on interface(s) 202. However, method 600 is not intended to be limited thereto.

At stage 601, one or more copies of a packet may be received at one of interface(s) 202. At stage 602, the one or more copies of the packet may be authenticated by authenticator 282. At stage 603, the one or more copies of the packet may be deduplicated (e.g., dropping extra copies as applicable). Such deduplication may be performed by the deduplicator 262 using the packet_ID in a manner similar to that described above. At stage 604, X-Defragmentation may be performed on the deduplicated packet. X-Defragmentation may be performed by deduplicator 262. At stage 605, X-Fragmentation may be performed on the packet by duplicator 250. At stage 606, the packet may be duplicated to generate one or more copies. Such duplication may be performed by duplicator 250 with copy(ies) intended for one or more interfaces 204. In some embodiments, there may be N copies intended for M different interfaces and some of the interfaces may get more than one copy. At stage 607, the one or more copies of the packet may be modified by performing "NAT-like translation". At stage 608, the one or more copies of the packet may be modified by performing "proxy translation 2". At stage 609, some or all of the duplicated copies may be optionally delayed (e.g., spreading them over certain time interval), and each copy may be then sent to one of interface(s) 204.

Figure 7F:
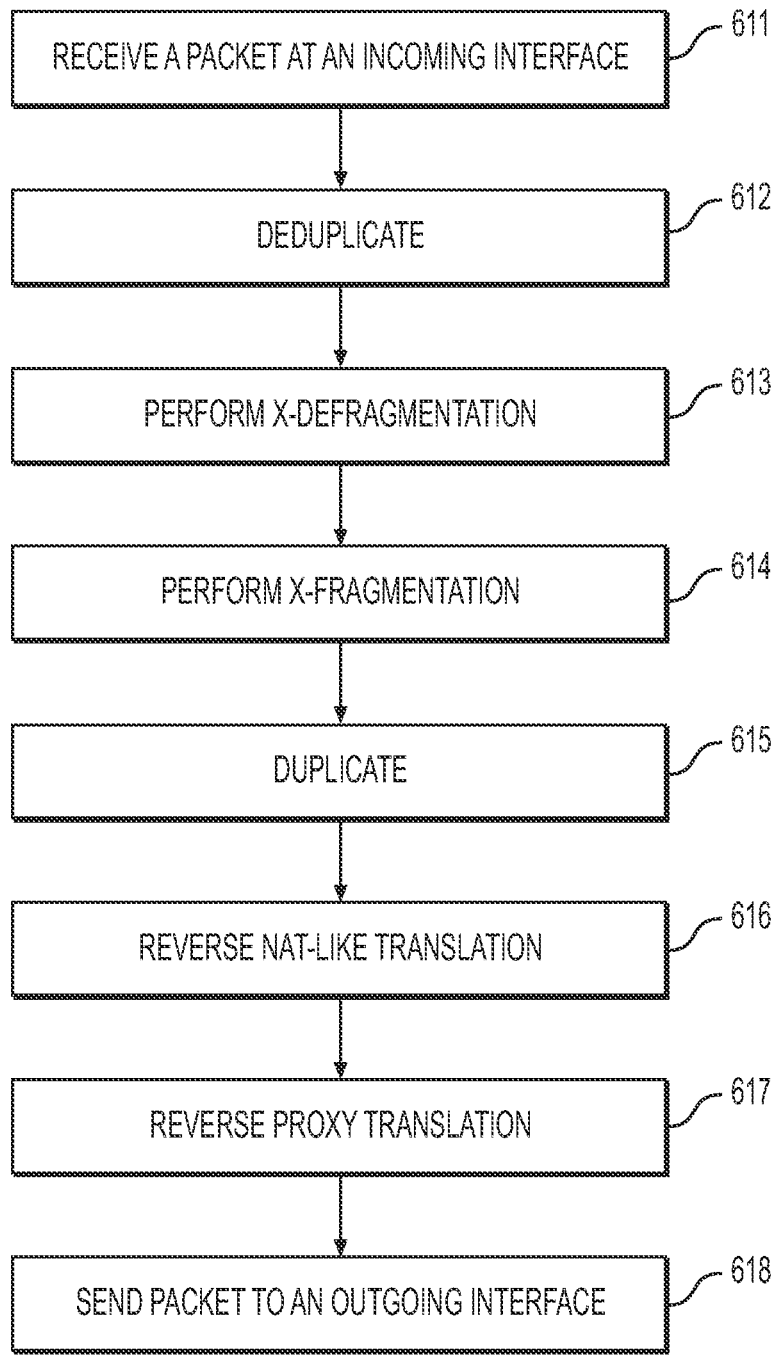
FIG. 7F is a flow diagram illustrating an exemplary operation method of an intermediate proxy, according to another embodiment of the present disclosure.

FIG. 7F is a flow diagram illustrating an exemplary operation method of intermediate proxy 122, according to another embodiment of the present disclosure. For ease of explanation, method 610 will be described with respect to intermediate proxy 122 of FIG. 5C, as described above and for a situation in which a packet is received on interface(s) 204. However, method 610 is not intended to be limited thereto.

At stage 611, one or more copies of a packet may be received at one of the interface(s) 204. At stage 612, the one or more copies of the packet may be deduplicated (e.g., dropping extra copies as applicable). Such deduplication may be performed by the deduplicator 260 using the packet_ID in a manner similar to that described above. At stage 613, X-Defragmentation may be performed on the packet. X-Defragmentation may be performed by deduplicator 260. At stage 614, X-Fragmentation may be performed on the packet. At stage 615, the packet may be duplicated to generate one or more copies. Such duplication may be performed by the duplicator 252 with copy(ies) intended for one or more interface(s) 202. In some embodiments, there may be N copies intended for M different interfaces and some of the interfaces may get more than one copy. At stage 616, the one or more copies of the packet may be modified by performing "reverse NAT-like translation". At stage 617, the one or more copies of the packet may be modified by performing "reverse proxy translation". At stage 618, some or all of the duplicated packets may be optionally delayed (e.g., spreading them over certain time interval), and each copy may be then sent to one of interface(s) 202.

Figure 7G:
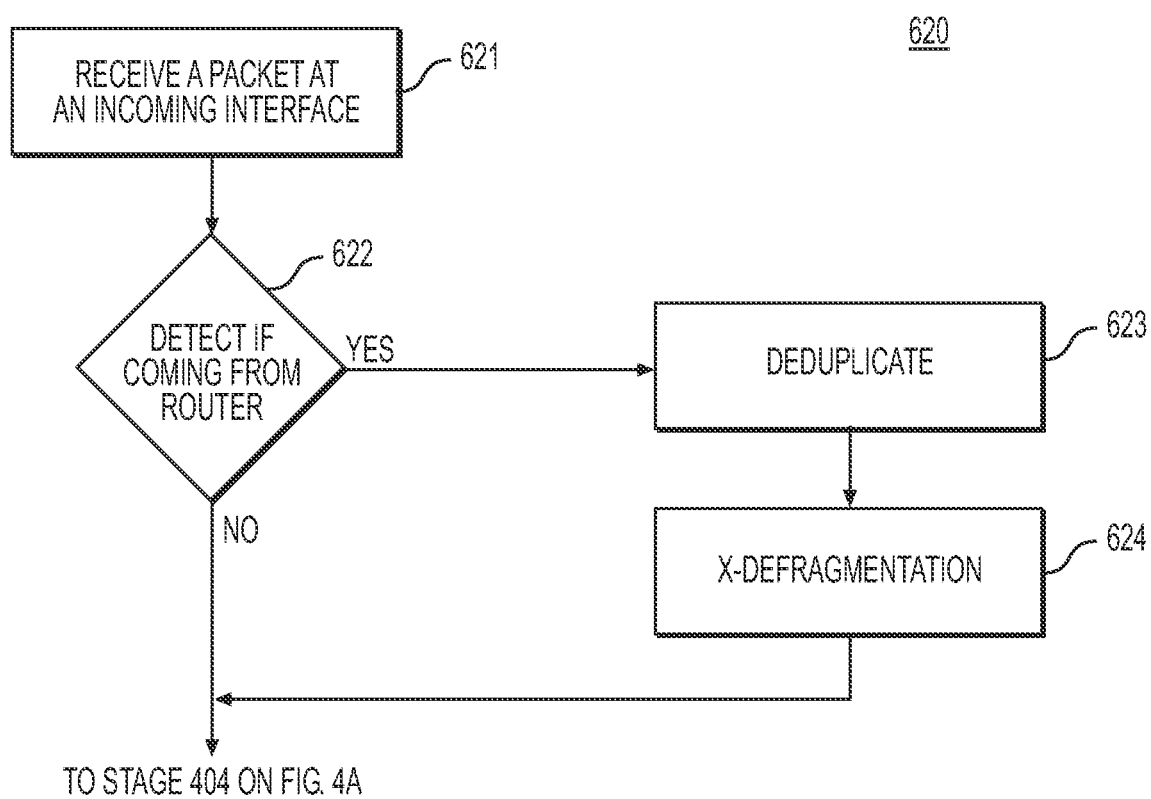
FIG. 7G is a flow diagram illustrating an exemplary operation method of a proxy router, according to an embodiment of the present disclosure.

FIG. 7G is a flow diagram illustrating an exemplary operation method of proxy router 123, according to an embodiment of the present disclosure. For ease of explanation, method 620 will be described with respect to proxy router 123 of FIG. 5D, as described above and for a situation in which a packet is received on interface(s) 202. However, method 620 is not intended to be limited thereto.

At stage 621, one or more packets may be received at one of the interface(s) 202. At stage 622, the proxy router may determine, using outgoing detector 220, whether the one or more packets were sent from latency-oriented router 120. If at stage 622 it is determined that the one or more packets were sent from latency-oriented router 120, at stage 623, the one or more packets may be deduplicated (e.g., dropping extra copies as applicable). At stage 624, "X-Defragmentation" may be performed on the packet. The process may then proceed to stage 404 of FIG. 7A to determine the type of the packet. The packet may then continue to be processed by the proxy router 123 according to stages 406-418 of FIG. 7A.

Upon a determination at stage 622 that the one or more packets received at interface(s) 202 were not sent from a latency-oriented router, the process may then proceed to stage 404 of FIG. 7A to determine the type of the packet. The packet may then continue to be processed by the proxy router 123 according to stages 406-418 of FIG. 7A.

Figure 7H:
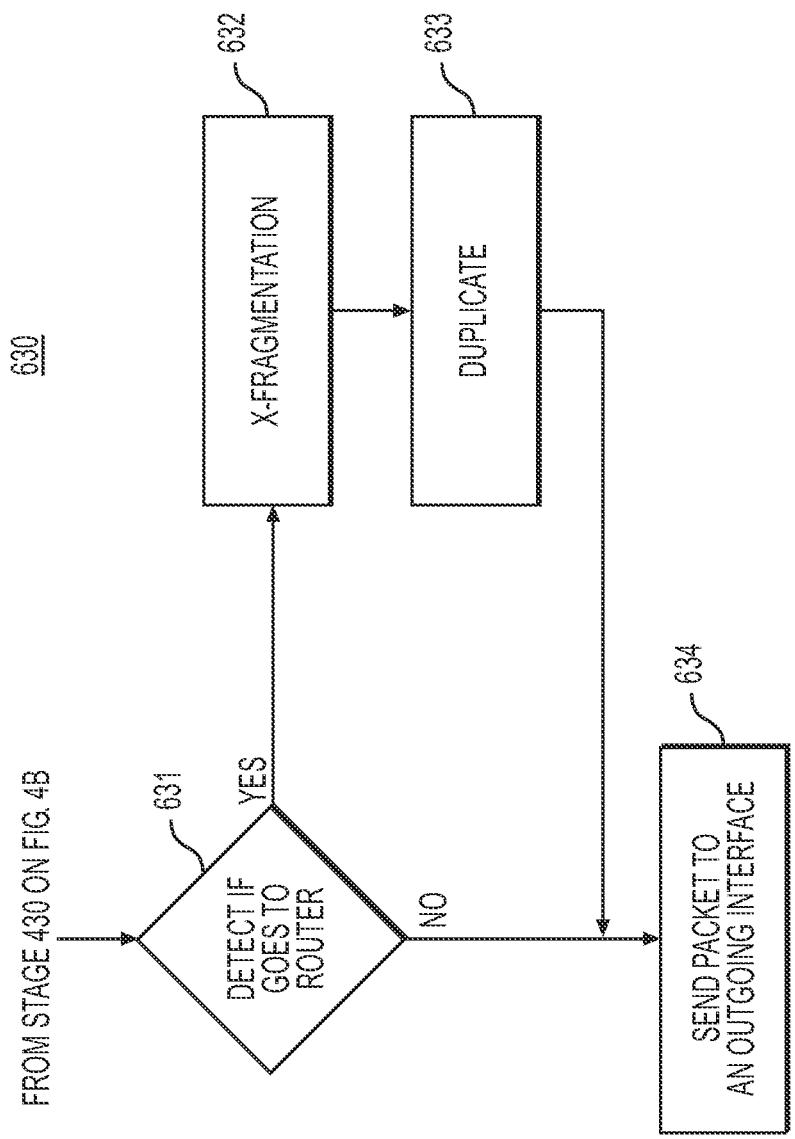
FIG. 7H is a flow diagram illustrating an exemplary operation method of a proxy router, according to another embodiment of the present disclosure.

FIG. 7H is a flow diagram illustrating an exemplary operation method of proxy router 123, according to another embodiment of the present disclosure. For ease of explanation, method 630 will be described with respect to proxy router 123 of FIG. 5D, as described above and for a situation in which a packet is received on interface(s) 204. However, method 620 is not intended to be limited thereto.

Method 630 continues from stage 430 of the method of FIG. 7B. In other words, when a packet is received at interface(s) 204 of the proxy router 123, it is determined whether the packet belongs to latency-critical traffic (see stage 424 of FIG. 7B). If the packet belongs to latency-critical traffic, then the proxy router 123 performs stages 426 through 430 as set out in and described with respect to FIG. 7B. After the proxy router 123 performs stage 430 as set out in FIG. 7B, it then may proceed to stage 631 in FIG. 7H to determine whether the packet should be sent to a latency-oriented router. This may be implemented by checking whether the session to which the packet belongs is a session from a latency-oriented router. If at stage 631 it is determined that the packet should be sent to a latency-oriented router, at stage 632 X-Fragmentation may be performed on the packet. At stage 633, the packet may be duplicated to generate one or more copies. In some embodiments, there may be N copies intended for M different interfaces and some of the interfaces may get more than one copy. At stage 634, some or all of the duplicated copies may be optionally delayed (e.g., spreading them over certain timer interval), and each copy may be then sent to one of the interface(s) 202.

Upon a determination at stage 631 that the packet should not be sent to a latency-oriented router, at stage 634 the packet may be sent to one of the interface(s) 202.

Figure 7I:
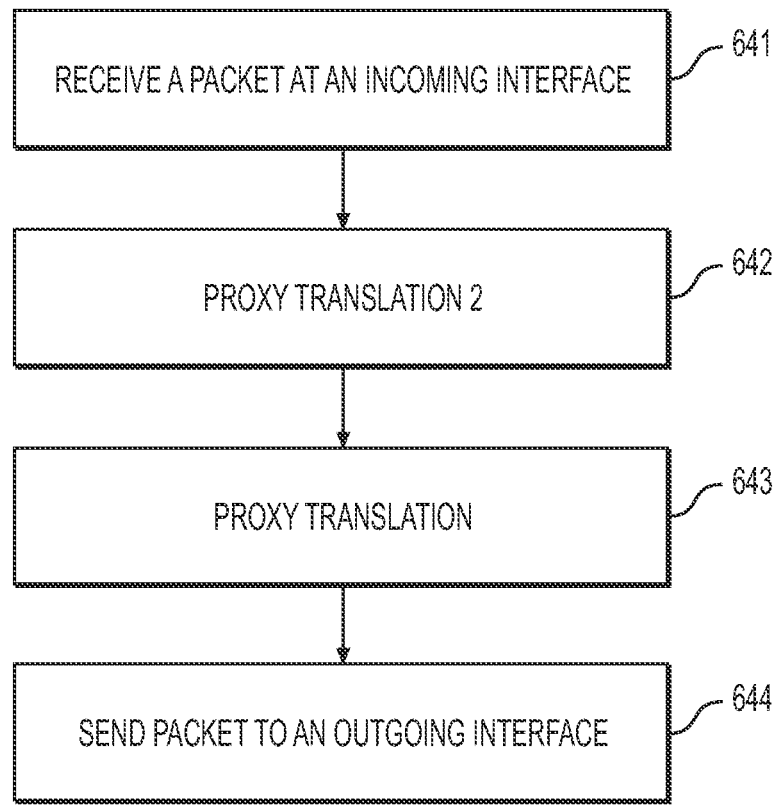
FIG. 7I is a flow diagram illustrating an exemplary operation method of a simple proxy, according to an embodiment of the present disclosure.

FIG. 7I is a flow diagram illustrating an exemplary operation method of simple proxy 124, according to an embodiment of the present disclosure. For ease of explanation, method 640 will be described with respect to simple proxy 124 of FIG. 5E, as described above and for a situation in which a packet is received on interface(s) 202. However, method 640 is not intended to be limited thereto.

At stage 641, a packet may be received at one of the interface(s) 202. At stage 642, the packet may be modified by performing "proxy translation 2". At stage 643, the packet may be modified by performing "proxy translation". At stage 634, the packet may be sent to one of interface(s) 204.

Figure 7J:
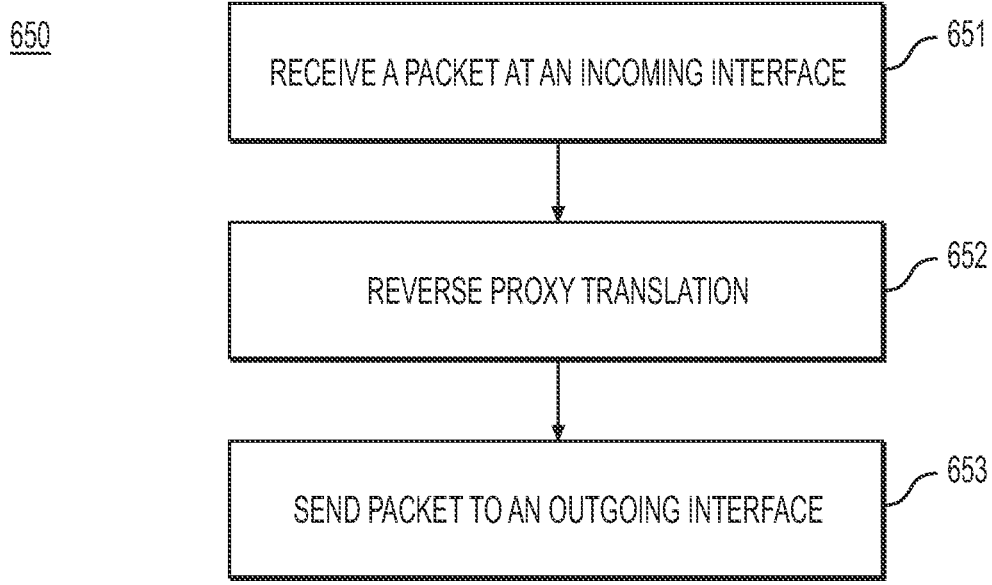
FIG. 7J is a flow diagram illustrating an exemplary operation method of a simple proxy, according to another embodiment of the present disclosure.

FIG. 7J is a flow diagram illustrating an exemplary operation method of simple proxy 124, according to another embodiment of the present disclosure. For ease of explanation, method 650 will be described with respect to simple proxy 124 of FIG. 5E, as described above and for a situation in which a packet is received on interface(s) 204. However, method 650 is not intended to be limited thereto.

At stage 651, a packet may be received at one of interface(s) 204. At stage 652, the packet may be modified by performing "reverse proxy translation". Reverse proxy translator 289 may perform "reverse proxy translation". At stage 653, the packet may be sent to one of interface(s) 202.

In some embodiments, packets such as, without limitation, IP, TCP and/or UDP packets may be transferred using "latency-optimized UDP-over-TCP" as described below. This technique may be particularly useful in the event using a UDP connection presents latency advantages, but a UDP connection between the relevant communicating points is not available (for example, because of firewalls blocking a UDP connection). It is to be understood that, within the context of present disclosure, "latency-optimized UDP-over-TCP" may be used whenever sending packets, including, but not limited to, IP, TCP and/or UDP packets is mentioned, especially for packets sent between latency-oriented router 120 and any of the proxies such as, without limitation, a simple proxy, intermediate proxy or latency-oriented proxy.

In some embodiments, "latency-optimized UDP-over-TCP" may be implemented as follows. On the sending side, each "forwarded packet" which is provided by an upper OSI layer (such as, without limitation, an application layer) for sending may be sent within a TCP packet, which may involve "wrapping" of the whole "forwarded packet" or some parts thereof, such as payload. Such TCP packets may be formed according to RFC793 and may include options according to any other RFCs on TCP, including, but not limited to, RFC2018 and/or RFC7323, the entirety of both of which is incorporated herein by reference. Such formation of TCP packets may include formatting all the fields of the corresponding TCP header according to RFC793. In some embodiments, the logic of TCP stack as described in RFC793 and/or established TCP practices may be modified in one or more of the following ways. First, each of the "forwarded packets" may cause the sender to send a TCP packet (this may include not using Nagle's algorithm). Second, the sender may avoid combining "forwarded packets" with other portions of the TCP stream, keeping a one-to-one correspondence between the "forwarded packets" and TCP packets. Third, retransmit packet policies may vary from established TCP practices. In some embodiments, retransmits may be delayed or skipped completely. Fourth, a "TCP Window" field may be compliant with RFC793 but may advertise a TCP window that is sufficient to transfer the next packet at all times or almost at all times. This may be achieved, for example, by setting "TCP receive window" on the receiving side, as described in more detail below.

On the receiving side, each TCP packet may be received separately. A corresponding "forwarded packet", such as an IP packet and/or UDP packet, may be extracted from each received TCP packet (for example, via "unwrapping") and forwarded to the upper OSI layer (such as an application layer) upon receipt of such TCP packet, regardless of any missing segments. This process may differ from conventional TCP implementations, which do not forward data to the upper OSI layer until all missing segments up to the current point in the TCP stream are received so that the stream goes uninterrupted.

The process described above may provide a valid TCP stream wherein packet-inspecting firewalls may let such TCP stream through. The TCP stream may have UDP-based packet exchanges, which may provide better latencies. However, the process described above may face problems if an en route firewall reassembles the TCP stream and then re-issues valid TCP packets (which may be of different sizes) from such reassembled stream. Although this practice is valid for the TCP stream, this practice may break the one-to-one correspondence of "forwarded packets" to TCP packets, which may in turn break the operation of "latency-optimized UDP-over-TCP". The following processes may help to address this issue.

In some embodiments, a "sender" of "latency-optimized UDP-over-TCP" may mark boundaries of the "forwarded packets". This may be done in one or more of the following ways. Boundaries may be marked by choosing a fixed value for a "boundary byte", by "escaping" such "boundary byte" within "forwarded packets" and adding such "boundary byte" to the packet boundaries by, for example, prepending each "forwarded packet" with such "boundary byte". This ensures that each "boundary byte" within a TCP stream may represent an inter-packet boundary. Boundaries may also be marked by encoding "forwarded packet" using encoding that uses less than 256 values (such as, without limitation, base64 encoding, base255 encoding, uuencoding, yEnc encoding or URL encoding) and using one of the unused values as a "boundary byte". As an illustrative example, if base64 is used, then there may be 256−64=192 values to choose as a "boundary byte". Each such "boundary byte" within the TCP stream may represent an inter-packet boundary. Additionally, boundaries may be marked by using an "escaped bitstream", as described in more detail below. Boundaries may also be marked by adding a size and/or checksum fields (wherein such checksum may be of any kind, including, but not limited to, any kind of Fletcher checksum, any kind of CRC checksum or any kind of crypto checksum such as SHA-256, SHA-3 or BLAKE) to each of the "forwarded packets" in the TCP stream. The receiver on the receiving side may attempt to assume that a "forwarded packet" starts at a certain point and then check whether the size and/or checksum match. If there is a match, the receiver's assumption stands, and the "forwarded packet" may be extracted from the stream. In some embodiments, the receiver may attempt to assume that a "forwarded packet" starts at each of the bytes of received stream. In some embodiments, a "boundary byte" may be added to the stream, and only these "boundary bytes" may be used for making the assumption about the forwarded packet starting point. In such case, "boundary bytes" may be used without escaping/encoding the body of the "forwarded packet".

In some embodiments, "escaping" may be implemented by selecting three 1-byte constants: "escape byte", "v0" and "v1" and/or by replacing the "escape byte" within the body with 2 bytes, i.e., "escape byte" "v0", and replacing the "boundary byte" with 2 bytes, i.e., "escape byte" "v1". In the worst case, such implementation may lead to 100 percent overhead of "escaping". In other embodiments, "escaping" may involve selecting a value for "escape byte" and using the next byte after "escape byte" to store any number, n (for example, n=5), of ternary digits. It should be noted that n may be equal to any integer. Each of the digits may have three possible values which symbolize where the next byte in the output should come from. The first value may indicate that the next byte is a "boundary byte"; the second value may indicate that the next byte is an "escape byte"; and the third value may indicate that the next byte is to be taken from the bytes coming after the "escape byte". In this manner, "escape byte"+following byte may be used to encode up to five bytes. This process may limit the worst-case overhead of "escaping" to 20 percent.

In some embodiments, an "escaped bitstream" may be implemented as follows. A bit-oriented encoding which takes symbols and emits sequences of bits may be used. Examples of such bit-oriented encodings include, without limitation, Huffman coding and Huffman-like coding as described in Sergey Ignatchenko, "An Algorithm for Online Data Compression", *C/C++ Users Journal*, Volume 16, Number 10 (October 1998). Next, to input the vocabulary of the symbols for the bit-oriented encoding, one or more special symbol(s) may be inserted in case the output bitstream contains a "boundary byte", and rather than carrying information about the encoded output, it may be used to ensure that the "boundary byte" does not appear in the bitstream.

Examples of such special symbols may include, without limitation, a no-op symbol and/or a symbol indicating that a certain portion of the bitstream or bytestream following such special symbol is inverted. In some embodiments, the no-op symbol may have an encoding length which is odd. Such no-op symbol may be used to "shift" the subsequent bitstream and avoid the "boundary byte" present in the output. In some embodiments, the symbol indicating an inversion of a portion of the bitstream or bytestream may indicate that bits in the next symbol are inverted. In other embodiments, such symbol may indicate that the next byte in the bytestream is inverted. In some embodiments, such special symbol(s) may be inserted into the bitstream when inserting the next "normal" symbol in the bitstream would cause the output bytestream to contain a "boundary byte". An "escaped bitstream" may allow for combining compression (such as, without limitation, Huffman or Huffman-like compression) with provision of guarantees that the encoded "forwarded packets" will not contain "boundary bytes".

In some embodiments, to implement an "escaped bitstream", eight special no-op symbols may be introduced into the input vocabulary of Huffman or Huffman-like encoding. All such special symbols may have the same odd-number encoded bitsize, wherein bitsize≤15, and three bits in the encoding (the first, last and middle bits) have all possible combinations (i.e., (0, 0, 0), (0, 0, 1), (0, 1, 0), (0, 1, 1), (1, 0, 0), (1, 0, 1), (1, 1, 0) and (1, 1, 1)). The encoding parameters and/or tables may be chosen in a way such that all other symbols in the input vocabulary may be encoded with no more than 14 bits. Prior to adding each symbol into the bitstream, the bitstream may be checked for whether adding a symbol would create a "boundary byte". If so, one of the eight no-op symbols may be selected to avoid creating "boundary bytes" and may be added to the output stream. This procedure for adding a symbol may be repeated. It should be noted that in some cases, the procedure described above may result in the addition of more than one special no-op symbol.

In some embodiments, upon receiving each TCP packet, the receiver of "latency-optimized UDP-over-TCP" may do one or more of the following. The receiver may check whether the TCP packet corresponds to a "forwarded packet". If so, the "forwarded packet" may be extracted and forwarded to an upper protocol layer for further processing. If not, a portion of the TCP stream may be reassembled by combining the TCP payload with the TCP payload from the previously received TCP packets. Then an attempt can be made to find one or more of the "forwarded packets" within this portion of TCP stream. It should be noted that, unlike in traditional TCP, UDP-over-TCP portions of a TCP stream may have "gaps" between them, and these "gaps" should not prevent further analysis as described below. The receiver of "latency-optimized UDP-over-TCP" may also extract a "forwarded packet", if there is one, from any of the reassembled portions of the TCP stream. Once the "forwarded packet" is extracted, the receiver may forward it to the upper protocol layer. The detection of "forwarded packets" in reassembled portions of TCP streams may be implemented based on marked boundaries of "forwarded packets", such as, without limitation, on "boundary bytes" and/or checksums. In some embodiments, each "boundary byte" may indicate the start of the "forwarded packet". In other embodiments, more complicated detection methods (including, but not limited to, checksums as described in more detail above) may be used.

The embodiment described above may operate properly in the presence of firewalls that may reassemble and then re-issue TCP stream, while simultaneously providing improved latency in the case of packets lost between a firewall and the receiver.

In some embodiments, "latency-optimized UDP-over-TCP" may be implemented as a custom TCP stack that operates according to the description above. Such implementation of "latency-optimized UDP-over-TCP" may apply to the sender, receiver or both. In some embodiments, the sender may be implemented as a unit preparing a TCP stream with "boundary bytes" and/or checksums, as described in more detail above, on top of a traditional TCP stack by, for example, disabling a Nagle algorithm for the traditional TCP stack. In one non-limiting example, this may be implemented using a TCP_NODELAY socket option on a Berkeley socket. In some embodiments, the receiver may be implemented using a traditional TCP stack as follows. A library (such as, without limitation, libpcap or libnetfilter) which allows "sniffing" of the incoming packets, or a network filter driver (including, but not limited to, all techniques associated with Windows Filtering Platform, NDIS drivers and/or Linux network filter drivers) may be used to copy relevant TCP packets as they are received. The original packet may proceed to the traditional TCP stack, where such packet may be processed (for example, by a traditional Berkeley socket), and all the contents from such socket may be ignored. Such processing by a traditional TCP stack may ensure that all retransmits are handled by the TCP stack. A copy of the original packet may be processed by, without limitation, reassembling portions of the TCP stream and/or finding, extracting and/or forwarding the "forwarded packets" from TCP packets and/or reassembled portions of the TCP stream, all of which are described in more detail above. In some embodiments, instead of making a copy of the TCP packet, the TCP packet may be processed as it passes the filter/sniffing library and/or driver. In some embodiments, a TCP receive buffer on the receiving side may be set to a relatively high value (for example, over 10 Kbytes). In some embodiments, a TCP receive buffer may be calculated as a product of a normal data stream for the application over a period of several round-trip times (for example, five to ten round-trip times). In some embodiments, instead of calculating round-trip times, an upper-bound estimate (such as one second) may be used as a period for conducting the calculations described above. The size of the TCP receive buffer may be set by using, without limitation, a SO_RCVBUF TCP socket option or any similar socket option. This may facilitate sufficient values for the TCP window to be advertised to the sending side, which may be done by the TCP stack itself, based on the size of the TCP receive buffer.

In some embodiments, "latency-oriented UDP-over-TCP" may also include (a) trying to send packets over UDP, (b) detecting that replies are not received for a significant time (such as 1 to 30 seconds), and (c) switching to "latency-oriented UDP-over-TCP" as described above. Such process may allow for automatic detection of UDP-unfriendly firewalls without user intervention. In some embodiments, such automatic detection may be made on a per-interface basis.

In some embodiments, "latency-oriented UDP-over-TCP" may include forming a TCP stream, which, from the point of view of a third-party observer, may be indistinguishable from a valid Secure Sockets Layer (SSL) and/or TLS stream (for example, as described in RFC5246, the entirety of which is incorporated herein by reference). Such formation of a TCP screen may include one or more of the following: establishing a valid SSL and/or TLS stream or a "handshake"; and/or wrapping all the "forwarded packets" within "TLS records" (as described in RFC5246) as, for example, application_dataTLS records. Since application_data is generally encrypted after a handshake, there may be no way for an intermediary to detect the contents within application_data records. In some embodiments, contents within TLS records may be not compliant with TLS specifications, but instead may simply contain the "forwarded packets" and/or boundary bytes. In some embodiments, one "forwarded packet" per TLS record may be used; in other embodiments, multiple "forwarded packets" per TLS record may be used. In some embodiments, some or all "forwarded packets" may span different TLS records. In some embodiments, "boundary bytes" described above may reside within TLS records. Some of the data within TLS records (for example, "forwarded packets" but not "boundary bytes") may be encrypted and/or scrambled to make them look like white noise to the potential third-party observers. All these measures may allow for communication that is indistinguishable from a valid SSL and/or TLS stream to a third-party observer and may facilitate communication in environments where third-party firewalls inspect the validity of SSL and/or TLS streams.

In some embodiments, "latency-oriented UDP-over-TCP" may include forming a TCP stream which, from the point of view of third-party observer, is a valid Websocket stream (as described in RFC6455, the entirety of which is incorporated herein by reference). This may include one or more of the following: establishing a valid Websocket "handshake" (which may involve an HTTP/HTTPS request); and/or wrapping all the "forwarded packets" within "Websocket frames" (as described in RFC6455). In some embodiments, one "forwarded packet" per "Websocket frame" may be used; in other embodiments, multiple "forwarded packets" per "Websocket frame" may be used. In some embodiments, some or all "forwarded packets" may span different "Websocket frames". In some embodiments, "boundary bytes" described above may reside within "Websocket frames". All these measures may allow for communication that is indistinguishable from a valid Websocket stream to a third-party observer and may facilitate communication in environments where third-party firewalls inspect the validity of HTTP and/or Websocket streams.

It should be understood that whenever sending a packet (such as a UDP packet and/or IP packet) is referred to throughout this embodiment, the payload of such packets may be encoded using any forward error correction mechanism, including, but not limited to, Hamming codes, Reed-Solomon codes and convolutional codes, and any forward error correction mechanism currently known or developed in the future.

It is to be understood that "adding fields" (for example, to a packet) or "wrapping" as discussed within the present disclosure may be accomplished in a variety of ways including, but not limited to: (a) wrapping, (b) adding field(s) to the beginning of the packet, and/or (c) adding field(s) to the end of the packet. The field that may be added to the beginning or end of a packet may have a fixed or variable size. If the field added is of a variable size, then the size of the field may be derived from the data within the field (for example, as in VLQ coding). If VLQ or other variable-size field(s) is added to the end of a packet, the field(s) may be written in a reverse byte order to facilitate determination of size starting from the end of the packet.

It should be understood that, throughout this disclosure, stream-oriented connections and/or protocols, including, but not limited to, QUIC, UDP Torrent tracker and Stream Control Transmission Protocol may be used in a similar manner as a TCP connection and/or protocol. Additionally, all the protocols running on top of the aforementioned stream-oriented connections and/or protocols, including, but not limited to, HTTP, HTTPS and SPDY, may use features described within the context of the present disclosure by being implemented on top of the applicable stream-oriented connections and/or protocol.

It would be apparent to one skilled in the relevant arts that the present disclosure, as described above, may be implemented in many different embodiments of software, hardware, firmware and/or the entities illustrated in the figures. Any actual software code with the specialized control of hardware to implement the present disclosure is not limiting of the present disclosure. Thus, the operational behavior of the present disclosure has been described with the understanding that modifications and variations of the embodiments are possible and within the scope and spirit of the present disclosure. Various aspects of the present disclosure may be implemented by software, firmware, hardware or a combination thereof. In an example of a variation, elements or processes of latency-oriented router 120, latency-oriented proxy 121, intermediate proxy 122, proxy router 123 and/or simple proxy 124 in FIGS. 5A-5E may be further configured to run in parallel. Such parallel execution of these processes may increase the efficiency and speed of latency-oriented router 120.

In addition to other embodiments discussed herein, the present disclosure provides for the following clauses which are directed to non-limiting embodiments of the present disclosure.

Clause 1: A method of managing packets, the method comprising: receiving, by a first routing device comprising a plurality of interfaces, a plurality of packets from a source device via a first interface; determining, by the first routing device, that the plurality of packets comprises at least one latency-critical packet; generating, by the first routing device, at least a first copy-packet of the at least one latency-critical packet; transmitting, by the first routing device, the at least one latency-critical packet to a target device via a second interface; and transmitting, by the first routing device, the at least first copy-packet to a second routing device via a third interface.

Clause 2: The method of clause 1, further comprising identifying, by the first routing device, the at least one latency-critical packet based on one or more packet characteristics.

Clause 3 The method of any of the preceding clauses, further comprising establishing, by the first routing device, a latency-critical session in response to identifying the at least one latency-critical packet.

Clause 4: The method of any of the preceding clauses, further comprising transmitting, by the first routing device, a request for a service for packet transmission to the second routing device via the third interface.

Clause 5: The method of any of the preceding clauses, wherein the request to the second routing device for the service for packet transmission comprises an advertisement message.

Clause 6: The method of any of the preceding clauses, wherein transmitting the at least first copy-packet to the second routing device via the third interface occurs after receiving a positive response to the request from the second routing device.

Clause 7: The method any of the preceding clauses, further comprising establishing a logical connection between the first routing device and the second routing device.

Clause 8: The method of any of the preceding clauses, wherein each of the plurality of packets received by the first routing device via the first interface comprises a plurality of fields, and wherein the method further comprises: identifying, by the first routing device, a target address field in the plurality of fields of the at least one latency-critical packet; and changing, by the first routing device, a content of the target address field of the at least first copy-packet to reflect an address of the second routing device.

Clause 9: The method of any of the preceding clauses, wherein each of the plurality of packets received by the first routing device via the first interface comprises a plurality of fields, and wherein the method further comprises: identifying, by the first routing device, a source address field in the plurality of fields of the at least one latency-critical packet; and changing, by the first routing device, a content of the source address field of the at least first copy-packet to reflect an address of the first routing device.

Clause 10: The method of any of the preceding clauses, wherein each of the plurality of packets received by the first routing device via the first interface comprises a plurality of fields, and wherein the method further comprises: identifying, by the first routing device, a target port field in the plurality of fields of the at least one latency-critical packet; and changing, by the first routing device, a content of the target port field of the at least first copy-packet to reflect a target port of the second routing device.

Clause 11: The method of any of the preceding clauses, wherein each of the plurality of packets received by the first routing device via the first interface comprises a plurality of fields, and wherein the method further comprises: identifying, by the first routing device, a source port field in the plurality of fields of the at least one latency-critical packet; and changing, by the first routing device, a content of the source port field of the at least first copy-packet to reflect a port of the first routing device.

Clause 12: The method of any of the preceding clauses, wherein the first target device is a proxy device.

Clause 13: The method of any of the preceding clauses, wherein the at least first copy-packet comprises content instructing the second routing device to transmit the at least first copy-packet to the target device.

Clause 14: The method of any of the preceding clauses, further comprises generating, by the first routing device, a cryptographic signature using a cryptographic algorithm for the at least first copy-packet that uniquely identifies the first routing device to the target device.

Clause 15: A routing device comprising: a plurality of interfaces, wherein the routing device is configured to receive a plurality of packets from a source device via a first interface; a processor configure to: determine that the plurality of packets received via the first interface comprise at least one latency-critical packet; generate at least a first copy-packet of the at least one latency-critical packet; transmit the at least one latency-critical packet to a target device via a second interface; and transmit the at least first copy-packet to a second routing device via a third interface.

Clause 16: The routing device of clause 15, wherein the processor is configured to determine that the plurality of packets received via the first interface comprise the at least one latency-critical packet based on one or more packet characteristics.

Clause 17: The routing device of any of clauses 15 to 16, wherein the processor is further configured to establish a latency-critical session in response to identifying the at least one latency-critical packet.

Clause 18: The routing device of any of clauses 15 to 17, wherein the processor is further configured to transmit a request for a service for packet transmission to the second routing device via the third interface.

Clause 19: The routing device of any of clauses 15 to 18, wherein the request to the second routing device for the service for packet transmission comprises an advertisement message.

Clause 20: The routing device of any of clauses 15 to 19, wherein the processor is configured to transmit the at least first copy-packet to the second routing device via the third interface after the processor receives a positive response to the request from the second routing device.

Clause 21: The routing device of any of clauses 15 to 20, wherein the processor is further configured to establish a logical connection between the first routing device and the second routing device.

Clause 22: The routing device of any of clauses 15 to 21, wherein each of the plurality of packets received by the routing device via the first interface comprises a plurality of fields, and wherein the processor is further configured to: identify a target address field in the plurality of fields of the at least one latency-critical packet; and change a content of the target address field of the at least first copy-packet to reflect an address of the second routing device.

Clause 23: The routing device of any of clauses 15 to 22, wherein each of the plurality of packets received by the routing device via the first interface comprises a plurality of fields, and wherein the processor is further configured to: identify a source address field in the plurality of fields of the at least one latency-critical packet; and change a content of the source address field of the at least first copy-packet to reflect an address of the first routing device.

Clause 24: The routing device of any of clauses 15 to 23, wherein each of the plurality of packets received by the routing device via the first interface comprises a plurality of fields, and wherein the processor is further configured to: identify a target port field in the plurality of fields of the at least one latency-critical packet; and change a content of the target port field of the at least first copy-packet to reflect a target port of the second routing device.

Clause 25: The routing device of any of clauses 15 to 24, wherein each of the plurality of packets received by the routing device via the first interface comprises a plurality of fields, and wherein the processor is further configured to: identify a source port field in the plurality of fields of the at least one latency-critical packet; and change a content of the source port field of the at least first copy-packet to reflect a port of the routing device.

Clause 26: The routing device of any of clauses 15 to 25, wherein the first target device is a proxy device.

Clause 27: The routing device of any of clauses 15 to 26, wherein the at least first copy-packet comprises content instructing the second routing device to transmit the at least first copy-packet to the target device.

Clause 28: The routing device of any of clauses 15 to 27, wherein the processor is further configured to generate a cryptographic signature using a cryptographic algorithm for the at least first copy-packet that uniquely identifies the routing device to the target device.

Clause 29: A method of managing packets, the method comprising: maintaining, by a first routing device, a communication session with a target device, wherein the first routing device receives packets from a source device via a first interface and transmitting the packets to the target device via a second interface; detecting, by the first routing device, a problem with the communication session with the target device; transmitting, by the first routing device, an emergency connection message to a second routing device via a third interface; receiving from the second routing device an emergency connection acknowledgement message; and transmitting, by the first routing device, the packets received from the source device to the second routing device via the third interface.

Clause 30: The method of clause 29, wherein transmitting the packets received from the source device to the second routing device via the third interface occurs after receiving the emergency connection acknowledgement message Clause 31: The method of any of clauses 29 to 30, further comprising: detecting, by the first routing device, that the problem has resolved and the communication session with the target device has been restored; transmitting, by the first routing device, an emergency connection termination message to the second routing device via the third interface; receiving from the second routing device an emergency connection termination acknowledgement message; resuming transmitting, by the first routing device, the packets received from the source device to the target device via the second interface.

Clause 32: The method of any of clauses 29 to 31, wherein the communication session is one selected from the group comprising: a TCP session, a UDP session and a latency-critical session.

Clause 33: The method of any of clauses 29 to 32, wherein detecting a problem with the communication session comprises detecting, by the first routing device, that it has not received an incoming packet over the second interface for a predetermined or configurable amount of time.

Clause 34: The method of any of clauses 29 to 33, wherein detecting a problem with the communication session comprises transmitting a ping message via the second interface and not receiving a response to the ping message.

Clause 35: The method of any of clauses 29 to 34, wherein the packets received from the source device via the first device comprise latency-critical packets.

Clause 36: A routing device comprising: a first interface configured to receive packets from a source device; a second interface to transmit the packets to a target device; and a processor configured to: maintain a communication session with the target device; detect a problem with the communication session with the target device; transmit an emergency connection message to a second routing device via a third interface of the routing device; receive from the second routing device an emergency connection acknowledgement message; and transmit the packet received from the source device to the second routing device via the third interface.

Clause 37: The routing device of clause 36, wherein the process is configured to transmit the packets received from the source device to the second routing device via the third interface after the processor receives the emergency connection acknowledgement message.

Clause 38: The routing device of any of clauses 36 to 37, wherein the processor is further configured to: detect that the problem has resolved and the communication session with the target device has been restored; transmit an emergency connection termination message to the second routing device via the third interface; receive from the second routing device an emergency connection termination acknowledgement message; resume transmitting the packets received from the source device to the target device via the second interface.

Clause 39: The routing device of any of clauses 36 to 38, wherein the communication session is one selected from the group comprising: a TCP session, a UDP session and a latency-critical session.

Clause 40: The routing device of any of clauses 36 to 39, wherein to detect a problem with the communication session the processor is further configured to detect that the routing device has not received an incoming packet over the second interface for a predetermined or configurable amount of time.

Clause 41: The routing device of any of clauses 36 to 40, wherein to detect a problem with the communication session the processor is further configured to transmit a ping message via the second interface and not receive a response to the ping message.

Clause 42: The routing device of any of clauses 36 to 41, wherein the packets received from the source device via the first device comprise latency-critical packets.

Figure 8:
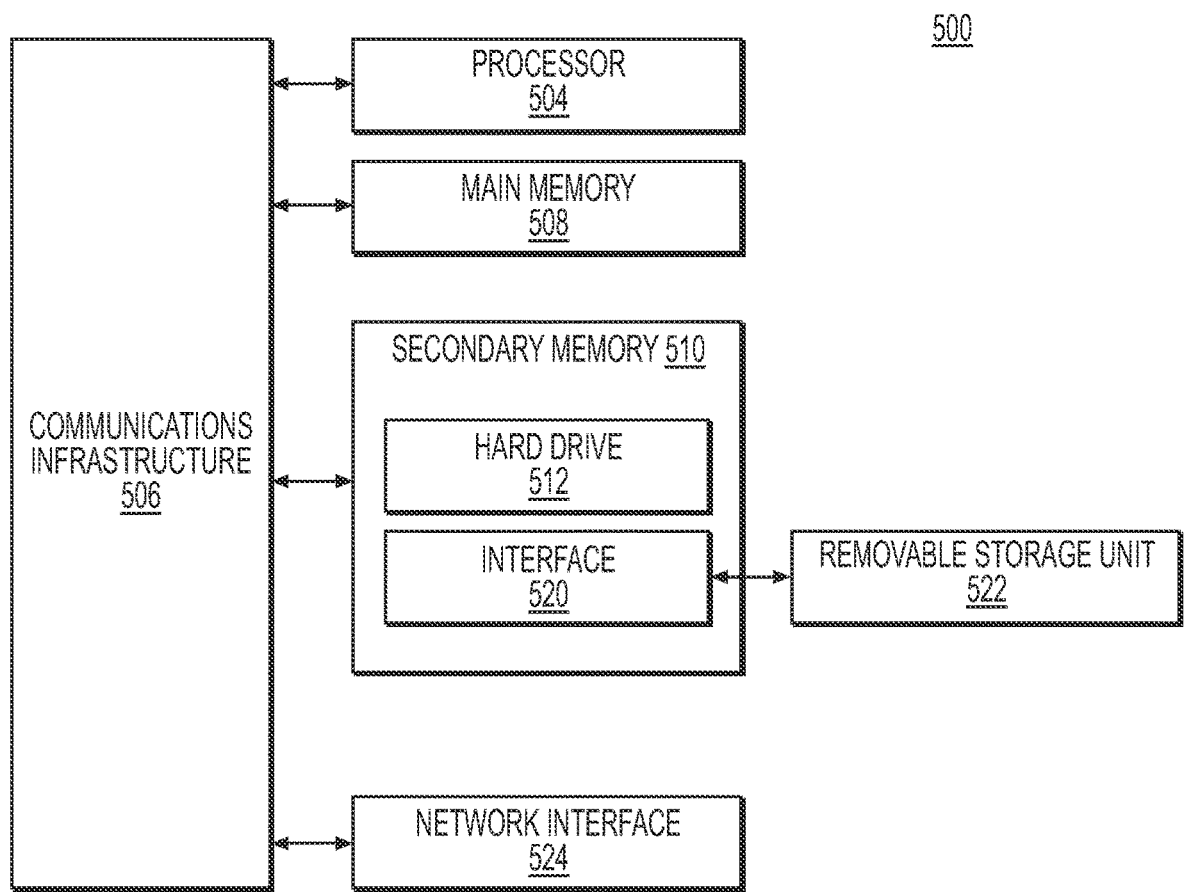
FIG. 8 illustrates an exemplary computer system, according to an embodiment of the present disclosure.

FIG. 8 illustrates an exemplary computer system 500, in which the present disclosure, or portions thereof, may be implemented as computer-readable code. Latency-oriented router 120, latency-oriented proxy 121, intermediate proxy 122, proxy router 123 and/or simple proxy 124 in FIGS. 4A-4H and 5A-5E, as well as the processes disclosed with respect to FIGS. 7A-7J may be implemented in system 500. After reading this description, it will become apparent to a person skilled in the relevant art how to implement the embodiments using other computer systems and/or computer architectures.

Computer system 500 may include one or more processors, such as processor 504. Processor 504 may be a special purpose or a general purpose processor. Computer system 500 also may include a main memory 508, preferably random access memory (RAM). Processor 504 may be connected to main memory 508 using one of double data rate (DDR) interfaces, such as DDR2, DDR3 or DDR3L.

Computer system 500 may also include a secondary memory 510. Secondary memory 510 may include a hard disk drive (or SSD/Flash) 512 (for example, connected to processor 504 via SATA interface, eMMC interface or any other similar interface). In alternative implementations, secondary memory 510 may include other means for allowing computer programs or other instructions to be loaded into computer system 500. Such means may include a removable storage unit 522 and interface 520. Examples of such means may include an SD card and SD interface, a removable memory chip (such as an erasable programmable read-only memory (EPROM) or programmable read-only memory (PROM)) and respective socket, optical or floppy disc and a respective disk drive, USB flash stick and USB socket, tape and a tape drive and other removable storage units that allow software and data to be transferred from the removable storage unit 522 to computer system 500.

Computer system 500 may also include a network interface 524. Network interface 524 may include one or more of the following: a modem, an ADSL modem, cable modem, 3G modem, LTE modem, a NIC (such as an Ethernet card), Wi-Fi a communications port, a PCMCIA slot and card or the like.

In this document, the terms "computer program medium" and "computer usable medium" are used to generally refer to media such as removable storage unit 522 and/or a hard disk drive 512. Computer program medium and computer usable medium may also refer to memories, such as main memory 508 and secondary memory 510, which may be memory semiconductors (e.g., dynamic random access memory, etc.). These computer program products are means for providing software to computer system 500.

Computer programs (also called computer control logic) are stored in main memory 508 and/or secondary memory 510. Computer programs may also be received via network interface 524. Such computer programs, when executed, enable computer system 500 to implement the present disclosure as discussed herein. In particular, the computer programs, when executed, enable processor 504 to implement the processes of the present disclosure, such as the steps in the methods illustrated by flowcharts of FIGS. 7A-7J, discussed above. Accordingly, such computer programs represent controllers of the computer system 500. Where the disclosure is implemented using software, the software may be stored in a computer program product and loaded into computer system 500 using removable storage unit 522, interface 520, hard drive 512 or network interface 524.

The disclosure is also directed to computer program products comprising software stored on any computer useable medium. Such software, when executed in one or more data processing device, causes a data processing device(s) to operate as described herein. Embodiments of the disclosure employ any computer useable or readable medium, known now or developed in the future. Examples of computer useable mediums include, but are not limited to, primary storage devices (e.g., any type of random access memory), secondary storage devices (e.g., hard drives, SSDs, floppy disks, tapes, magnetic storage devices, optical storage devices, microelectromechanical systems, nanotechnological storage device, Flash, etc.) and communication mediums (e.g., wired and wireless communications networks, local area networks, wide area networks, intranets, etc.).

It is to be understood that the various embodiments disclosed herein are not mutually exclusive and that a particular implementation may include features or capabilities of multiple embodiments discussed herein.

While the present disclosure refers to packets and/or fields within packets by certain specific names, it is to be understood that these names are not intended to limit the scope of the invention in any way and that any name or designator may be given to packets and/or fields described herein as long as it performs the function and/or serves the purpose described herein. It is also to be understood that the invention is not limited to any particular structure and/or organization of packets and/or fields therein.

While specific embodiments and applications of the present invention have been illustrated and described, it is to be understood that the invention is not limited to the precise configuration and components disclosed herein. The terms, descriptions and figures used herein are set forth by way of illustration only and are not meant as limitations. Various modifications, changes and variations which will be apparent to those skilled in the art may be made in the arrangement, operation and details of the apparatuses, methods and systems of the present invention disclosed herein without departing from the spirit and scope of the invention. By way of non-limiting example, it will be understood that the block diagrams included herein are intended to show a selected subset of the components of each apparatus and system, and each pictured apparatus and system may include other components which are not shown on the drawings. Additionally, those with ordinary skill in the art will recognize that certain steps and functionalities described herein may be omitted or re-ordered without detracting from the scope or performance of the embodiments described herein.

The various illustrative logical blocks, modules, circuits and algorithm steps described in connection with the embodiments disclosed herein may be implemented as electronic hardware, computer software or combinations of both. To illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. The described functionality may be implemented in varying ways for each particular application-such as by using any combination of MCUs, MPUs, FPGAs, ASICs and/or System on a Chip (SoC), but such implementation decisions should not be interpreted as causing a departure from the scope of the present invention.

The steps of a method or algorithm described in connection with the embodiments disclosed herein may be embodied directly in hardware, in a software module executed by a processor or in a combination of the two. A software module may reside in RAM, flash memory, read-only memory, EPROM memory, EEPROM memory, registers, hard disk, a removable disk, a CD-ROM or any other form of storage medium known in the art.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

What is claimed is:

1. A method of managing packets, the method comprising:
   maintaining, by a first routing device, a communication session with a target device, wherein the first routing device receives packets from a source device via a first interface and transmits the packets to the target device via a second interface;
   detecting, by the first routing device, a problem with a connection between the first routing device and the target device;
   transmitting, by the first routing device, an emergency connection message to a second routing device via a third interface in response to detecting the problem with the connection between the first routing device and the target device;
   receiving, by the first routing device, an emergency connection acknowledgement message from the second routing device; and
   transmitting, by the first routing device, one or more packets received from the source device to the second routing device via the third interface in response to detecting the problem with the connection between the first routing device and the target device and receipt of the emergency connection acknowledgement message from the second routing device, wherein the second routing device transmits the one or more packets to the target device.

2. The method of claim 1, further comprising:
   determining, by the first routing device, that the problem with the connection between the first routing device and the target device has been resolved;
   transmitting, by the first routing device, an emergency connection termination message to the second routing device via the third interface in response to determining that the problem with the connection between the first routing device and the target device has been resolved;
   receiving, by the first routing device, an emergency connection termination acknowledgement message from the second routing device; and
   resuming transmitting, by the first routing device, the packets received from the source device to the target device via the second interface in response to receipt of the emergency connection termination acknowledgement message from the second routing device.

3. The method of claim 1, wherein the communication session is one selected from the group comprising: a TCP session, a UDP session, and a latency-critical session.

4. The method of claim 1, wherein detecting the problem with the connection between the first routing device and the target device comprises detecting that an incoming packet has not been received over the second interface for a predetermined or configurable amount of time.

5. The method of claim 1, wherein detecting the problem with the connection between the first routing device and the target device comprises transmitting a ping message via the second interface and determining that a response to the ping message has not been received.

6. The method of claim 1, wherein the packets received from the source device via the first device comprise latency-critical packets.

7. The method of claim 1, further comprising transmitting, by the first routing device, a session termination message to the target device via the second interface in response to receipt of the emergency connection acknowledgement message from the second routing device.

8. The method of claim 1, wherein each of the packets received from the source device via the first interface comprises a plurality of fields, and wherein the method further comprises:
   identifying, by the first routing device, a source address field in the plurality of fields of at least one packet of the packets received from the source device via the first interface; and
   changing, by the first routing device, a content of the source address field of the at least one packet to reflect an address of the first routing device.

9. The method of claim 1, wherein each of the packets received from the source device via the first interface comprises a plurality of fields, and wherein the method further comprises:
   identifying, by the first routing device, a source port field in the plurality of fields of at least one packet of the packets received from the source device via the first interface; and
   changing, by the first routing device, a content of the source port field of the at least one packet to reflect a port of the first routing device.

10. The method of claim 1, wherein detecting the problem with the connection between the first routing device and the target device comprises receiving a notification over the second interface indicating that a packet was not received by the target device.

11. A routing device comprising:
    a first interface configured to receive packets from a source device;
    a second interface configured to transmit the packets to a target device; and
    a processor configured to:
       maintain a communication session with the target device;

detect a problem with a connection between the routing device and the target device;

transmit an emergency connection message to a second routing device via a third interface of the routing device in response to the detection of the problem with the connection between the routing device and the target device;

receive an emergency connection acknowledgement message from the second routing device; and transmit one or more packets received from the source device to the second routing device via the third interface in response to the detection of the problem with the connection between the first routing device and the target device and receipt of the emergency connection acknowledgement message from the second routing device, wherein the second routing device transmits the one or more packets to the target device.

12. The routing device of claim 11, wherein the processor is further configured to:

determine that the problem with the connection between the routing device and the target device has been resolved;

transmit an emergency connection termination message to the second routing device via the third interface in response to determining that the problem with the connection between the routing device and the target device has been resolved;

receive from the second routing device an emergency connection termination acknowledgement message; and resume transmitting the packets received from the source device to the target device via the second interface in response to receipt of the emergency connection termination acknowledgement message from the second routing device.

13. The routing device of claim 11, wherein the communication session is one selected from the group comprising: a TCP session, a UDP session, and a latency-critical session.

14. The routing device of claim 11, wherein to detect the problem with the connection between the routing device and the target device, the processor is further configured to detect that the routing device has not received an incoming packet over the second interface for a predetermined or configurable amount of time.

15. The routing device of claim 11, wherein to detect the problem with the connection between the routing device and the target device, the processor is further configured to transmit a ping message via the second interface and determine that a response to the ping message has not been received.

16. The routing device of claim 11, wherein the packets received from the source device via the first device comprise latency-critical packets.

17. The routing device of claim 11, wherein the processor is further configured to transmit a session termination message to the target device via the second interface in response to receipt of the emergency connection acknowledgement message from the second routing device.

18. The routing device of claim 11, wherein each of the packets received from the source device via the first interface comprises a plurality of fields, and wherein the processor is further configured to:

identify a source address field in the plurality of fields of at least one packet of the packets received from the source device via the first interface; and change a content of the source address field of the at least one packet to reflect an address of the routing device.

19. The routing device of claim 11, wherein each of the packets received from the source device via the first interface comprises a plurality of fields, and wherein the processor is further configured to:

identify a source port field in the plurality of fields of at least one packet of the packets received from the source device via the first interface; and change a content of the source port field of the at least one packet to reflect a port of the routing device.

20. The routing device of claim 11, wherein to detect the problem with the connection between the routing device and the target device, the processor is further configured to receive a notification over the second interface indicating that a packet was not received by the target device.

* * * * *